United States Patent
Maxwell et al.

(10) Patent No.: US 12,544,344 B2
(45) Date of Patent: Feb. 10, 2026

(54) TOPICAL DELIVERY OF NUCLEIC ACID COMPOUNDS

(71) Applicant: Phio Pharmaceuticals Corp., King of Prussia, PA (US)

(72) Inventors: Melissa Maxwell, Clinton, MA (US); Richard J. Looby, Reading, MA (US)

(73) Assignee: Phio Pharmaceuticals Corp., King of Prussia, PA (US)

( * ) Notice: Subject to any disclaimer, the term of this patent is extended or adjusted under 35 U.S.C. 154(b) by 89 days.

(21) Appl. No.: 16/606,669

(22) PCT Filed: Apr. 19, 2018

(86) PCT No.: PCT/US2018/028436
§ 371 (c)(1),
(2) Date: Oct. 18, 2019

(87) PCT Pub. No.: WO2018/195355
PCT Pub. Date: Oct. 25, 2018

(65) Prior Publication Data
US 2020/0085764 A1   Mar. 19, 2020

Related U.S. Application Data

(60) Provisional application No. 62/487,454, filed on Apr. 19, 2017.

(51) Int. Cl.
| | | |
|---|---|---|
| A61K 8/365 | (2006.01) | |
| A61K 8/35 | (2006.01) | |
| A61K 8/368 | (2006.01) | |
| A61K 8/37 | (2006.01) | |
| A61K 8/42 | (2006.01) | |
| A61K 8/60 | (2006.01) | |
| A61K 8/73 | (2006.01) | |
| A61K 9/00 | (2006.01) | |
| A61K 31/122 | (2006.01) | |
| A61K 31/7088 | (2006.01) | |
| A61K 47/12 | (2006.01) | |
| A61K 47/18 | (2017.01) | |

(52) U.S. Cl.
CPC .............. *A61K 31/122* (2013.01); *A61K 8/35* (2013.01); *A61K 8/365* (2013.01); *A61K 8/368* (2013.01); *A61K 8/37* (2013.01); *A61K 8/42* (2013.01); *A61K 8/606* (2013.01); *A61K 8/731* (2013.01); *A61K 31/7088* (2013.01); *A61K 47/12* (2013.01); *A61K 47/18* (2013.01); *A61K 9/0014* (2013.01)

(58) Field of Classification Search
None
See application file for complete search history.

(56) References Cited

U.S. PATENT DOCUMENTS

| | | |
|---|---|---|
| 3,687,808 A | 8/1972 | Merigan et al. |
| 3,737,337 A | 6/1973 | Schnoring et al. |
| 3,891,570 A | 6/1975 | Fukushima et al. |
| 4,201,860 A | 5/1980 | Naito et al. |
| 4,235,871 A | 11/1980 | Papahadjopoulos et al. |
| 4,384,975 A | 5/1983 | Fong |
| 4,389,330 A | 6/1983 | Tice et al. |
| 4,415,732 A | 11/1983 | Caruthers et al. |
| 4,426,330 A | 1/1984 | Sears |
| 4,501,728 A | 2/1985 | Geho et al. |
| 4,652,441 A | 3/1987 | Okada et al. |
| 4,735,935 A * | 4/1988 | McAnalley .......... A61K 31/715 424/DIG. 13 |
| 4,737,323 A | 4/1988 | Martin et al. |
| 4,837,028 A | 6/1989 | Allen |
| 4,897,355 A | 1/1990 | Eppstein et al. |
| 4,904,582 A | 2/1990 | Tullis |
| 4,958,013 A | 9/1990 | Letsinger |
| 5,013,556 A | 5/1991 | Woodle et al. |
| 5,023,243 A | 6/1991 | Tullis et al. |
| 5,051,257 A | 9/1991 | Pietronigro |
| 5,053,228 A | 10/1991 | Mori et al. |
| 5,108,921 A | 4/1992 | Low et al. |
| 5,112,963 A | 5/1992 | Pieles et al. |
| 5,149,782 A | 9/1992 | Chang et al. |
| 5,151,510 A | 9/1992 | Stec et al. |
| 5,162,115 A | 11/1992 | Pietronigro |
| 5,188,897 A | 2/1993 | Suhadolnik et al. |
| 5,213,804 A | 5/1993 | Martin et al. |
| 5,227,170 A | 7/1993 | Sullivan |

(Continued)

FOREIGN PATENT DOCUMENTS

| | | |
|---|---|---|
| AU | 2004206255 B2 | 8/2004 |
| CN | 1 568 373 A | 1/2005 |

(Continued)

OTHER PUBLICATIONS

Biochemical, Reagents Kits Offer Scientists Good Return on Investment. Ahern (1995) [retrieved on Dec. 22, 1998]. Retrieved from the internet: <https://www.the-scientist.com/technology/biochemical-reagents-kits-offer-scientists-good-return-on-investment-58425>. (Year: 1995).*

International Search Report and Written Opinion for Application No. PCT/US2018/028436 mailed Jul. 9, 2018.

International Preliminary Report on Patentability for Application No. PCT/US2018/028436 mailed Oct. 31, 2019.

[No Author Listed] RXi Pharmaceuticals Corporation. Ex 99.1. OTC: RXII. Mar. 2013. 38 pages.

[No Author Listed], RXi Pharmaceuticals Presents Self-Delivering RNAi Data at Scar Club Meeting in France. Drugs.com. Mar. 26, 2010. http://www.drugs.com/clinical_trials/rxi-pharmaceuticals-presents-self-delivering-rnai-data-scar-club-meeting-france-9093.html [last accessed Aug. 19, 2014].

(Continued)

*Primary Examiner* — Katherine Peebles
(74) *Attorney, Agent, or Firm* — Wolf, Greenfield & Sacks, P.C.

(57) ABSTRACT

In some aspects, the disclosure relates to RNAi constructs with improved tissue and cellular uptake characteristics and methods of use of these compounds in dermal applications.

9 Claims, 6 Drawing Sheets

Specification includes a Sequence Listing.

(56) References Cited

U.S. PATENT DOCUMENTS

| | | | |
|---|---|---|---|
| 5,264,221 | A | 11/1993 | Tagawa et al. |
| 5,264,423 | A | 11/1993 | Cohen et al. |
| 5,264,562 | A | 11/1993 | Matteucci |
| 5,354,844 | A | 10/1994 | Beug et al. |
| 5,356,633 | A | 10/1994 | Woodle et al. |
| 5,395,619 | A | 3/1995 | Zalipsky et al. |
| 5,405,939 | A | 4/1995 | Suhadolnik |
| 5,407,609 | A | 4/1995 | Tice et al. |
| 5,416,016 | A | 5/1995 | Low et al. |
| 5,416,203 | A | 5/1995 | Letsinger |
| 5,417,978 | A | 5/1995 | Tari et al. |
| 5,432,272 | A | 7/1995 | Benner |
| 5,453,496 | A | 9/1995 | Caruthers et al. |
| 5,459,127 | A | 10/1995 | Felgner et al. |
| 5,459,255 | A | 10/1995 | Cook et al. |
| 5,466,786 | A | 11/1995 | Buhr et al. |
| 5,469,854 | A | 11/1995 | Unger et al. |
| 5,470,967 | A | 11/1995 | Huie et al. |
| 5,486,603 | A | 1/1996 | Buhr |
| 5,489,677 | A | 2/1996 | Sanghvi et al. |
| 5,495,009 | A | 2/1996 | Matteucci et al. |
| 5,512,295 | A | 4/1996 | Kornberg et al. |
| 5,512,439 | A | 4/1996 | Homes et al. |
| 5,514,786 | A | 5/1996 | Cook et al. |
| 5,525,465 | A | 6/1996 | Haralambidis |
| 5,527,528 | A | 6/1996 | Allen et al. |
| 5,532,130 | A | 7/1996 | Alul |
| 5,534,259 | A | 7/1996 | Zalipsky et al. |
| 5,543,152 | A | 8/1996 | Webb et al. |
| 5,543,158 | A | 8/1996 | Gref et al. |
| 5,547,932 | A | 8/1996 | Curiel et al. |
| 5,556,948 | A | 9/1996 | Tagawa et al. |
| 5,561,225 | A | 10/1996 | Maddry et al. |
| 5,574,142 | A | 11/1996 | Meyer, Jr. et al. |
| 5,578,718 | A | 11/1996 | Cook et al. |
| 5,580,575 | A | 12/1996 | Unger et al. |
| 5,580,731 | A | 12/1996 | Chang et al. |
| 5,580,972 | A | 12/1996 | Tu et al. |
| 5,583,020 | A | 12/1996 | Sullivan |
| 5,587,469 | A | 12/1996 | Cook et al. |
| 5,591,721 | A | 1/1997 | Agrawal et al. |
| 5,591,722 | A | 1/1997 | Montgomery et al. |
| 5,591,843 | A | 1/1997 | Eaton |
| 5,594,121 | A | 1/1997 | Froehler et al. |
| 5,595,756 | A | 1/1997 | Bally et al. |
| 5,596,086 | A | 1/1997 | Matteucci et al. |
| 5,596,091 | A | 1/1997 | Switzer |
| 5,599,797 | A | 2/1997 | Cook et al. |
| 5,602,240 | A | 2/1997 | De Mesmaeker et al. |
| 5,607,923 | A | 3/1997 | Cook et al. |
| 5,614,617 | A | 3/1997 | Cook et al. |
| 5,614,621 | A | 3/1997 | Ravikumar et al. |
| 5,623,070 | A | 4/1997 | Cook et al. |
| 5,625,050 | A | 4/1997 | Beaton et al. |
| 5,633,360 | A | 5/1997 | Bischofberger et al. |
| 5,643,889 | A | 7/1997 | Suhadolnik et al. |
| 5,646,126 | A | 7/1997 | Cheng et al. |
| 5,646,265 | A | 7/1997 | McGee |
| 5,658,731 | A | 8/1997 | Sproat et al. |
| 5,661,025 | A | 8/1997 | Szoka, Jr. et al. |
| 5,661,134 | A | 8/1997 | Cook et al. |
| 5,663,312 | A | 9/1997 | Chaturvedula |
| 5,670,633 | A | 9/1997 | Cook et al. |
| 5,672,662 | A | 9/1997 | Harris et al. |
| 5,681,940 | A | 10/1997 | Wang et al. |
| 5,681,941 | A | 10/1997 | Cook et al. |
| 5,684,143 | A | 11/1997 | Gryaznov et al. |
| 5,700,920 | A | 12/1997 | Altmann et al. |
| 5,466,786 | B1 | 4/1998 | Buhr et al. |
| 5,736,392 | A | 4/1998 | Hawley-Nelson et al. |
| 5,750,666 | A | 5/1998 | Caruthers et al. |
| 5,767,099 | A | 6/1998 | Harris et al. |
| 5,770,713 | A | 6/1998 | Imbach et al. |
| 5,777,153 | A | 7/1998 | Lin et al. |
| 5,780,053 | A | 7/1998 | Ashley et al. |
| 5,789,416 | A | 8/1998 | Lum et al. |
| 5,792,847 | A | 8/1998 | Buhr et al. |
| 5,808,023 | A | 9/1998 | Sanghvi et al. |
| 5,817,781 | A | 10/1998 | Swaminathan et al. |
| 5,830,430 | A | 11/1998 | Unger et al. |
| 5,830,653 | A | 11/1998 | Froehler et al. |
| 5,837,856 | A * | 11/1998 | Arnold, Jr. ......... C12N 15/1131 536/24.5 |
| 5,851,548 | A | 12/1998 | Dattagupta et al. |
| 5,855,910 | A | 1/1999 | Ashley et al. |
| 5,856,455 | A | 1/1999 | Cook |
| 5,914,396 | A | 6/1999 | Cook et al. |
| 5,945,521 | A | 8/1999 | Just et al. |
| 5,948,767 | A | 9/1999 | Scheule et al. |
| 5,969,116 | A | 10/1999 | Martin |
| 5,976,567 | A | 11/1999 | Wheeler et al. |
| 5,981,501 | A | 11/1999 | Wheeler et al. |
| 5,986,083 | A | 11/1999 | Dwyer et al. |
| 6,001,841 | A | 12/1999 | Cook et al. |
| 6,005,094 | A | 12/1999 | Simon et al. |
| 6,005,096 | A | 12/1999 | Matteucci et al. |
| 6,015,886 | A | 1/2000 | Dale et al. |
| 6,020,475 | A | 2/2000 | Capaldi et al. |
| 6,020,483 | A | 2/2000 | Beckvermit et al. |
| 6,025,140 | A | 2/2000 | Langel et al. |
| 6,028,183 | A | 2/2000 | Lin et al. |
| 6,043,352 | A | 3/2000 | Manoharan et al. |
| 6,051,699 | A | 4/2000 | Ravikumar |
| 6,107,094 | A | 8/2000 | Crooke |
| 6,111,085 | A | 8/2000 | Cook et al. |
| 6,121,437 | A | 9/2000 | Guzaev |
| 6,133,229 | A | 10/2000 | Gibson et al. |
| 6,153,737 | A | 11/2000 | Manoharan et al. |
| 6,207,819 | B1 | 3/2001 | Manoharan et al. |
| 6,221,911 | B1 | 4/2001 | Lavin et al. |
| 6,248,878 | B1 | 6/2001 | Matulic-Adamic et al. |
| 6,271,358 | B1 | 8/2001 | Manoharan et al. |
| 6,300,319 | B1 | 10/2001 | Manoharan |
| 6,326,358 | B1 | 12/2001 | Manoharan |
| 6,331,617 | B1 | 12/2001 | Weeks et al. |
| 6,335,434 | B1 | 1/2002 | Guzaev et al. |
| 6,344,436 | B1 | 2/2002 | Smith et al. |
| 6,355,787 | B1 | 3/2002 | Beckvermit et al. |
| 6,358,931 | B1 | 3/2002 | Cook et al. |
| 6,372,499 | B1 | 4/2002 | Midoux et al. |
| 6,379,965 | B1 | 4/2002 | Boutin |
| 6,395,492 | B1 | 5/2002 | Manoharan et al. |
| 6,399,754 | B1 | 6/2002 | Cook |
| 6,403,565 | B1 * | 6/2002 | von Borstel ............ A61P 17/00 514/45 |
| 6,410,702 | B1 | 6/2002 | Swaminathan et al. |
| 6,420,549 | B1 | 7/2002 | Cook et al. |
| 6,432,963 | B1 | 8/2002 | Hisamichi et al. |
| 6,440,943 | B1 | 8/2002 | Cook et al. |
| 6,444,806 | B1 | 9/2002 | Veerapanani et al. |
| 6,455,586 | B1 | 9/2002 | Kaplan et al. |
| 6,465,628 | B1 | 10/2002 | Ravikumar et al. |
| 6,476,205 | B1 | 11/2002 | Buhr et al. |
| 6,506,559 | B1 | 1/2003 | Fire et al. |
| 6,525,031 | B2 | 2/2003 | Manoharan |
| 6,528,631 | B1 | 3/2003 | Cook et al. |
| 6,531,584 | B1 | 3/2003 | Cook et al. |
| 6,559,279 | B1 | 5/2003 | Manoharan et al. |
| 6,656,730 | B1 | 12/2003 | Manoharan |
| 6,673,611 | B2 | 1/2004 | Thompson et al. |
| 6,683,167 | B2 | 1/2004 | Meteley et al. |
| 6,794,137 | B2 | 9/2004 | Blumenberg |
| 6,815,432 | B2 | 11/2004 | Wheeler et al. |
| 6,849,726 | B2 | 2/2005 | Usman et al. |
| 6,858,225 | B2 | 2/2005 | Semple et al. |
| 6,887,906 | B1 | 5/2005 | Teng et al. |
| 7,041,824 | B2 | 5/2006 | Bordon-Pallier et al. |
| 7,044,945 | B2 | 5/2006 | Sand |
| 7,056,704 | B2 | 6/2006 | Tuschl et al. |
| 7,078,196 | B2 | 7/2006 | Tuschl et al. |
| 7,098,190 | B1 * | 8/2006 | Becker ................. A61P 17/00 514/44 A |
| 7,108,721 | B2 | 9/2006 | Huckle et al. |
| 7,148,342 | B2 | 12/2006 | Tolentino et al. |

(56) References Cited

U.S. PATENT DOCUMENTS

| | | |
|---|---|---|
| 7,205,297 B2 | 4/2007 | Beauchamp et al. |
| 7,345,027 B2 | 3/2008 | Tolentino et al. |
| 7,405,274 B2 | 7/2008 | Lin et al. |
| 7,432,250 B2 | 10/2008 | Crooke |
| 7,521,431 B2 | 4/2009 | Reich et al. |
| 7,538,095 B2 | 5/2009 | Fire et al. |
| 7,560,438 B2 | 7/2009 | Fire et al. |
| 7,579,186 B1 | 8/2009 | Sakamoto et al. |
| 7,595,387 B2 | 9/2009 | Leake et al. |
| 7,622,633 B2 | 11/2009 | Fire et al. |
| 7,629,321 B2 | 12/2009 | Crooke |
| 7,645,744 B2 | 1/2010 | Reich et al. |
| 7,674,895 B2 | 3/2010 | Reich et al. |
| 7,695,902 B2 | 4/2010 | Crooke |
| 7,745,608 B2 | 6/2010 | Manoharan et al. |
| 7,750,143 B2 | 7/2010 | Tolentino et al. |
| 7,750,144 B2 | 7/2010 | Zamore et al. |
| 7,786,290 B2 | 8/2010 | Woppmann et al. |
| 7,807,814 B2 | 10/2010 | Reich et al. |
| 7,829,693 B2 | 11/2010 | Kreutzer et al. |
| 7,847,090 B2 | 12/2010 | Reich et al. |
| 7,872,118 B2 | 1/2011 | Reich et al. |
| 7,994,305 B2 | 8/2011 | Reich et al. |
| 8,110,674 B2 | 2/2012 | Manoharan et al. |
| 8,168,600 B2 | 5/2012 | Dokka et al. |
| 8,193,163 B2 | 6/2012 | Reich et al. |
| 8,193,334 B2 | 6/2012 | Radovic-Moreno et al. |
| 8,202,845 B2 | 6/2012 | Drumm et al. |
| 8,227,444 B2 | 7/2012 | Dejneka et al. |
| 8,236,775 B2 | 8/2012 | Reich et al. |
| 8,263,569 B2 | 9/2012 | Baulcombe et al. |
| 8,329,671 B2 | 12/2012 | Gu et al. |
| 8,410,260 B2 | 4/2013 | Collin-Djangone et al. |
| 8,470,792 B2 | 6/2013 | Frost et al. |
| 8,486,909 B2 | 7/2013 | Rennard et al. |
| 8,541,384 B2 | 9/2013 | Tolentino et al. |
| 8,546,345 B2 | 10/2013 | Tolentino et al. |
| 8,664,189 B2 | 3/2014 | Khvorova et al. |
| 8,796,443 B2 | 8/2014 | Khvorova et al. |
| 8,815,818 B2 | 8/2014 | Samarsky et al. |
| 8,822,428 B2 | 9/2014 | Collin-Djangone et al. |
| 8,946,180 B2 | 2/2015 | Drumm et al. |
| 8,946,403 B2 | 2/2015 | Tolentino et al. |
| 9,074,211 B2 | 7/2015 | Wolf et al. |
| 9,080,171 B2 | 7/2015 | Khvorova et al. |
| 9,095,504 B2 | 8/2015 | Libertine et al. |
| 9,150,863 B2 | 10/2015 | Tolentino et al. |
| 9,175,289 B2 | 11/2015 | Khvorova et al. |
| 9,222,092 B2 | 12/2015 | Giese et al. |
| 9,303,259 B2 | 4/2016 | Khvorova et al. |
| 9,340,786 B2 | 5/2016 | Khvorova et al. |
| 9,493,774 B2 | 11/2016 | Kamens et al. |
| 9,745,574 B2 | 8/2017 | Woolf et al. |
| 9,938,530 B2 | 4/2018 | Khvorova et al. |
| 9,963,702 B2 | 5/2018 | Khvorova et al. |
| 10,041,073 B2 | 8/2018 | Khvorova et al. |
| 10,131,904 B2 | 11/2018 | Pavco et al. |
| 10,138,485 B2 | 11/2018 | Khvorova et al. |
| 10,167,471 B2 | 1/2019 | Kamens et al. |
| 10,184,124 B2 | 1/2019 | Libertine et al. |
| 10,240,149 B2 | 3/2019 | Khvorova et al. |
| 10,300,027 B2 | 5/2019 | Levis et al. |
| 10,479,992 B2 | 11/2019 | Woolf et al. |
| 10,633,654 B2 | 4/2020 | Pavco et al. |
| 10,662,430 B2 | 5/2020 | Libertine et al. |
| 10,774,330 B2 | 9/2020 | Khvorova et al. |
| 10,808,247 B2 | 10/2020 | Byrne et al. |
| 10,815,485 B2 | 10/2020 | Khvorova et al. |
| 10,876,119 B2 | 12/2020 | Khvorova et al. |
| 10,900,039 B2 | 1/2021 | Cauwenbergh et al. |
| 10,913,948 B2 | 2/2021 | Khvorova et al. |
| 10,934,550 B2 | 3/2021 | Wolfson et al. |
| 11,001,845 B2 | 5/2021 | Cardia et al. |
| 11,021,707 B2 | 6/2021 | Cardia et al. |
| 11,118,178 B2 | 9/2021 | Khvorova et al. |
| 11,254,940 B2 | 2/2022 | Woolf et al. |
| 11,279,934 B2 | 3/2022 | Byrne et al. |
| 11,396,654 B2 | 7/2022 | Khvorova et al. |
| 11,584,933 B2 | 2/2023 | Libertine et al. |
| 11,667,915 B2 | 6/2023 | Woolf et al. |
| 11,926,828 B2 | 3/2024 | Cauwenbergh |
| 2002/0081736 A1 | 6/2002 | Conroy et al. |
| 2002/0132788 A1 | 9/2002 | Lewis et al. |
| 2002/0147332 A1 | 10/2002 | Kaneko et al. |
| 2002/0160393 A1 | 10/2002 | Symonds et al. |
| 2002/0162126 A1 | 10/2002 | Beach et al. |
| 2003/0004325 A1 | 1/2003 | Cook et al. |
| 2003/0027780 A1 | 2/2003 | Hardee et al. |
| 2003/0077829 A1 | 4/2003 | MacLachlan |
| 2003/0108923 A1 | 6/2003 | Tuschl et al. |
| 2003/0139585 A1 | 7/2003 | Uhlmann et al. |
| 2003/0157030 A1 | 8/2003 | Davis et al. |
| 2003/0158403 A1 | 8/2003 | Manoharan et al. |
| 2003/0166282 A1 | 9/2003 | Brown et al. |
| 2004/0009938 A1 | 1/2004 | Manoharan et al. |
| 2004/0014957 A1 | 1/2004 | Eldrup et al. |
| 2004/0018999 A1 | 1/2004 | Beach et al. |
| 2004/0054155 A1 | 3/2004 | Woolf et al. |
| 2004/0072785 A1 | 4/2004 | Wolff et al. |
| 2004/0087526 A1 | 5/2004 | Lin et al. |
| 2004/0137471 A1 | 7/2004 | Vickers et al. |
| 2004/0162235 A1 | 8/2004 | Trubetskoy et al. |
| 2004/0167090 A1 | 8/2004 | Monahan et al. |
| 2004/0171033 A1 | 9/2004 | Baker et al. |
| 2004/0180351 A1 | 9/2004 | Giese et al. |
| 2004/0192629 A1 | 9/2004 | Xu et al. |
| 2004/0204377 A1 | 10/2004 | Rana et al. |
| 2004/0219520 A1 | 11/2004 | Mirkin et al. |
| 2004/0229266 A1 | 11/2004 | Tuschl et al. |
| 2004/0235031 A1 | 11/2004 | Schultz et al. |
| 2004/0241845 A1 | 12/2004 | Desgroseillers et al. |
| 2004/0248839 A1 | 12/2004 | Kowalik et al. |
| 2004/0259247 A1 | 12/2004 | Tuschl et al. |
| 2005/0008617 A1 | 1/2005 | Chen et al. |
| 2005/0020521 A1 | 1/2005 | Rana et al. |
| 2005/0032733 A1 | 2/2005 | McSwiggen et al. |
| 2005/0037496 A1 | 2/2005 | Rozema et al. |
| 2005/0064595 A1 | 3/2005 | MacLachlan et al. |
| 2005/0080246 A1 | 4/2005 | Allerson et al. |
| 2005/0107325 A1 | 5/2005 | Manoharan et al. |
| 2005/0142535 A1 | 6/2005 | Damha et al. |
| 2005/0175682 A1 | 8/2005 | Heyes et al. |
| 2005/0181382 A1 | 8/2005 | Zamore et al. |
| 2005/0222071 A1 | 10/2005 | Duranton et al. |
| 2005/0245474 A1 | 11/2005 | Baker et al. |
| 2005/0246794 A1 | 11/2005 | Khvorova et al. |
| 2005/0255487 A1 | 11/2005 | Khvorova et al. |
| 2005/0265957 A1 | 12/2005 | Monahan et al. |
| 2005/0281781 A1 | 12/2005 | Ostroff |
| 2006/0008910 A1 | 1/2006 | MacLachlan et al. |
| 2006/0009409 A1 | 1/2006 | Woolf et al. |
| 2006/0025363 A1 | 2/2006 | Breitenbach et al. |
| 2006/0069050 A1 | 3/2006 | Rana |
| 2006/0142228 A1 | 6/2006 | Ford et al. |
| 2006/0160766 A1 | 7/2006 | Cheung |
| 2006/0178324 A1 | 8/2006 | Hadwiger et al. |
| 2006/0178327 A1 | 8/2006 | Yeung |
| 2006/0188506 A1 | 8/2006 | Cheung |
| 2006/0211766 A1 | 9/2006 | Kaplan et al. |
| 2006/0240093 A1 | 10/2006 | MacLachlan et al. |
| 2007/0020623 A1 | 1/2007 | Petersohn et al. |
| 2007/0032441 A1 | 2/2007 | McSwiggen et al. |
| 2007/0166734 A1 | 7/2007 | Bhat et al. |
| 2007/0173473 A1 | 7/2007 | McSwiggen et al. |
| 2007/0231392 A1 | 10/2007 | Wagner et al. |
| 2007/0269889 A1 | 11/2007 | Leake et al. |
| 2008/0038296 A1 | 2/2008 | Brahmbhatt et al. |
| 2008/0071068 A1 | 3/2008 | Oba et al. |
| 2008/0085869 A1 | 4/2008 | Yamada et al. |
| 2008/0152661 A1 | 6/2008 | Rozema et al. |
| 2008/0182808 A1 | 7/2008 | Breitenbach et al. |
| 2008/0311040 A1 | 12/2008 | Berry et al. |
| 2009/0012021 A1 | 1/2009 | Sood et al. |
| 2009/0023216 A1 | 1/2009 | Woolf |

(56) References Cited

U.S. PATENT DOCUMENTS

| | | |
|---|---|---|
| 2009/0131360 A1 | 5/2009 | Woolf et al. |
| 2009/0171075 A1 | 7/2009 | Li |
| 2009/0181908 A1 | 7/2009 | Kaspar et al. |
| 2009/0202458 A1 | 8/2009 | Binetti et al. |
| 2009/0202520 A1 | 8/2009 | Lupher, Jr. et al. |
| 2009/0208564 A1 | 8/2009 | Li et al. |
| 2009/0220583 A1 | 9/2009 | Pereswetoff-Morath et al. |
| 2009/0239934 A1 | 9/2009 | Schmitt-Milas |
| 2009/0247608 A1 | 10/2009 | Manoharan et al. |
| 2010/0069620 A1 | 3/2010 | Zon et al. |
| 2010/0136695 A1 | 6/2010 | Woolf |
| 2010/0196482 A1 | 8/2010 | Radovic-Moreno et al. |
| 2011/0054004 A1 | 3/2011 | Mustoe et al. |
| 2011/0251258 A1 | 10/2011 | Samarsky et al. |
| 2011/0268761 A1 | 11/2011 | Levis et al. |
| 2011/0294869 A1 | 12/2011 | Petersen |
| 2013/0195966 A1 | 8/2013 | Collin-Djangone et al. |
| 2014/0072613 A1 | 3/2014 | Lander et al. |
| 2016/0115484 A1 | 4/2016 | Woolf et al. |
| 2016/0152973 A1 | 6/2016 | Jadhav et al. |
| 2016/0243259 A1* | 8/2016 | Almarsson ............ A61K 38/00 |
| 2016/0304875 A1 | 10/2016 | Cauwenbergh et al. |
| 2016/0319278 A1 | 11/2016 | Khvorova et al. |
| 2016/0355808 A1 | 12/2016 | Khvorova et al. |
| 2016/0355826 A1 | 12/2016 | Khvorova et al. |
| 2017/0022501 A1 | 1/2017 | Dean et al. |
| 2017/0051288 A1 | 2/2017 | Byrne et al. |
| 2017/0051290 A1 | 2/2017 | Byrne et al. |
| 2018/0263925 A1 | 9/2018 | Cauwenbergh et al. |
| 2019/0029974 A1 | 1/2019 | Cauwenbergh et al. |
| 2019/0211337 A1 | 7/2019 | Khvorova et al. |
| 2019/0218557 A1 | 7/2019 | Kamens et al. |
| 2020/0085764 A1 | 3/2020 | Maxwell et al. |
| 2020/0101028 A1 | 4/2020 | Levis et al. |
| 2020/0215113 A1 | 7/2020 | Eliseev et al. |
| 2020/0308578 A1 | 10/2020 | Woolf et al. |
| 2021/0024926 A1 | 1/2021 | Khvorova et al. |
| 2021/0062195 A1 | 3/2021 | Libertine et al. |
| 2021/0147849 A1 | 5/2021 | Khvorova et al. |
| 2021/0261968 A1 | 8/2021 | Khvorova et al. |
| 2021/0348166 A1 | 11/2021 | Wolfson et al. |
| 2021/0348169 A1 | 11/2021 | Cauwenbergh et al. |
| 2023/0002766 A1 | 1/2023 | Cardia et al. |
| 2023/0089478 A1 | 3/2023 | Cardia et al. |
| 2024/0301430 A1 | 9/2024 | Maxwell et al. |

FOREIGN PATENT DOCUMENTS

| | | |
|---|---|---|
| EP | 0 552 766 A2 | 7/1993 |
| EP | 1 214 945 A2 | 6/2002 |
| EP | 1 144 623 B9 | 3/2003 |
| EP | 1 352 061 B1 | 10/2003 |
| EP | 0 928 290 B9 | 3/2005 |
| EP | 1 407 044 B1 | 9/2007 |
| EP | 1 605 978 B1 | 9/2010 |
| EP | 2364693 A2 | 9/2011 |
| EP | 2 592 146 A2 | 5/2013 |
| EP | 2 719 762 A1 | 4/2014 |
| JP | 4 095 895 B2 | 9/2004 |
| JP | 2006-0849475 A | 4/2006 |
| JP | 2006-516288 A | 6/2006 |
| JP | 2007-512377 A | 5/2007 |
| JP | 2007-525169 A | 9/2007 |
| JP | 2007-531520 A | 11/2007 |
| JP | 2008-536874 A | 9/2008 |
| JP | 2009-519033 | 5/2009 |
| JP | 2010-516816 A | 5/2010 |
| JP | 2014-058557 A | 4/2014 |
| WO | WO 90/14074 A1 | 11/1990 |
| WO | WO 91/16024 A1 | 10/1991 |
| WO | WO 91/17424 A1 | 11/1991 |
| WO | WO 92/03464 A1 | 3/1992 |
| WO | WO 94/23028 A2 | 10/1994 |
| WO | WO 95/11910 A1 | 5/1995 |
| WO | WO 95/23162 A1 | 8/1995 |
| WO | WO 96/40964 A2 | 12/1996 |
| WO | WO 99/13915 A1 | 3/1999 |
| WO | WO 99/60012 A1 | 11/1999 |
| WO | WO 00/03683 A2 | 1/2000 |
| WO | WO 03/012052 A2 | 2/2003 |
| WO | WO 2003/064626 A2 | 8/2003 |
| WO | WO 2004/064760 A2 | 8/2004 |
| WO | WO 2004/065600 A2 | 8/2004 |
| WO | WO 2004/065601 A2 | 8/2004 |
| WO | WO 2004/090105 A2 | 10/2004 |
| WO | WO 2005/019430 A2 | 3/2005 |
| WO | WO 2005/024033 A2 | 3/2005 |
| WO | WO 2005/051971 A1 | 6/2005 |
| WO | WO 2005/079533 A2 | 9/2005 |
| WO | WO 2005/097992 A2 | 10/2005 |
| WO | WO 2006/007372 A2 | 1/2006 |
| WO | WO 2006/019430 A2 | 2/2006 |
| WO | WO 2006/039656 A2 | 4/2006 |
| WO | WO 2006/065601 A2 | 6/2006 |
| WO | WO 2006/092795 A2 | 9/2006 |
| WO | WO 2006/113679 A2 | 10/2006 |
| WO | WO 2006/128141 A2 | 11/2006 |
| WO | WO 2007/021142 A1 | 2/2007 |
| WO | WO 2007/030167 A1 | 3/2007 |
| WO | WO 2007/050643 A2 | 5/2007 |
| WO | WO 2007/069068 A2 | 6/2007 |
| WO | WO 2007/079224 A2 | 7/2007 |
| WO | WO 2007/089607 A2 | 8/2007 |
| WO | WO 2008/036825 A2 | 3/2008 |
| WO | WO 2008/094866 A1 | 8/2008 |
| WO | WO 2008/109353 A1 | 9/2008 |
| WO | WO 2009/020344 A2 | 2/2009 |
| WO | WO 2009/029688 A3 | 3/2009 |
| WO | WO 2009/029690 A1 | 3/2009 |
| WO | WO 2009/044392 A2 | 4/2009 |
| WO | WO 2009/078685 A2 | 6/2009 |
| WO | WO 2009/126933 A2 | 10/2009 |
| WO | WO 2010/006237 A2 | 1/2010 |
| WO | WO 2010/027830 A2 | 3/2010 |
| WO | WO 2010/027831 A1 | 3/2010 |
| WO | WO 2010/027832 A1 | 3/2010 |
| WO | WO 2010/042281 A2 | 4/2010 |
| WO | WO 2010/135207 A1 | 11/2010 |
| WO | WO 2014/076703 A1 | 5/2014 |
| WO | WO-2016037071 A2 * | 3/2016 ............ A61P 17/02 |
| WO | WO 2016/161388 A1 | 10/2016 |
| WO | WO 2017/173453 A1 | 10/2017 |
| WO | WO 2023/015264 A1 | 2/2023 |
| WO | WO 2023/015265 A2 | 2/2023 |
| WO | WO 2023/130021 A1 | 7/2023 |
| WO | WO 2024/064769 A1 | 3/2024 |
| WO | WO 2025/101204 A1 | 5/2025 |
| WO | WO 2025/117786 A1 | 6/2025 |

OTHER PUBLICATIONS

Abifadel et al., Mutations in PCSK9 cause autosomal dominant hypercholesterolemia. Nat Genet. Jun. 2003;34(2):154-6.

Akhtar et al., Interactions of antisense DNA oligonucleotide analogs with phospholipid membranes (liposomes). Nucleic Acids Res. Oct. 25, 1991;19(20):5551-9. doi: 10.1093/nar/19.20.5551. Author Manuscript.

Akinc et al., A combinatorial library of lipid-like materials for delivery of RNAi therapeutics. Nat Biotechnol. May 2008;26(5):561-9. doi: 10.1038/nbt1402. Epub Apr. 27, 2008.

Akinc et al., Development of lipidoid-siRNA formulations for systemic delivery to the liver. Mol Ther. May 2009;17(5):872-9. doi: 10.1038/mt.2009.36. Epub Mar. 3, 2009.

Alahari et al., Inhibition of expression of the multidrug resistance-associated P-glycoprotein of by phosphorothioate and 5' cholesterol-conjugated phosphorothioate antisense oligonucleotides. Mol Pharmacol. Oct. 1996;50(4):808-19.

Aleckovic et al., RNAi at Oxford. J RNAi Gene Silencing. May 27, 2008;4(1):266-8.

Anderson et al., Experimental validation of the importance of seed complement frequency to siRNA specificity. RNA. May 2008;14(5):853-61. doi: 10.1261/rna.704708. Epub Mar. 26, 2008.

(56) References Cited

OTHER PUBLICATIONS

Augustyns et al., Incorporation of hexose nucleoside analogues into oligonucleotides: synthesis, base-pairing properties and enzymatic stability. Nucleic Acids Res. Sep. 25, 1992;20(18):4711-6.
Baigude et al., Design and creation of new nanomaterials for therapeutic RNAi. ACS Chem Biol. Apr. 24, 2007;2(4):237-41. Supporting Information.
Beanes et al., Skin repair and scar formation: the central role of TGF-beta. Expert Rev Mol Med. Mar. 21, 2003;5(8):1-22. doi: 10.1017/S1462399403005817.
Beier et al., Kinetics of particle uptake in the domes of Peyer's patches. Am J Physiol. Jul. 1998;275(1 Pt 1):G130-7.
Bonfigli et al., Human glioblastoma ADF cells express tyrosinase, L-tyrosine hydroxylase and melanosomes and are sensitive to L-tyrosine and phenylthiourea. J Cell Physiol. Jun. 2006;207(3):675-82. doi: 10.1002/jcp.20603.
Bongartz et al., Improved biological activity of antisense oligonucleotides conjugated to a fusogenic peptide. Nucleic Acids Res. Nov. 11, 1994;22(22):4681-8.
Boussif et al., Optimized galenics improve in vitro gene transfer with cationic molecules up to 1000-fold. Gene Ther. Dec. 1996;3(12):1074-80.
Boutorin et al., Synthesis of alkylating oligonucleotide derivatives containing cholesterol or phenazinium residues at their 3'-terminus and their interaction with DNA within mammalian cells. FEBS Lett. Aug. 28, 1989;254(1-2):129-32.
Braasch et al., RNA interference in mammalian cells by chemically-modified RNA. Biochemistry. Jul. 8, 2003;42(26):7967-75.
Brown et al., Immune recognition. A new receptor for beta-glucans. Nature. Sep. 6, 2001;413(6851):36-7.
Brown et al., RNAi off-targeting: Light at the end of the tunnel. J RNAi Gene Silencing. Jul. 28, 2006;2(2):175-7.
Byrne et al., Formulation and Release of sd-rxRNA® from a Cross-linked, Thiolated CMHA-based Film for Topical Delivery to Reduce the Formation of Corneal Scarring. RXi Pharmaceuticals. Association for Research in Vision and Ophthalmology (ARVO) 2015 Annual Meeting. May 6, 2015. Poster. 1 page.
Cardia et al., Novel self-delivering RNAi compounds with enhanced cellular updatake and distribution properties. Keystone RNAi Silencing Conference. Jan. 14-19, 2010. Poster. 1 Page.
Cardia et al., Self-Delivering RNAi Compounds. Drug Delivery Technology. Sep. 2010;10(7):1-4.
Chen et al., Nanoparticles modified with tumor-targeting scFv deliver siRNA and miRNA for cancer therapy. Mol Ther. Sep. 2010;18(9):1650-6. doi: 10.1038/mt.2010.136. Epub Jul. 6, 2010.
Chen et al., Functionalization of single-walled carbon nanotubes enables efficient intracellular delivery of siRNA targeting MDM2 to inhibit breast cancer cells growth. Biomed Pharmacother. Jul. 2012;66(5):334-8. doi: 10.1016/j.biopha.2011.12.005. Epub Feb. 17, 2012.
Chernikov et al., Current Development of siRNA Bioconjugates: From Research to the Clinic. Front Pharmacol. Apr. 26, 2019;10:444. doi: 10.3389/fphar.2019.00444.
Chiang et al., Antisense oligonucleotides inhibit intercellular adhesion molecule 1 expression by two distinct mechanisms. J Biol Chem. Sep. 25, 1991;266(27):18162-71.
Chiu et al., Visualizing a correlation between siRNA localization, cellular uptake, and RNAi in living cells. Chem Biol. Aug. 2004;11(8):1165-75.
Chiu et al., siRNA function in RNAi: a chemical modification analysis. RNA. Sep. 2003;9(9):1034-48.
Choung et al., Chemical modification of siRNAs to improve serum stability without loss of efficacy. Biochem Biophys Res Commun. Apr. 14, 2006;342(3):919-27.
Chu et al., Potent RNAi by short RNA triggers. RNA. 2008;14:1714-9.
Cicha et al., Connective tissue growth factor is overexpressed in complicated atherosclerotic plaques and induces mononuclear cell chemotaxis in vitro. Arterioscler Thromb Vasc Biol. May 2005;25(5):1008-13. Epub Mar. 10, 2005. Materials and Methods.
Clark et al., Exploiting M cells for drug and vaccine delivery. Adv Drug Deliv Rev. Aug. 23, 2001;50(1-2):81-106.
Clark et al., Targeting polymerised liposome vaccine carriers to intestinal M cells. Vaccine. Oct. 12, 2001;20(1-2):208-17.
Constantinides et al., Formulation and intestinal absorption enhancement evaluation of water-in-oil microemulsions incorporating medium-chain glycerides. Pharm Res. Oct. 1994;11(10):1385-90.
Crombez et al., A non-covalent peptide-based strategy for siRNA delivery. Biochem Soc Trans. Feb. 2007;35(Pt 1):44-6. Review.
Czauderna et al., Structural variations and stabilising modifications of synthetic siRNAs in mammalian cells. Nucleic Acids Res. Jun. 1, 2003;31(11):2705-16.
Daniels et al., Imatinib mesylate inhibits the profibrogenic activity of TGF-beta and prevents bleomycin-mediated lung fibrosis. J Clin Invest. Nov. 2004;114(9):1308-16.
De Smidt et al., Association of antisense oligonucleotides with lipoproteins prolongs the plasma half-life and modifies the tissue distribution. Nucleic Acids Res. Sep. 11, 1991;19(17):4695-700.
Debart et al., Chemical modifications to improve the cellular uptake of oligonucleotides. Curr Top Med Chem. 2007;7(7):727-37.
Diebold et al., Mannose receptor-mediated gene delivery into antigen presenting dendritic cells. Somat Cell Mol Genet. Nov. 2002;27(1-6):65-74. Review.
Distler et al., Imatinib mesylate reduces production of extracellular matrix and prevents development of experimental dermal fibrosis. Arthritis Rheum. Jan. 2007;56(1):311-22.
Dykxhoorn et al., The silent treatment: siRNAs as small molecule drugs. Gene Ther. Mar. 2006;13(6):541-52. Review.
Dziadzio et al., N-terminal connective tissue growth factor is a marker of the fibrotic phenotype in scleroderma. QJM. Jul. 2005;98(7):485-92. Epub Jun. 13, 2005.
Elbashir et al., Duplexes of 21-nucleotide RNAs mediate RNA interference in cultured mammalian cells. Nature. May 24, 2001;411(6836):494-8.
Elbashir et al., Functional anatomy of siRNAs for mediating efficient RNAi in *Drosophila melanogaster* embryo lysate. EMBO J. Dec. 3, 2001;20(23):6877-88.
Fajac et al., Uptake of plasmid/glycosylated polymer complexes and gene transfer efficiency in differentiated airway epithelial cells. J Gene Med. 2003;5(1):38-48.
Fedorov et al., Off-target effects by siRNA can induce toxic phenotype. RNA. Jul. 2006;12(7):1188-96. Epub May 8, 2006.
Felgner et al., Lipofection: a highly efficient, lipid-mediated DNA-transfection procedure. Proc Natl Acad Sci U S A. Nov. 1987;84(21):7413-7.
Ferentz et al., Disulfide-crosslinked oligonucleotides. Journal of the American Chemical Society. 1991;113 (10): 4000-4002.
Fisher et al., Intracellular disposition and metabolism of fluorescently-labeled unmodified and modified oligonucleotides microinjected into mammalian cells. Nucleic Acids Res. Aug. 11, 1993;21(16):3857-65.
Floch et al., Cationic phosphonolipids as non viral vectors for DNA transfection in hematopoietic cell lines and CD34+ cells. Blood Cells Mol Dis. 1997;23(1):69-87.
Florence, The oral absorption of micro- and nanoparticulates: neither exceptional nor unusual. Pharm Res. Mar. 1997;14(3):259-66.
Frank-Kamenetsky et al., Therapeutic RNAi targeting PCSK9 acutely lowers plasma cholesterol in rodents and LDL cholesterol in non-human primates. Proc Natl Acad Sci U S A. Aug. 19, 2008;105(33):11915-20. doi: 10.1073/pnas.0805434105. Epub Aug. 11, 2008.
Fritz et al., Gene transfer into mammalian cells using histone-condensed plasmid DNA. Hum Gene Ther. Aug. 1, 1996;7(12):1395-404.
Fuhrhop et al., Bolaamphiphiles with mannose- and tetraalkylammonium head groups as coatings for nucleic acids and possible reagents for transfections. Chem Phys Lipids. 1987;43(3):193-213.
Funhoff et al., Endosomal escape of polymeric gene delivery complexes is not always enhanced by polymers buffering at low pH. Biomacromolecules. Jan.-Feb. 2004;5(1):32-9.
Gaudana et al., Ocular drug delivery. AAPS J. Sep. 2010;12(3):348-60. doi: 10.1208/s12248-010-9183-3. Epub May 1, 2010.

(56) References Cited

OTHER PUBLICATIONS

Germanas et al., Discovery of small-molecule inhibitors of tyrosinase. Bioorg Med Chem Lett. Dec. 15, 2007;17(24):6871-5. doi: 10.1016/j.bmcl.2007.10.014. Epub Oct. 12, 2007.

Ginobbi et al., Folic acid-polylysine carrier improves efficacy of c-myc antisense oligodeoxynucleotides on human melanoma (M14) cells. Anticancer Res. Jan.-Feb. 1997;17(1A):29-35.

Glaser, Oligonucleotide therapies move toward efficacy trials to treav HIV CMV, cancer. Genetic Engineering News. Feb. 1, 2016;16:1-21.

Goldman et al., In vitro and in vivo gene delivery mediated by a synthetic polycationic amino polymer. Nat Biotechnol. May 1997;15(5):462-6.

Gottschalk et al., A novel DNA-peptide complex for efficient gene transfer and expression in mammalian cells. Gene Ther. May 1996;3(5):448-57.

Greggio et al., Tyrosinase exacerbates dopamine toxicity but is not genetically associated with Parkinson's disease. J Neurochem. Apr. 2005;93(1):246-56. doi: 10.1111/j.1471-4159.2005.03019.x.

Grosse et al., In vivo gene delivery in the mouse lung with lactosylated polyethylenimine, questioning the relevance of in vitro experiments. J Control Release. Dec. 8, 2008;132(2):105-12. Epub Sep. 4, 2008.

Haensler et al., Polyamidoamine cascade polymers mediate efficient transfection of cells in culture. Bioconjug Chem. Sep.-Oct. 1993;4(5):372-9.

Hashimoto et al., Gene transfer by DNA/mannosylated chitosan complexes into mouse peritoneal macrophages. Biotechnol Lett. Jun. 2006;28(11):815-21. Epub May 31, 2006.

Ho et al., Preparation of microemulsions using polyglycerol fatty acid esters as surfactant for the delivery of protein drugs. J Pharm Sci. Feb. 1996;85(2):138-43.

Hoerter et al., Chemical modification resolves the asymmetry of siRNA strand degradation in human blood serum. RNA. Nov. 2007;13(11):1887-93. doi: 10.1261/rna.602307. Epub Sep. 5, 2007.

Holmes et al., Syntheses and oligonucleotide incorporation of nucleoside analogues containing pendant imidazolyl or amino functionalities—the search for sequence-specific artificial ribonucleases. Eur J Org Chem. Apr. 13, 2005;5171-83. DOI; 10.1002/ejoc.20050413.

Hope et al., Cationic lipids, phosphatidylethanolamine and the intracellular delivery of polymeric, nucleic acid-based drugs (review). Mol Membr Biol.; Jan.-Mar. 1998;15(1):1-14.

Huang et al., Lipitoids—novel cationic lipids for cellular delivery of plasmid DNA in vitro. Chem Biol. Jun. 1998;5(6):345-54.

Hudziak et al., Resistance of morpholino phosphorodiamidate oligomers to enzymatic degradation. Antisense Nucleic Acid Drug Dev. 1996 Winter;6(4):267-72.

Ihre et al., Fast and convenient divergent synthesis of aliphatic ester dendrimers by anhydride coupling. J Am Chem Soc. Jun. 27, 2001;123(25):5908-17.

Ito et al., Expression of connective tissue growth factor in human renal fibrosis. Kidney Int. Apr. 1998;53(4):853-61.

Jackson et al., Position-specific chemical modification of siRNAs reduces "off-target" transcript silencing. RNA. Jul. 2006;12(7):1197-1205. Epub May 8, 2006.

Jäschke et al., Automated Incorporation of Polyethylene Glycol into Synthetic Oligonucleotides, Tetra. Lett. Jan. 1993;34(2) :301-304.

Jiang et al., Mannosylated chitosan-graft-polyethylenimine as a gene carrier for Raw 264.7 cell targeting. Int J Pharm. Jun. 22, 2009;375(1-2):133-9. Epub Apr. 5, 2009.

Jiang et al., miR2Disease: a manually curated database for microRNA deregulation in human disease. Nucleic Acids Res. Jan. 2009;37(Database issue):D98-104. doi: 10.1093/nar/gkn714. Epub Oct. 15, 2008.

Kamata et al., Amphiphilic peptides enhance the efficiency of liposome-mediated DNA transfection. Nucleic Acids Res. Feb. 11, 1994;22(3):536-7.

Kamens et al., Novel, chemically modified RNAi compounds with improved potency, stability and specificity. Keystone RNAi Silencing: Mechanism, Biology and Application Conference. Jan. 14-19, 2010. Poster. 1 Page.

Kichler, Gene transfer with modified polyethylenimines J Gene Med. Feb. 2004;6 Suppl 1:S3-10. Review.

Kim et al., Systemic and specific delivery of small interfering RNAs to the liver mediated by apolipoprotein A-I. Mol Ther. Jun. 2007;15(6):1145-52. Epub Apr. 17, 2007.

Kraynack et al., Small interfering RNAs containing full 2'-O-methylribonucleotide-modified sense strands display Argonaute2/eIF2C2-dependent activity. RNA. Jan. 2006;12(1):163-76. Epub Nov. 21, 2005.

Kubo et al., Modified 27-nt dsRNAs with dramatically enhanced stability in serum and long-term RNAi activity. Oligonucleotides. 2007 Winter;17(4):445-64.

Layzer et al., In vivo activity of nuclease-resistant siRNAs. RNA. May 2004;10(5):766-71.

Leask et al., Insights into the molecular mechanism of chronic fibrosis: the role of connective tissue growth factor in scleroderma. J Invest Dermatol. Jan. 2004;122(1):1-6.

Lee et al., Contributions of 3'-overhang to the dissociation of small interfering RNAs from the PAZ domain: molecular dynamics simulation study. J Mol Graph Model. Mar. 2007;25(6):784-93. Epub Jul. 11, 2006.

Legendre et al., Dioleoylmelittin as a novel serum-insensitive reagent for efficient transfection of mammalian cells. Bioconjug Chem. Jan.-Feb. 1997;8(1):57-63.

Lemaitre et al., Specific antiviral activity of a poly(L-lysine)-conjugated oligodeoxyribonucleotide sequence complementary to vesicular stomatitis virus N protein mRNA initiation site. Proc Natl Acad Sci U S A. Feb. 1987;84(3):648-52.

Letsinger et al., Cholesteryl-conjugated oligonucleotides: synthesis, properties, and activity as inhibitors of replication of human immunodeficiency virus in cell culture. Proc Natl Acad Sci U S A. Sep. 1989;86(17):6553-6.

Leuschner et al., Cleavage of the siRNA passenger strand during RISC assembly in human cells. EMBO Reports 2006;7(3):314-20.

Lewis et al., A serum-resistant cytofectin for cellular delivery of antisense oligodeoxynucleotides and plasmid DNA. Proc Natl Acad Sci U S A. Apr. 16, 1996;93(8):3176-81.

Lewis et al., Biodegradable poly(L-lactic acid) matrices for the sustained delivery of antisense oligonucleotides. J of Controlled Release. 1995; 37:173-183.

Li et al., Surface-modified LPD nanoparticles for tumor targeting. Ann N Y Acad Sci. Oct. 2006;1082:1-8.

Liang et al., Oligonucleotide delivery: a cellular prospective. Pharmazie. Aug. 1999;54(8):559-66.

Manoharan et al., Chemical modifications to improve uptake and bioavailability of antisense oligonucleotides. Ann N Y Acad Sci. Oct. 28, 1992;660:306-9.

Manoharan, Oligonucleotide conjugates as potential antisense drugs with improved uptake, biodistribution, targeted delivery, and mechanism of action. Antisense Nucleic Acid Drug Dev. Apr. 2002;12(2):103-28.

Martins et al., Sterol side chain length and structure affect the clearance of chylomicron-like lipid emulsions in rats and mice. J Lipid Res. Feb. 1998;39(2):302-12.

Mathews et al., Incorporating chemical modification constraints into a dynamic programming algorithm for prediction of RNA secondary structure. Proc Natl Acad Sci U S A. May 11, 2004;101(19):7287-92. Epub May 3, 2004.

Maxwell et al., Tyrosinase Targeting Self-delivering RNAi Compounds. RXi Pharmaceuticals Society for Investigative Dermatology (SID) 74th Annual Meeting. May 9, 2015. Poster. 1 page.

Medarova et al., In vivo imaging of siRNA delivery and silencing in tumors. Nat Med. Mar. 2007;13(3):372-7. Epub Feb. 25, 2007.

Mescalchin et al., Cellular uptake and intracellular release are major obstacles to the therapeutic application of siRNA: novel options by phosphorothioate-stimulated delivery. Expert Opin Biol Ther. Oct. 2007;7(10):1531-8. Review.

Milhem et al., Polyamidoamine Starburst dendrimers as solubility enhancers. Int J Pharm. Mar. 20, 2000;197(1-2):239-41.

(56) References Cited

OTHER PUBLICATIONS

Mistry et al., Recombinant HMG1 protein produced in Pichia pastoris: a nonviral gene delivery agent. Biotechniques. Apr. 1997;22(4):718-29.
Murphy et al., A combinatorial approach to the discovery of efficient cationic peptoid reagents for gene delivery. Proc Natl Acad Sci U S A. Feb. 17, 1998;95(4):1517-22.
Nakase et al., Biodegradable microspheres targeting mucosal immune-regulating cells: new approach for treatment of inflammatory bowel disease. J Gastroenterol. Mar. 2003;38 Suppl 15:59-62.
Oberhauser et al., Effective incorporation of 2'-O-methyl-oligoribonucleotides into liposomes and enhanced cell association through modification with thiocholesterol. Nucleic Acids Res. Feb. 11, 1992;20(3):533-8.
Olejnik et al., Photocleavable biotin phosphoramidite for 5'-end-labeling, affinity purification and phosphorylation of synthetic oligonucleotides. Nucleic Acids Res. Jan. 15, 1996;24(2):361-6.
Ortigão et al., Antisense effect of oligodeoxynucleotides with inverted terminal internucleotidic linkages: a minimal modification protecting against nucleolytic degradation. Antisense Res Dev. 1992 Summer;2(2):129-46.
Overhoff et al., Phosphorothioate-stimulated uptake of short interfering RNA by human cells. EMBO Rep. Dec. 2005;6(12):1176-81.
Park et al., Mannosylated polyethylenimine coupled mesoporous silica nanoparticles for receptor-mediated gene delivery. Int J Pharm. Jul. 9, 2008;359(1-2):280-7. Epub Apr. 12, 2008.
Parrish et al., Functional anatomy of a dsRNA trigger: differential requirement for the two trigger strands in RNA interference. Mol Cell. Nov. 2000;6(5):1077-87.
Pavco et al., Robust Intradermal efficacy with novel chemically modified self-delivering RNAi compounds. Keystone RNAi Silencing Conference: Mechanism, Biology and Application Conference. Jan. 14-19, 2010. Poster. 1 Page.
Rajeev et al., 2'-modified-2-thiothymidine oligonucleotides. Org Lett. Aug. 21, 2003;5(17):3005-8.
Rose et al., Functional polarity is introduced by Dicer processing of short substrate RNAs. Nucleic Acids Res. Jul. 26, 2005;33(13):4140-56. Print 2005.
Rozema et al., Dynamic PolyConjugates for targeted in vivo delivery of siRNA to hepatocytes. Proc Natl Acad Sci U S A. Aug. 7, 2007; 104(32): 12982-12987.
Rozners et al., Expanding functionality of RNA: synthesis and properties of RNA containing imidazole modified tandem G-U wobble base pairs. Chem Commun (Camb). Dec. 14, 2005;(46):5778-80.
Rump et al., Preparation of conjugates of oligodeoxynucleotides and lipid structures and their interaction with low-density lipoprotein. Bioconjug Chem. May-Jun. 1998;9(3):341-9.
Salomon et al., Modified dsRNAs that are not processed by Dicer maintain potency and are incorporated into the RISC. Nucleic Acids Res. Jun. 2010;38(11):3771-9. doi: 10.1093/nar/gkq055. Epub Feb. 18, 2010.
Sato et al., Serum levels of connective tissue growth factor are elevated in patients with systemic sclerosis: association with extent of skin sclerosis and severity of pulmonary fibrosis. J Rheumatol. Jan. 2000;27(1):149-54.
Sato et al., Tumor targeting and imaging of intraperitoneal tumors by use of antisense oligo-DNA complexed with dendrimers and/or avidin in mice. Clin Cancer Res. Nov. 2001;7(11):3606-12.
Schell et al., Stimulation of the uptake of polynucleotides by poly(L-lysine). Biochim Biophys Acta. Mar. 27, 1974;340(3):323-33.
Seela et al., Oligodeoxyribonucleotides containing 1,3-propanediol as nucleoside substitute. Nucleic Acids Res. Apr. 10, 1987;15(7):3113-29.
Shen, Advances in the development of siRNA-based therapeutics for cancer. IDrugs. Aug. 2008;11(8):572-8. Review.
Shi, Mammalian RNAi for the masses. Trends Genet. Jan. 2003;19(1):9-12.

Shi-Wen et al., Regulation and function of connective tissue growth factor/CCN2 in tissue repair, scarring and fibrosis. Cytokine Growth Factor Rev. Apr. 2008;19(2):133-44. doi: 10.1016/j.cytogfr.2008.01.002.
Shoeman et al., Fluorescence microscopic comparison of the binding of phosphodiester and phosphorothioate (antisense) oligodeoxyribonucleotides to subcellular structures, including intermediate filaments, the endoplasmic reticulum, and the nuclear interior. Antisense Nucleic Acid Drug Dev. Aug. 1997;7(4):291-308.
Sibley et al. Novel RNA-based strategies for therapeutic gene silencing. Mol Ther. Mar. 2010;18(3):466-76. doi: 10.1038/mt.2009.306. Epub Jan. 19, 2010.
Sisco et al., Antisense inhibition of connective tissue growth factor (CTGF/CCN2) mRNA limits hypertrophic scarring without affecting wound healing in vivo. Wound Repair Regen. Sep.-Oct. 2008;16(5):661-73. doi:10.1111/j.1524-475X.2008.00416.x.
Slowminski et al., Inhibitors of melanogenesis increase toxicity of cyclophosphamide and lymphocytes against melanoma cells. Int J Cancer. Mar. 15, 2009;124(6):1470-7. doi: 10.1002/ijc.24005.
Snead et al., RNA interference trigger variants: getting the most out of RNA for RNA interference-based therapeutics. Nucleic Acid Ther. Jun. 2012;22(3):139-46. doi: 10.1089/nat.2012.0361. Review.
Soto et al., Characterization of multilayered nanoparticles encapsulated in yeast cell wall particles for DNA delivery. Bioconjug Chem. Apr. 2008;19(4):840-8. doi: 10.1021/bc700329p. Epub Apr. 1, 2008.
Soto et al., Oral Macrophage Mediated Gene Delivery System. 2007 NSTI Nanotechnology Conference and Trade Show, May 20-24, 2007, Santa Clara, CA. NSTI Nanotech 2007 Proceedings; 2:378-81.
Soutschek et al., Therapeutic silencing of an endogenous gene by systemic administration of modified siRNAs. Nature. Nov. 11, 2004;432(7014):173-8.
Sriram et al., Reduction of corneal scarring in rabbits by targeting the TGFB1 pathway with a triple siRNA combination. Adv Biosci Biotechnol. Jan. 1, 2013;4(10):47-55.
Sriram et al., Triple combination of siRNAs targeting TGFβ1, TGFβR2, and CTGF enhances reduction of collagen I and smooth muscle actin in corneal fibroblasts. Invest Ophthalmol Vis Sci. Dec. 17, 2013;54(13):8214-23. doi: 10.1167/iovs.13-12758.
Stein et al., A specificity comparison of four antisense types: morpholino, 2'-O-methyl RNA, DNA, and phosphorothioate DNA. Antisense Nucleic Acid Drug Dev. Jun. 1997;7(3):151-7.
Summerton et al., Morpholino and phosphorothioate antisense oligomers compared in cell-free and in-cell systems. Antisense Nucleic Acid Drug Dev. Apr. 1997;7(2):63-70.
Sun et al., Asymmetric RNA duplexes mediate RNA interference in mammalian cells. Nat Biotechnol. Dec. 2008;26(12):1379-82. doi: 10.1038/nbt.1512. Epub Nov. 23, 2008. 4 Pages.
Tan et al., Quantum-dot based nanoparticles for targeted silencing of HER2/neu gene via RNA interference. Biomaterials. Mar. 2007;28(8):1565-71. Epub Dec. 11, 2006.
Uhlmann et al., Antisense oligonucleotides: a new therapeutic principle. Chem Rev. 1990;90(4):543-84.
Van Der Lubben et al., Transport of chitosan microparticles for mucosal vaccine delivery in a human intestinal M-cell model. J Drug Target. Sep. 2002;10(6):449-56.
Vargas et al., Exploiting tyrosinase expression and activity in melanocytic tumors: quercetin and the central role of p53. Integr Cancer Ther. Dec. 2011;10(4):328-40. doi: 10.1177/1534735410391661. Epub Dec. 31, 2010.
Vashi et al., Facial hyperpigmentation: causes and treatment. Br J Dermatol. Oct. 2013;169 Suppl 3:41-56. doi: 10.1111/bjd.12536.
Vaught et al., Expanding the chemistry of DNA for in vitro selection. J Am Chem Soc. Mar. 31, 2010;132(12):4141-51. doi: 10.1021/ja908035g.
Vickers et al., Efficient reduction of target RNAs by small interfering RNA and RNase H-dependent antisense agents. A comparative analysis. J Biol Chem. Feb. 28, 2003;278(9):7108-18. Epub Dec. 23, 2002.

(56) References Cited

OTHER PUBLICATIONS

Vlassov et al., Transport of oligonucleotides across natural and model membranes. Biochim Biophys Acta. Jun. 29, 1994;1197(2):95-108.
Wadhwa Peptide-mediated gene delivery: influence of peptide structure on gene expression. Bioconjug Chem. Jan.-Feb. 1997;8(1):81-8.
Wagner et al., DNA-binding transferrin conjugates as functional gene-delivery agents: synthesis by linkage of polylysine or ethidium homodimer to the transferrin carbohydrate moiety. Bioconjug Chem. Jul.-Aug. 1991;2(4):226-31.
Wagner et al., Transferrin-polycation-DNA complexes: the effect of polycations on the structure of the complex and DNA delivery to cells. Proc Natl Acad Sci U S A. May 15, 1991;88(10):4255-9.
Wolfrum et al., Mechanisms and optimization of in vivo delivery of lipophilic siRNAs. Nat Biotechnol. Oct. 2007;25(10):1149-57. Epub Sep. 16, 2007.
Wu et al., Receptor-mediated in vitro gene transformation by a soluble DNA carrier system. Biol Chem. Apr. 5, 1987;262(10):4429-32. Erratum in: J Biol Chem Jan. 5, 1988;263(1):588.
Wyman et al., Design, synthesis, and characterization of a cationic peptide that binds to nucleic acids and permeabilizes bilayers. Biochemistry. Mar. 11, 1997;36(10):3008-17.
Yamada et al., Lysophosphatidic acid stimulates the proliferation and motility of malignant pleural mesothelioma cells through lysophosphatidic acid receptors, LPA1 and LPA2. Cancer Sci. Aug. 2008;99(8):1603-10.
Yamada et al., Synthesis and properties of oligonucleotides having a chemically stable 2-(trimethylsilyl)benzoyl group. Nucleic Acids Symp Ser (Oxf). 2008;(52):301-2. doi: 10.1093/nass/nrn152.
Zhou et al., Controlled release of PEI/DNA complexes from mannose-bearing chitosan microspheres as a potent delivery system to enhance immune response to HBV DNA vaccine. J Control Release. Aug. 28, 2007;121(3):200-7. Epub May 25, 2007.
Zhou et al., Lipophilic polylysines mediate efficient DNA transfection in mammalian cells. Biochim Biophys Acta. May 31, 1991;1065(1):8-14.
Zimmermann et al., RNAi-mediated gene silencing in non-human primates. Nature. May 4, 2006;441(7089):111-4. Epub Mar. 26, 2006.
Genbank Submission; NIH/NCBI Accession No. NM_001025366.2. Li et al., Apr. 9, 2017. 5 pages.
Genbank Submission; NIH/NCBI Accession No. NM_002467.4. Kake et al., Apr. 17, 2017. 4 pages.
Genbank Submission; NIH/NCBI Accession No. NM_004958.3. Chandrika et al., Apr. 17, 2017. 9 pages.
Genbank Submission; NIH/NCBI Accession No. NM_011057.3. Houlihan et al., Apr. 16, 2017. 3 pages.
Genbank Submission; NIH/NCBI Accession No. NP_001020537.2. Li et al., Apr. 9, 2017. 3 pages.
Genbank Submission; NIH/NCBI Accession No. NP_001521.1. He et al., Apr. 9, 2017. 4 pages.
Genbank Submission; NIH/NCBI Accession No. NP_004949.1. Chandrika et al., Apr. 17, 2017. 7 pages.
Genbank Submission; NIH/NCBI, Accession No. M92934.1. Bradham et al., Apr. 4, 2002. 2 pages.
Sugibayashi, K., Skin-penetration enhancement and controlled release of drugs, Drug Delivery System, Jul. 25, 2016;31(3):201-209. doi.org/10.2745/dds.31.201.
[No Author Listed], RXi Pharmaceuticals to Present an Update on its Consumer Product Development Programs at the Society for Investigative Dermatology 76th Annual Meeting. Company Press Release. PRNewswire. Apr. 20, 2017. 2 pages.
Gallas et al., Chemistry and formulations for siRNA therapeutics. Chem Soc Rev. Oct. 21, 2013;42(20):7983-97. doi: 10.1039/c3cs35520a.
Hassler et al., Comparison of partially and fully chemically-modified siRNA in conjugate-mediated delivery in vivo. Nucleic Acids Res. Mar. 16, 2018;46(5):2185-2196. doi: 10.1093/nar/gky037. Suppl. Data 9 pages.
Holton et al., Prevention of UVR Induced MMP1 Upregulation with an MMP1 Targeting Self-delivering RNAi (sd-rxRNA®) Compounds May Reduce the Effects of Skin Photo-aging. Society for Investigative Dermatology (SID) 76th Annual Meeting. Apr. 29, 2017. Poster. 1 page.
Maxwell et al., Topical Application of Self-delivering RNAi (sd-rxRNA®) Compounds for Reduction of Hyperpigmentation. Society for Investigative Dermatology (SID) $76^{th}$ Annual Meeting. Apr. 29, 2017. Poster. 1 page.
Nikan et al., Docosahexaenoic Acid Conjugation Enhances Distribution and Safety of siRNA upon Local Administration in Mouse Brain. Mol Ther Nucleic Acids. Aug. 9, 2016;5(8):e344. doi: 10.1038/mtna.2016.50.
Osborn et al., Hydrophobicity drives the systemic distribution of lipid-conjugated siRNAs via lipid transport pathways. Nucleic Acids Res. Feb. 20, 2019;47(3):1070-1081. doi: 10.1093/nar/gky1232.
Podbevsek et al., Solution-state structure of a fully alternately 2'-F/2'-OMe modified 42-nt dimeric siRNA construct. Nucleic Acids Res. Nov. 2010;38(20):7298-307. doi: 10.1093/nar/gkq621. Epub Jul. 12, 2010.
Setten et al., The current state and future directions of RNAi-based therapeutics. Nat Rev Drug Discov. Jun. 2019;18(6):421-446. doi: 10.1038/s41573-019-0017-4. Erratum in: Nat Rev Drug Discov. Mar. 18, 2019; Erratum in: Nat Rev Drug Discov. Apr. 24, 2019.
Tai et al., Chemical modulation of siRNA lipophilicity for efficient delivery. J Control Release. Aug. 10, 2019;307:98-107. doi: 10.1016/j.jconrel.2019.06.022. Epub Jun. 21, 2019.
Jiping, Regulation of Gene Expression. Pharmaceutical Molecular Biology. People's Health Publishing House. Jul. 2007:299-303.
Amarzguioui et al., Approaches for chemically synthesized siRNA and vector-mediated RNAi. FEBS Lett. Oct. 31, 2005;579(26):5974-81. doi: 10.1016/j.febslet.2005.08.070. Epub Sep. 20, 2005.
Corey, Chemical modification: the key to clinical application of RNA interference? J Clin Invest. Dec. 2007;117(12):3615-22. doi: 10.1172/JCI33483.
Rana, Illuminating the silence: understanding the structure and function of small RNAs. Nat Rev Mol Cell Biol. Jan. 2007;8(1):23-36. doi: 10.1038/nrm2085.
Shmushkovich et al., Functional features defining the efficacy of cholesterol-conjugated, self-deliverable, chemically modified siRNAs. Nucleic Acids Res. Nov. 16, 2018;46(20):10905-10916. doi: 10.1093/nar/gky745.
Vlaia et al., Cellulose-Derivatives-Based Hydrogels as Vehicles for Dermal and Transdermal Drug Delivery. Emerging Concepts in Analysis and Applications of Hydrogels. InTech. Aug. 24, 2016:159-200.
Wiechers, Formulating at pH 4-5: How Lower pH Benefits the Skin and Formulations. Cosmetics & Toiletries. Oct. 28, 2013. 11 pages.
Zheng et al., Activation of the protein kinase PKR by short double-stranded RNAs with single-stranded tails. RNA. Dec. 2004;10(12):1934-45. doi: 10.1261/rna.7150804.
Fakhr et al., Precise and efficient siRNA design: a key point in competent gene silencing. Cancer Gene Ther. Apr. 2016;23(4):73-82. doi: 10.1038/cgt.2016.4. Epub Mar. 18, 2016.
Watts et al., Silencing disease genes in the laboratory and the clinic. J Pathol. Jan. 2012;226(2):365-79. doi: 10.1002/path.2993. Epub Nov. 9, 2011.

* cited by examiner

SEQUENCE LISTING

<160> NUMBER OF SEQ ID NOS: 742

<210> SEQ ID NO 1
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 1
acaggaagau gua                                                           13

<210> SEQ ID NO 2
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 2

```
uacaucuucc uguaguaca                                              19

<210> SEQ ID NO 3
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 3
gaguggagcg ccu                                                    13

<210> SEQ ID NO 4
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 4
aggcgcucca cucugguggu                                             19

<210> SEQ ID NO 5
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 5
cgacuggaag aca                                                    13

<210> SEQ ID NO 6
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 6
ugucuuccag ucgguaagc                                              19

<210> SEQ ID NO 7
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 7
ggagcgccug uuc                                                    13

<210> SEQ ID NO 8
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 8
gaacaggcgc uccacucug                                              19

<210> SEQ ID NO 9
<211> LENGTH: 13
<212> TYPE: RNA
```

```
<213> ORGANISM: Artificial Sequence
<220> FEATURE:
<223> OTHER INFORMATION: Synthetic polynucleotide

<400> SEQUENCE: 9
gccauuacaa cug                                                              13

<210> SEQ ID NO 10
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 10
caguuguaau ggcaggcac                                                        19

<210> SEQ ID NO 11
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 11
gagcuuucug gcu                                                              13

<210> SEQ ID NO 12
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 12
agccagaaag cucaaacuu                                                        19

<210> SEQ ID NO 13
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 13
aguggagcgc cug                                                              13

<210> SEQ ID NO 14
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 14
caggcgcucc acucugugg                                                        19

<210> SEQ ID NO 15
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 15
uggagcgccu guu                                                              13
```

<210> SEQ ID NO 16
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 16
aacaggcgcu ccacucugu                                                    19

<210> SEQ ID NO 17
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 17
guuugagcuu ucu                                                          13

<210> SEQ ID NO 18
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 18
agaaagcuca aacuugaua                                                    19

<210> SEQ ID NO 19
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 19
ugccauuaca acu                                                          13

<210> SEQ ID NO 20
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 20
aguuguaaug gcaggcaca                                                    19

<210> SEQ ID NO 21
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 21
acuggaagac acg                                                          13

<210> SEQ ID NO 22
<211> LENGTH: 19
<212> TYPE: RNA
<213> ORGANISM: Artificial Sequence
<220> FEATURE:

<223> OTHER INFORMATION: Synthetic polynucleotide

<400> SEQUENCE: 22
cgugucuucc agucgguaa                                                              19

<210> SEQ ID NO 23
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 23
aacugccugg ucc                                                                    13

<210> SEQ ID NO 24
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 24
ggaccaggca guuggcucu                                                              19

<210> SEQ ID NO 25
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 25
agaccugugc cug                                                                    13

<210> SEQ ID NO 26
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 26
caggcacagg ucuugauga                                                              19

<210> SEQ ID NO 27
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 27
cagaguggag cgc                                                                    13

<210> SEQ ID NO 28
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 28
gcgcuccacu cuggugucu                                                              19

```
<210> SEQ ID NO 29
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 29
ccugguccag acc                                                          13

<210> SEQ ID NO 30
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 30
ggucuggacc aggcaguug                                                    19

<210> SEQ ID NO 31
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 31
ccauuacaac ugu                                                          13

<210> SEQ ID NO 32
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 32
acaguuguaa uggcaggca                                                    19

<210> SEQ ID NO 33
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 33
cugccauuac aac                                                          13

<210> SEQ ID NO 34
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 34
guuguaaugg caggcacag                                                    19

<210> SEQ ID NO 35
<211> LENGTH: 13
<212> TYPE: RNA
<213> ORGANISM: Artificial Sequence
<220> FEATURE:
<223> OTHER INFORMATION: Synthetic polynucleotide
```

```
<400> SEQUENCE: 35
auuacaacug ucc                                                          13

<210> SEQ ID NO 36
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 36
ggacaguugu aauggcagg                                                    19

<210> SEQ ID NO 37
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 37
cauuacaacu guc                                                          13

<210> SEQ ID NO 38
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 38
gacaguugua auggcaggc                                                    19

<210> SEQ ID NO 39
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 39
agaguggagc gcc                                                          13

<210> SEQ ID NO 40
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 40
ggcgcuccac ucugugguc                                                    19

<210> SEQ ID NO 41
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 41
ggcgcuccac ucugugguc                                                    19

<210> SEQ ID NO 42
<211> LENGTH: 19
```

```
<212> TYPE: RNA
<213> ORGANISM: Artificial Sequence
<220> FEATURE:
<223> OTHER INFORMATION: Synthetic polynucleotide

<400> SEQUENCE: 42
ucuuccaguc gguaagccg                                                   19

<210> SEQ ID NO 43
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 43
auguacggag aca                                                         13

<210> SEQ ID NO 44
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 44
ugucuccgua caucuuccu                                                   19

<210> SEQ ID NO 45
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 45
gccuugcgaa gcu                                                         13

<210> SEQ ID NO 46
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 46
agcuucgcaa ggccugacc                                                   19

<210> SEQ ID NO 47
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 47
gcugcgagga gug                                                         13

<210> SEQ ID NO 48
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 48
```

```
cacuccucgc agcauuucc                                              19

<210> SEQ ID NO 49
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 49
gccuaucaag uuu                                                    13

<210> SEQ ID NO 50
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 50
aaacuugaua ggcuuggag                                              19

<210> SEQ ID NO 51
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 51
aauucugugg agu                                                    13

<210> SEQ ID NO 52
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 52
acuccacaga auuuagcuc                                              19

<210> SEQ ID NO 53
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 53
uguacggaga cau                                                    13

<210> SEQ ID NO 54
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 54
augucuccgu acaucuucc                                              19

<210> SEQ ID NO 55
<211> LENGTH: 13
<212> TYPE: RNA
<213> ORGANISM: Artificial Sequence
```

```
<220> FEATURE:
<223> OTHER INFORMATION: Synthetic polynucleotide

<400> SEQUENCE: 55
agccuaucaa guu                                                          13

<210> SEQ ID NO 56
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 56
aacuugauag gcuuggaga                                                    19

<210> SEQ ID NO 57
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 57
caaguuugag cuu                                                          13

<210> SEQ ID NO 58
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 58
aagcucaaac uugauaggc                                                    19

<210> SEQ ID NO 59
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 59
cuguggagua ugu                                                          13

<210> SEQ ID NO 60
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 60
acauacucca cagaauuua                                                    19

<210> SEQ ID NO 61
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 61
aaauucugug gag                                                          13
```

```
<210> SEQ ID NO 62
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 62
cuccacagaa uuuagcucg                                                    19

<210> SEQ ID NO 63
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 63
uuucaguagc aca                                                          13

<210> SEQ ID NO 64
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 64
ugugcuacug aaaucauuu                                                    19

<210> SEQ ID NO 65
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 65
caaugacauc uuu                                                          13

<210> SEQ ID NO 66
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 66
aaagauguca uugucuccg                                                    19

<210> SEQ ID NO 67
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 67
aguaccagug cac                                                          13

<210> SEQ ID NO 68
<211> LENGTH: 19
<212> TYPE: RNA
<213> ORGANISM: Artificial Sequence
<220> FEATURE:
<223> OTHER INFORMATION: Synthetic polynucleotide
```

```
<400> SEQUENCE: 68
gugcacuggu acuugcagc                                              19

<210> SEQ ID NO 69
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 69
ggaagacacg uuu                                                    13

<210> SEQ ID NO 70
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 70
aaacgugucu uccagucgg                                              19

<210> SEQ ID NO 71
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 71
cuaucaaguu uga                                                    13

<210> SEQ ID NO 72
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 72
ucaaacuuga uaggcuugg                                              19

<210> SEQ ID NO 73
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 73
agcuaaauuc ugu                                                    13

<210> SEQ ID NO 74
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 74
acagaauuua gcucgguau                                              19

<210> SEQ ID NO 75
```

```
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 75
agguagaaug uaa                                                          13

<210> SEQ ID NO 76
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 76
uuacauucua ccuaggug                                                     19

<210> SEQ ID NO 77
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 77
agcugaucag uuu                                                          13

<210> SEQ ID NO 78
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 78
aaacugauca gcuauauag                                                    19

<210> SEQ ID NO 79
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 79
uucugcucag aua                                                          13

<210> SEQ ID NO 80
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 80
uaucugagca gaauuucca                                                    19

<210> SEQ ID NO 81
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 81
```

```
uuaucuaagu uaa                                              13

<210> SEQ ID NO 82
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 82
uuaacuuaga uaacuguac                                        19

<210> SEQ ID NO 83
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 83
uauacgagua aua                                              13

<210> SEQ ID NO 84
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 84
uauuacucgu auaagaugc                                        19

<210> SEQ ID NO 85
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 85
gacuggacag cuu                                              13

<210> SEQ ID NO 86
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 86
aagcugucca gucuaaucg                                        19

<210> SEQ ID NO 87
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 87
auggccuuua uua                                              13

<210> SEQ ID NO 88
<211> LENGTH: 19
<212> TYPE: RNA
```

```
<213> ORGANISM: Artificial Sequence
<220> FEATURE:
<223> OTHER INFORMATION: Synthetic polynucleotide

<400> SEQUENCE: 88
uaauaaaggc cauuuguuc                                                    19

<210> SEQ ID NO 89
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 89
auaccgagcu aaa                                                          13

<210> SEQ ID NO 90
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 90
uuuagcucgg uaugucuuc                                                    19

<210> SEQ ID NO 91
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 91
uuguugagag ugu                                                          13

<210> SEQ ID NO 92
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 92
acacucucaa caaauaaac                                                    19

<210> SEQ ID NO 93
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 93
acauaccgag cua                                                          13

<210> SEQ ID NO 94
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 94
uagcucggua ugucuucau                                                    19
```

```
<210> SEQ ID NO 95
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 95
agcagaaagg uua                                                          13

<210> SEQ ID NO 96
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 96
uaaccuuucu gcugguacc                                                    19

<210> SEQ ID NO 97
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 97
aguuguuccu uaa                                                          13

<210> SEQ ID NO 98
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 98
uuaaggaaca acuugacuc                                                    19

<210> SEQ ID NO 99
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 99
auuugaagug uaa                                                          13

<210> SEQ ID NO 100
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 100
uuacacuuca aauagcagg                                                    19

<210> SEQ ID NO 101
<211> LENGTH: 13
<212> TYPE: RNA
<213> ORGANISM: Artificial Sequence
<220> FEATURE:
```

```
<223> OTHER INFORMATION: Synthetic polynucleotide

<400> SEQUENCE: 101
aagcugaccu gga                                                            13

<210> SEQ ID NO 102
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 102
uccaggucag cuucgcaag                                                      19

<210> SEQ ID NO 103
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 103
ggucaugaag aag                                                            13

<210> SEQ ID NO 104
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 104
cuucuucaug accucgccg                                                      19

<210> SEQ ID NO 105
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 105
auggucaggc cuu                                                            13

<210> SEQ ID NO 106
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 106
aaggccugac caugcacag                                                      19

<210> SEQ ID NO 107
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 107
gaagacacgu uug                                                            13
```

```
<210> SEQ ID NO 108
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 108
caaacguguc uuccagucg                                            19

<210> SEQ ID NO 109
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 109
aggccuugcg aag                                                  13

<210> SEQ ID NO 110
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 110
cuucgcaagg ccugaccau                                            19

<210> SEQ ID NO 111
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 111
uaccgacugg aag                                                  13

<210> SEQ ID NO 112
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 112
cuuccagucg guaagccgc                                            19

<210> SEQ ID NO 113
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 113
accgcaagau cgg                                                  13

<210> SEQ ID NO 114
<211> LENGTH: 19
<212> TYPE: RNA
<213> ORGANISM: Artificial Sequence
<220> FEATURE:
<223> OTHER INFORMATION: Synthetic polynucleotide
```

```
<400> SEQUENCE: 114
ccgaucuugc gguuggccg                                               19

<210> SEQ ID NO 115
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 115
caggccuugc gaa                                                     13

<210> SEQ ID NO 116
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 116
uucgcaaggc cugaccaug                                               19

<210> SEQ ID NO 117
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 117
cgagcuaaau ucu                                                     13

<210> SEQ ID NO 118
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 118
agaauuuagc ucgguaugu                                               19

<210> SEQ ID NO 119
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 119
ucuguggagu aug                                                     13

<210> SEQ ID NO 120
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 120
cauacuccac agaauuuag                                               19

<210> SEQ ID NO 121
<211> LENGTH: 13
```

```
<212> TYPE: RNA
<213> ORGANISM: Artificial Sequence
<220> FEATURE:
<223> OTHER INFORMATION: Synthetic polynucleotide

<400> SEQUENCE: 121
cggagacaug gca                                                           13

<210> SEQ ID NO 122
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 122
ugccaugucu ccguacauc                                                     19

<210> SEQ ID NO 123
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 123
augacaacgc cuc                                                           13

<210> SEQ ID NO 124
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 124
gaggcguugu cauugguaa                                                     19

<210> SEQ ID NO 125
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 125
gaggucauga aga                                                           13

<210> SEQ ID NO 126
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 126
ucuucaugac cucgccguc                                                     19

<210> SEQ ID NO 127
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 127
```
uaaauucugu gga                                                    13

<210> SEQ ID NO 128
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 128
uccacagaau uuagcucgg                                              19

<210> SEQ ID NO 129
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 129
uggaagacac guu                                                    13

<210> SEQ ID NO 130
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 130
aacgugucuu ccagcggu                                               19

<210> SEQ ID NO 131
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 131
aagauguacg gag                                                    13

<210> SEQ ID NO 132
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 132
cuccguacau cuuccugua                                              19

<210> SEQ ID NO 133
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 133
aaugacaacg ccu                                                    13

<210> SEQ ID NO 134
<211> LENGTH: 19
<212> TYPE: RNA
<213> ORGANISM: Artificial Sequence

```
<220> FEATURE:
<223> OTHER INFORMATION: Synthetic polynucleotide

<400> SEQUENCE: 134
aggcguuguc auugguaac                                                19

<210> SEQ ID NO 135
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 135
ggcgagguca uga                                                      13

<210> SEQ ID NO 136
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 136
ucaugaccuc gccgucagg                                                19

<210> SEQ ID NO 137
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 137
gacacguuug gcc                                                      13

<210> SEQ ID NO 138
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 138
ggccaaacgu gcuuccag                                                 19

<210> SEQ ID NO 139
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 139
acggagacau ggc                                                      13

<210> SEQ ID NO 140
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 140
gccaugucuc cguacaucu                                                19
```

```
<210> SEQ ID NO 141
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 141
ucaggccuug cga                                                          13

<210> SEQ ID NO 142
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 142
ucgcaaggcc ugaccaugc                                                    19

<210> SEQ ID NO 143
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 143
gcgaagcuga ccu                                                          13

<210> SEQ ID NO 144
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 144
aggucagcuu cgcaaggcc                                                    19

<210> SEQ ID NO 145
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 145
ggaagaugua cgg                                                          13

<210> SEQ ID NO 146
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 146
ccguacaucu uccuguagu                                                    19

<210> SEQ ID NO 147
<211> LENGTH: 13
<212> TYPE: RNA
<213> ORGANISM: Artificial Sequence
<220> FEATURE:
<223> OTHER INFORMATION: Synthetic polynucleotide
```

<400> SEQUENCE: 147
gugacuucgg cuc                                                          13

<210> SEQ ID NO 148
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 148
gagccgaagu cacagaaga                                                    19

<210> SEQ ID NO 149
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 149
ugacuucggc ucc                                                          13

<210> SEQ ID NO 150
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 150
ggagccgaag ucacagaag                                                    19

<210> SEQ ID NO 151
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 151
uggucaggcc uug                                                          13

<210> SEQ ID NO 152
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 152
caaggccuga ccaugcaca                                                    19

<210> SEQ ID NO 153
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 153
ucaaguuuga gcu                                                          13

<210> SEQ ID NO 154

```
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 154
agcucaaacu ugauaggcu                                               19

<210> SEQ ID NO 155
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 155
gccagaacug cag                                                     13

<210> SEQ ID NO 156
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 156
cugcaguucu ggccgacgg                                               19

<210> SEQ ID NO 157
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 157
uggaguaugu acc                                                     13

<210> SEQ ID NO 158
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 158
gguacauacu ccacagaau                                               19

<210> SEQ ID NO 159
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 159
gcuagagaag cag                                                     13

<210> SEQ ID NO 160
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 160
```
cugcuucucu agccugcag                                                19

<210> SEQ ID NO 161
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 161
ggucaggccu ugc                                                      13

<210> SEQ ID NO 162
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 162
gcaaggccug accaugcac                                                19

<210> SEQ ID NO 163
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 163
gagcuaaauu cug                                                      13

<210> SEQ ID NO 164
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 164
cagaauuuag cucgguaug                                                19

<210> SEQ ID NO 165
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 165
aagacacguu ugg                                                      13

<210> SEQ ID NO 166
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 166
ccaaacgugu cuuccaguc                                                19

<210> SEQ ID NO 167
<211> LENGTH: 13
<212> TYPE: RNA

```
<213> ORGANISM: Artificial Sequence
<220> FEATURE:
<223> OTHER INFORMATION: Synthetic polynucleotide

<400> SEQUENCE: 167
cgaggucaug aag                                                          13

<210> SEQ ID NO 168
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 168
cuucaugacc ucgccguca                                                    19

<210> SEQ ID NO 169
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 169
ggccuugcga agc                                                          13

<210> SEQ ID NO 170
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 170
gcuucgcaag gccugacca                                                    19

<210> SEQ ID NO 171
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 171
cuugcgaagc uga                                                          13

<210> SEQ ID NO 172
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 172
ucagcuucgc aaggccuga                                                    19

<210> SEQ ID NO 173
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 173
ccgacuggaa gac                                                          13
```

<210> SEQ ID NO 174
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 174
gucuuccagu cgguaagcc                                                    19

<210> SEQ ID NO 175
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 175
ccuaucaagu uug                                                          13

<210> SEQ ID NO 176
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 176
caaacuugau aggcuugga                                                    19

<210> SEQ ID NO 177
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 177
uguuccaaga ccu                                                          13

<210> SEQ ID NO 178
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 178
aggucuugga acaggcgcu                                                    19

<210> SEQ ID NO 179
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 179
cgaagcugac cug                                                          13

<210> SEQ ID NO 180
<211> LENGTH: 19
<212> TYPE: RNA
<213> ORGANISM: Artificial Sequence
<220> FEATURE:

<223> OTHER INFORMATION: Synthetic polynucleotide

<400> SEQUENCE: 180
caggucagcu ucgcaaggc                                           19

<210> SEQ ID NO 181
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 181
uugcgaagcu gac                                                 13

<210> SEQ ID NO 182
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 182
gucagcuucg caaggccug                                           19

<210> SEQ ID NO 183
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 183
caaugacaac gcc                                                 13

<210> SEQ ID NO 184
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 184
ggcguuguca uugguaacc                                           19

<210> SEQ ID NO 185
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 185
guaccagugc acg                                                 13

<210> SEQ ID NO 186
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 186
cgugcacugg uacuugcag                                           19

```
<210> SEQ ID NO 187
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 187
ccuguuccaa gac                                                          13

<210> SEQ ID NO 188
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 188
gucuuggaac aggcgcucc                                                    19

<210> SEQ ID NO 189
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 189
uacggagaca ugg                                                          13

<210> SEQ ID NO 190
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 190
ccaugucucc guacaucuu                                                    19

<210> SEQ ID NO 191
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 191
ugcgaagcug acc                                                          13

<210> SEQ ID NO 192
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 192
ggucagcuuc gcaaggccu                                                    19

<210> SEQ ID NO 193
<211> LENGTH: 13
<212> TYPE: RNA
<213> ORGANISM: Artificial Sequence
<220> FEATURE:
<223> OTHER INFORMATION: Synthetic polynucleotide
```

```
<400> SEQUENCE: 193
ccuugcgaag cug                                                           13

<210> SEQ ID NO 194
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 194
cagcuucgca aggccugac                                                     19

<210> SEQ ID NO 195
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 195
cugugacuuc ggc                                                           13

<210> SEQ ID NO 196
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 196
gccgaaguca cagaagagg                                                     19

<210> SEQ ID NO 197
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 197
gcuaaauucu gug                                                           13

<210> SEQ ID NO 198
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 198
cacagaauuu agcucggua                                                     19

<210> SEQ ID NO 199
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 199
cuaaauucug ugg                                                           13

<210> SEQ ID NO 200
<211> LENGTH: 19
```

```
<212> TYPE: RNA
<213> ORGANISM: Artificial Sequence
<220> FEATURE:
<223> OTHER INFORMATION: Synthetic polynucleotide

<400> SEQUENCE: 200
ccacagaauu uagcucggu                                                19

<210> SEQ ID NO 201
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 201
agacacguuu ggc                                                      13

<210> SEQ ID NO 202
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 202
gccaaacgug ucuuccagu                                                19

<210> SEQ ID NO 203
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 203
ccgcaagauc ggc                                                      13

<210> SEQ ID NO 204
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 204
gccgaucuug cgguuggcc                                                19

<210> SEQ ID NO 205
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 205
uaucaaguuu gag                                                      13

<210> SEQ ID NO 206
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 206
```
cucaaacuug auaggcuug                                                  19

<210> SEQ ID NO 207
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 207
gaagcugacc ugg                                                        13

<210> SEQ ID NO 208
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 208
ccaggucagc uucgcaagg                                                  19

<210> SEQ ID NO 209
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 209
acauuaacuc aua                                                        13

<210> SEQ ID NO 210
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 210
uaugaguuaa ugucucuca                                                  19

<210> SEQ ID NO 211
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 211
gacauuaacu caua                                                       14

<210> SEQ ID NO 212
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 212
uaugaguuaa ugucucuca                                                  19

<210> SEQ ID NO 213
<211> LENGTH: 13
<212> TYPE: RNA
<213> ORGANISM: Artificial Sequence

```
<220> FEATURE:
<223> OTHER INFORMATION: Synthetic polynucleotide

<400> SEQUENCE: 213
ugaagaaugu uaa                                                            13

<210> SEQ ID NO 214
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 214
uuaacauucu ucaaaccag                                                      19

<210> SEQ ID NO 215
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 215
uugaagaaug uuaa                                                           14

<210> SEQ ID NO 216
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 216
uuaacauucu ucaaaccag                                                      19

<210> SEQ ID NO 217
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 217
gauagcaucu uaa                                                            13

<210> SEQ ID NO 218
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 218
uuaagaugcu aucugauga                                                      19

<210> SEQ ID NO 219
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 219
agauagcauc uuaa                                                           14
```

```
<210> SEQ ID NO 220
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 220
uuaagaugcu aucugauga                                              19

<210> SEQ ID NO 221
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 221
ugaaguguaa uua                                                    13

<210> SEQ ID NO 222
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 222
uaauuacacu ucaaauagc                                              19

<210> SEQ ID NO 223
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 223
aauugagaag gaa                                                    13

<210> SEQ ID NO 224
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 224
uuccuucuca auuacacuu                                              19

<210> SEQ ID NO 225
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 225
uugagaagga aaa                                                    13

<210> SEQ ID NO 226
<211> LENGTH: 19
<212> TYPE: RNA
<213> ORGANISM: Artificial Sequence
<220> FEATURE:
<223> OTHER INFORMATION: Synthetic polynucleotide
```

```
<400> SEQUENCE: 226
uuuuccuucu caauuacac                                                  19

<210> SEQ ID NO 227
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 227
cauucugauu cga                                                        13

<210> SEQ ID NO 228
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 228
ucgaaucaga augucagag                                                  19

<210> SEQ ID NO 229
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 229
uucugauucg aaa                                                        13

<210> SEQ ID NO 230
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 230
uuucgaauca gaaugucag                                                  19

<210> SEQ ID NO 231
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 231
cugucgauua gaa                                                        13

<210> SEQ ID NO 232
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 232
uucuaaucga caggauucc                                                  19

<210> SEQ ID NO 233
```

```
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 233
uuugccugua aca                                                          13

<210> SEQ ID NO 234
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 234
uguuacaggc aaauucacu                                                    19

<210> SEQ ID NO 235
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 235
auuugccugu aaca                                                         14

<210> SEQ ID NO 236
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 236
uguuacaggc aaauucacu                                                    19

<210> SEQ ID NO 237
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 237
acaagccaga uua                                                          13

<210> SEQ ID NO 238
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 238
uaaucuggcu uguuacagg                                                    19

<210> SEQ ID NO 239
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 239
```
aacaagccag auua                                                    14

<210> SEQ ID NO 240
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 240
uaaucuggcu uguuacagg                                               19

<210> SEQ ID NO 241
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 241
caguuuauuu gua                                                     13

<210> SEQ ID NO 242
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 242
uacaaauaaa cuguccgaa                                               19

<210> SEQ ID NO 243
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 243
uguugagagu gua                                                     13

<210> SEQ ID NO 244
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 244
uacacucuca acaaauaaa                                               19

<210> SEQ ID NO 245
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 245
uuguugagag ugua                                                    14

<210> SEQ ID NO 246
<211> LENGTH: 19
<212> TYPE: RNA

```
<213> ORGANISM: Artificial Sequence
<220> FEATURE:
<223> OTHER INFORMATION: Synthetic polynucleotide

<400> SEQUENCE: 246
uacacucuca acaaauaaa                                              19

<210> SEQ ID NO 247
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 247
ugcaccuuuc uaa                                                    13

<210> SEQ ID NO 248
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 248
uuagaaaggu gcaaacaug                                              19

<210> SEQ ID NO 249
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 249
uugcaccuuu cuaa                                                   14

<210> SEQ ID NO 250
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 250
uuagaaaggu gcaaacaug                                              19

<210> SEQ ID NO 251
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 251
uugagcuuuc uga                                                    13

<210> SEQ ID NO 252
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 252
ucagaaagcu caaacuuga                                              19
```

<210> SEQ ID NO 253
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 253
ugagagugug aca                                                          13

<210> SEQ ID NO 254
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 254
ugucacacuc ucaacaaau                                                    19

<210> SEQ ID NO 255
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 255
agugugacca aaa                                                          13

<210> SEQ ID NO 256
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 256
uuuuggucac acucucaac                                                    19

<210> SEQ ID NO 257
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 257
gagugugacc aaaa                                                         14

<210> SEQ ID NO 258
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 258
uuuuggucac acucucaac                                                    19

<210> SEQ ID NO 259
<211> LENGTH: 13
<212> TYPE: RNA
<213> ORGANISM: Artificial Sequence
<220> FEATURE:

<223> OTHER INFORMATION: Synthetic polynucleotide

<400> SEQUENCE: 259
gugugaccaa aaa                                                          13

<210> SEQ ID NO 260
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 260
uuuuugguca cacucucaa                                                    19

<210> SEQ ID NO 261
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 261
ugugaccaaa aga                                                          13

<210> SEQ ID NO 262
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 262
ucuuuugguc acacucuca                                                    19

<210> SEQ ID NO 263
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 263
gugugaccaa aaga                                                         14

<210> SEQ ID NO 264
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 264
ucuuuugguc acacucuca                                                    19

<210> SEQ ID NO 265
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 265
gugaccaaaa gua                                                          13

```
<210> SEQ ID NO 266
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 266
uacuuuuggu cacacucuc                                                19

<210> SEQ ID NO 267
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 267
gaccaaaagu uaa                                                      13

<210> SEQ ID NO 268
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 268
uuaacuuuug gucacacuc                                                19

<210> SEQ ID NO 269
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 269
gcaccuuucu aga                                                      13

<210> SEQ ID NO 270
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 270
ucuagaaagg ugcaaacau                                                19

<210> SEQ ID NO 271
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 271
ccuuucuagu uga                                                      13

<210> SEQ ID NO 272
<211> LENGTH: 19
<212> TYPE: RNA
<213> ORGANISM: Artificial Sequence
<220> FEATURE:
<223> OTHER INFORMATION: Synthetic polynucleotide
```

```
<400> SEQUENCE: 272
ucaacuagaa aggugcaaa                                                    19

<210> SEQ ID NO 273
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 273
gcaccuuucu aga                                                          13

<210> SEQ ID NO 274
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 274
ucuagaaagg ugcaaacau                                                    19

<210> SEQ ID NO 275
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 275
gcaccuuucu aga                                                          13

<210> SEQ ID NO 276
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 276
ucuagaaagg ugcaaacau                                                    19

<210> SEQ ID NO 277
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 277
gcaccuuucu aga                                                          13

<210> SEQ ID NO 278
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 278
ucuagaaagg ugcaaacau                                                    19

<210> SEQ ID NO 279
<211> LENGTH: 13
```

```
<212> TYPE: RNA
<213> ORGANISM: Artificial Sequence
<220> FEATURE:
<223> OTHER INFORMATION: Synthetic polynucleotide

<400> SEQUENCE: 279
gcaccuuucu aga                                                          13

<210> SEQ ID NO 280
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 280
ucuagaaagg ugcaaacau                                                    19

<210> SEQ ID NO 281
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 281
gcaccuuucu aga                                                          13

<210> SEQ ID NO 282
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 282
ucuagaaagg ugcaaacau                                                    19

<210> SEQ ID NO 283
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 283
gcaccuuucu aga                                                          13

<210> SEQ ID NO 284
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 284
ucuagaaagg ugcaaacau                                                    19

<210> SEQ ID NO 285
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 285
```
gcaccuuucu aga                                                    13

<210> SEQ ID NO 286
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 286
ucuagaaagg ugcaaacau                                              19

<210> SEQ ID NO 287
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 287
gcaccuuucu aga                                                    13

<210> SEQ ID NO 288
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 288
ucuagaaagg ugcaaacau                                              19

<210> SEQ ID NO 289
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 289
gcaccuuucu aga                                                    13

<210> SEQ ID NO 290
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 290
ucuagaaagg ugcaaacau                                              19

<210> SEQ ID NO 291
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 291
gcaccuuucu aga                                                    13

<210> SEQ ID NO 292
<211> LENGTH: 19
<212> TYPE: RNA
<213> ORGANISM: Artificial Sequence

```
<220> FEATURE:
<223> OTHER INFORMATION: Synthetic polynucleotide

<400> SEQUENCE: 292
ucuagaaagg ugcaaacau                                               19

<210> SEQ ID NO 293
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 293
gcaccuuucu aga                                                     13

<210> SEQ ID NO 294
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 294
ucuagaaagg ugcaaacau                                               19

<210> SEQ ID NO 295
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 295
gugaccaaaa gua                                                     13

<210> SEQ ID NO 296
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 296 uacuuuggu cacacucuc                                                19

<210> SEQ ID NO 297
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 297
gugaccaaaa gua                                                     13

<210> SEQ ID NO 298
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 298 uacuuuggu cacacucuc                                                19
```

<210> SEQ ID NO 299
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 299
gugaccaaaa gua                                                      13

<210> SEQ ID NO 300
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 300 uacuuuggu cacacucuc                                                 19

<210> SEQ ID NO 301
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 301
uugcaccuuu cuaa                                                     14

<210> SEQ ID NO 302
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 302
uuagaaaggu gcaaacaagg                                               20

<210> SEQ ID NO 303
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 303
uugcaccuuu cuaa                                                     14

<210> SEQ ID NO 304
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 304
uuagaaaggu gcaaacaagg                                               20

<210> SEQ ID NO 305
<211> LENGTH: 14
<212> TYPE: RNA
<213> ORGANISM: Artificial Sequence
<220> FEATURE:
<223> OTHER INFORMATION: Synthetic polynucleotide

```
<400> SEQUENCE: 305
uugcaccuuu cuaa                                                    14

<210> SEQ ID NO 306
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 306
uuagaaaggu gcaaacaagg                                              20

<210> SEQ ID NO 307
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 307
uugcaccuuu cuaa                                                    14

<210> SEQ ID NO 308
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 308
uuagaaaggu gcaaacaagg                                              20

<210> SEQ ID NO 309
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 309
uugcaccuuu cuaa                                                    14

<210> SEQ ID NO 310
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 310
uuagaaaggu gcaaacaagg                                              20

<210> SEQ ID NO 311
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 311
uugcaccuuu cuaa                                                    14

<210> SEQ ID NO 312
```

```
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 312
uuagaaaggu gcaaacaagg                                                 20

<210> SEQ ID NO 313
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 313
uugcaccuuu cuaa                                                       14

<210> SEQ ID NO 314
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 314
uuagaaaggu gcaaacaagg                                                 20

<210> SEQ ID NO 315
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 315
uugcaccuuu cuaa                                                       14

<210> SEQ ID NO 316
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 316
uuagaaaggu gcaaacaagg                                                 20

<210> SEQ ID NO 317
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 317
uugcaccuuu cuaa                                                       14

<210> SEQ ID NO 318
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 318
```

-continued uuagaaaggu gcaaacaagg                                                    20

<210> SEQ ID NO 319
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 319
uugcaccuuu cuaa                                                          14

<210> SEQ ID NO 320
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 320
uuagaaaggu gcaaacaagg                                                    20

<210> SEQ ID NO 321
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 321
uugcaccuuu cuaa                                                          14

<210> SEQ ID NO 322
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 322
uuagaaaggu gcaaacaagg                                                    20

<210> SEQ ID NO 323
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 323
uugcaccuuu cuaa                                                          14

<210> SEQ ID NO 324
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 324
uuagaaaggu gcaaacaagg                                                    20

<210> SEQ ID NO 325
<211> LENGTH: 14
<212> TYPE: RNA

<210> SEQ ID NO 325
<211> LENGTH: 14 (implied)
<212> TYPE: RNA
<213> ORGANISM: Artificial Sequence
<220> FEATURE:
<223> OTHER INFORMATION: Synthetic polynucleotide

<400> SEQUENCE: 325
uugcaccuuu cuaa                                            14

<210> SEQ ID NO 326
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 326
uuagaaaggu gcaaacaagg                                      20

<210> SEQ ID NO 327
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 327
uugcaccuuu cuaa                                            14

<210> SEQ ID NO 328
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 328
uuagaaaggu gcaaacaagg                                      20

<210> SEQ ID NO 329
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 329
uugcaccuuu cuaa                                            14

<210> SEQ ID NO 330
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 330
uuagaaaggu gcaaacaagg                                      20

<210> SEQ ID NO 331
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 331
ccuuucuagu uga                                             13

<210> SEQ ID NO 332
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 332
ucaacuagaa aggugcaaa                                              19

<210> SEQ ID NO 333
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 333
ccuuucuagu uga                                                    13

<210> SEQ ID NO 334
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 334
ucaacuagaa aggugcaaa                                              19

<210> SEQ ID NO 335
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 335
ccuuucuagu uga                                                    13

<210> SEQ ID NO 336
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 336
ucaacuagaa aggugcaaa                                              19

<210> SEQ ID NO 337
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 337
ccuuucuagu uga                                                    13

<210> SEQ ID NO 338
<211> LENGTH: 19
<212> TYPE: RNA
<213> ORGANISM: Artificial Sequence
<220> FEATURE:

<223> OTHER INFORMATION: Synthetic polynucleotide

<400> SEQUENCE: 338
ucaacuagaa aggugcaaa                                                    19

<210> SEQ ID NO 339
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 339
ccuuucuagu uga                                                          13

<210> SEQ ID NO 340
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 340
ucaacuagaa aggugcaaa                                                    19

<210> SEQ ID NO 341
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 341
ccuuucuagu uga                                                          13

<210> SEQ ID NO 342
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 342
ucaacuagaa aggugcaaa                                                    19

<210> SEQ ID NO 343
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 343
ccuuucuagu uga                                                          13

<210> SEQ ID NO 344
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 344
ucaacuagaa aggugcaaa                                                    19

```
<210> SEQ ID NO 345
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 345
ccuuucuagu uga                                                          13

<210> SEQ ID NO 346
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 346
ucaacuagaa aggugcaaa                                                    19

<210> SEQ ID NO 347
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 347
ccuuucuagu uga                                                          13

<210> SEQ ID NO 348
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 348
ucaacuagaa aggugcaaa                                                    19

<210> SEQ ID NO 349
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 349
ccuuucuagu uga                                                          13

<210> SEQ ID NO 350
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 350
ucaacuagaa aggugcaaa                                                    19

<210> SEQ ID NO 351
<211> LENGTH: 13
<212> TYPE: RNA
<213> ORGANISM: Artificial Sequence
<220> FEATURE:
<223> OTHER INFORMATION: Synthetic polynucleotide
```

```
<400> SEQUENCE: 351
ccuuucuagu uga                                              13

<210> SEQ ID NO 352
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 352
ucaacuagaa aggugcaaa                                        19

<210> SEQ ID NO 353
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 353
ccuuucuagu uga                                              13

<210> SEQ ID NO 354
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 354
ucaacuagaa aggugcaaa                                        19

<210> SEQ ID NO 355
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 355
ccuuucuagu uga                                              13

<210> SEQ ID NO 356
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 356
ucaacuagaa aggugcaaa                                        19

<210> SEQ ID NO 357
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 357
gcaccuuucu aga                                              13

<210> SEQ ID NO 358
<211> LENGTH: 19
```

```
<212> TYPE: RNA
<213> ORGANISM: Artificial Sequence
<220> FEATURE:
<223> OTHER INFORMATION: Synthetic polynucleotide

<400> SEQUENCE: 358
ucuagaaagg ugcaaacau                                            19

<210> SEQ ID NO 359
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 359
gcaccuuucu aga                                                  13

<210> SEQ ID NO 360
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 360
ucuagaaagg ugcaaacau                                            19

<210> SEQ ID NO 361
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 361
gcaccuuucu aga                                                  13

<210> SEQ ID NO 362
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 362
ucuagaaagg ugcaaacau                                            19

<210> SEQ ID NO 363
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 363
gcaccuuucu aga                                                  13

<210> SEQ ID NO 364
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 364
```
ucuagaaagg ugcaaacau                                                    19

<210> SEQ ID NO 365
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 365
gcaccuuucu aga                                                          13

<210> SEQ ID NO 366
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 366
ucuagaaagg ugcaaacau                                                    19

<210> SEQ ID NO 367
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 367
gcaccuuucu aga                                                          13

<210> SEQ ID NO 368
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 368
ucuagaaagg ugcaaacau                                                    19

<210> SEQ ID NO 369
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 369
gcaccuuucu aga                                                          13

<210> SEQ ID NO 370
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 370
ucuagaaagg ugcaaacau                                                    19

<210> SEQ ID NO 371
<211> LENGTH: 13
<212> TYPE: RNA
<213> ORGANISM: Artificial Sequence

```
<220> FEATURE:
<223> OTHER INFORMATION: Synthetic polynucleotide

<400> SEQUENCE: 371
gcaccuuucu aga                                                        13

<210> SEQ ID NO 372
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 372
ucuagaaagg ugcaaacau                                                  19

<210> SEQ ID NO 373
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 373
gcaccuuucu aga                                                        13

<210> SEQ ID NO 374
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 374
ucuagaaagg ugcaaacau                                                  19

<210> SEQ ID NO 375
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 375
uugcaccuuu cuaa                                                       14

<210> SEQ ID NO 376
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 376
uuagaaaggu gcaaacaagg                                                 20

<210> SEQ ID NO 377
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 377
uugcaccuuu cuaa                                                       14
```

```
<210> SEQ ID NO 378
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 378
uuagaaaggu gcaaacaagg                                                  20

<210> SEQ ID NO 379
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 379
uugcaccuuu cuaa                                                        14

<210> SEQ ID NO 380
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 380
uuagaaaggu gcaaacaagg                                                  20

<210> SEQ ID NO 381
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 381
uugcaccuuu cuaa                                                        14

<210> SEQ ID NO 382
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 382
uuagaaaggu gcaaacaagg                                                  20

<210> SEQ ID NO 383
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 383
uugcaccuuu cuaa                                                        14

<210> SEQ ID NO 384
<211> LENGTH: 20
<212> TYPE: RNA
<213> ORGANISM: Artificial Sequence
<220> FEATURE:
<223> OTHER INFORMATION: Synthetic polynucleotide
```

<400> SEQUENCE: 384
uuagaaaggu gcaaacaagg                                              20

<210> SEQ ID NO 385
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 385
uugcaccuuu cuaa                                                    14

<210> SEQ ID NO 386
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 386
uuagaaaggu gcaaacaagg                                              20

<210> SEQ ID NO 387
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 387
uugcaccuuu cuaa                                                    14

<210> SEQ ID NO 388
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 388
uuagaaaggu gcaaacaagg                                              20

<210> SEQ ID NO 389
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 389
uugcaccuuu cuaa                                                    14

<210> SEQ ID NO 390
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 390
uuagaaaggu gcaaacaagg                                              20

<210> SEQ ID NO 391

```
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 391
uugcaccuuu cuaa                                                         14

<210> SEQ ID NO 392
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 392
uuagaaaggu gcaaacaagg                                                   20

<210> SEQ ID NO 393
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 393
uugcaccuuu cuaa                                                         14

<210> SEQ ID NO 394
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 394
uuagaaaggu gcaaacaagg                                                   20

<210> SEQ ID NO 395
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 395
uugcaccuuu cuaa                                                         14

<210> SEQ ID NO 396
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 396
uuagaaaggu gcaaacaagg                                                   20

<210> SEQ ID NO 397
<211> LENGTH: 14
<212> TYPE: RNA
<213> ORGANISM: Artificial Sequence
<220> FEATURE:
<223> OTHER INFORMATION: Synthetic polynucleotide

<400> SEQUENCE: 397
```

```
uugcaccuuu cuaa                                                    14

<210> SEQ ID NO 398
<211> LENGTH: 20
<212> TYPE: RNA
<213> ORGANISM: Artificial Sequence
<220> FEATURE:
<223> OTHER INFORMATION: Synthetic polynucleotide

<400> SEQUENCE: 398
uuagaaaggu gcaaacaagg                                              20

<210> SEQ ID NO 399
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 399
ccuuucuagu uga                                                     13

<210> SEQ ID NO 400
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 400
ucaacuagaa aggugcaaa                                               19

<210> SEQ ID NO 401
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 401
ccuuucuagu uga                                                     13

<210> SEQ ID NO 402
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 402
ucaacuagaa aggugcaaa                                               19

<210> SEQ ID NO 403
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 403
ccuuucuagu uga                                                     13

<210> SEQ ID NO 404
<211> LENGTH: 19
<212> TYPE: RNA
```

<213> ORGANISM: Artificial Sequence
<220> FEATURE:
<223> OTHER INFORMATION: Synthetic polynucleotide

<400> SEQUENCE: 404
ucaacuagaa aggugcaaa                                              19

<210> SEQ ID NO 405
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 405
gcaccuuucu aga                                                    13

<210> SEQ ID NO 406
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 406
ucuagaaagg ugcaaacau                                              19

<210> SEQ ID NO 407
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 407
gcaccuuucu aga                                                    13

<210> SEQ ID NO 408
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 408
ucuagaaagg ugcaaacau                                              19

<210> SEQ ID NO 409
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 409
gcaccuuucu aga                                                    13

<210> SEQ ID NO 410
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 410
ucuagaaagg ugcaaacau                                              19

<210> SEQ ID NO 411
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 411
gcaccuuucu aga                                                          13

<210> SEQ ID NO 412
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 412
ucuagaaagg ugcaaacau                                                    19

<210> SEQ ID NO 413
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 413
gcaccuuucu aga                                                          13

<210> SEQ ID NO 414
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 414
ucuagaaagg ugcaaacau                                                    19

<210> SEQ ID NO 415
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 415
gugaccaaaa gua                                                          13

<210> SEQ ID NO 416
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 416
uacuuuuggu cacacucuc                                                    19

<210> SEQ ID NO 417
<211> LENGTH: 13
<212> TYPE: RNA
<213> ORGANISM: Artificial Sequence
<220> FEATURE:

<223> OTHER INFORMATION: Synthetic polynucleotide

<400> SEQUENCE: 417
gugaccaaaa gua                                                          13

<210> SEQ ID NO 418
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 418 uacuuuggu cacacucuc                                                     19

<210> SEQ ID NO 419
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 419
gugaccaaaa gua                                                          13

<210> SEQ ID NO 420
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 420 uacuuuggu cacacucuc                                                     19

<210> SEQ ID NO 421
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 421
gugaccaaaa gua                                                          13

<210> SEQ ID NO 422
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 422 uacuuuggu cacacucuc                                                     19

<210> SEQ ID NO 423
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 423
gugaccaaaa gua                                                          13

```
<210> SEQ ID NO 424
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 424 uacuuuggu cacacucuc                                                    19

<210> SEQ ID NO 425
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 425
gugaccaaaa gua                                                         13

<210> SEQ ID NO 426
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 426 uacuuuggu cacacucuc                                                    19

<210> SEQ ID NO 427
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 427
gugaccaaaa gua                                                         13

<210> SEQ ID NO 428
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 428 uacuuuggu cacacucuc                                                    19

<210> SEQ ID NO 429
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 429
gugaccaaaa gua                                                         13

<210> SEQ ID NO 430
<211> LENGTH: 19
<212> TYPE: RNA
<213> ORGANISM: Artificial Sequence
<220> FEATURE:
<223> OTHER INFORMATION: Synthetic polynucleotide
```

<400> SEQUENCE: 430 uacuuuggu cacacucuc                                                  19

<210> SEQ ID NO 431
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 431
gugaccaaaa gua                                                       13

<210> SEQ ID NO 432
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 432 uacuuuggu cacacucuc                                                  19

<210> SEQ ID NO 433
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 433
gcaccuuucu aga                                                       13

<210> SEQ ID NO 434
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 434
ucuagaaagg ugcaaacau                                                 19

<210> SEQ ID NO 435
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 435
gugaccaaaa gua                                                       13

<210> SEQ ID NO 436
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 436 uacuuuggu cacacucuc                                                  19

<210> SEQ ID NO 437
<211> LENGTH: 13

```
<212> TYPE: RNA
<213> ORGANISM: Artificial Sequence
<220> FEATURE:
<223> OTHER INFORMATION: Synthetic polynucleotide

<400> SEQUENCE: 437
gugaccaaaa gua                                                          13

<210> SEQ ID NO 438
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 438 uacuuuggu cacacucuc                                                     19

<210> SEQ ID NO 439
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 439
ccuacaggau uga                                                          13

<210> SEQ ID NO 440
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 440
uacaggauug aaa                                                          13

<210> SEQ ID NO 441
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 441
aggauugaaa aua                                                          13

<210> SEQ ID NO 442
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 442
ugaaaauuac aca                                                          13

<210> SEQ ID NO 443
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 443
```

-continued

| | |
|---|---|
| gaaaggugga cca | 13 |

<210> SEQ ID NO 444
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 444

| | |
|---|---|
| aaagguggac caa | 13 |

<210> SEQ ID NO 445
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 445

| | |
|---|---|
| ugauguucag cua | 13 |

<210> SEQ ID NO 446
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 446

| | |
|---|---|
| accuuugaug cua | 13 |

<210> SEQ ID NO 447
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 447

| | |
|---|---|
| uuugaugcua uaa | 13 |

<210> SEQ ID NO 448
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 448

| | |
|---|---|
| uugaugcuau aaa | 13 |

<210> SEQ ID NO 449
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 449

| | |
|---|---|
| ugaugcuaua aca | 13 |

<210> SEQ ID NO 450
<211> LENGTH: 13
<212> TYPE: RNA
<213> ORGANISM: Artificial Sequence

```
<220> FEATURE:
<223> OTHER INFORMATION: Synthetic polynucleotide

<400> SEQUENCE: 450
acaugcgcac aaa                                                          13

<210> SEQ ID NO 451
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 451
augcgcacaa aua                                                          13

<210> SEQ ID NO 452
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 452
augaaguccg gua                                                          13

<210> SEQ ID NO 453
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 453
ugaaguccgg uua                                                          13

<210> SEQ ID NO 454
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 454
guccgguuuu uca                                                          13

<210> SEQ ID NO 455
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 455
uccgguuuuu caa                                                          13

<210> SEQ ID NO 456
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 456
ccgguuuuuc aaa                                                          13
```

<210> SEQ ID NO 457
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 457
cgguuuuuca aaa                                                           13

<210> SEQ ID NO 458
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 458
gguuuuucaa aga                                                           13

<210> SEQ ID NO 459
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 459
ggagguauga uga                                                           13

<210> SEQ ID NO 460
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 460
gagguaugau gaa                                                           13

<210> SEQ ID NO 461
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 461
agguaugaug aaa                                                           13

<210> SEQ ID NO 462
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 462
guaugaugaa uaa                                                           13

<210> SEQ ID NO 463
<211> LENGTH: 13
<212> TYPE: RNA
<213> ORGANISM: Artificial Sequence
<220> FEATURE:
<223> OTHER INFORMATION: Synthetic polynucleotide

```
<400> SEQUENCE: 463
augaugaaua uaa                                                         13

<210> SEQ ID NO 464
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 464
augaauauaa aca                                                         13

<210> SEQ ID NO 465
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 465
gauccagguu aua                                                         13

<210> SEQ ID NO 466
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 466
auccagguua uca                                                         13

<210> SEQ ID NO 467
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 467
ccaaaaugau aga                                                         13

<210> SEQ ID NO 468
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 468
caaaaugaua gca                                                         13

<210> SEQ ID NO 469
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 469
aaaaugauag caa                                                         13

<210> SEQ ID NO 470
```

```
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 470
uuccuggaau uga                                                            13

<210> SEQ ID NO 471
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 471
uaauagcugg uua                                                            13

<210> SEQ ID NO 472
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 472
aauagcuggu uca                                                            13

<210> SEQ ID NO 473
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 473
auagcugguu caa                                                            13

<210> SEQ ID NO 474
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 474
uagcugguuc aaa                                                            13

<210> SEQ ID NO 475
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 475
agcugguuca aca                                                            13

<210> SEQ ID NO 476
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 476
```
gcugguucaa cua                                              13

<210> SEQ ID NO 477
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 477
cugguucaac uga                                              13

<210> SEQ ID NO 478
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 478
ugguucaacu gca                                              13

<210> SEQ ID NO 479
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 479
gguucaacug caa                                              13

<210> SEQ ID NO 480
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 480
ucaauccugu aggucagau                                        19

<210> SEQ ID NO 481
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 481
uuucaauccu guaggucag                                        19

<210> SEQ ID NO 482
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 482
uauuuucaau ccuguaggu                                        19

<210> SEQ ID NO 483
<211> LENGTH: 19
<212> TYPE: RNA

```
<213> ORGANISM: Artificial Sequence
<220> FEATURE:
<223> OTHER INFORMATION: Synthetic polynucleotide

<400> SEQUENCE: 483
uguguaauuu ucaauccug                                              19

<210> SEQ ID NO 484
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 484
ugguccaccu uucaucuuc                                              19

<210> SEQ ID NO 485
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 485
uugguccacc uuucaucuu                                              19

<210> SEQ ID NO 486
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 486
uagcugaaca ucaccacug                                              19

<210> SEQ ID NO 487
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 487
uagcaucaaa gguuagcuu                                              19

<210> SEQ ID NO 488
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 488
uuauagcauc aaagguuag                                              19

<210> SEQ ID NO 489
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 489
uuuauagcau caaagguua                                              19
```

<210> SEQ ID NO 490
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 490
uguuauagca ucaaagguu                                                19

<210> SEQ ID NO 491
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 491
uuugugcgca uguagaauc                                                19

<210> SEQ ID NO 492
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 492
uauuugugcg cauguagaa                                                19

<210> SEQ ID NO 493
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 493
uaccggacuu caucucugu                                                19

<210> SEQ ID NO 494
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 494
uaaccggacu ucaucucug                                                19

<210> SEQ ID NO 495
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 495 ugaaaaccg gacuucauc                                                 19

<210> SEQ ID NO 496
<211> LENGTH: 19
<212> TYPE: RNA
<213> ORGANISM: Artificial Sequence
<220> FEATURE:

<223> OTHER INFORMATION: Synthetic polynucleotide

<400> SEQUENCE: 496
uugaaaaacc ggacuucau                                                                19

<210> SEQ ID NO 497
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 497
uuugaaaaac cggacuuca                                                                19

<210> SEQ ID NO 498
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 498
uuuugaaaaa ccggacuuc                                                                19

<210> SEQ ID NO 499
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 499
ucuuugaaaa accggacuu                                                                19

<210> SEQ ID NO 500
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 500
ucaucauacc uccaguauu                                                                19

<210> SEQ ID NO 501
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 501
uucaucauac cuccaguau                                                                19

<210> SEQ ID NO 502
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 502
uuucaucaua ccuccagua                                                                19

```
<210> SEQ ID NO 503
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 503
uuauucauca uaccuccag                                                    19

<210> SEQ ID NO 504
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 504
uuauauucau cauaccucc                                                    19

<210> SEQ ID NO 505
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 505
uguuuauauu caucauacc                                                    19

<210> SEQ ID NO 506
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 506
uauaaccugg auccauaga                                                    19

<210> SEQ ID NO 507
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 507
ugauaaccug gauccauag                                                    19

<210> SEQ ID NO 508
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 508
ucuaucauuu ugggauaac                                                    19

<210> SEQ ID NO 509
<211> LENGTH: 19
<212> TYPE: RNA
<213> ORGANISM: Artificial Sequence
<220> FEATURE:
<223> OTHER INFORMATION: Synthetic polynucleotide
```

-continued

<400> SEQUENCE: 509
ugcuaucauu uugggauaa				19

<210> SEQ ID NO 510
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 510
uugcuaucau uuugggaua				19

<210> SEQ ID NO 511
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 511
ucaauuccag gaaagucau				19

<210> SEQ ID NO 512
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 512
uaaccagcua uuagcuuuc				19

<210> SEQ ID NO 513
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 513
ugaaccagcu auuagcuuu				19

<210> SEQ ID NO 514
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 514
uugaaccagc uauuagcuu				19

<210> SEQ ID NO 515
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 515
uuugaaccag cuauuagcu				19

<210> SEQ ID NO 516
<211> LENGTH: 19

```
<212> TYPE: RNA
<213> ORGANISM: Artificial Sequence
<220> FEATURE:
<223> OTHER INFORMATION: Synthetic polynucleotide

<400> SEQUENCE: 516
uguugaacca gcuauuagc                                                       19

<210> SEQ ID NO 517
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 517
uaguugaacc agcuauuag                                                       19

<210> SEQ ID NO 518
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 518
ucaguugaac cagcuauua                                                       19

<210> SEQ ID NO 519
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 519
ugcaguugaa ccagcuauu                                                       19

<210> SEQ ID NO 520
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 520
uugcaguuga accagcuau                                                       19

<210> SEQ ID NO 521
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 521
ugauguucag cua                                                             13

<210> SEQ ID NO 522
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 522
```
ugauguucag cua                                                          13

<210> SEQ ID NO 523
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 523
ugauguucag cua                                                          13

<210> SEQ ID NO 524
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 524
ugauguucag cua                                                          13

<210> SEQ ID NO 525
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (4)..(4)
<223> OTHER INFORMATION: Modified by 5 methyl
<220> FEATURE:
<221> NAME/KEY: misc_feature
<222> LOCATION: (6)..(8)
<223> OTHER INFORMATION: Modified by 5 methyl
<220> FEATURE:
<221> NAME/KEY: misc_feature
<222> LOCATION: (11)..(12)
<223> OTHER INFORMATION: Modified by 5 methyl

<400> SEQUENCE: 525
ugauguucag cua                                                          13

<210> SEQ ID NO 526
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 526
ugauguucag cua                                                          13

<210> SEQ ID NO 527
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 527
accuuugaug cua                                                          13

```
<210> SEQ ID NO 528
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 528
accuuugaug cua                                                            13

<210> SEQ ID NO 529
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 529
accuuugaug cua                                                            13

<210> SEQ ID NO 530
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 530
accuuugaug cua                                                            13

<210> SEQ ID NO 531
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 531
accuuugaug cua                                                            13

<210> SEQ ID NO 532
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 532
accuuugaug cua                                                            13

<210> SEQ ID NO 533
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (2)..(6)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl
<220> FEATURE:
<221> NAME/KEY: misc_feature
<222> LOCATION: (11)..(12)
<223> OTHER INFORMATION: Modified by 5 methyl
```

```
<400> SEQUENCE: 533
accuuugaug cua                                                    13

<210> SEQ ID NO 534
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 534
agguaugaug aaa                                                    13

<210> SEQ ID NO 535
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 535
agguaugaug aaa                                                    13

<210> SEQ ID NO 536
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 536
agguaugaug aaa                                                    13

<210> SEQ ID NO 537
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 537
agguaugaug aaa                                                    13

<210> SEQ ID NO 538
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (4)..(4)
<223> OTHER INFORMATION: Modified by 5 methyl
<220> FEATURE:
<221> NAME/KEY: misc_feature
<222> LOCATION: (6)..(6)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl

<400> SEQUENCE: 538
agguaugaug aaa                                                    13

<210> SEQ ID NO 539
<211> LENGTH: 13
```

```
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (4)..(4)
<223> OTHER INFORMATION: Modified by 5 methyl
<220> FEATURE:
<221> NAME/KEY: misc_feature
<222> LOCATION: (6)..(6)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl

<400> SEQUENCE: 539
agguaugaug aaa                                                         13

<210> SEQ ID NO 540
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 540
uagcugguuc aaa                                                         13

<210> SEQ ID NO 541
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 541
uagcugguuc aaa                                                         13

<210> SEQ ID NO 542
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 542
uagcugguuc aaa                                                         13

<210> SEQ ID NO 543
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 543
uagcugguuc aaa                                                         13

<210> SEQ ID NO 544
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
```

```
<223> OTHER INFORMATION: Modified by 5 methyl
<220> FEATURE:
<221> NAME/KEY: misc_feature
<222> LOCATION: (4)..(5)
<223> OTHER INFORMATION: Modified by 5 methyl
<220> FEATURE:
<221> NAME/KEY: misc_feature
<222> LOCATION: (8)..(10)
<223> OTHER INFORMATION: Modified by 5 methyl

<400> SEQUENCE: 544
uagcugguuc aaa                                                           13

<210> SEQ ID NO 545
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 545
agcugguuca aca                                                           13

<210> SEQ ID NO 546
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 546
agcugguuca aca                                                           13

<210> SEQ ID NO 547
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 547
agcugguuca aca                                                           13

<210> SEQ ID NO 548
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 548
agcugguuca aca                                                           13

<210> SEQ ID NO 549
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (3)..(4)
<223> OTHER INFORMATION: Modified by 5 methyl
<220> FEATURE:
<221> NAME/KEY: misc_feature
<222> LOCATION: (7)..(9)
<223> OTHER INFORMATION: Modified by 5 methyl
<220> FEATURE:
<221> NAME/KEY: misc_feature
```

```
<222> LOCATION: (12)..(12)
<223> OTHER INFORMATION: Modified by 5 methyl

<400> SEQUENCE: 549
agcugguuca aca                                                      13

<210> SEQ ID NO 550
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 550
uagcugaaca ucaccacug                                                19

<210> SEQ ID NO 551
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (4)..(5)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl
<220> FEATURE:
<221> NAME/KEY: misc_feature
<222> LOCATION: (11)..(12)
<223> OTHER INFORMATION: Modified by 5 methyl
<220> FEATURE:
<221> NAME/KEY: misc_feature
<222> LOCATION: (14)..(15)
<223> OTHER INFORMATION: Modified by 5 methyl
<220> FEATURE:
<221> NAME/KEY: misc_feature
<222> LOCATION: (17)..(18)
<223> OTHER INFORMATION: Modified by 5 methyl

<400> SEQUENCE: 551
uagcugaaca ucaccacug                                                19

<210> SEQ ID NO 552
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (4)..(5)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl
<220> FEATURE:
<221> NAME/KEY: misc_feature
<222> LOCATION: (11)..(12)
<223> OTHER INFORMATION: Modified by 5 methyl
<220> FEATURE:
```

<221> NAME/KEY: misc_feature
<222> LOCATION: (14)..(15)
<223> OTHER INFORMATION: Modified by 5 methyl
<220> FEATURE:
<221> NAME/KEY: misc_feature
<222> LOCATION: (17)..(18)
<223> OTHER INFORMATION: Modified by 5 methyl

<400> SEQUENCE: 552
uagcugaaca ucaccacug                                                   19

<210> SEQ ID NO 553
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 553
uagcugaaca ucaccacug                                                   19

<210> SEQ ID NO 554
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 554
uagcugaaca ucaccacug                                                   19

<210> SEQ ID NO 555
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 555
uagcugaaca ucaccacug                                                   19

<210> SEQ ID NO 556
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 556
uagcaucaaa gguuagcuu                                                   19

<210> SEQ ID NO 557
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 557
uagcaucaaa gguuagcuu                                                   19

<210> SEQ ID NO 558
<211> LENGTH: 19
<212> TYPE: RNA
<213> ORGANISM: Artificial Sequence
<220> FEATURE:
<223> OTHER INFORMATION: Synthetic polynucleotide -continued

<400> SEQUENCE: 558
uagcaucaaa gguuagcuu                                                19

<210> SEQ ID NO 559
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (4)..(4)
<223> OTHER INFORMATION: Modified by 5 methyl
<220> FEATURE:
<221> NAME/KEY: misc_feature
<222> LOCATION: (6)..(7)
<223> OTHER INFORMATION: Modified by 5 methyl
<220> FEATURE:
<221> NAME/KEY: misc_feature
<222> LOCATION: (13)..(14)
<223> OTHER INFORMATION: Modified by 5 methyl
<220> FEATURE:
<221> NAME/KEY: misc_feature
<222> LOCATION: (17)..(18)
<223> OTHER INFORMATION: Modified by 5 methyl

<400> SEQUENCE: 559
uagcaucaaa gguuagcuu                                                19

<210> SEQ ID NO 560
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (4)..(4)
<223> OTHER INFORMATION: Modified by 5 methyl
<220> FEATURE:
<221> NAME/KEY: misc_feature
<222> LOCATION: (6)..(7)
<223> OTHER INFORMATION: Modified by 5 methyl
<220> FEATURE:
<221> NAME/KEY: misc_feature
<222> LOCATION: (13)..(13)
<223> OTHER INFORMATION: Modified by 5 methyl
<220> FEATURE:
<221> NAME/KEY: misc_feature
<222> LOCATION: (17)..(18)
<223> OTHER INFORMATION: Modified by 5 methyl

<400> SEQUENCE: 560
uagcaucaaa gguuagcuu                                                19

<210> SEQ ID NO 561
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (4)..(4)

<223> OTHER INFORMATION: Modified by 5 methyl
<220> FEATURE:
<221> NAME/KEY: misc_feature
<222> LOCATION: (6)..(7)
<223> OTHER INFORMATION: Modified by 5 methyl
<220> FEATURE:
<221> NAME/KEY: misc_feature
<222> LOCATION: (13)..(14)
<223> OTHER INFORMATION: Modified by 5 methyl
<220> FEATURE:
<221> NAME/KEY: misc_feature
<222> LOCATION: (17)..(18)
<223> OTHER INFORMATION: Modified by 5 methyl

<400> SEQUENCE: 561
uagcaucaaa gguuagcuu                                             19

<210> SEQ ID NO 562
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 562
uagcaucaaa gguuagcuu                                             19

<210> SEQ ID NO 563
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 563
uuucaucaua ccuccagua                                             19

<210> SEQ ID NO 564
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 564
uuucaucaua ccuccagua                                             19

<210> SEQ ID NO 565
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(4)
<223> OTHER INFORMATION: Modified by 5 methyl
<220> FEATURE:
<221> NAME/KEY: misc_feature
<222> LOCATION: (6)..(7)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl
<220> FEATURE:
<221> NAME/KEY: misc_feature
<222> LOCATION: (11)..(15)
<223> OTHER INFORMATION: Modified by 5 methyl
<220> FEATURE:
<221> NAME/KEY: misc_feature
<222> LOCATION: (18)..(18)
<223> OTHER INFORMATION: Modified by 5 methyl

<400> SEQUENCE: 565
uuucaucaua ccuccagua                                                        19

<210> SEQ ID NO 566
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(4)
<223> OTHER INFORMATION: Modified by 5 methyl
<220> FEATURE:
<221> NAME/KEY: misc_feature
<222> LOCATION: (6)..(7)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl
<220> FEATURE:
<221> NAME/KEY: misc_feature
<222> LOCATION: (11)..(15)
<223> OTHER INFORMATION: Modified by 5 methyl
<220> FEATURE:
<221> NAME/KEY: misc_feature
<222> LOCATION: (18)..(18)
<223> OTHER INFORMATION: Modified by 5 methyl

<400> SEQUENCE: 566
uuucaucaua ccuccagua                                                        19

<210> SEQ ID NO 567
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 567
uuucaucaua ccuccagua                                                        19

<210> SEQ ID NO 568
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 568
uuucaucaua ccuccagua                                                        19

<210> SEQ ID NO 569
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 569
uuugaaccag cuauuagcu                                                        19

<210> SEQ ID NO 570
<211> LENGTH: 19
<212> TYPE: RNA

<213> ORGANISM: Artificial Sequence
<220> FEATURE:
<223> OTHER INFORMATION: Synthetic polynucleotide

<400> SEQUENCE: 570
uuugaaccag cuauuagcu                                                 19

<210> SEQ ID NO 571
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: Modified by 5 methyl
<220> FEATURE:
<221> NAME/KEY: misc_feature
<222> LOCATION: (7)..(8)
<223> OTHER INFORMATION: Modified by 5 methyl
<220> FEATURE:
<221> NAME/KEY: misc_feature
<222> LOCATION: (11)..(12)
<223> OTHER INFORMATION: Modified by 5 methyl
<220> FEATURE:
<221> NAME/KEY: misc_feature
<222> LOCATION: (14)..(15)
<223> OTHER INFORMATION: Modified by 5 methyl
<220> FEATURE:
<221> NAME/KEY: misc_feature
<222> LOCATION: (18)..(18)
<223> OTHER INFORMATION: Modified by 5 methyl

<400> SEQUENCE: 571
uuugaaccag cuauuagcu                                                 19

<210> SEQ ID NO 572
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: Modified by 5 methyl
<220> FEATURE:
<221> NAME/KEY: misc_feature
<222> LOCATION: (7)..(8)
<223> OTHER INFORMATION: Modified by 5 methyl
<220> FEATURE:
<221> NAME/KEY: misc_feature
<222> LOCATION: (11)..(12)
<223> OTHER INFORMATION: Modified by 5 methyl
<220> FEATURE:
<221> NAME/KEY: misc_feature
<222> LOCATION: (14)..(15)
<223> OTHER INFORMATION: Modified by 5 methyl
<220> FEATURE:
<221> NAME/KEY: misc_feature
<222> LOCATION: (18)..(18)
<223> OTHER INFORMATION: Modified by 5 methyl

<400> SEQUENCE: 572
uuugaaccag cuauuagcu                                                 19

<210> SEQ ID NO 573
<211> LENGTH: 19
<212> TYPE: RNA
<213> ORGANISM: Artificial Sequence
<220> FEATURE:
<223> OTHER INFORMATION: Synthetic polynucleotide -continued

<400> SEQUENCE: 573
uuugaaccag cuauuagcu                                                19

<210> SEQ ID NO 574
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 574
uguugaacca gcuauuagc                                                19

<210> SEQ ID NO 575
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 575
uguugaacca gcuauuagc                                                19

<210> SEQ ID NO 576
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (3)..(4)
<223> OTHER INFORMATION: Modified by 5 methyl
<220> FEATURE:
<221> NAME/KEY: misc_feature
<222> LOCATION: (8)..(9)
<223> OTHER INFORMATION: Modified by 5 methyl
<220> FEATURE:
<221> NAME/KEY: misc_feature
<222> LOCATION: (12)..(13)
<223> OTHER INFORMATION: Modified by 5 methyl
<220> FEATURE:
<221> NAME/KEY: misc_feature
<222> LOCATION: (15)..(16)
<223> OTHER INFORMATION: Modified by 5 methyl

<400> SEQUENCE: 576
uguugaacca gcuauuagc                                                19

<210> SEQ ID NO 577
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (3)..(4)
<223> OTHER INFORMATION: Modified by 5 methyl
<220> FEATURE:
<221> NAME/KEY: misc_feature
<222> LOCATION: (8)..(9)

```
<223> OTHER INFORMATION: Modified by 5 methyl
<220> FEATURE:
<221> NAME/KEY: misc_feature
<222> LOCATION: (12)..(13)
<223> OTHER INFORMATION: Modified by 5 methyl
<220> FEATURE:
<221> NAME/KEY: misc_feature
<222> LOCATION: (15)..(16)
<223> OTHER INFORMATION: Modified by 5 methyl

<400> SEQUENCE: 577
uguugaacca gcuauuagc                                                    19

<210> SEQ ID NO 578
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 578
uguugaacca gcuauuagc                                                    19

<210> SEQ ID NO 579
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 579
uauaauagga cca                                                          13

<210> SEQ ID NO 580
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 580
auaauaggac cua                                                          13

<210> SEQ ID NO 581
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 581
uaauaggacc uga                                                          13

<210> SEQ ID NO 582
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 582
ucacuuuagc aaa                                                          13

<210> SEQ ID NO 583
<211> LENGTH: 13
<212> TYPE: RNA
<213> ORGANISM: Artificial Sequence
```

```
<220> FEATURE:
<223> OTHER INFORMATION: Synthetic polynucleotide

<400> SEQUENCE: 583
cacuuuagca aaa                                                          13

<210> SEQ ID NO 584
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 584
uggccaaaug aaa                                                          13

<210> SEQ ID NO 585
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 585
agagacauug aua                                                          13

<210> SEQ ID NO 586
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 586
gagacauuga uua                                                          13

<210> SEQ ID NO 587
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 587
cugccuuggc aua                                                          13

<210> SEQ ID NO 588
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 588
gacauuugca caa                                                          13

<210> SEQ ID NO 589
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 589
cauuugcaca gaa                                                          13
```

```
<210> SEQ ID NO 590
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 590
auuugcacag aua                                                          13

<210> SEQ ID NO 591
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 591
uuugcacaga uga                                                          13

<210> SEQ ID NO 592
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 592
ugcacagaug aga                                                          13

<210> SEQ ID NO 593
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 593
gcacagauga gua                                                          13

<210> SEQ ID NO 594
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 594
cacagaugag uaa                                                          13

<210> SEQ ID NO 595
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 595
acagaugagu aca                                                          13

<210> SEQ ID NO 596
<211> LENGTH: 13
<212> TYPE: RNA
<213> ORGANISM: Artificial Sequence
<220> FEATURE:
<223> OTHER INFORMATION: Synthetic polynucleotide
```

```
<400> SEQUENCE: 596
uccuaacuua cua                                                    13

<210> SEQ ID NO 597
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 597
ccuaacuuac uca                                                    13

<210> SEQ ID NO 598
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 598
cuaacuuacu caa                                                    13

<210> SEQ ID NO 599
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 599
uucuccucuu gga                                                    13

<210> SEQ ID NO 600
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 600
cuggaaacca uga                                                    13

<210> SEQ ID NO 601
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 601
uggaaaccau gaa                                                    13

<210> SEQ ID NO 602
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 602
ggaaaccaug aca                                                    13

<210> SEQ ID NO 603
```

```
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 603
gaaaccauga caa                                                          13

<210> SEQ ID NO 604
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 604
aaaccaugac aaa                                                          13

<210> SEQ ID NO 605
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 605
aaccaugaca aaa                                                          13

<210> SEQ ID NO 606
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 606
ccaauuucag cua                                                          13

<210> SEQ ID NO 607
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 607
uuuagaaaua caa                                                          13

<210> SEQ ID NO 608
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 608
auacacugga aga                                                          13

<210> SEQ ID NO 609
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 609
```
acacuggaag gaa                                                          13

<210> SEQ ID NO 610
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 610
ggaaggauuu gca                                                          13

<210> SEQ ID NO 611
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 611
aggauuugcu aga                                                          13

<210> SEQ ID NO 612
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 612
gauuugcuag uca                                                          13

<210> SEQ ID NO 613
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 613
gaauggaaca aua                                                          13

<210> SEQ ID NO 614
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 614
uggaacaaug uca                                                          13

<210> SEQ ID NO 615
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 615
ccagaagcca aua                                                          13

<210> SEQ ID NO 616
<211> LENGTH: 13
<212> TYPE: RNA

```
<213> ORGANISM: Artificial Sequence
<220> FEATURE:
<223> OTHER INFORMATION: Synthetic polynucleotide

<400> SEQUENCE: 616
cagaagccaa uga                                                          13

<210> SEQ ID NO 617
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 617
agaagccaau gca                                                          13

<210> SEQ ID NO 618
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 618
cagagccauu uaa                                                          13

<210> SEQ ID NO 619
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 619
agagccauuu aua                                                          13

<210> SEQ ID NO 620
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 620
ugguccuauu auaaaagac                                                    19

<210> SEQ ID NO 621
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 621
uagguccuau uauaaaaga                                                    19

<210> SEQ ID NO 622
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 622
ucagguccua uuauaaaag                                                    19
```

```
<210> SEQ ID NO 623
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 623
uuugcuaaag ugagguagg                                                19

<210> SEQ ID NO 624
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 624
uuuugcuaaa gugagguag                                                19

<210> SEQ ID NO 625
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 625
uuucauuugg ccauagguc                                                19

<210> SEQ ID NO 626
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 626
uaucaauguc ucuccagau                                                19

<210> SEQ ID NO 627
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 627
uaaucaaugu cucuccaga                                                19

<210> SEQ ID NO 628
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 628
uaugccaagg cagaaaagc                                                19

<210> SEQ ID NO 629
<211> LENGTH: 19
<212> TYPE: RNA
<213> ORGANISM: Artificial Sequence
<220> FEATURE:
```

<223> OTHER INFORMATION: Synthetic polynucleotide

<400> SEQUENCE: 629
uugugcaaau gucacacuu                    19

<210> SEQ ID NO 630
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 630
uucugugcaa augucacac                    19

<210> SEQ ID NO 631
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 631
uaucugugca aaugucaca                    19

<210> SEQ ID NO 632
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 632
ucaucugugc aaaugucac                    19

<210> SEQ ID NO 633
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 633
ucucaucugu gcaaauguc                    19

<210> SEQ ID NO 634
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 634
uacucaucug ugcaaaugu                    19

<210> SEQ ID NO 635
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 635
uuacucaucu gugcaaaug                    19

```
<210> SEQ ID NO 636
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 636
uguacucauc ugugcaaau                                                   19

<210> SEQ ID NO 637
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 637
uaguaaguua ggauuugug                                                   19

<210> SEQ ID NO 638
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 638
ugaguaaguu aggauuugu                                                   19

<210> SEQ ID NO 639
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 639
uugaguaagu uaggauuug                                                   19

<210> SEQ ID NO 640
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 640
uccaagagga gaagaauga                                                   19

<210> SEQ ID NO 641
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 641
ucaugguuuc caggauuac                                                   19

<210> SEQ ID NO 642
<211> LENGTH: 19
<212> TYPE: RNA
<213> ORGANISM: Artificial Sequence
<220> FEATURE:
<223> OTHER INFORMATION: Synthetic polynucleotide
```

```
<400> SEQUENCE: 642
uucaugguuu ccaggauua                                                      19

<210> SEQ ID NO 643
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 643
ugucaugguu uccaggauu                                                      19

<210> SEQ ID NO 644
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 644
uugucauggu uuccaggau                                                      19

<210> SEQ ID NO 645
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 645
uuugucaugg uuuccagga                                                      19

<210> SEQ ID NO 646
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 646
uuuugucaug guuuccagg                                                      19

<210> SEQ ID NO 647
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 647
uagcugaaau uggcagcuu                                                      19

<210> SEQ ID NO 648
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 648
uuguauuucu aaagcugaa                                                      19

<210> SEQ ID NO 649
<211> LENGTH: 19
```

```
<212> TYPE: RNA
<213> ORGANISM: Artificial Sequence
<220> FEATURE:
<223> OTHER INFORMATION: Synthetic polynucleotide

<400> SEQUENCE: 649
ucuuccagug uauuucuaa                                              19

<210> SEQ ID NO 650
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 650
uuccuuccag uguauuucu                                              19

<210> SEQ ID NO 651
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 651
ugcaaauccu uccagugua                                              19

<210> SEQ ID NO 652
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 652
ucuagcaaau ccuuccagu                                              19

<210> SEQ ID NO 653
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 653
ugacuagcaa auccuucca                                              19

<210> SEQ ID NO 654
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 654
uauuguucca uucauauag                                              19

<210> SEQ ID NO 655
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 655
```
ugacauuguu ccauucaua                                                19

<210> SEQ ID NO 656
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 656
uauuggcuuc uggauaaac                                                19

<210> SEQ ID NO 657
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 657 ucauggcuu cuggauaaa                                                 19

<210> SEQ ID NO 658
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 658
ugcauuggcu ucuggauaa                                                19

<210> SEQ ID NO 659
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 659
uuaaauggcu cugauacaa                                                19

<210> SEQ ID NO 660
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 660
uauaaauggc ucugauaca                                                19

<210> SEQ ID NO 661
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 661
cacuuuagca aaa                                                      13

<210> SEQ ID NO 662
<211> LENGTH: 13
<212> TYPE: RNA
<213> ORGANISM: Artificial Sequence

```
<220> FEATURE:
<223> OTHER INFORMATION: Synthetic polynucleotide

<400> SEQUENCE: 662
cacuuuagca aaa                                                          13

<210> SEQ ID NO 663
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 663
cacuuuagca aaa                                                          13

<210> SEQ ID NO 664
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 664
cacuuuagca aaa                                                          13

<210> SEQ ID NO 665
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (3)..(6)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl

<400> SEQUENCE: 665
cacuuuagca aaa                                                          13

<210> SEQ ID NO 666
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (3)..(6)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl

<400> SEQUENCE: 666
cacuuuagca aaa                                                          13
```

<210> SEQ ID NO 667
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 667
gagacauuga uua                                                          13

<210> SEQ ID NO 668
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 668
gagacauuga uua                                                          13

<210> SEQ ID NO 669
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 669
gagacauuga uua                                                          13

<210> SEQ ID NO 670
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 670
gagacauuga uua                                                          13

<210> SEQ ID NO 671
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (5)..(5)
<223> OTHER INFORMATION: Modified by 5 methyl
<220> FEATURE:
<221> NAME/KEY: misc_feature
<222> LOCATION: (7)..(8)
<223> OTHER INFORMATION: Modified by 5 methyl
<220> FEATURE:
<221> NAME/KEY: misc_feature
<222> LOCATION: (11)..(12)
<223> OTHER INFORMATION: Modified by 5 methyl

<400> SEQUENCE: 671
gagacauuga uua                                                          13

<210> SEQ ID NO 672
<211> LENGTH: 13
<212> TYPE: RNA
<213> ORGANISM: Artificial Sequence
<220> FEATURE:
<223> OTHER INFORMATION: Synthetic polynucleotide -continued

<400> SEQUENCE: 672
uuugcacaga uga                                                          13

<210> SEQ ID NO 673
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 673
uuugcacaga uga                                                          13

<210> SEQ ID NO 674
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 674
uuugcacaga uga                                                          13

<210> SEQ ID NO 675
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 675
uuugcacaga uga                                                          13

<210> SEQ ID NO 676
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: Modified by 5 methyl
<220> FEATURE:
<221> NAME/KEY: misc_feature
<222> LOCATION: (5)..(5)
<223> OTHER INFORMATION: Modified by 5 methyl
<220> FEATURE:
<221> NAME/KEY: misc_feature
<222> LOCATION: (7)..(7)
<223> OTHER INFORMATION: Modified by 5 methyl
<220> FEATURE:
<221> NAME/KEY: misc_feature
<222> LOCATION: (11)..(11)
<223> OTHER INFORMATION: Modified by 5 methyl

<400> SEQUENCE: 676
uuugcacaga uga                                                          13

<210> SEQ ID NO 677
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(3)

```
<223> OTHER INFORMATION: Modified by 5 methyl
<220> FEATURE:
<221> NAME/KEY: misc_feature
<222> LOCATION: (5)..(5)
<223> OTHER INFORMATION: Modified by 5 methyl
<220> FEATURE:
<221> NAME/KEY: misc_feature
<222> LOCATION: (7)..(7)
<223> OTHER INFORMATION: Modified by 5 methyl
<220> FEATURE:
<221> NAME/KEY: misc_feature
<222> LOCATION: (11)..(11)
<223> OTHER INFORMATION: Modified by 5 methyl

<400> SEQUENCE: 677
uuugcacaga uga                                                          13

<210> SEQ ID NO 678
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 678
gcacagauga gua                                                          13

<210> SEQ ID NO 679
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 679
gcacagauga gua                                                          13

<210> SEQ ID NO 680
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 680
gcacagauga gua                                                          13

<210> SEQ ID NO 681
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 681
gcacagauga gua                                                          13

<210> SEQ ID NO 682
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 682
gcacagauga gua                                                          13
```

```
<210> SEQ ID NO 683
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (2)..(2)
<223> OTHER INFORMATION: Modified by 5 methyl
<220> FEATURE:
<221> NAME/KEY: misc_feature
<222> LOCATION: (4)..(4)
<223> OTHER INFORMATION: Modified by 5 methyl
<220> FEATURE:
<221> NAME/KEY: misc_feature
<222> LOCATION: (8)..(8)
<223> OTHER INFORMATION: Modified by 5 methyl
<220> FEATURE:
<221> NAME/KEY: misc_feature
<222> LOCATION: (12)..(12)
<223> OTHER INFORMATION: Modified by 5 methyl

<400> SEQUENCE: 683
gcacagauga gua                                                        13

<210> SEQ ID NO 684
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 684
uucuccucuu gga                                                        13

<210> SEQ ID NO 685
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 685
uucuccucuu gga                                                        13

<210> SEQ ID NO 686
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 686
uucuccucuu gga                                                        13

<210> SEQ ID NO 687
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 687
uucuccucuu gga                                                        13

<210> SEQ ID NO 688
<211> LENGTH: 13
<212> TYPE: RNA
```

<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(10)
<223> OTHER INFORMATION: Modified by 5 methyl

<400> SEQUENCE: 688
uucuccucuu gga                                                            13

<210> SEQ ID NO 689
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 689
aggauuugcu aga                                                            13

<210> SEQ ID NO 690
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 690
aggauuugcu aga                                                            13

<210> SEQ ID NO 691
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 691
aggauuugcu aga                                                            13

<210> SEQ ID NO 692
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 692
aggauuugcu aga                                                            13

<210> SEQ ID NO 693
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (5)..(10)
<223> OTHER INFORMATION: Modified by 5 methyl

<400> SEQUENCE: 693
aggauuugcu aga                                                            13

<210> SEQ ID NO 694
<211> LENGTH: 13

```
<212> TYPE: RNA
<213> ORGANISM: Artificial Sequence
<220> FEATURE:
<223> OTHER INFORMATION: Synthetic polynucleotide

<400> SEQUENCE: 694
gaauggaaca aua                                                          13

<210> SEQ ID NO 695
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 695
gaauggaaca aua                                                          13

<210> SEQ ID NO 696
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 696
gaauggaaca aua                                                          13

<210> SEQ ID NO 697
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 697
gaauggaaca aua                                                          13

<210> SEQ ID NO 698
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (4)..(4)
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl
<220> FEATURE:
<221> NAME/KEY: misc_feature
<222> LOCATION: (12)..(12)
<223> OTHER INFORMATION: Modified by 5 methyl

<400> SEQUENCE: 698
gaauggaaca aua                                                          13

<210> SEQ ID NO 699
<211> LENGTH: 13
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (4)..(4)
```

```
<223> OTHER INFORMATION: Modified by 5 methyl
<220> FEATURE:
<221> NAME/KEY: misc_feature
<222> LOCATION: (9)..(9)
<223> OTHER INFORMATION: Modified by 5 methyl
<220> FEATURE:
<221> NAME/KEY: misc_feature
<222> LOCATION: (12)..(12)
<223> OTHER INFORMATION: Modified by 5 methyl

<400> SEQUENCE: 699
gaauggaaca aua                                                        13

<210> SEQ ID NO 700
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 700
uuuugcuaaa gugagguag                                                  19

<210> SEQ ID NO 701
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 701
uuuugcuaaa gugagguag                                                  19

<210> SEQ ID NO 702
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(4)
<223> OTHER INFORMATION: Modified by 5 methyl
<220> FEATURE:
<221> NAME/KEY: misc_feature
<222> LOCATION: (6)..(7)
<223> OTHER INFORMATION: Modified by 5 methyl
<220> FEATURE:
<221> NAME/KEY: misc_feature
<222> LOCATION: (12)..(12)
<223> OTHER INFORMATION: Modified by 5 methyl
<220> FEATURE:
<221> NAME/KEY: misc_feature
<222> LOCATION: (17)..(17)
<223> OTHER INFORMATION: Modified by 5 methyl

<400> SEQUENCE: 702
uuuugcuaaa gugagguag                                                  19

<210> SEQ ID NO 703
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(4)
<223> OTHER INFORMATION: Modified by 5 methyl
<220> FEATURE:
<221> NAME/KEY: misc_feature
```

```
<222> LOCATION: (6)..(7)
<223> OTHER INFORMATION: Modified by 5 methyl
<220> FEATURE:
<221> NAME/KEY: misc_feature
<222> LOCATION: (12)..(12)
<223> OTHER INFORMATION: Modified by 5 methyl
<220> FEATURE:
<221> NAME/KEY: misc_feature
<222> LOCATION: (17)..(17)
<223> OTHER INFORMATION: Modified by 5 methyl

<400> SEQUENCE: 703
uuuugcuaaa gugagguag                                              19

<210> SEQ ID NO 704
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 704
uuuugcuaaa gugagguag                                              19

<210> SEQ ID NO 705
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 705
uuuugcuaaa gugagguag                                              19

<210> SEQ ID NO 706
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 706
uaaucaaugu cucuccaga                                              19

<210> SEQ ID NO 707
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 707
uaaucaaugu cucuccaga                                              19

<210> SEQ ID NO 708
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (4)..(5)
<223> OTHER INFORMATION: Modified by 5 methyl
<220> FEATURE:
```

```
<221> NAME/KEY: misc_feature
<222> LOCATION: (8)..(8)
<223> OTHER INFORMATION: Modified by 5 methyl
<220> FEATURE:
<221> NAME/KEY: misc_feature
<222> LOCATION: (10)..(16)
<223> OTHER INFORMATION: Modified by 5 methyl

<400> SEQUENCE: 708
uaaucaaugu cucuccaga                                              19

<210> SEQ ID NO 709
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (4)..(5)
<223> OTHER INFORMATION: Modified by 5 methyl
<220> FEATURE:
<221> NAME/KEY: misc_feature
<222> LOCATION: (8)..(8)
<223> OTHER INFORMATION: Modified by 5 methyl
<220> FEATURE:
<221> NAME/KEY: misc_feature
<222> LOCATION: (10)..(16)
<223> OTHER INFORMATION: Modified by 5 methyl

<400> SEQUENCE: 709
uaaucaaugu cucuccaga                                              19

<210> SEQ ID NO 710
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 710
uaaucaaugu cucuccaga                                              19

<210> SEQ ID NO 711
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 711
ucaucugugc aaaugucac                                              19

<210> SEQ ID NO 712
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 712
ucaucugugc aaaugucac                                              19

<210> SEQ ID NO 713
<211> LENGTH: 19
```

```
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(2)
<223> OTHER INFORMATION: Modified by 5 methyl
<220> FEATURE:
<221> NAME/KEY: misc_feature
<222> LOCATION: (4)..(6)
<223> OTHER INFORMATION: Modified by 5 methyl
<220> FEATURE:
<221> NAME/KEY: misc_feature
<222> LOCATION: (8)..(8)
<223> OTHER INFORMATION: Modified by 5 methyl
<220> FEATURE:
<221> NAME/KEY: misc_feature
<222> LOCATION: (10)..(10)
<223> OTHER INFORMATION: Modified by 5 methyl
<220> FEATURE:
<221> NAME/KEY: misc_feature
<222> LOCATION: (14)..(14)
<223> OTHER INFORMATION: Modified by 5 methyl
<220> FEATURE:
<221> NAME/KEY: misc_feature
<222> LOCATION: (16)..(17)
<223> OTHER INFORMATION: Modified by 5 methyl

<400> SEQUENCE: 713
ucaucugugc aaaugucac                                            19

<210> SEQ ID NO 714
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(2)
<223> OTHER INFORMATION: Modified by 5 methyl
<220> FEATURE:
<221> NAME/KEY: misc_feature
<222> LOCATION: (4)..(6)
<223> OTHER INFORMATION: Modified by 5 methyl
<220> FEATURE:
<221> NAME/KEY: misc_feature
<222> LOCATION: (8)..(8)
<223> OTHER INFORMATION: Modified by 5 methyl
<220> FEATURE:
<221> NAME/KEY: misc_feature
<222> LOCATION: (10)..(10)
<223> OTHER INFORMATION: Modified by 5 methyl
<220> FEATURE:
<221> NAME/KEY: misc_feature
<222> LOCATION: (14)..(14)
<223> OTHER INFORMATION: Modified by 5 methyl
<220> FEATURE:
<221> NAME/KEY: misc_feature
<222> LOCATION: (16)..(17)
<223> OTHER INFORMATION: Modified by 5 methyl

<400> SEQUENCE: 714
ucaucugugc aaaugucac                                            19

<210> SEQ ID NO 715
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 715
```
ucaucugugc aaaugucac                                                19

<210> SEQ ID NO 716
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 716
ucaucugugc aaaugucac                                                19

<210> SEQ ID NO 717
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 717
uacucaucug ugcaaaugu                                                19

<210> SEQ ID NO 718
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 718
uacucaucug ugcaaaugu                                                19

<210> SEQ ID NO 719
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (3)..(5)
<223> OTHER INFORMATION: Modified by 5 methyl
<220> FEATURE:
<221> NAME/KEY: misc_feature
<222> LOCATION: (7)..(9)
<223> OTHER INFORMATION: Modified by 5 methyl
<220> FEATURE:
<221> NAME/KEY: misc_feature
<222> LOCATION: (11)..(11)
<223> OTHER INFORMATION: Modified by 5 methyl
<220> FEATURE:
<221> NAME/KEY: misc_feature
<222> LOCATION: (13)..(13)
<223> OTHER INFORMATION: Modified by 5 methyl
<220> FEATURE:
<221> NAME/KEY: misc_feature
<222> LOCATION: (17)..(17)
<223> OTHER INFORMATION: Modified by 5 methyl

<400> SEQUENCE: 719
uacucaucug ugcaaaugu                                                19

<210> SEQ ID NO 720
<211> LENGTH: 19
<212> TYPE: RNA
<213> ORGANISM: Artificial Sequence

```
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (3)..(5)
<223> OTHER INFORMATION: Modified by 5 methyl
<220> FEATURE:
<221> NAME/KEY: misc_feature
<222> LOCATION: (7)..(9)
<223> OTHER INFORMATION: Modified by 5 methyl
<220> FEATURE:
<221> NAME/KEY: misc_feature
<222> LOCATION: (11)..(11)
<223> OTHER INFORMATION: Modified by 5 methyl
<220> FEATURE:
<221> NAME/KEY: misc_feature
<222> LOCATION: (13)..(13)
<223> OTHER INFORMATION: Modified by 5 methyl
<220> FEATURE:
<221> NAME/KEY: misc_feature
<222> LOCATION: (17)..(17)
<223> OTHER INFORMATION: Modified by 5 methyl

<400> SEQUENCE: 720
uacucaucug ugcaaaugu                                                        19

<210> SEQ ID NO 721
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 721
uacucaucug ugcaaaugu                                                        19

<210> SEQ ID NO 722
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 722
uacucaucug ugcaaaugu                                                        19

<210> SEQ ID NO 723
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 723
uccaagagga gaagaauga                                                        19

<210> SEQ ID NO 724
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 724
uccaagagga gaagaauga                                                        19
```

<210> SEQ ID NO 725
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: Modified by 5 methyl
<220> FEATURE:
<221> NAME/KEY: misc_feature
<222> LOCATION: (17)..(17)
<223> OTHER INFORMATION: Modified by 5 methyl

<400> SEQUENCE: 725
uccaagagga gaagaauga                                              19

<210> SEQ ID NO 726
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: Modified by 5 methyl
<220> FEATURE:
<221> NAME/KEY: misc_feature
<222> LOCATION: (17)..(17)
<223> OTHER INFORMATION: Modified by 5 methyl

<400> SEQUENCE: 726
uccaagagga gaagaauga                                              19

<210> SEQ ID NO 727
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 727
uccaagagga gaagaauga                                              19

<210> SEQ ID NO 728
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 728
ucuagcaaau ccuuccagu                                              19

<210> SEQ ID NO 729
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 729
ucuagcaaau ccuuccagu                                              19

<210> SEQ ID NO 730
<211> LENGTH: 19

```
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: Modified by 5 methyl
<220> FEATURE:
<221> NAME/KEY: misc_feature
<222> LOCATION: (6)..(6)
<223> OTHER INFORMATION: Modified by 5 methyl
<220> FEATURE:
<221> NAME/KEY: misc_feature
<222> LOCATION: (10)..(16)
<223> OTHER INFORMATION: Modified by 5 methyl

<400> SEQUENCE: 730
ucuagcaaau ccuuccagu                                                    19

<210> SEQ ID NO 731
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: Modified by 5 methyl
<220> FEATURE:
<221> NAME/KEY: misc_feature
<222> LOCATION: (6)..(6)
<223> OTHER INFORMATION: Modified by 5 methyl
<220> FEATURE:
<221> NAME/KEY: misc_feature
<222> LOCATION: (10)..(16)
<223> OTHER INFORMATION: Modified by 5 methyl

<400> SEQUENCE: 731
ucuagcaaau ccuuccagu                                                    19

<210> SEQ ID NO 732
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 732
ucuagcaaau ccuuccagu                                                    19

<210> SEQ ID NO 733
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 733
uauuguucca uucauauag                                                    19

<210> SEQ ID NO 734
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 734
```
uauuguucca uucauauag                                           19

<210> SEQ ID NO 735
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (3)..(4)
<223> OTHER INFORMATION: Modified by 5 methyl
<220> FEATURE:
<221> NAME/KEY: misc_feature
<222> LOCATION: (6)..(9)
<223> OTHER INFORMATION: Modified by 5 methyl
<220> FEATURE:
<221> NAME/KEY: misc_feature
<222> LOCATION: (11)..(13)
<223> OTHER INFORMATION: Modified by 5 methyl
<220> FEATURE:
<221> NAME/KEY: misc_feature
<222> LOCATION: (15)..(15)
<223> OTHER INFORMATION: Modified by 5 methyl
<220> FEATURE:
<221> NAME/KEY: misc_feature
<222> LOCATION: (17)..(17)
<223> OTHER INFORMATION: Modified by 5 methyl

<400> SEQUENCE: 735
uauuguucca uucauauag                                           19

<210> SEQ ID NO 736
<211> LENGTH: 19
<212> TYPE: RNA
<213> ORGANISM: Artificial Sequence
<220> FEATURE:
<223> OTHER INFORMATION: Synthetic polynucleotide
<220> FEATURE:
<221> NAME/KEY: misc_feature
<222> LOCATION: (1)..(1)
<223> OTHER INFORMATION: Modified by 5 methyl
<220> FEATURE:
<221> NAME/KEY: misc_feature
<222> LOCATION: (3)..(4)
<223> OTHER INFORMATION: Modified by 5 methyl
<220> FEATURE:
<221> NAME/KEY: misc_feature
<222> LOCATION: (6)..(9)
<223> OTHER INFORMATION: Modified by 5 methyl
<220> FEATURE:
<221> NAME/KEY: misc_feature
<222> LOCATION: (11)..(13)
<223> OTHER INFORMATION: Modified by 5 methyl
<220> FEATURE:
<221> NAME/KEY: misc_feature
<222> LOCATION: (15)..(15)
<223> OTHER INFORMATION: Modified by 5 methyl
<220> FEATURE:
<221> NAME/KEY: misc_feature
<222> LOCATION: (17)..(17)
<223> OTHER INFORMATION: Modified by 5 methyl

<400> SEQUENCE: 736
uauuguucca uucauauag                                           19

<210> SEQ ID NO 737
<211> LENGTH: 19
<212> TYPE: RNA
<213> ORGANISM: Artificial Sequence

```
<220> FEATURE:
<223> OTHER INFORMATION: Synthetic polynucleotide

<400> SEQUENCE: 737
uauuguucca uucauauag                                                    19

<210> SEQ ID NO 738
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 738
uauuguucca uucauauag                                                    19

<210> SEQ ID NO 739
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 739
cuguggaagu cua                                                          13

<210> SEQ ID NO 740
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 740
uagacuucca cagaacucu                                                    19

<210> SEQ ID NO 741
<211> LENGTH: 13
<212> TYPE: RNA
<213> ORGANISM: Artificial Sequence
<220> FEATURE:
<223> OTHER INFORMATION: Synthetic polynucleotide

<400> SEQUENCE: 741
cuguggaagu cua                                                          13

<210> SEQ ID NO 742
<211> LENGTH: 19
<212> TYPE: RNA
<213> ORGANISM: Artificial Sequence
<220> FEATURE:
<223> OTHER INFORMATION: Synthetic polynucleotide

<400> SEQUENCE: 742
uagacuucca cagaacucu                                                    19
```

TOPICAL DELIVERY OF NUCLEIC ACID COMPOUNDS

RELATED APPLICATIONS

This Application is a national stage filing under 35 U.S.C. § 371 of International Patent Application Serial No. PCT/US2018/028436, filed Apr. 19, 2018, entitled "TOPICAL DELIVERY OF NUCLEIC ACID COMPOUNDS", which was published under PCT Article 21 (2) in English and which claims the benefit under 35 U.S.C. § 119 (e) of U.S. Provisional Application Ser. No. 62/487,454, filed on Apr. 19, 2017, entitled "TOPICAL DELIVERY OF NUCLEIC ACID COMPOUNDS", the entire contents of each of which are incorporated herein by reference in their entireties.

FIELD

The disclosure relates, in some aspects, to compositions and methods for delivering nucleic acid molecules to the skin of a subject, for example by topical administration.

BACKGROUND

Complementary oligonucleotide sequences are promising therapeutic agents and useful research tools in elucidating gene functions. However, prior art oligonucleotide molecules suffer from several problems that may impede their clinical development, and frequently make it difficult to achieve intended efficient inhibition or increase of gene expression (including protein synthesis) using such compositions in vivo.

A major problem has been the delivery of these compounds to cells and tissues. Conventional double-stranded RNAi compounds, 19-29 bases long, form a highly negatively-charged rigid helix of approximately 1.5 by 10-15 nm in size. This rod type molecule cannot get through the cell-membrane and as a result has very limited efficacy both in vitro and in vivo. As a result, all conventional RNAi compounds require some kind of delivery vehicle to promote their tissue distribution and cellular uptake. This is considered to be a major limitation of the RNAi technology.

SUMMARY

Aspects of the invention relate to compositions and methods that are useful for delivering nucleic acid molecules to a subject, for example by topical administration. In some aspects, the disclosure is based on the surprising discovery that therapeutic oligonucleotide gel formulations comprising urea and lactic acid efficiently penetrate through the stratum corneum and into the dermis of a subject when topically applied. In some embodiments, the gel formulations are useful for treating disorders affecting the skin, scalp, nails, oral mucosa or genital mucosa of a subject in need thereof.

Accordingly, in some aspects, the disclosure provides a pharmaceutical composition comprising one or more therapeutic oligonucleotides, urea, and lactic acid.

In some embodiments, a pharmaceutical composition further comprises a thickening agent. In some embodiments, a thickening agent is methylcellulose (MC) or hydroxypropyl cellulose (HPC). In some embodiments, a pharmaceutical composition is formulated in a gel.

In some embodiments, urea is present in an amount between about 5% and about 40% w/w. In some embodiments, urea is present in an amount between about 5% and about 15% w/w, for example at about 10% w/w.

In some embodiments, lactic acid is present in an amount between about 2% and about 10% w/w. In some embodiments, lactic acid is present in an amount between about 2% and about 8% w/w, for example at about 5% w/w.

In some embodiments, a thickening agent is present in an amount between about 0% and about 40% w/w. In some embodiments, a thickening agent is present in an amount between about 0% and about 2%, for example at about 1% w/w.

In some embodiments, a pharmaceutical composition has a pH between about 3.0 and 4.7. In some embodiments, a pharmaceutical composition has a pH of about 3.5.

In some embodiments, a pharmaceutical composition further comprises at least one of: a preservative (e.g., sodium benzoate), a salt (e.g., NaCl), a pH adjusting-agent (e.g., NaOH), water, or any combination of the foregoing.

In some embodiments, a pharmaceutical composition comprises at least one therapeutic oligonucleotide that targets: CTGF, VEGF, MAP4K4, PDGF-B, SPP1, TGFB1, TGFB2, HIF-1α mTOR, PTGS2 (COX-2), PPIB, IL-1 alpha, IL-1 beta, Icam-1, Tie 1, Tie 2, ANG2, Ang1, MYC, TNFα, MMP1, TYR or any combination thereof. In some embodiments, a pharmaceutical composition comprises at least one therapeutic oligonucleotide that targets a long non-coding RNA (lncRNA). In some embodiments, a pharmaceutical composition comprises 0.1% w/w to 10% w/w therapeutic oligonucleotide. In some embodiments, a therapeutic oligonucleotide is an sd-rxRNA.

In some embodiments, an sd-rxRNA targets CTGF and comprises at least 12 contiguous nucleotides of a sequence set forth in Table 1. In some embodiments, an sd-rxRNA comprises a sense strand having a sequence set forth in SEQ ID NO: 359 and an antisense strand having a sequence set forth in SEQ ID NO: 360.

In some embodiments, an sd-rxRNA targets MMP1 and comprises at least 12 contiguous nucleotides of a sequence set forth in Tables 2, 3, 4, and 5. In some embodiments, an sd-rxRNA comprises a sense strand having a sequence set forth in SEQ ID NO: 540 and an antisense strand having a sequence set forth in SEQ ID NO: 569.

In some embodiments, an sd-rxRNA targets TYR and comprises at least 12 contiguous nucleotides of a sequence set forth in Tables 6, 7, 8, and 9. In some embodiments, an sd-rxRNA comprises a sense strand having a sequence set forth in SEQ ID NO: 696 and an antisense strand having a sequence set forth in SEQ ID NO: 735.

In some embodiments, an sd-rxRNA targets MAP4k4. In some embodiments, an sd-rxRNA comprises a sense strand having a sequence set forth in SEQ ID NO: 739 and an antisense strand having a sequence set forth in SEQ ID NO: 740. In some embodiments, an sd-rxRNA comprises a sense strand having a sequence set forth in SEQ ID NO: 741 and an antisense strand having a sequence set forth in SEQ ID NO: 742.

In some embodiments, a pharmaceutical composition comprises about 1% w/w to about 2% w/w sd-rxRNA.

In some embodiments, the disclosure provides a kit comprising a pharmaceutical composition as described by the disclosure, for example a kit comprising a container housing a pharmaceutical composition.

In some aspects, the disclosure provides a method for delivering a therapeutic oligonucleotide to the dermis of a subject, the method comprising topically administering a pharmaceutical composition as described by the disclosure to the subject. In some embodiments, a subject has a disease or disorder of the skin, scalp, nails, oral mucosa or genital mucosa.

In some aspects, the disclosure provides a method for treating a skin disorder in a subject, the method comprising topically administering to the subject an effective amount of a pharmaceutical composition as described by the disclosure.

In some embodiments, a skin disorder is skin cancer, dermal scarring, psoriasis, morphea, post-inflammatory hyperpigmentation, lentigines, uneven skin tone, hyperpigmentation, or photo ageing.

In some embodiments, a pharmaceutical composition is administered in an amount effective to reduce expression and/or activity of one or more target genes, for example, CTGF, VEGF, MAP4K4, PDGF-B, SPP1, TGFB1, TGFB2, HIF-1α mTOR, PTGS2 (COX-2), PPIB, IL-1 alpha, IL-1 beta, Icam-1, Tie 1, Tie 2, ANG2, Ang1, MYC, TNFα, MMP1, TYR or any combination thereof. In some embodiments, administration of a pharmaceutical composition to a subject results in reduction of expression and/or activity of one or more target genes in the dermis of the subject.

In some embodiments, methods described herein are for improving the cosmetic appearance of skin.

Further aspects of the disclosure relate to compositions for use in improving cosmetic appearance in a subject, comprising one or more therapeutic oligonucleotides, urea, and lactic acid. In some embodiments, the composition for use in improving cosmetic appearance in a subject further comprises a thickening agent. In some embodiments, in the composition for use in improving cosmetic appearance in a subject, the thickening agent is methylcellulose (MC) or hydroxypropyl cellulose (HPC).

In some embodiments, the composition for use in improving cosmetic appearance in a subject is formulated in a gel. In some embodiments, in the composition for use in improving cosmetic appearance in a subject, the urea is present in an amount between about 5% and about 40% w/w. In some embodiments, in the composition for use in improving cosmetic appearance in a subject, the urea is present in an amount between about 5% and about 15% w/w, optionally wherein the urea is present at about 10% w/w.

In some embodiments, in the composition for use in improving cosmetic appearance in a subject, the lactic acid is present in an amount between about 2% and about 10% w/w. In some embodiments, the lactic acid is present in an amount between about 2% and about 8% w/w, optionally wherein the lactic acid is present at about 5% w/w.

In some embodiments, in the composition for use in improving cosmetic appearance in a subject, the thickening agent is present in an amount between about 0% and about 40% w/w. In some embodiments, in the composition for use in improving cosmetic appearance in a subject, the thickening agent is present in an amount between about 0% and about 2%, optionally wherein the thickening agent is methylcellulose (MC), further optionally wherein the MC is present at about 1% w/w.

In some embodiments, the composition for use in improving cosmetic appearance in a subject has a pH between about 3.0 and 4.7. In some embodiments, the pH is about 3.5.

In some embodiments, the composition for use in improving cosmetic appearance in a subject further comprises at least one of: a preservative (e.g., sodium benzoate), a salt (e.g., NaCl), a pH adjusting-agent (e.g., NaOH), water, or any combination of the foregoing.

In some embodiments, in the composition for use in improving cosmetic appearance in a subject, at least one of the therapeutic oligonucleotides targets CTGF, VEGF, MAP4K4, PDGF-B, SPP1, TGFB1, TGFB2, HIF-1α mTOR, PTGS2 (COX-2), PPIB, IL-1 alpha, IL-1 beta, Icam-1, Tie 1, Tie 2, ANG2, Ang1, MYC, TNFα, MMP1, TYR or any combination thereof. In some embodiments, in the composition for use in improving cosmetic appearance in a subject, at least one of the therapeutic oligonucleotides targets a long non-coding RNA (lncRNA).

In some embodiments, in the composition for use in improving cosmetic appearance in a subject, at least one of the therapeutic oligonucleotides is an sd-rxRNA. In some embodiments, in the composition for use in improving cosmetic appearance in a subject, the sd-rxRNA targets CTGF and comprises at least 12 contiguous nucleotides of a sequence set forth in Table 1. In some embodiments, in the composition for use in improving cosmetic appearance in a subject, the sd-rxRNA comprises a sense strand having a sequence set forth in SEQ ID NO: 359 and an antisense strand having a sequence set forth in SEQ ID NO: 360.

In some embodiments, in the composition for use in improving cosmetic appearance in a subject, the sd-rxRNA targets MMP1 and comprises at least 12 contiguous nucleotides of a sequence set forth in Tables 2, 3, 4, and 5. In some embodiments, the sd-rxRNA comprises a sense strand having a sequence set forth in SEQ ID NO: 540 and an antisense strand having a sequence set forth in SEQ ID NO: 569.

In some embodiments, in the composition for use in improving cosmetic appearance in a subject, the sd-rxRNA targets TYR and comprises at least 12 contiguous nucleotides of a sequence set forth in Tables 6, 7, 8, and 9. In some embodiments, the sd-rxRNA comprises a sense strand having a sequence set forth in SEQ ID NO: 696 and an antisense strand having a sequence set forth in SEQ ID NO: 735.

In some embodiments, in the composition for use in improving cosmetic appearance in a subject, the sd-rxRNA targets MAP4k4. In some embodiments, the sd-rxRNA comprises a sense strand having a sequence set forth in SEQ ID NO: 739 and an antisense strand having a sequence set forth in SEQ ID NO: 740. In some embodiments, the sd-rxRNA comprises a sense strand having a sequence set forth in SEQ ID NO: 741 and an antisense strand having a sequence set forth in SEQ ID NO: 742.

In some embodiments, the composition for use in improving cosmetic appearance in a subject comprises 0.1% w/w to 10% w/w therapeutic oligonucleotide. In some embodiments, the composition for use in improving cosmetic appearance in a subject comprises about 1% w/w to about 2% w/w sd-rxRNA.

Each of the limitations of the invention can encompass various embodiments of the invention. It is, therefore, anticipated that each of the limitations of the invention involving any one element or combinations of elements can be included in each aspect of the invention. This invention is not limited in its application to the details of construction and the arrangement of components set forth in the following description or illustrated in the drawings. The invention is capable of other embodiments and of being practiced or of being carried out in various ways.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Figure 1:
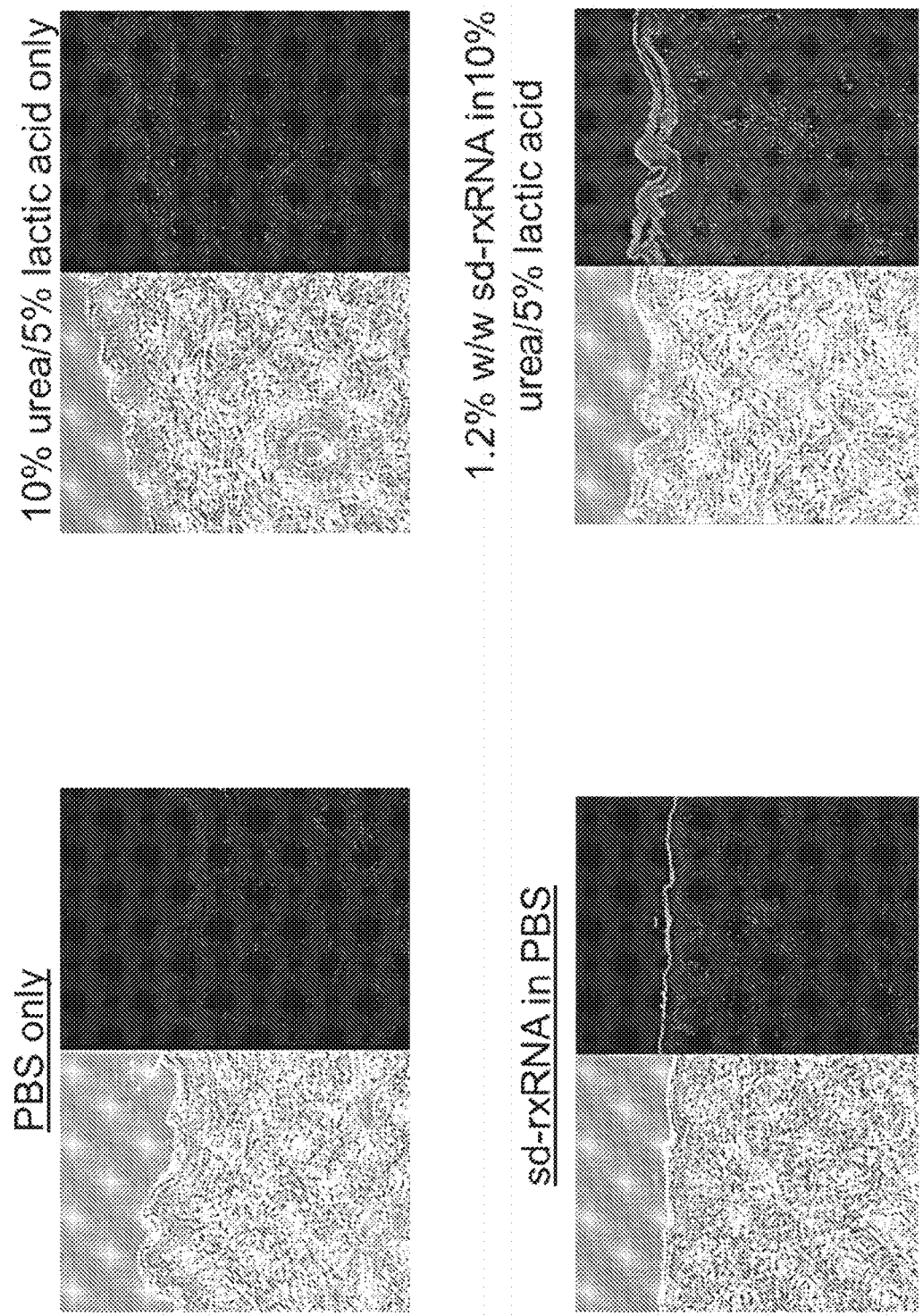
FIG. 1 shows representative images of skin penetration by one embodiment of sd-rxRNA in a formulation comprising urea (e.g., 10% urea) and lactic acid (e.g., 5% lactic acid).

Aspects of the invention relate to formulations of therapeutic nucleic acid molecules containing urea and lactic acid for delivery to the skin and other tissues using topical administration. Surprisingly, it was found that, in some embodiments, nucleic acid molecules formulated as described herein were able to penetrate the stratum corneum to the epidermis and dermis of the skin. Formulations described herein can be used, in some embodiments, to treat or prevent indications associated with the skin, scalp, nails, oral mucosa, and/or genital mucosa.

As used herein, "nucleic acid molecule" includes but is not limited to: sd-rxRNA, rxRNAori, oligonucleotides, ASO, siRNA, shRNA, miRNA, hsiRNA, ncRNA, cp-la-siRNA, aiRNA, BMT-101, RXI-109, RXI-231, EXC-001, single-stranded nucleic acid molecules, double-stranded nucleic acid molecules, RNA and DNA. In some embodiments, the nucleic acid molecule is a chemically modified nucleic acid molecule, such as a chemically modified oligonucleotide.

The term "therapeutic oligonucleotide" refers to a nucleic acid molecule (e.g., an inhibitory nucleic acid molecule) that reduces expression or activity of a target gene associated with a disease or disorder. Examples of therapeutic oligonucleotides include sd-rxRNA, rxRNAori, oligonucleotides, ASO, siRNA, shRNA, miRNA, hsiRNA, ncRNA, cp-la-siRNA, aiRNA, BMT-101, RXI-109, RXI-231, EXC-001, single-stranded nucleic acid molecules, double-stranded nucleic acid molecules, RNA and DNA. Therapeutic oligonucleotides can target disease-associated genes, such as CTGF, VEGF, MAP4K4, PDGF-B, SPP1, TGFB1, TGFB2, HIF-1α, mTOR, PTGS2 (COX-2), PPIB, IL-1 alpha, IL-1 beta, Icam-1, Tie 1, Tie 2, ANG2, Ang1, MYC, TNFα, MMP1, TYR or any combination thereof. Target gene selection and production of additional therapeutic oligonucleotides may be achieved without undue experimentation by a skilled artisan.

Sd-rxRNA Molecules

Aspects of the invention relate to sd-rxRNA molecules. As used herein, an "sd-rxRNA" or an "sd-rxRNA molecule" refers to a self-delivering RNA molecule such as those described in, and incorporated by reference from, U.S. Pat. No. 8,796,443, granted on Aug. 5, 2014, entitled ""REDUCED SIZE SELF-DELIVERING RNAI COMPOUNDS" and PCT Publication No. WO2010/033247 (Application No. PCT/US2009/005247), filed on Sep. 22, 2009, and entitled "REDUCED SIZE SELF-DELIVERING RNAI COMPOUNDS." Briefly, an sd-rxRNA, (also referred to as an sd-rxRNA$^{nano}$) is an isolated asymmetric double stranded nucleic acid molecule comprising a guide strand, with a minimal length of 16 nucleotides, and a passenger strand of 8-18 nucleotides in length, wherein the double stranded nucleic acid molecule has a double stranded region and a single stranded region, the single stranded region having 4-12 nucleotides in length and having at least three nucleotide backbone modifications. In preferred embodiments, the double stranded nucleic acid molecule has one end that is blunt or includes a one or two nucleotide overhang. sd-rxRNA molecules can be optimized through chemical modification, and in some instances through attachment of hydrophobic conjugates.

In some embodiments, an sd-rxRNA comprises an isolated double stranded nucleic acid molecule comprising a guide strand and a passenger strand, wherein the region of the molecule that is double stranded is from 8-15 nucleotides long, wherein the guide strand contains a single stranded region that is 4-12 nucleotides long, wherein the single stranded region of the guide strand contains 3, 4, 5, 6, 7, 8, 9, 10, 11 or 12 phosphorothioate modifications, and wherein at least 40% of the nucleotides of the double stranded nucleic acid are modified.

In some embodiments, the polynucleotides described by the disclosure are referred to herein as isolated double stranded or duplex nucleic acids, oligonucleotides or polynucleotides, nano molecules, nano RNA, sd-rxRNA', sd-rxRNA or RNA molecules.

Generally, sd-rxRNAs are much more effectively taken up by cells compared to conventional siRNAs. These molecules are highly efficient in silencing of target gene expression and offer significant advantages over previously described RNAi molecules including high activity in the presence of serum, efficient self-delivery, compatibility with a wide variety of linkers, and reduced presence or complete absence of chemical modifications that are associated with toxicity.

In contrast to single-stranded polynucleotides, duplex polynucleotides have traditionally been difficult to deliver to a cell as they have rigid structures and a large number of negative charges which makes membrane transfer difficult. sd-rxRNAs however, although partially double-stranded, are recognized in vivo as single-stranded and, as such, are capable of efficiently being delivered across cell membranes. As a result the polynucleotides described by the disclosure are capable in many instances of self-delivery. Thus, the polynucleotides described herein may be formulated in a manner similar to conventional RNAi agents, or they may be delivered to the cell or subject alone (or with non-delivery type carriers) and allowed to self-deliver. In some embodiments, self-delivering asymmetric double-stranded RNA molecules are provided in which one portion of the molecule resembles a conventional RNA duplex and a second portion of the molecule is single stranded.

Oligonucleotides described by the disclosure, in some aspects, have a combination of asymmetric structures including a double stranded region and a single stranded region of 5 nucleotides or longer, specific chemical modification patterns and are conjugated to lipophilic or hydrophobic molecules. This class of RNAi like compounds have superior efficacy in vitro and in vivo. It is believed that the reduction in the size of the rigid duplex region in combination with phosphorothioate modifications applied to a single stranded region contribute to the observed superior efficacy.

Methods of effectively administering sd-rxRNA to the skin and silencing gene expression have been demonstrated in U.S. Pat. No. 8,664,189, granted on Mar. 4, 2014 and entitled "RNA INTERFERENCE IN SKIN INDICA- TIONS," U.S. Pat. No. 9,340,786, filed on Apr. 4, 2013 and entitled "RNA INTERFERENCE IN DERMAL AND FIBROTIC INDICATIONS," PCT Publication No. WO 2010/033246, filed on Sep. 22, 2009 and entitled "RNA INTERFERENCE IN SKIN INDICATIONS" and PCT Publication No. WO2011/119887, filed on Mar. 24, 2011 and entitled "RNA INTERFERENCE IN DERMAL AND FIBROTIC INDICATIONS." Each of the above-referenced patents and publications are incorporated by reference herein in their entireties.

For example, FIG. 42 in U.S. Pat. No. 9,340,786 demonstrates CTGF silencing following intradermal injection of RXI-109 in vivo (Rat skin) after two intradermal injections of RXI-109 (CTGF-targeting sd-rxRNA). Data presented are from a study using an excisional wound model in rat dermis. Following two intradermal injections of RXI-109, silencing of CTGF vs. non-targeting control was sustained for at least five days. The reduction of CTGF mRNA was dose dependent: 51 and 67% for 300 and 600 µg, respectively, compared to the dose matched non-targeting control. The Methods used to produce the data shown in FIG. 42 included: RXI-109 or non-targeting control (NTC) was administered by intradermal injection (300 or 600 ug per 200 uL injection) to each of four sites on the dorsum of rats on Days 1 and 3. A 4 mm excisional wound was made at each injection site ~30 min after the second dose (Day 3). Terminal biopsy samples encompassing the wound site and surrounding tissue were harvested on Day 8. RNA was isolated and subjected to gene expression analysis by qPCR. Data are normalized to the level of the TATA box binding protein (TBP) housekeeping gene and graphed relative to the PBS vehicle control set at 1.0. Error bars represent standard deviation between the individual biopsy samples. P values for RXI-109-treated groups vs dose-matched non-targeting control groups were **p<0.001 for 600 µg, *p<0.01 for 300 µg.

It should be appreciated that the sd-rxRNA molecules disclosed herein can be administered to the skin in the same manner as the sd-rxRNA molecules disclosed in U.S. Pat. No. 9,340,786, incorporated by reference in its entirety.

Pharmaceutical Compositions

In some aspects, the disclosure relates to the surprising discovery that topical administration of certain formulations of therapeutic oligonucleotides (e.g., sd-rxRNAs) comprising urea, lactic acid, and certain thickening agents (e.g., methylcellulose, "MC") to a subject. In some embodiments, administration of therapeutic oligonucleotides (e.g., sd-rxRNAs) results in delivery of the therapeutic oligonucleotides through the stratum corneum and into the dermis of the skin of the subject.

In some embodiments, a pharmaceutical composition as described by the disclosure comprises urea. In some embodiments, the urea is present in an amount between 5% and about 40% w/w (e.g., about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40%, inclusive). In some embodiments, urea is present in an amount between about 5% and about 15% w/w (about 5%, 6%, 7%, 8%, 9%, 10%, 11%, 12%, 13%, 14%, or 15%, inclusive). In some embodiments, urea is present in the pharmaceutical composition at about 10% w/w. In some embodiments, urea is present in the pharmaceutical composition at greater than 40% w/w.

In some embodiments, a pharmaceutical composition as described by the disclosure comprises lactic acid. In some embodiments, lactic acid is present in an amount between about 2% and about 10% w/w (e.g., about 2%, 3%, 4%, 5%, 6%, 7%, 8%, 9%, or 10%, inclusive). In some embodiments, lactic acid is present in an amount between about 2% and about 8% (e.g., about 2%, 3%, 4%, 5%, 6%, 7%, or 8%, inclusive). In some embodiments, lactic acid is present at about 5% w/w. In some embodiments, lactic acid is present at greater than 10% w/w.

In some aspects, the disclosure relates to pharmaceutical compositions that are formulated into a gel. Generally, a "gel" refers to a two-phase colloidal composition having a solid phase dispersed in a liquid phase that is thickened to form a semi-solid or solid mass. Accordingly in some embodiments, a pharmaceutical composition described by the disclosure comprises a thickening agent (e.g., an agent that increases the viscosity of a liquid without substantially changing the other properties of the liquid). Typically, thickening agents are polysaccharides or peptides (e.g., proteins).

Examples of polysaccharide thickening agents include but are not limited to sugars (e.g., agar, carrageenan, etc.), cellulose (e.g., cellulose, methylcellulose, ethyl cellulose, hydroxyethyl cellulose, hydroxypropyl cellulose, hydroxypropylmethyl cellulose, carboxymethyl cellulose, sodium carboxymethyl cellulose, etc.) and derivates thereof, starches (e.g., corn starch, potato starch, tapioca, etc.) and derivatives thereof, vegetable gums (e.g., alginin, guar gum, xanthan gum, etc.) and derivates thereof, pectin, etc. Examples of protein thickening agents include but are not limited to collagen, albumin (e.g., egg whites), gelatin, etc.

In some embodiments, a thickening agent is present in an amount between about 0% and about 40% w/w (e.g., not present, present at about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40% w/w, inclusive). In some embodiments, a thickening agent is present in an amount between about 0% and about 2% (e.g., not present, present at about 1%, 1.1%, 1.2%, 1.3%, 1.4%, 1.5%, 1.6%, 1.7%, 1.8%, 1.9%, or about 2% w/w, inclusive). In some embodiments, a thickening agent is present in a pharmaceutical composition at about 1% w/w. In some embodiments, a thickening agent is present in a pharmaceutical composition at greater than 40% w/w.

The amount of active ingredient (e.g., therapeutic oligonucleotide or oligonucleotides) in a pharmaceutical composition generally depends upon the effectiveness of the active ingredient, and other factors such as the species, size (e.g., mass), target tissue, etc. of a subject. In some embodiments, the amount of therapeutic oligonucleotide in a pharmaceutical composition as described by the disclosure ranges from about 0.1% w/w and 10% w/w (e.g., about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% w/w, inclusive). In some embodiments, the amount of therapeutic oligonucleotide in a pharmaceutical composition as described by the disclosure ranges from about 1% to 2% w/w (e.g., about 1.0%, 1.1%, 1.2%, 1.3%, 1.4%, 1.5%, 1.6%, 1.7%, 1.8%, 1.9%. or 2.0% w/w, inclusive). In some embodiments, the amount of therapeutic oligonucleotide in a pharmaceutical composition is greater than 10%.

In some aspects, the disclosure relates to the discovery that altering the pH of a pharmaceutical composition as described by the disclosure results in improved delivery of therapeutic oligonucleotides into the skin (e.g. the dermis) of a subject. Generally, the pH of a composition may be adjusted by adding a pH adjusting agent, for example an acid (e.g., hydrochloric acid, HCl) or a base (e.g., sodium hydroxide, NaOH), to the composition until a desired pH is reached. In some embodiments, a pharmaceutical composition has a pH between about 3.0 and 5.0 (e.g., about 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0, inclusive). In some embodiments, a pharmaceutical composition has a pH of about 3.5.

In some embodiments, a pharmaceutical composition comprises at least one additional component (e.g., a pharmaceutically acceptable excipient), for example a preservative, a salt, a pH adjusting-agent, water, or any combination of the foregoing. Examples of preservatives include but are not limited to sodium benzoate, benzoic acid, boric acid, methylparaben, ethylparaben, sodium propionate, potassium sorbate, chlorobutantol, benzyl alcohol, phenols (e.g., phenol, chlorocrescol), mercurial compounds (e.g., thiomersal, nitromersal), and quartenary ammonium compounds (e.g., benzalkonium chloride, cetyl pyridinium chloride). Examples of salts include but are not limited to sodium chloride, sodium nitrite, potassium nitrite, etc. Additional examples of pharmaceutically acceptable excipients are disclosed for example in REMINGTON'S PHARMACEUTICAL SCIENCES, 18th Ed. (1990).

CTGF

In some aspects, the instant disclosure relates to the use of nucleic acids, such as sd-rxRNA, targeting Connective Tissue Growth Factor (CTGF). Examples of nucleic acids (e.g., sd-rxRNAs) targeting CTGF are shown in Table 1 below and are incorporated by reference herein from U.S. Pat. No. 9,340,786.

TABLE 1

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 13980 | 1222 | 1 | A.mC.A.G.G.A. A.G.A.mU. G.mU.A.Chl | 2 | P.mU.A.fC. A.fU.fC.fU.fU.fC.fC.m U.G.mU*A*G*mU* A*mC*A. | 98% |
| 13981 | 813 | 3 | G.A.G.mU.G.G. A.G.mC. G.mC.mC.mU.Chl | 4 | P.mA.G.G.fC. G.fC.fU.fC.fC. A.mC.mU.mC*mU* G*mU*G*G*U. | 82% |
| 13982 | 747 | 5 | mC.G.A.mC.mU. G.G.A.A.G. A.mC.A.Chl | 6 | P.mU. G.fU.fC.fU.fU.fC.fC. A.G.mU.mC.G* G*mU*A*A*G*C. | 116% |
| 13983 | 817 | 7 | G.G.A.G.mC. G.mC.mC.mU. G.mU.mU.mC.Chl | 8 | P.mG.A.A.fC.A.G. G.fC. G.fC.mU.mC.mC* A*mC*mU*mC*mU* G. | 97% |
| 13984 | 1174 | 9 | G.mC.mC. A.mU.mU.A.mC. A.A.mC.mU. G.Chl | 10 | P.mC.A.G.fU.fU. G.fU.A.A.fU.G. G.mC*A*G*G*mC* A*C. | 102% |
| 13985 | 1005 | 11 | G.A. G.mC.mU.mU.mU .mC.mU.G. G.mC.mU.Chl | 12 | P.mA.G.fC.fC.A.G. A.A.A. G.mC.mU.mC*A*A* A*mC*mU*U. | 114% |
| 13986 | 814 | 13 | A.G.mU.G.G.A. G.mC. G.mC.mC.mU. G.Chl | 14 | P.mC.A.G.G.fC. G.fC.fU.fC.fC. A.mC.mU*mC*mU* G*mU*G*G. | 111% |
| 13987 | 816 | 15 | mU.G.G.A. G.mC. G.mC.mC.mU. G.mU.mU.Chl | 16 | P.mA.A.fC.A.G. G.fC.G.fC.fU.mC.mC. A*mC*mU*mC*mU* G*U. | 102% |
| 13988 | 1001 | 17 | G.mU.mU.mU.G. A. G.mC.mU.mU.mU .mC.mU.Chl | 18 | P.mA.G.A.A.A. G.fC.fU.fC.A.A. A.mC*mU*mU*G* A*mU*A. | 99% |
| 13989 | 1173 | 19 | mU.G.mC.mC. A.mU.mU.A.mC. A.A.mC.mU.Chl | 20 | P.mA.G.fU.fU.G.fU. A.A.fU.G.G.mC.A* G*G*mC*A*mC*A. | 107% |
| 13990 | 749 | 21 | A.mC.mU.G.G. A.A.G.A.mC. A.mC.G.Chl | 22 | P.mC.G.fU. G.fU.fC.fU.fU.fC.fC. A.G.mU*mC*G* G*mU*A*A. | 91% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 13991 | 792 | 23 | A.A.mC.mU. G.mC.mC.mU.G. G.mU.mC.mC.Chl | 24 | P.mG.A.fC.fC.A. G.G.fC.A.G.mU.mU* G*G*mC*mU*mC* U. | 97% |
| 13992 | 1162 | 25 | A.G. A.mC.mC.mU. G.mU. G.mC.mC.mU. G.Chl | 26 | P.mC.A.G.G.fC. A.fC.A.G. G.mU.mC.mU.mU* G*A*mU*G*A. | 107% |
| 13993 | 811 | 27 | mC.A.G.A. G.mU.G.G.A. G.mC.G.mC.Chl | 28 | P.mG.fC. G.fC.fU.fC.fC. A.fC.fU.mC.mU. G*mU*G* G*mU*mC*U. | 113% |
| 13994 | 797 | 29 | mC.mC.mU.G. G.mU.mC.mC.A. G.A.mC.mC.Chl | 30 | P.mG.G.fU.fC.fU.G. G.A.fC.fC.A.G. G*mC*A* G*mU*mU*G. | n/a |
| 13995 | 1175 | 31 | mC.mC. A.mU.mU.A.mC. A.A.mC.mU. G.mU.Chl | 32 | P.mA.fC.A.G.fU.fU. G.fU.A.A.mU.G. G*mC*A*G*G*mC* A. | 113% |
| 13996 | 1172 | 33 | mC.mU. G.mC.mC. A.mU.mU.A.mC. A.A.mC.Chl | 34 | P.mG.fU.fU.G.fU.A. A.fU.G.G.mC.A.G* G*mC*A*mC*A*G. | 110% |
| 13997 | 1177 | 35 | A.mU.mU.A.mC. A.A.mC.mU. G.mU.mC.mC.Chl | 36 | P.mG.G.A.fC.A. G.fU.fU.G.fU.A. A.mU*G*G*mC*A G*G. | 105% |
| 13998 | 1176 | 37 | mC.A.mU.mU. A.mC.A. A.mC.mU. G.mU.mC.Chl | 38 | P.mG.A.fC.A. G.fU.fU.G.fU.A. A.mU.G*G*mC*A* G*G*C. | 89% |
| 13999 | 812 | 39 | A.G.A.G.mU.G. G.A.G.mC. G.mC.mC.Chl | 40 | P.mG.G.fC. G.fC.fU.fC.fC. A.fC.mU.mC.mU* G*mU*G*G*mU*C. | 99% |
| 14000 | 745 | 41 | A.mC.mC.G. A.mC.mU.G.G. A.A.G.A.Chl | 42 | P.mU.fC.fU.fU.fC.fC. A.G.fU.fC.G.G.mU* A*A*G*mC*mC*G. | n/a |
| 14001 | 1230 | 43 | A.mU.G.mU. A.mC.G.G.A.G. A.mC.A.Chl | 44 | P.mU. G.fU.fC.fU.fC.fC. G.fU.A.mC. A.mU*mC*mU*mU*m C*mC*U. | 106% |
| 14002 | 920 | 45 | G.mC.mC.mU.mU. G.mC.G.A.A. G.mC.mU.Chl | 46 | P.mA.G.fC.fU.fU.fC. G.fC.A.A.G. G.mC*mC*mU*G* A*mC*C. | 93% |
| 14003 | 679 | 47 | G.mC.mU.G.mC. G.A.G.G.A. G.mU.G.Chl | 48 | P.mC. A.fC.fU.fC.fC.fU.fC. G.fC.A.G.mC* A*mU*mU*mU*mC* C. | 102% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 14004 | 992 | 49 | G.mC.mC.mU.A.mU.mC.A.A.G.mU.mU.mU.Chl | 50 | P.mA.A.A.fC.fU.fU.G.A.fU.A.G.G.mC*mU*mU*G*G*A*G. | 100% |
| 14005 | 1045 | 51 | A.A.mU.mU.mC.mU.G.mU.G.G.A.G.mU.Chl | 52 | P.mA.fC.fU.fC.fC.A.fC.A.G.A.A.mU.mU*mU*A*G*mC*mU*C. | 104% |
| 14006 | 1231 | 53 | mU.G.mU.A.mC.G.G.A.G.A.mC.A.mU.Chl | 54 | P.mA.fU.G.fU.fC.fU.fC.fC.G.fU.A.mC.A*mU*mC*mU*mU*mC*C. | 87% |
| 14007 | 991 | 55 | A.G.mC.mC.mU.A.mU.mC.A.A.G.mU.mU.Chl | 56 | P.mA.A.fC.fU.fU.G.A.fU.A.G.G.mC.mU*mU*G*G*A*G*A. | 101% |
| 14008 | 998 | 57 | mC.A.A.G.mU.mU.mU.G.A.G.mC.mU.mU.Chl | 58 | P.mA.A.G.fC.fU.fC.A.A.A.fC.mU.mU.G*A*mU*A*G*G*C. | 98% |
| 14009 | 1049 | 59 | mC.mU.G.mU.G.G.A.G.mU.A.mU.G.mU.Chl | 60 | P.mA.fC.A.fU.A.fC.fU.fC.fC.A.mC.A.G*A*A*mU*mU*mU*A. | 98% |
| 14010 | 1044 | 61 | A.A.A.mU.mU.mC.mU.G.mU.G.G.A.G.Chl | 62 | P.mC.fU.fC.fC.A.fC.A.G.A.A.mU.mU.mU*A*G*mC*mU*mC*G. | 93% |
| 14011 | 1327 | 63 | mU.mU.mU.mC.A.G.mU.A.G.mC.A.mC.A.Chl | 64 | P.mU.G.fU.G.fC.fU.A.fC.fU.G.A.A.A*mU*mC*A*mU*mU*U. | 95% |
| 14012 | 1196 | 65 | mC.A.A.mU.G.A.mC.A.mU.mC.mU.mU.mU.Chl | 66 | P.mA.A.A.G.A.fU.G.fU.fC.A.mU.mU.G*mU*m*mU*mC*m*G. | 101% |
| 14013 | 562 | 67 | A.G.mU.A.mC.mC.A.G.mU.G.mC.A.mC.Chl | 68 | P.mG.fU.G.fC.A.fC.fU.G.G.fU.A.mC.mU*mU*G*mC*A*G*C. | 66% |
| 14014 | 752 | 69 | G.G.A.A.G.A.mC.A.mC.G.mU.mU.mU.Chl | 70 | P.mA.A.fC.G.fU.G.fU.fC.fU.mU.mC.mC*A*G*mU*mC*G*G. | 95% |
| 14015 | 994 | 71 | mC.mU.A.mU.mC.A.A.G.mU.mU.mU.G.A.Chl | 72 | P.mU.fC.A.A.A.fC.fU.fU.G.A.mU.A.G*G*mC*mU*mU*G*G. | 85% |
| 14016 | 1040 | 73 | A.G.mC.mU.A.A.A.mU.mU.mC.mU.G.mU.Chl | 74 | P.mA.fC.A.G.A.A.fU.fU.fU.A.G.mC.mU*mC*G*G*mU*A*U. | 61% |
| 14017 | 1984 | 75 | A.G.G.mU.A.G.A.A.mU.G.mU.A.A.Chl | 76 | P.mU.fU.A.fC.A.fU.fU.fC.fU.A.mC.mC.mU*A*mU*G*G*mU*G. | 32% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 14018 | 2195 | 77 | A.G.mC.mU.G. A.mU.mC.A. G.mU.mU.mU.Chl | 78 | P.mA.A.A.fC.fU.G. A.fU.fC.A.G.mC.mU* A*mU*A*mU*A*G. | 86% |
| 14019 | 2043 | 79 | mU.mU.mC.mC. G.mC.mU.mC.A. G.A.mU.A.Chl | 80 | P.mU.A.fU.fC.fU.G. A.G.fC.A.G.A. A*mU*mU*mU*mC* mC*A. | 81% |
| 14020 | 1892 | 81 | mU.mU. A.mU.mC.mU.A. A.G.mU.mU.A. A.Chl | 82 | P.mU.fU.A. A.fC.fU.fU.A.G. A.mU.A.A*mC*mU* G*mU*A*C. | 84% |
| 14021 | 1567 | 83 | mU.A.mU.A.mC. G.A.G.mU.A. A.mU.A.Chl | 84 | P.mU.A.fU.fU. A.fC.fU.fC.G.fU. A.mU.A*A*G* A*mU*G*C. | 72% |
| 14022 | 1780 | 85 | G.A.mC.mU.G. G.A.mC.A. G.mC.mU.mU.Chl | 86 | P.mA.A.G.fC.fU. G.fU.fC.fC.A. G.mU.mC*mU*A* A.mU*mC*G. | 65% |
| 14023 | 2162 | 87 | A.mU.G. G.mC.mC.mU.mU. mU.A.mU.mU. A.Chl | 88 | P.mU.A.A.fU.A.A. A.G.G.fC.mC. A.mU*mU*mU* G*mU*mU*C. | 80% |
| 14024 | 1034 | 89 | A.mU.A.mC.mC. G.A.G.mC.mU. A.A.A.Chl | 90 | P.mU.fU.fU.A. G.fC.fU.fC.G.G.mU. A.mU* G*mU*mC*mU*mU* C. | 91% |
| 14025 | 2264 | 91 | mU.mU. G.mU.mU.G.A. G.A.G.mU. G.mU.Chl | 92 | P.mA.fC. A.fC.fU.fC.fU.fC.A. A.mC.A.A*A*mU* A*A*A*C. | 58% |
| 14026 | 1032 | 93 | A.mC.A.mU. A.mC.mC.G.A. G.mC.mU.A.Chl | 94 | P.mU.A.G.fC.fU.fC. G.G.fU.A.mU. G.mU*mC*mU*mU*m C*A*U. | 106% |
| 14027 | 1535 | 95 | A.G.mC.A.G.A. A.A.G. G.mU.mU.A.Chl | 96 | P.mU.A. A.fC.fC.fU.fU.fU.fC.fU .G.mC.mU*G* G*mU*A*mC*C. | 67% |
| 14028 | 1694 | 97 | A.G.mU.mU. G.mU.mU.mC.mC. mU.mU.A.A.Chl | 98 | P.mU.fU.A.A.G.G. A. A.fC.A. A.mC.mU*mU*G* A*mC*mU*C. | 94% |
| 14029 | 1588 | 99 | A.mU.mU.mU.G. A.A.G.mU. G.mU.A.A.Chl | 100 | P.mU.fU.A.fC. A.fC.fU.fU.fC.A.A. A.mU*A*G*mC*A* G*G. | 97% |
| 14030 | 928 | 101 | A.A.G.mC.mU. G.A.mC.mC.mU. G.G.A.Chl | 102 | P.mU.fC.fC.A.G. G.fU.fC.A. G.mC.mU.mU*mC* G*mC*A*A*G. | 100% |
| 14031 | 1133 | 103 | G.G.mU.mC. A.mU.G.A.A.G. A.A.G.Chl | 104 | P.mC.fU.fU.fC.fU.f C.A.fU.G. A.mC.mC*mU*mC* G*mC*mC*G. | 82% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 14032 | 912 | 105 | A.mU.G. G.mU.mC.A.G. G.mC.mC.mU.mU. Chl | 106 | P.mA.A.G. G.fC.fC.fU.G. A.fC.mC.A.mU* G*mC*A*mC*A*G. | 84% |
| 14033 | 753 | 107 | G.A.A.G.A.mC. A.mC. G.mU.mU.mU. G.Chl | 108 | P.mC.A.A.A.fC. G.fU. G.fU.fC.mU.mU.mC* mC*A*G*mU*mC* G. | 86% |
| 14034 | 918 | 109 | A.G. G.mC.mU.mU. G.mC.G.A.A. G.Chl | 110 | P.mC.fU.fU.fC.G.fC. A.A.G. G.mC.mC.mU*G* A*mC*mC*A*U. | 88% |
| 14035 | 744 | 111 | mU.A.mC.mC.G. A.mC.mU.G.G. A.A.G.Chl | 112 | P.mC.fU.fU.fC.fC.A. G.fU.fC.G.G.mU.A* A*G*mC*mC*G*C. | 95% |
| 14036 | 466 | 113 | A.mC.mC.G.mC. A.A.G. A.mU.mC.G. G.Chl | 114 | P.mC.fC.G. A.fU.fC.fU.fU.G.fC. G.G.mU*mU*G* G*mC*mC*G. | 73% |
| 14037 | 917 | 115 | mC.A.G. G.mC.mC.mU.mU. G.mC.G.A.A.Chl | 116 | P.mU.fU.fC.G.fC.A. A.G.G.fC.mC.mU.G* A*mC*mC*A*mU* G. | 86% |
| 14038 | 1038 | 117 | mC.G.A. G.mC.mU.A.A. A.mU.mU.mC.mU .Chl | 118 | P.mA.G.A. A.fU.fU.fU.A. G.fC.mU.mC.G* G*mU*A*mU*G*U. | 84% |
| 14039 | 1048 | 119 | mU.mC.mU. G.mU.G.G.A. G.mU.A.mU. G.Chl | 120 | P.mC.A.fU. A.fC.fU.fC.fC.A.fC. A.G.A* A*mU*mU*mU*A* G. | 87% |
| 14040 | 1235 | 121 | mC.G.G.A.G. A.mC.A.mU.G. G.mC.A.Chl | 122 | P.mU.G.fC.fC.A.fU. G.fU.fC.fU.mC.mC. G*mU*A*mC* A*mU*C. | 100% |
| 14041 | 868 | 123 | A.mU.G.A.mC. A.A.mC. G.mC.mC.mU.mC. Chl | 124 | P.mG.A.G.G.fC. G.fU.fU.G.fU.mC. A.mU*mU*G* G*mU*A*A. | 104% |
| 14042 | 1131 | 125 | G.A.G. G.mU.mC.A.mU. G.A.A.G.A.Chl | 126 | P.mU.fC.fU.fU.fC. A.fU.G. A.fC.mC.mU.mC* G*mC*mC*G*mU* C. | 85% |
| 14043 | 1043 | 127 | mU.A.A. A.mU.mU.mC.mU .G.mU.G.G. A.Chl | 128 | P.mU.fC.fC.A.fC.A. G.A.A.fU.mU.mU.A* G*mC*mU*mC*G. | 74% |
| 14044 | 751 | 129 | mU.G.G.A.A.G. A.mC.A.mC. G.mU.mU.Chl | 130 | P.mA.A.fC.G.fU. G.fU.fC.fU.fU.mC.mC. A*G*mU*mC*G* U. | 84% |
| 14045 | 1227 | 131 | A.A.G.A.mU. G.mU.A.mC.G. G.A.G.Chl | 132 | P.mC.fU.fC.fC.G.fU. A.fC. A.fU.mC.mU.mU*mC* mC*mU*G*mU*A. | 99% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 14046 | 867 | 133 | A.A.mU.G.A.mC.A.A.mC.G.mC.mC.mU.Chl | 134 | P.mA.G.G.fC.G.fU.fU.G.fU.fC.A.mU.mU*G*G*mU*A*A*C. | 94% |
| 14047 | 1128 | 135 | G.G.mC.G.A.G.mU.mC.A.mU.G.A.Chl | 136 | P.mU.fC.A.fU.G.A.fC.fC.fU.fC.G.mC.mC*G*mU*mC*A*G. | 89% |
| 14048 | 756 | 137 | G.A.mC.A.mC.G.mU.mU.mU.G.G.mC.mC.Chl | 138 | P.mG.G.fC.fC.A.A.A.fC.G.fU.G.mU.mC*mU*mU*mC*mC*A*G. | 93% |
| 14049 | 1234 | 139 | A.mC.G.G.A.G.A.mC.A.mU.G.G.mC.Chl | 140 | P.mG.fC.fC.A.fU.G.fU.fC.fU.fC.fC.mC.G.mU*A*mC*A*mU*mC*U. | 100% |
| 14050 | 916 | 141 | mU.mC.A.G.G.mC.mC.mU.mU.G.mC.G.A.Chl | 142 | P.mU.fC.G.fC.A.A.G.G.fC.fC.mU.G.A*mC*mC*A*mU*G*C. | 96% |
| 14051 | 925 | 143 | G.mC.G.A.A.G.mC.mU.G.A.mC.mC.mU.Chl | 144 | P.mA.G.G.fU.fC.A.G.fC.fU.fU.mC.G.mC*A*A*G*G*mC*C. | 80% |
| 14052 | 1225 | 145 | G.G.A.A.G.A.mU.G.mU.A.mC.G.G.Chl | 146 | P.mC.fC.G.fU.A.fC.A.fU.fC.fU.mU.mC.mC*mU*G*mU*A*G*U. | 96% |
| 14053 | 445 | 147 | G.mU.G.A.mC.mU.mU.mC.G.G.mC.mU.mC.Chl | 148 | P.mG.A.G.fC.fC.G.A.A.G.fU.mC.A.mC*A*G*A*A*G*A. | 101% |
| 14054 | 446 | 149 | mU.G.A.mC.mU.mU.mC.G.G.mC.mU.mC.mC.Chl | 150 | P.mG.G.A.G.fC.fC.G.A.A.G.mU.mC.A*mC*A*G*A*A*G. | 93% |
| 14055 | 913 | 151 | mU.G.G.mU.mC.A.G.G.mC.mC.mU.mU.G.Chl | 152 | P.mC.A.A.G.G.fC.fC.fU.G.A.mC.mC.A*mU*G*mC*A*mC*A. | 67% |
| 14056 | 997 | 153 | mU.mC.A.A.G.mU.mU.mU.G.A.G.mC.mU.Chl | 154 | P.mA.G.fC.fU.fC.A.A.A.fC.fU.mU.G.A*mU*A*G*G*mC*U. | 92% |
| 14057 | 277 | 155 | G.mC.mC.A.G.A.A.mC.mU.G.mC.A.G.Chl | 156 | P.mC.fU.G.fC.A.G.fU.fU.fC.fU.G.mC.mC*mC*G*A*mC*G*G. | 84% |
| 14058 | 1052 | 157 | mU.G.G.A.G.mU.A.mU.G.mU.A.mC.mC.Chl | 158 | P.mG.G.fU.A.fC.A.fU.A.fC.fU.mC.mC.A*mC*A*G*A*A*U. | n/a |
| 14059 | 887 | 159 | G.mC.mU.A.G.A.G.A.A.G.mC.A.G.Chl | 160 | P.mC.fU.G.fC.fU.fU.fC.fU.fC.fU.A.G.mC*mC*mU*G*mC*A*G. | 80% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 14060 | 914 | 161 | G.G.mU.mC.A.G.G.mC.mC.mU.mU.G.mC.Chl | 162 | P.mG.fC.A.A.G.G.fC.fC.fU.G.A.mC.mC*A*mU*G*mC*A*C. | 112% |
| 14061 | 1039 | 163 | G.A.G.mC.mU.A.A.A.mU.mU.mC.mU.G.Chl | 164 | P.mC.A.G.A.A.fU.fU.fU.A.G.mC.mU.mC*G*G*mU*A*mU*G. | 104% |
| 14062 | 754 | 165 | A.A.G.A.mC.A.mC.G.mU.mU.U.G.Chl | 166 | P.mC.fC.A.A.A.fC.G.fU.G.fU.mC.mU.mU*mC*mC*A*G*mU*C. | 109% |
| 14063 | 1130 | 167 | mC.G.A.G.G.mU.mC.A.mU.G.A.A.G.Chl | 168 | P.mC.fU.fU.fC.A.fU.G.A.fC.fC.mU.mC.G*mC*mC*G*mU*mC*A. | 103% |
| 14064 | 919 | 169 | G.G.mC.mC.mU.mU.G.mC.G.A.A.G.mC.Chl | 170 | P.mG.fC.fU.fU.fC.G.fC.A.A.G.G.mC.mC*mU*G*A*mC*mC*A. | 109% |
| 14065 | 922 | 171 | mC.mU.mU.G.mC.G.A.A.G.mC.mU.G.A.Chl | 172 | P.mU.fC.A.G.fC.fU.fU.fC.G.fC.A.A.G*G*mC*mC*mU*G*A. | 106% |
| 14066 | 746 | 173 | mC.mC.G.A.mC.mU.G.G.A.A.G.A.mC.Chl | 174 | P.mG.fU.fC.fU.fU.fC.fC.A.G.fU.mC.G.G*mU*A*A*G*mC*C. | 106% |
| 14067 | 993 | 175 | mC.mC.mU.A.mU.mC.A.A.G.mU.mU.mU.G.Chl | 176 | P.mC.A.A.A.fC.fU.fU.G.A.fU.A.G.G*mC*mU*mU*G*G*A. | 67% |
| 14068 | 825 | 177 | mU.G.mU.mU.mC.mC.A.A.G.A.mC.mC.mU.Chl | 178 | P.mA.G.G.fU.fC.fU.G.G.A.A.mC.A*G*G*mC*G*mC*U. | 93% |
| 14069 | 926 | 179 | mC.G.A.A.G.mC.mU.G.A.mC.mC.mU.G.Chl | 180 | P.mC.A.G.G.fU.fC.A.G.fC.fU.mU.mC.G*mC*A*A*G*G*C. | 95% |
| 14070 | 923 | 181 | mU.mU.G.mC.G.A.A.G.mC.mU.G.A.mC.Chl | 182 | P.mG.fU.fC.A.G.fC.fU.fU.fC.G.mC.A.A*G*G*mC*mC*mU*G. | 95% |
| 14071 | 866 | 183 | mC.A.A.mU.G.A.mC.A.A.mC.G.mC.mC.Chl | 184 | P.mG.G.fC.G.fU.fU.G.fU.fC.A.mU.mU.G*G*mU*A*A*mC*C. | 132% |
| 14072 | 563 | 185 | G.mU.A.mC.mC.A.G.mU.G.mC.A.mC.G.Chl | 186 | P.mC.G.fU.G.fC.A.fC.fU.G.G.mU.A.mC*mU*mU*G*mC*A*G. | n/a |
| 14073 | 823 | 187 | mC.mC.mU.G.mU.mU.mC.mC.A.A.G.A.mC.Chl | 188 | P.mG.fU.fC.fU.fU.G.G.A.A.fC.A.G.G*mC*G*mC*mU*mC*C. | 98% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 14074 | 1233 | 189 | mU.A.mC.G.G. A.G.A.mC. A.mU.G.G.Chl | 190 | P.mC.fC.A.fU. G.fU.fC.fU.fC.fC. G.mU.A*mC* A*mU*mC*mU*U. | 109% |
| 14075 | 924 | 191 | mU.G.mC.G.A. A.G.mC.mU.G. A.mC.mC.Chl | 192 | P.mG.G.fU.fC.A. G.fC.fU.fU.fC.G.mC. A*A*G*G*mC*mC* U. | 95% |
| 14076 | 921 | 193 | mC.mC.mU.mU. G.mC.G.A.A. G.mC.mU.G.Chl | 194 | P.mC.A. G.fC.fU.fU.fC.G.fC. A.A.G. G*mC*mC*mU*G* A*C. | 116% |
| 14077 | 443 | 195 | mC.mU.G.mU.G. A.mC.mU.mU.mC. G.G.mC.Chl | 196 | P.mG.fC.fC.G.A.A. G.fU.fC.A.mC.A.G* A*A*G*A*G. | 110% |
| 14078 | 1041 | 197 | G.mC.mU.A.A. A.mU.mU.mC.mU .G.mU.G.Chl | 198 | P.mC.A.fC.A.G.A. A.fU.fU.fU.A. G.mC*mU*mC*G* G*mU*A. | 99% |
| 14079 | 1042 | 199 | mC.mU.A.A. A.mU.mU.mC.mU .G.mU.G.G.Chl | 200 | P.mC.fC.A.fC.A.G. A.A.fU.fU.mU.A. G*mC*mU*mC*G* G*U. | 109% |
| 14080 | 755 | 201 | A.G.A.mC. A.mC. G.mU.mU.mU.G. G.mC.Chl | 202 | P.mG.fC.fC.A.A. A.fC.G.fU. G.mU.mC.mU*mU*m C*mC*A*G*U. | 121% |
| 14081 | 467 | 203 | mC.mC.G.mC.A. A.G.A.mU.mC. G.G.mC.Chl | 204 | P.mG.fC.C.fG.A. U.fC.fU.fU.fG.C.mG. G*mU*mU*G* G*mC*C. | 132% |
| 14082 | 995 | 205 | mU.A.mU.mC.A. A.G.mU.mU.mU. G.A.G.Chl | 206 | P.mC.fU.fC.A.A. A.fC.fU.fU.G.A.mU. A*G* G*mC*mU*mU*G. | 105% |
| 14083 | 927 | 207 | G.A.A. G.mC.mU.G. A.mC.mC.mU.G. G.Chl | 208 | P.mC.fC.A.G. G.fU.fC.A. G.fC.mU.mU.mC* G*mC*A*A*G*G. | 114% |
| 17356 | 1267 | 209 | A.mC.A.mU.mU. A.A.mC.mU.mC. A.mU.A.Chl | 210 | P.mU.A.fU.G.A. G.mU.fU.A.A.fU. G.fU*fC*fU*fC*fU*fC *A. | 120% |
| 17357 | 1267 | 211 | G.A.mC. A.mU.mU.A. A.mC.mU.mC. A.mU. A.Chl | 212 | P.mU.A.fU.G.A. G.mU.fU.A.A.fU. G.fU*fC*fU*fC*fU*fC *A. | 56% |
| 17358 | 1442 | 213 | mU.G.A.A.G.A. A.mU.G.mU.mU. A.A.Chl | 214 | P.mU.fU.A.A.fC. A.fU.fU.fC.fU.fU.fC. A*A*A*fC*fC*A* G. | 34% |
| 17359 | 1442 | 215 | mU.mU.G.A.A. G.A.A.mU. G.mU.mU.A. A.Chl | 216 | P.mU.fU.A.A.fC. A.fU.fU.fC.fU.fU.fC. A*A*A*fC*fC*A* G. | 31% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 17360 | 1557 | 217 | G.A.mU.A. G.mC. A.mU.mC.mU.mU .A.A.Chl | 218 | P.mU.fU.A.A.G. A.fU.G.fC.fU. A.fU.fC*fU*G* A*fU*G*A. | 59% |
| 17361 | 1557 | 219 | A.G.A.mU.A. G.mC. A.mU.mC.mU.mU .A.A.Chl | 220 | P.mU.fU.A.A.G. A.fU.G.fC.fU. A.fU.fC*fU*G* A*fU*G*A. | 47% |
| 17362 | 1591 | 221 | mU.G.A.A. G.mU.G.mU.A. A.mU.mU.A.Chl | 222 | P.mU.A.A.fU.fU. A.fC.A.fC.fU.fU.fC. A*A*A*fU*A*G* C. | 120% |
| 17363 | 1599 | 223 | A.A.mU.mU.G. A.G.A.A.G.G. A.A.Chl | 224 | P.mU.fU.fC.fC.fU.fU.f C.fU.fC.A.A.fU.fU* A*fC*A*fC*fU*U. | 71% |
| 17364 | 1601 | 225 | mU.mU.G.A.G. A.A.G.G.A.A. A.A.Chl | 226 | P.mU.fU.fU.fU.fC.fC.f U.fU.fC.fU.fC.A. A*fU*fU*A*fC*A* C. | 62% |
| 17365 | 1732 | 227 | mC. A.mU.mU.mC.mU .G. A.mU.mU.mC.G. A.Chl | 228 | P.mU.fC.G.A. A.fU.fC.A.G.A. A.fU.G*fU*fC*A* G*A*G. | 99% |
| 17366 | 1734 | 229 | mU.mU.mC.mU. G.A.mU.mU.mC. G.A.A.A.Chl | 230 | P.mU.fU.fU.fC.G.A. A.fU.fC.A.G.A. A*fU*G*fU*fC*A* G. | 97% |
| 17367 | 1770 | 231 | mC.mU. G.mU.mC.G. A.mU.mU.A.G. A.A.Chl | 232 | P.mU.fU.fC.fU.A. A.fU.fC.G.A.fC.A. G*G*A*fU*fU*C* C. | 45% |
| 17368 | 1805 | 233 | mU.mU.mU. G.mC.mC.mU. G.mU.A.A.mC. A.Chl | 234 | P.mU.G.fU.fU.A.fC. A.G.G.fC.A.A. A*fU*fU*fC*A*fC* U. | 71% |
| 17369 | 1805 | 235 | A.mU.mU.mU. G.mC.mC.mU. G.mU.A.A.mC. A.Chl | 236 | P.mU.G.fU.fU.A.fC. A.G.G.fC.A.A. A*fU*fU*fC*A*fC* U. | 67% |
| 17370 | 1815 | 237 | A.mC.A.A. G.mC.mC.A.G. A.mU.mU.A.Chl | 238 | P.mU.A.A.fU.fC.fU. G.G.fC.fU.fU. G.fU*fU*A*fC*A* G*G. | 65% |
| 17371 | 1815 | 239 | A.A.mC.A.A. G.mC.mC.A.G. A.mU.mU.A.Chl | 240 | P.mU.A.A.fU.fC.fU. G.G.fC.fU.fU. G.fU*fU*A*fC*A* G*G. | 35% |
| 17372 | 2256 | 241 | mC.A. G.mU.mU.mU. A.mU.mU.mU. G.mU.A.Chl | 242 | P.mU.A.fC.A.A. A.fU.A.A.A.fC.fU. G*fU*fC*fC*G*A* A. | 113% |
| 17373 | 2265 | 243 | mU.G.mU.mU.G. A.G.A.G.mU. G.mU.A.Chl | 244 | P.mU.A.fC. A.fC.fU.fC.fU.fC.A. A.fC.A*A*fU*A* A*A. | 35% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 17374 | 2265 | 245 | mU.mU.G.mU.mU.G.A.G.A.G.mU.G.mU.A.Chl | 246 | P.mU.A.fC.A.fC.fU.fC.fU.fC.A.fC.A*A*A*fU*A*A. | 31% |
| 17375 | 2295 | 247 | mU.G.mC.A.mC.mC.mU.mU.mU.mC.mU.A.A.Chl | 248 | P.mU.fU.A.G.A.A.A.G.G.fU.G.fC.A*A*A*fC*A*fU*G. | 34% |
| 17376 | 2295 | 249 | mU.mU.G.mC.A.mC.mC.mU.mU.mU.mC.mU.A.A.Chl | 250 | P.mU.fU.A.G.A.A.A.G.G.fU.G.fC.A*A*A*fC*A*fU*G. | 28% |
| 17377 | 1003 | 251 | mU.mU.G.A.G.mC.mU.mU.mU.mC.mU.G.A.Chl | 252 | P.mU.fC.A.G.A.A.A.G.fC.fU.fC.A.A*A*fC*fU*fU*G*A. | 67% |
| 17378 | 2268 | 253 | mU.G.A.G.A.G.mU.G.mU.G.A.mC.A.Chl | 254 | P.mU.G.fU.fC.A.fC.A.fC.fU.fC.fU.fC.A*A*fC*A*A*A*U. | 42% |
| 17379 | 2272 | 255 | A.G.mU.G.mU.G.A.mC.mC.A.A.A.A.Chl | 256 | P.mU.fU.fU.fU.G.G.fU.fC.A.fC.A.fC.fU*fC*fU*fC*A*A*C. | 35% |
| 17380 | 2272 | 257 | G.A.G.mU.G.mU.G.A.mC.mC.A.A.A.Chl | 258 | P.mU.fU.fU.fU.G.G.fU.fC.A.fC.A.fC.fU*fC*fU*fC*A*A*C. | 29% |
| 17381 | 2273 | 259 | G.mU.G.mU.G.A.mC.mC.A.A.A.A.Chl | 260 | P.mU.fU.fU.fU.fU.G.G.fU.fC.A.fC.A.fC*fU*fC*fU*fC*A*A. | 42% |
| 17382 | 2274 | 261 | mU.G.mU.G.A.mC.mC.A.A.A.G.A.Chl | 262 | P.mU.fC.fU.fU.fU.fU.G.G.fU.fC.A.fC.A*fC*fU*fC*fU*fC*A. | 42% |
| 17383 | 2274 | 263 | G.mU.G.mU.G.A.mC.mC.A.A.A.G.A.Chl | 264 | P.mU.fC.fU.fU.fU.fU.G.G.fU.fC.A.fC.A*fC*fU*fC*fU*fC*A. | 37% |
| 17384 | 2275 | 265 | G.mU.G.A.mC.mC.A.A.A.G.mU.A.Chl | 266 | P.mU.A.fC.fU.fU.fU.G.G.fU.fC.A.fC*A*fC*fU*fC*fU*fC. | 24% |
| 17385 | 2277 | 267 | G.A.mC.mC.A.A.A.G.mU.mU.A.Chl | 268 | P.mU.fU.A.A.fC.fU.fU.fU.fU.G.G.fU.fC*A*fC*A*fC*fU*C. | 27% |
| 17386 | 2296 | 269 | G.mC.A.mC.mC.mU.mU.mU.mC.mU.A.G.A.Chl | 270 | P.mU.fC.fU.A.G.A.A.A.G.G.fU.G.fC*A*A*A*fC*A*U. | 23% |
| 17387 | 2299 | 271 | mC.mC.mU.mU.mU.mC.mU.A.G.mU.mU.G.A.Chl | 272 | P.mU.fC.A.A.fC.fU.A.G.A.A.A.G*fU*G*fC*A*A. | 46% |
| 21138 | 2296 | 273 | G.mC.A.mC.mC.mU.mU.mU.mC.mU.A.G.A.TEG-Chl | 274 | P.mU.fC.fU.A.G.A.mA.A.G.G.fU.G.mC*A*A*A*mC*A*U. | 42% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 21139 | 2296 | 275 | G.mC.A.mC.mC.mU.mU.mU.mC.mU.A.G.A.TEG-Chl | 276 | P.mU.fC.fU.A.G.mA.A.mA.G.G.fU.G.mC*A*A*A*mC.A*U. | 32% |
| 21140 | 2296 | 277 | G.mC.A.mC.mC.mU.mU.mU.mC.mU.A.G.A.TEG-Chl | 278 | P.mU.fC.fU.A.G.A.A.A.G.G.fU.G.mC*A*mA*A*mC*A*U. | 41% |
| 21141 | 2296 | 279 | G.mC.A.mC.mC.mU.mU.mU.mC.mU.A.G.A.TEG-Chl | 280 | P.mU.fC.fU.A.G.A.mA.A.G.G.fU.G.mC*A*mA*A*mC*A*U. | 51% |
| 21142 | 2296 | 281 | G.mC.A.mC.mC.mU.mU.mU.mC.mU.A.G.A.TEG-Chl | 282 | P.mU.fC.fU.A.G.mA.A.mA.G.G.fU.G.mC*A*mA*A*mC*A*U. | 25% |
| 21143 | 2296 | 283 | G.mC.A.mC.mC.mU.mU.mU.mC.mU.A.G.A.TEG-Chl | 284 | P.mU.fC.fU.A.G.A.A.A.G.G.fU.G.fC*mA*mA*mA*fC*mA*U. | 61% |
| 21144 | 2296 | 285 | G.mC.A.mC.mC.mU.mU.mU.mC.mU.A.G.A.TEG-Chl | 286 | P.mU.fC.fU.A.G.A.mA.A.G.G.fU.G.fC*mA*mA*mA*fC*mA*U. | 49% |
| 21145 | 2296 | 287 | G.mC.A.mC.mC.mU.mU.mU.mC.mU.A.G.A.TEG-Chl | 288 | P.mU.fC.fU.A.G.mA.A.mA.G.G.fU.G.fC*mA*mA*mA*fC*mA*U. | 46% |
| 21146 | 2296 | 289 | G.mC.A.mC.mC.mU.mU.mU.mC.mU.mU.A*mG*mA.TEG-Chl | 290 | P.mU.fC.fU.A.G.A.A.A.G.G.fU.G.fC*A*A*A*fC*A*U. | 37% |
| 21147 | 2296 | 291 | mG*mC*A.mC.mC.mU.mU.mU.mC.mU.A*mG*mA.TEG-Chl | 292 | P.mU.fC.fU.A.G.A.A.A.G.G.fU.G.fC*A*A*A*fC*A*U. | 43% |
| 21148 | 2296 | 293 | mG*mC*mA.mC.mC.mU.mU.mU.mC.mU.mA*mG*mA.TEG-Chl | 294 | P.mU.fC.fU.A.G.A.A.A.G.G.fU.G.fC*A*A*A*fC*A*U. | 29% |
| 21149 | 2275 | 295 | G.mU.G.A.mC.mC.A.A.A.A.G*mU*mA.TEG-Chl | 296 | P.mU.A.fC.fU.fU.fU.fU.G.G.fU.fC.A.fC*A*fC*fU*fC*fU*C. | 138% |
| 21150 | 2275 | 297 | mG*mU*G.A.mC.mC.A.A.mA.A.G*mU*mA.TEG-Chl | 298 | P.mU.A.fC.fU.fU.fU.fU.G.G.fU.fC.A.fC*A*fC*fU*fC*fU*C. | 116% |
| 21151 | 2275 | 299 | mG*mU*mG.mA.mC.mC.mA.mA.mA.mA.mG*mU*mA.TEG-Chl | 300 | P.mU.A.fC.fU.fU.fU.fU.G.G.fU.fC.A.fC*A*fC*fU*fC*fU*C. | 105% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 21152 | 2295 | 301 | mU.mU.G.mC.A.mC.mC.mU.mU.mU.mC.mU.A.A.TEG-Chl | 302 | P.mU.fU.A.G.A.mA.A.G.G.fU.G.fC.A.A*A*fC*A*fA*G*G. | 46% |
| 21153 | 2295 | 303 | mU.mU.G.mC.A.mC.mC.mU.mU.mU.mC.mU.A.A.TEG-Chl | 304 | P.mU.fU.A.G.A.mA.A.mA.G.G.fU.G.fC.A.A*A*fC*A*fA*G*G. | 28% |
| 21154 | 2295 | 305 | mU.mU.G.mC.A.mC.mC.mU.mU.mU.mC.mU.A.A.TEG-Chl | 306 | P.mU.fU.A.mA.G.mA.A.mA.G.mG.fU.G.fC.A.A*A*fC*A*fA*G*G. | 28% |
| 21155 | 2295 | 307 | mU.mU.G.mC.A.mC.mC.mU.mU.mU.mC.mU.A.A.TEG-Chl | 308 | P.mU.fU.A.G.A.mA.A.G.G.fU.G.mC.A.A*A*mC*A*mA*G*G. | 60% |
| 21156 | 2295 | 309 | mU.mU.G.mC.A.mC.mC.mU.mU.mU.mC.mU.A.A.TEG-Chl | 310 | P.mU.fU.A.G.A.mA.A.G.G.fU.G.fC.A.mA*mA*fC*mA*fA*mG*G. | 54% |
| 21157 | 2295 | 311 | mU.mU.G.mC.A.mC.mC.mU.mU.mU.mC.mU.A.A.TEG-Chl | 312 | P.mU.fU.A.G.A.mA.A.G.G.fU.G.fC.mA.mA*mA*fC*mA*fA*mG*G. | 40% |
| 21158 | 2295 | 313 | mU.mU.G.mC.A.mC.mC.mU.mU.mU.mC.mU.A.A.TEG-Chl | 314 | P.mU.fU.A.G.A.mA.A.G.G.fU.G.fC.A.mA*mA*fC*mA*mA*mG*G. | n/a |
| 21159 | 2295 | 315 | mU.mU.G.mC.A.mC.mC.mU.mU.mU.mC.mU.A.A.TEG-Chl | 316 | P.mU.fU.A.G.A.mA.A.G.G.fU.G.fC.A.mA*mA*mC*mA*mA*mG*G. | 41% |
| 21160 | 2295 | 317 | mU.mU.G.mC.A.mC.mC.mU.mU.mU.mC.mU.A.A.Chl-TEG | 318 | P.mU.fU.A.G.A.mA.A.G.G.fU.G.fC.mA.mA*mA*mC*mA*mA*mG*mG. | 65% |
| 21161 | 2295 | 319 | mU.mU.G.mC.A.mC.mC.mU.mU.mU.mC.mU.A.A.TEG-Chl | 320 | P.mU.fU.A.G.A.mA.A.G.G.fU.G.fC.A.A*A*fC*A*mA*mG*G. | 43% |
| 21162 | 2295 | 321 | mU.mU.G.mC.A.mC.mC.mU.mU.mU.mC.mU.A.A.TEG-Chl | 322 | P.mU.fU.A.G.A.mA.A.G.G.fU.G.fC.mA.A*mA*fC*A*mA*mG*G. | 41% |
| 21163 | 2295 | 323 | mU.mU.G.mC.A.mC.mC.mU.mU.mU.mC.mU.A*A*TEG-Chl | 324 | P.mU.fU.A.G.A.A.A.G.G.fU.G.fC.A.A*A*fC*A*A*G*G. | 32% |
| 21164 | 2295 | 325 | mU.mU.G.mC.A.mC.mC.mU.mU.mU.mC.mU.mA*mA*TEG-Chl | 326 | P.mU.fU.A.G.A.A.A.G.G.fU.G.fC.A.A*A*fC*A*A*G*G. | 39% |
| 21165 | 2295 | 327 | mU*mU*G.mC.A.mC.mC.mU.mU.mU.mC.mU.mA*mA*TEG-Chl | 328 | P.mU.fU.A.G.A.A.A.G.G.fU.G.fC.A.A*A*fC*A*A*G*G. | 28% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 21166 | 2295 | 329 | mU.mU.mG.mC.mA.mC.mC.mU.mU.mU.mC.mU.mA*mA*TEG-Chl | 330 | P.mU.fU.A.G.A.A.A.G.G.fU.G.fC.A.A*A*fC*A*A*G*G. | 27% |
| 21167 | 2299 | 331 | mC.mC.mU.mU.mU.mC.mU.A.G.mU.mU.G.A.TEG-Chl | 332 | P.mU.fC.A.A.fC.fU.A.G.A.mA.A.G.G*fU*G*fC*A*A*A. | 49% |
| 21168 | 2299 | 333 | mC.mC.mU.mU.mU.mC.mU.A.G.mU.mU.G.A.TEG-Chl | 334 | P.mU.fC.A.A.fC.fU.A.G.A.mA.A.G.G*mU*G*mC*A*A*A. | 53% |
| 21169 | 2299 | 335 | mC.mC.mU.mU.mU.mC.mU.A.G.mU.mU.G.A.TEG-Chl | 336 | P.mU.fC.A.A.fC.fU.A.G.mA.A.A.mG.G*fU*G*fC*A*A*A. | 47% |
| 21170 | 2299 | 337 | mC.mC.mU.mU.mU.mC.mU.A.G.mU.mU.G.A.TEG-Chl | 338 | P.mU.fC.A.A.fC.fU.A.G.mA.A.A.mG.G*mU*G*mC*A*A*A. | 70% |
| 21171 | 2299 | 339 | mC.mC.mU.mU.mU.mC.mU.A.G.mU.mU.G.A.TEG-Chl | 340 | P.mU.fC.A.A.fC.fU.A.G.A.mA.A.G.G*mU*G*mC*A*mA*A. | 65% |
| 21172 | 2299 | 341 | mC.mC.mU.mU.mU.mC.mU.A.G.mU.mU.G.A.TEG-Chl | 342 | P.mU.fC.A.A.fC.fU.A.G.A.mA.A.G.G*mU*G*mC*mA*mA*A. | 43% |
| 21173 | 2299 | 343 | mC.mC.mU.mU.mU.mC.mU.A.G.mU.mU.G.A.TEG-Chl | 344 | P.mU.fC.A.A.fC.fU.A.G.A.mA.A.G.mG*mU*mG*mC*mA*mA*A. | 52% |
| 21174 | 2299 | 345 | mC.mC.mU.mU.mU.mC.mU.A.G.mU.mU.G.A.TEG-Chl | 346 | P.mU.fC.A.A.fC.fU.A.G.A.mA.A.G.G*mU*mG*mC*mA*mA*A. | 47% |
| 21175 | 2299 | 347 | mC.mC.mU.mU.mU.mC.mU.A.G.mU.mU.G.A.TEG-Chl | 348 | P.mU.fC.A.A.fC.fU.A.G.A.mA.A.G.G*fU*mG*fC*mA*mA*A. | 35% |
| 21176 | 2299 | 349 | mC.mC.mU.mU.mU.mC.mU.A.G.mU.mU.G.A.TEG-Chl | 350 | P.mU.fC.A.A.fC.fU.A.G.mA.A.A.mG.G*fU*mG*fC*mA*mA*A. | 50% |
| 21177 | 2299 | 351 | mC.mC.mU.mU.mU.mC.mU.A.G.mU.mU*mG*mA.TEG-Chl | 352 | P.mU.fC.A.A.fC.fU.A.G.A.A.A.G.G*fU*G*fC*A*A*A. | 37% |
| 21178 | 2299 | 353 | mC*mC*mU.mU.mU.mC.mU.A.G.mU.mU*mG*mA.TEG-Chl | 354 | P.mU.fC.A.A.fC.fU.A.G.A.A.A.G.G*fU*G*fC*A*A*A. | 36% |
| 21179 | 2299 | 355 | mC*mC*mU.mU.mU.mC.mU.mA.mG.mU.mU*mG*mA.TEG-Chl | 356 | P.mU.fC.A.A.fC.fU.A.G.A.A.A.G.G*fU*G*fC*A*A*A. | 35% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 21203 | 2296 | 357 | G.mC.A.mC.mC.mU.mU.mU.mC.mU.A*mG*mA.TEG-Chl | 358 | P.mU.fC.fU.A.G.A.mA.A.G.G.fU.G.mC*A*A*mC*A*U. | 40% |
| 21204 | 2296 | 359 | G.mC.A.mC.mC.mU.mU.mU.mC.mU.A*mG*mA.TEG-Chl | 360 | P.mU.fC.fU.A.G.mA.A.mA.G.G.fU.G.mC*A*A*mC*A*U. | 28% |
| 21205 | 2296 | 361 | G.mC.A.mC.mC.mU.mU.mU.mC.mU.A*mG*mA.TEG-Chl | 362 | P.mU.fC.fU.A.G.mA.A.mA.G.G.fU.G.mC*A*mA*A*mC*A*U. | 51% |
| 21206 | 2296 | 363 | mG*mC*A.mC.mC.mU.mU.mU.mC.mU.A*mG*mA.TEG-Chl | 364 | P.mU.fC.fU.A.G.A.mA.A.G.G.fU.G.mC*A*A*A*mC*A*U. | 46% |
| 21207 | 2296 | 365 | mG*mC*A.mC.mC.mU.mU.mU.mC.mU.A*mG*mA.TEG-Chl | 366 | P.mU.fC.fU.A.G.mA.A.mA.G.G.fU.G.mC*A*A*mC*A*U. | 29% |
| 21208 | 2296 | 367 | mG*mC*A.mC.mC.mU.mU.mU.mC.mU.A*mG*mA.TEG-Chl | 368 | P.mU.fC.fU.A.G.mA.A.mA.G.G.fU.G.mC*A*mA*A*mC*A*U. | 72% |
| 21209 | 2296 | 369 | mG*mC*mA.mC.mC.mU.mU.mU.mC.mU.mA*mG*mA.TEG-Chl | 370 | P.mU.fC.fU.A.G.A.mA.A.G.G.fU.G.mC*A*A*A*mC*A*U. | 89% |
| 21210 | 2296 | 371 | mG*mC*mA.mC.mC.mU.mU.mU.mC.mU.mA*mG*mA.TEG-Chl | 372 | P.mU.fC.fU.A.G.mA.A.mA.G.G.fU.G.mC*A*A*mC*A*U. | 65% |
| 21211 | 2296 | 373 | mG*mC*mA.mC.mC.mU.mU.mU.mC.mU.mA*mG*mA.TEG-Chl | 374 | P.mU.fC.fU.A.G.mA.A.mA.G.G.fU.G.mC*A*mA*A*mC*A*U. | 90% |
| 21212 | 2295 | 375 | mU.mU.G.mC.A.mC.mC.mU.mU.mU.mC.mU*mA*mA.TEG-Chl | 376 | P.mU.fU.A.G.A.mA.A.G.G.fU.G.fC.mA.mA*mA*fC*mA*mA*mG*G. | 60% |
| 21213 | 2295 | 377 | mU.mU.G.mC.A.mC.mC.mU.mU.mU.mC.mU*mA*mA.TEG-Chl | 378 | P.mU.fU.A.G.A.mA.A.G.G.fU.G.fC.A.mA*mA*mC*mA*mA*mG*G. | 63% |
| 21214 | 2295 | 379 | mU.mU.G.mC.A.mC.mC.mU.mU.mU.mC.mU*mA*mA.TEG-Chl | 380 | P.mU.fU.A.G.A.mA.A.G.G.fU.G.fC.A.A*A*fC*A*mA*mG*G. | 52% |
| 21215 | 2295 | 381 | mU.mU.G.mC.A.mC.mC.mU.mU.mU.mC.mU*mA*mA.TEG-Chl | 382 | P.mU.fU.A.G.A.mA.A.G.G.fU.G.fC.mA.A*mA*fC*A*mA*mG*G. | 45% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 21216 | 2295 | 383 | mU*mU*G.mC.A.mC.mC.mU.mU.mU.mC.mU*mA*mA.TEG-Chl | 384 | P.mU.fU.A.G.A.mA.A.G.G.fU.G.fC.mA.mA*mA*fC*mA*mA*mG*G. | 65% |
| 21217 | 2295 | 385 | mU*mU*G.mC.A.mC.mC.mU.mU.mU.mC.mU*mA*mA.TEG-Chl | 386 | P.mU.fU.A.G.A.mA.A.G.G.fU.G.fC.A.mA*mA*mC*mA*mA*mG*G. | 69% |
| 21218 | 2295 | 387 | mU*mU*G.mC.A.mC.mC.mU.mU.mU.mC.mU*mA*mA.TEG-Chl | 388 | P.mU.fU.A.G.A.mA.A.G.G.fU.G.fC.A.A*A*fC*A*mA*mG*G. | 62% |
| 21219 | 2295 | 389 | mU*mU*G.mC.A.mC.mC.mU.mU.mU.mC.mU*mA*mA.TEG-Chl | 390 | P.mU.fU.A.G.A.mA.A.G.G.fU.G.fC.mA.A*mA*fC*A*mA*mG*G. | 54% |
| 21220 | 2295 | 391 | mU.mU.mG.mC.mA.mC.mC.mU.mU.mU.mC.mU*mA*mA.TEG-Chl | 392 | P.mU.fU.A.G.A.mA.A.G.G.fU.G.fC.mA.mA*mA*mA*fC*mA*mA*mG*G. | 52% |
| 21221 | 2295 | 393 | mU.mU.mG.mC.mA.mC.mC.mU.mU.mU.mC.mU*mA*mA.TEG-Chl | 394 | P.mU.fU.A.G.A.mA.A.G.G.fU.G.fC.A.mA*mA*mC*mA*mA*mG*G. | 53% |
| 21222 | 2295 | 395 | mU.mU.mG.mC.mA.mC.mC.mU.mU.mU.mC.mU*mA*mA.TEG-Chl | 396 | P.mU.fU.A.G.A.mA.A.G.G.fU.G.fC.A.A*A*fC*A*mA*mG*G. | 43% |
| 21223 | 2295 | 397 | mU.mU.mG.mC.mA.mC.mC.mU.mU.mU.mC.mU*mA*mA.TEG-Chl | 398 | P.mU.fU.A.G.A.mA.A.G.G.fU.G.fC.mA.A*mA*fC*A*mA*mG*G. | 43% |
| 21224 | 2299 | 399 | mC.mC.mU.mU.mU.mC.mU.A.G.mU.mU*mG*mA.TEG-Chl | 400 | P.mU.fC.A.A.fC.fU.A.G.A.mA.A.G.G*fU*mG*fC*mA*mA*A. | 60% |
| 21225 | 2299 | 401 | mC*mC*mU.mU.mU.mC.mU.A.G.mU.mU*mG*mA.TEG-Chl | 402 | P.mU.fC.A.A.fC.fU.A.G.A.mA.A.G.G*fU*mG*fC*mA*mA*A. | 67% |
| 21226 | 2299 | 403 | mC*mC*mU.mU.mU.mC.mU.mA.mG.mU.mU*mG*mA.TEG-Chl | 404 | P.mU.fC.A.A.fC.fU.A.G.A.mA.A.G.G*fU*mG*fC*mA*mA*A. | 66% |
| 21227 | 2296 | 405 | G.mC.A.mC.mC.mU.mU.mU.mC.mU.A*mG*mA.TEG-Chl | 406 | P.mU.fC.fU.A.G.mA.A.mA.G.G.fU.G.fC*mA*mA*mA*fC*mA*U. | 49% |
| 20584 | 2296 | 407 | G.mC.A.mC.mC.mU.mU.mU.mC.mU.A.G.A.Chl-TEG | 408 | P.mU.fC.fU.A.G.A.A.A.G.G.mU.G.mC*A*A*A*mC*A*U. | 70% |
| 20585 | 2296 | 409 | G.mC.A.mC.mC.mU.mU.mU.mC.mU.A.G.A.Chl-TEG | 410 | P.mU.fC.fU.A.G.A.A.A.G.G.fU.G.mC*A*A*A*mC*A*U. | 15% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 20586 | 2296 | 411 | G.mC.A.mC.mC.mU.mU.mU.mC.mU.A.G.A.Chl-TEG | 412 | P.mU.C.U.A.G.A.A.A.G.G.mU.G.mC*A*A*A*mC*A*U. | 30% |
| 20587 | 2296 | 413 | G.mC.A.mC.mC.mU.mU.mU.mC.mU.A.G.A.Chl-TEG | 414 | P.mU.fC.fU.A.G.A.A.A.G.G.fU.G.fC*mA*mA*mA*fC*mA*U. | 32% |
| 20616 | 2275 | 415 | G.mU.G.A.mC.mC.A.A.A.A.G.mU.A.Chl-TEG | 416 | P.mU.A.fC.fU.fU.fU.G.G.fU.mC.A.mC*A*mC*mU*mC*mU*C. | 22% |
| 20617 | 2275 | 417 | G.mU.G.A.mC.mC.A.A.A.A.G.mU.A.Chl-TEG | 418 | P.mU.A.fC.fU.fU.fU.fU.G.G.fU.fC.A.mC*A*fC*mU*fC*mU*C. | 18% |
| 20618 | 2275 | 419 | G.mU.G.A.mC.mC.A.A.A.A.G.mU.A.Chl-TEG | 420 | P.mU.A.C.U.U.U.U.G.G.U.mC.A.mC*A*mC*mU*mC*mU*C. | 36% |
| 20619 | 2275 | 421 | G.mU.G.A.mC.mC.A.A.A.A.G.mU.A.Chl-TEG | 422 | P.mU.A.fC.fU.fU.fU.fU.G.G.fU.fC.A.mC*mA*mC*mU*mC*mU*C. | 28% |
| 21381 | 2275 | 423 | G.mU.G.A.mC.mC.A.A.A.A.G*mU*mA.TEG-Chl | 424 | P.mU.A.fC.fU.fU.fU.fU.G.G.fU.mC.A.mC*A*mC*mU*mC*mU*C. | 28% |
| 21382 | 2275 | 425 | G.mU.G.A.mC.mC.A.A.A.A.G*mU*mA.TEG-Chl | 426 | P.mU.A.fC.fU.fU.fU.fU.G.G.fU.fC.A.mC*A*fC*mU*fC*mU*C. | 28% |
| 21383 | 2275 | 427 | mG*mU*mG.mA.mC.mC.mA.mA.mA.mA.mG*mU*mA.TEG-Chl | 428 | P.mU.A.fC.fU.fU.fU.fU.G.G.fU.mC.A.mC*A*mC*mU*mC*mU*C. | 43% |
| 21384 | 2275 | 429 | mG*mU*mG.mA.mC.mC.mA.mA.mA.mA.mG*mU*mA.TEG-Chl | 430 | P.mU.A.fC.fU.fU.fU.fU.G.G.fU.fC.A.mC*A*fC*mU*fC*mU*C. | 50% |
| 20392 | 2275 | 431 | G.mU.G.A.mC.mC.A.A.A.A.G.mU.A.TEG-Chl | 432 | P.mU.A.fC.fU.fU.fU.fU.G.G.fU.fC.A.fC*A*fC*fU*fC*fU*C. | 28% |
| 20393 | 2296 | 433 | G.mC.A.mC.mC.mU.mU.mU.mC.mU.A.G.A.TEG-Chl | 434 | P.mU.fC.fU.A.G.A.A.A.G.G.fU.G.fC*A*A*A*fC*A*U. | 35% |
| 21429 | 2275 | 435 | G.mU.G.A.mC.mC.A.A.A.A.G*mU*mA.Teg-Chl | 436 | P.mU.A.fC.fU.fU.fU.fU.G.G.fU.fC.A.mC*A*fC*mU*fC*mU*C. | 36% |

TABLE 1-continued

CTGF sd-rxRNA sequences (Accession Number: NM_001901.2)

| Oligo Number | Start Site | SEQ ID NO: | Sense sequence | SEQ ID NO | Antisense sequence | % remaining mRNA expression (1 uM sd-rxRNA, A549) |
|---|---|---|---|---|---|---|
| 21430 | 2275 | 437 | G.mU.G. A.mC.mC.A. A.mA.A. G*mU*mA.Teg-Chl | 438 | P.mU. A.fC.fU.fU.fU.fU.G. G.fU.mC.A.mC* A*mC*mU*mC*mU* C. | 31% |

Key
Chl = cholesterol
TEG-chl = cholesterol with TEG linker
M = 2'Ome
F = 2'fluoro
* = phosphorothioate linkage
. = phosphodiester linkage In some embodiments, the nucleic acid molecule is RXI-109, comprising a sense strand sequence of: G.mC. A.mC.mC.mU.mU.mU.mC.mU. A*mG*mA.TEG-Chl (e.g., SEQ ID NO: 359) and an antisense strand sequence of: P.mU.fC.fU. A. G.mA. A.mA. G. G.fU. G.mC*A*A*mC*A*U (e.g., SEQ ID NO: 360).

Matrix Metalloproteinases

In some aspects, the disclosure relates to the use of nucleic acids, such as sd-rxRNA, targeting matrix metalloproteinases (MMPs). As used herein, "matrix metalloproteinase" refers to a zinc-dependent endopeptidase that is capable of degrading extracellular matrix proteins, including but not limited to collagen, gelatin, fibronectin, laminin, cholesterol sulfate, aggrecan, fibrinogen and fibrin. MMPs have been linked to several cell behaviors, for example cell proliferation, cell migration, cell differentiation, angiogenesis, apoptosis and immune function. Several genes encode MMPs, including but not limited to MMP1, MMP2, MMP3, MMP7, MMP8, MMP9, MMP10, MMP11, MMP12, MMP13, MMP14, MMP15, MMP16, MMP17, MMP19, MMP20, MMP21, MMP23A/B, MMP24, MMP25, MMP26, MMP27 and MMP28. In some embodiments, the sd-rxRNA targets an MMP that degrades or breaks down interstitial collagen. In some embodiments, the interstitial collagen is collagen I, collagen II and/or collagen III. In some embodiments, the sd-rxRNA targets MMP1. Examples of nucleic acids (e.g., sd-rxRNAs) targeting MMP1 are shown in Tables 2-5, below, incorporated by reference from PCT Publication No. WO 2016/037071.

TABLE 2

MMP1 Sense Strand Oligonucleotides

| Oligo Number | Start Site | SEQ ID NO: | Sense sequence | Sense Chemistry | Sense Backbone |
|---|---|---|---|---|---|
| MMP1-1 | 481 | 439 | CCUACAGGAUUGA | mmm0m00m0mmmm-Chl | ooooooooooosso |
| MMP1-2 | 483 | 440 | UACAGGAUUGAAA | mmm00m0mm00mm-Chl | ooooooooooosso |
| MMP1-3 | 486 | 441 | AGGAUUGAAAAUA | mm00mm00m00mm-Chl | ooooooooooosso |
| MMP1-4 | 491 | 442 | UGAAAAUUACACA | m00m00mm0m0mm-Chl | ooooooooooosso |
| MMP1-5 | 738 | 443 | GAAAGGUGGACCA | mm0m00m000mmm-Chl | ooooooooooosso |
| MMP1-6 | 739 | 444 | AAAGGUGGACCAA | mm000m000mmmm-Chl | ooooooooooosso |
| MMP1-7 | 869 | 445 | UGAUGUUCAGCUA | mm0m0mmm00mmm-Chl | ooooooooooosso |
| MMP1-8 | 984 | 446 | ACCUUUGAUGCUA | mmmmmm00m0mmm-Chl | ooooooooooosso |
| MMP1-9 | 987 | 447 | UUUGAUGCUAUAA | mmm00m0mm0mmm-Chl | ooooooooooosso |
| MMP1-10 | 988 | 448 | UUGAUGCUAUAAA | mm00mm0mm00mm-Chl | ooooooooooosso |
| MMP1-11 | 989 | 449 | UGAUGCUAUAACA | mm0m0mmm00mm-Chl | ooooooooooosso |
| MMP1-12 | 1042 | 450 | ACAUGCGCACAAA | mm0m0m0m0mmm-Chl | ooooooooooosso |
| MMP1-13 | 1044 | 451 | AUGCGCACAAAUA | mm0m0mm000mm-Chl | ooooooooooosso |
| MMP1-14 | 1150 | 452 | AUGAAGUCCGGUA | mm00m0mmm00mm-Chl | ooooooooooosso |

TABLE 2-continued

MMP1 Sense Strand Oligonucleotides

| Oligo Number | Start Site | SEQ ID NO: | Sense sequence | Sense Chemistry | Sense Backbone |
|---|---|---|---|---|---|
| MMP1-15 | 1151 | 453 | UGAAGUCCGGUUA | mm000mmm00mmm-Chl | ooooooooooosso |
| MMP1-19 | 1155 | 454 | GUCCGGUUUUUCA | mmmm00mmmmmmm-Chl | ooooooooooosso |
| MMP1-20 | 1156 | 455 | UCCGGUUUUUCAA | mmm00mmmmmmmm-Chl | ooooooooooosso |
| MMP1-16 | 1157 | 456 | CCGGUUUUUCAAA | mm00mmmmmm0mm-Chl | ooooooooooosso |
| MMP1-17 | 1158 | 457 | CGGUUUUUCAAAA | mm0mmmmmm00mm-Chl | ooooooooooosso |
| MMP1-18 | 1159 | 458 | GGUUUUUCAAAGA | mmmmmmmm000mm-Chl | ooooooooooosso |
| MMP1-21 | 1330 | 459 | GGAGGUAUGAUGA | mm000m0m00mmm-Chl | ooooooooooosso |
| MMP1-22 | 1331 | 460 | GAGGUAUGAUGAA | mm00m0m00m0mm-Chl | ooooooooooosso |
| MMP1-23 | 1332 | 461 | AGGUAUGAUGAAA | mm0m0m0m00mm-Chl | ooooooooooosso |
| MMP1-24 | 1334 | 462 | GUAUGAUGAAUAA | mm0m0m000mmm-Chl | ooooooooooosso |
| MMP1-25 | 1336 | 463 | AUGAUGAAUAUAA | mm00m000m0mm-Chl | ooooooooooosso |
| MMP1-26 | 1339 | 464 | AUGAAUAUAAACA | mm000m0m000mm-Chl | Ooooooooooosso |
| MMP1-27 | 1359 | 465 | GAUCCAGGUUAUA | mmmmm000mm0mm-Chl | ooooooooooosso |
| MMP1-28 | 1360 | 466 | AUCCAGGUUAUCA | mmmm000mm0mm-Chl | ooooooooooosso |
| MMP1-40 | 1372 | 467 | CCAAAAUGAUAGA | mm0m0m00m0mm-Chl | ooooooooooosso |
| MMP1-29 | 1373 | 468 | CAAAAUGAUAGCA | mm000m00m00mm-Chl | ooooooooooosso |
| MMP1-30 | 1374 | 469 | AAAAUGAUAGCAA | mm0m00m00mmm-Chl | ooooooooooosso |
| MMP1-31 | 1393 | 470 | UUCCUGGAAUUGA | mmmmm00m0mmmm-Chl | ooooooooooosso |
| MMP1-32 | 1517 | 471 | UAAUAGCUGGUUA | mm0m00mm00mmm-Chl | ooooooooooosso |
| MMP1-33 | 1518 | 472 | AAUAGCUGGUUCA | mmm00mm00mmmm-Chl | ooooooooooosso |
| MMP1-34 | 1519 | 473 | AUAGCUGGUUCAA | mm00mm00mmmm-Chl | ooooooooooosso |
| MMP1-35 | 1520 | 474 | UAGCUGGUUCAAA | mm0mm00mmm0mm-Chl | ooooooooooosso |
| MMP1-36 | 1521 | 475 | AGCUGGUUCAACA | mmmm00mm00mm-Chl | ooooooooooosso |
| MMP1-37 | 1522 | 476 | GCUGGUUCAACUA | mmm00mmm00mm-Chl | ooooooooooosso |
| MMP1-38 | 1523 | 477 | CUGGUUCAACUGA | mm00mmm00mmmm-Chl | ooooooooooosso |
| MMP1-39 | 1524 | 478 | UGGUUCAACUGCA | mm0mmm00mm0mm-Chl | ooooooooooosso |
| MMP1-41 | 1525 | 479 | GGUUCAACUGCAA | mmmmm00mm0mmm-Chl | ooooooooooosso | o: phosphodiester,
s: phosphorothioate;
P: 5' phosphorylation;
O: 2'-OH;
f: 2'-fluoro;
m: 2' O-methyl;
Chl: cholesterol.

TABLE 3

MMP1 Antisense Strand Oligonucleotides

| Oligo Number | SEQ ID NO: | Antisense sequence | AntiSense Chemistry | AntiSense Backbone |
|---|---|---|---|---|
| MMP1-1 | 480 | UCAAUCCUGUAGGUCAGAU | Pm00ffff0f000ff00m0 | ooooooooooooossssso |
| MMP1-2 | 481 | UUUCAAUCCUGUAGGUCAG | Pmfff00ffff0f000ff00 | ooooooooooooossssso |
| MMP1-3 | 482 | UAUUUCAAUCCUGUAGGU | Pm0fffff00ffff0f00m0 | ooooooooooooossssso |
| MMP1-4 | 483 | UGUGUAAUUUCAAUCCUG | Pm0f0f00fffff00ffff0 | ooooooooooooossssso |
| MMP1-5 | 484 | UGGUCCACCUUUCAUCUUC | Pm00fff0fffffff0ffff0 | ooooooooooooossssso |
| MMP1-6 | 485 | UUGGUCCACCUUUCAUCUU | Pmf00fff0fffffff0fff0 | ooooooooooooossssso |
| MMP1-7 | 486 | UAGCUGAACAUCACCACUG | Pm00ff000f0ff0ff0f0 | ooooooooooooossssso |
| MMP1-8 | 487 | UAGCAUCAAAGGUUAGCUU | Pm00f0ff00m00ff00ff0 | ooooooooooooossssso |
| MMP1-9 | 488 | UUAUAGCAUCAAAGGUUAG | Pmf0f00f0ff00m00ff00 | ooooooooooooossssso |
| MMP1-10 | 489 | UUUAUAGCAUCAAAGGUUA | Pmff0f00f0ff00m00ff0 | ooooooooooooossssso |
| MMP1-11 | 490 | UGUUAUAGCAUCAAAGGUU | Pm0ff0f00f0ff00m00f0 | ooooooooooooossssso |
| MMP1-12 | 491 | UUUGUGCGCAUGUAGAAUC | Pmff0f0f0f0f0f00m0f0 | ooooooooooooossssso |
| MMP1-13 | 492 | UAUUUGUGCGCAUGUAGAA | Pm0fff0f0f0f0f0f00m0 | ooooooooooooossssso |
| MMP1-14 | 493 | UACCGGACUUCAUCUCUGU | Pm0ff000ffff0fffff00 | ooooooooooooossssso |
| MMP1-15 | 494 | UAACCGGACUUCAUCUCUG | Pm00ff000ffff0fffff0 | ooooooooooooossssso |
| MMP1-19 | 495 | UGAAAAACCGGACUUCAUC | Pm000m00ff000ffff0f0 | ooooooooooooossssso |
| MMP1-20 | 496 | UUGAAAAACCGGACUUCAU | Pmf000m00ff000ffff00 | ooooooooooooossssso |
| MMP1-16 | 497 | UUUGAAAAACCGGACUUCA | Pmff000m00ff000ffff0 | ooooooooooooossssso |
| MMP1-17 | 498 | UUUUGAAAAACCGGACUUC | Pmfff000m00ff000fff0 | ooooooooooooossssso |
| MMP1-18 | 499 | UCUUUGAAAAACCGGACUU | Pmffff000m00ff000ff0 | ooooooooooooossssso |
| MMP1-21 | 500 | UCAUCAUACCUCCAGUAUU | Pmf0ff0f0fffff00f0f0 | ooooooooooooossssso |
| MMP1-22 | 501 | UUCAUCAUACCUCCAGUAU | Pmff0ff0f0fffff00f00 | ooooooooooooossssso |
| MMP1-23 | 502 | UUUCAUCAUACCUCCAGUA | Pmfff0ff0f0fffff00f0 | ooooooooooooossssso |
| MMP1-24 | 503 | UUAUUCAUCAUACCUCCAG | Pm0fff0ff0f0fffff00 | ooooooooooooossssso |
| MMP1-25 | 504 | UUAUAUUCAUCAUACCUCC | Pmf0f0fff0ff0f0fffff0 | ooooooooooooossssso |
| MMP1-26 | 505 | UGUUUAUAUUCAUCAUACC | Pm0fff0f0fff0ff0f0f0 | ooooooooooooossssso |
| MMP1-27 | 506 | UAUAACCUGGAUCCAUAGA | Pm0f00fff000fff0f000 | ooooooooooooossssso |
| MMP1-28 | 507 | UGAUAACCUGGAUCCAUAG | Pm00f00fff000fff0f00 | ooooooooooooossssso |
| MMP1-40 | 508 | UCUAUCAUUUUGGGAUAAC | Pmf0ff0ffff0000f000 | ooooooooooooossssso |
| MMP1-29 | 509 | UGCUAUCAUUUUGGGAUAA | Pm0ff0ff0ffff00m0f00 | ooooooooooooossssso |
| MMP1-30 | 510 | UUGCUAUCAUUUUGGGAUA | Pmf0ff0ff0ffff00m0f0 | ooooooooooooossssso |
| MMP1-31 | 511 | UCAAUUCCAGGAAAGUCAU | Pmf00ffff000m000ff00 | ooooooooooooossssso |
| MMP1-32 | 512 | UAACCAGCUAUUAGCUUUC | Pm00ff00ff0ff00ffff0 | ooooooooooooossssso |
| MMP1-33 | 513 | UGAACCAGCUAUUAGCUUU | Pm000ff00ff0ff00fff0 | ooooooooooooossssso |
| MMP1-34 | 514 | UUGAACCAGCUAUUAGCUU | Pmf000ff00ff0ff00ff0 | ooooooooooooossssso |
| MMP1-35 | 515 | UUUGAACCAGCUAUUAGCU | Pmff000ff00ff0ff00f0 | ooooooooooooossssso |
| MMP1-36 | 516 | UGUUGAACCAGCUAUUAGC | Pm0ff000ff00ff0ff000 | ooooooooooooossssso |

TABLE 3-continued

MMP1 Antisense Strand Oligonucleotides

| Oligo Number | SEQ ID NO: | Antisense sequence | AntiSense Chemistry | AntiSense Backbone |
|---|---|---|---|---|
| MMP1-37 | 517 | UAGUUGAACCAGCUAUUAG | Pm00ff000ff00ff0ff00 | oooooooooooossssssso |
| MMP1-38 | 518 | UCAGUUGAACCAGCUAUUA | Pmf00ff000ff00ff0ff0 | oooooooooooossssssso |
| MMP1-39 | 519 | UGCAGUUGAACCAGCUAUU | Pm0f00ff000ff00ff0f0 | oooooooooooossssssso |
| MMP1-41 | 520 | UUGCAGUUGAACCAGCUAU | Pmf0f00ff000ff00ff00 | oooooooooooossssssso | o: phosphodiester;
s: phosphorothioate;
P: 5' phosphorylation;
O: 2'-OH;
f: 2'-fluoro;
m: 2' O-methyl.

TABLE 4

Optimized MMP-1 Sense Strand Oligonucleotides

| Oligo Number | Duplex ID | Oligo Number | Start Site | SEQ ID NO: | Sense sequence | Sense Chemistry | Sense Backbone |
|---|---|---|---|---|---|---|---|
| MMP1-42 | 26166 | 25856 | 869 | 521 | UGAUGUUCAGCUA | mm0m0mmm00mmm-Ch1 | Ooooooooooosso |
| MMP1-43 | 26167 | 25856 | | 522 | UGAUGUUCAGCUA | mm0m0mmm00mmm-Ch1 | Ooooooooooosso |
| MMP1-44 | 26168 | 25856 | | 523 | UGAUGUUCAGCUA | mm0m0mmm00mmm-Ch1 | Ooooooooooosso |
| MMP1-45 | 26169 | 25856 | | 524 | UGAUGUUCAGCUA | mm0m0mmm00mmm-Ch1 | Ooooooooooosso |
| MMP1-46 | 26170 | 26102 | | 525 | YGAYGYYXAGXYA | mm0m0mmm00mmm-Ch1 | Ooooooooooosso |
| MMP1-47 | 26171 | 26103 | | 526 | UGAUGUUCAGCUA | mmmmmmmmmmmmm-Ch1 | Ooooooooooosso |
| MMP1-48 | 26172 | 25858 | 984 | 527 | ACCUUUGAUGCUA | mmmmmm00m0mmm-Ch1 | Ooooooooooosso |
| MMP1-49 | 26173 | 25858 | | 528 | ACCUUUGAUGCUA | mmmmmm00m0mmm-Ch1 | Ooooooooooosso |
| MMP1-50 | 26174 | 25858 | | 529 | ACCUUUGAUGCUA | mmmmmm00m0mmm-Ch1 | Ooooooooooosso |
| MMP1-51 | 26175 | 25858 | | 530 | ACCUUUGAUGCUA | mmmmmm00m0mmm-Ch1 | ooooooooooosso |
| MMP1-52 | 26176 | 25858 | | 531 | ACCUUUGAUGCUA | mmmmmm00m0mmm-Ch1 | Ooooooooooosso |
| MMP1-53 | 26177 | 25858 | | 532 | ACCUUUGAUGCUA | mmmmmm00m0mmm-Ch1 | Ooooooooooosso |
| MMP1-54 | 26178 | 26110 | | 533 | AXXYYYGAYGXYA | mmmmmm00m0mmm-Ch1 | Ooooooooooosso |
| MMP1-55 | 26179 | 25888 | 1332 | 534 | AGGUAUGAUGAAA | mm0m0m00m0mm-Ch1 | Ooooooooooosso |
| MMP1-56 | 26180 | 25888 | | 535 | AGGUAUGAUGAAA | mm0m0m00m0mm-Ch1 | Ooooooooooosso |
| MMP1-57 | 26181 | 25888 | | 536 | AGGUAUGAUGAAA | mm0m0m00m0mm-Ch1 | Ooooooooooosso |
| MMP1-58 | 26182 | 25888 | | 537 | AGGUAUGAUGAAA | mm0m0m00m0mm-Ch1 | Ooooooooooosso |
| MMP1-59 | 26183 | 26115 | | 538 | AGGYAYGAYGAAA | mm0m0m00m0mm-Ch1 | Ooooooooooosso |
| MMP1-60 | 26184 | 26116 | | 539 | AGGYAYGAYGAAA | mm0m0mm0mm0m-Ch1 | Ooooooooooosso |
| MMP1-61 | 26185 | 25914 | 1520 | 540 | UAGCUGGUUCAAA | mm0mm00mmm0m-Ch1 | Ooooooooooosso |
| MMP1-62 | 26186 | 25914 | | 541 | UAGCUGGUUCAAA | mm0mm00mmm0m-Ch1 | Ooooooooooosso |
| MMP1-63 | 26187 | 25914 | | 542 | UAGCUGGUUCAAA | mm0mm00mmm0m-Ch1 | Ooooooooooosso |
| MMP1-64 | 26188 | 25914 | | 543 | UAGCUGGUUCAAA | mm0mm00mmm0m-Ch1 | Ooooooooooosso |

TABLE 4-continued

Optimized MMP-1 Sense Strand Oligonucleotides

| Oligo Number | Duplex ID | Oligo Number | Start Site | SEQ ID NO: | Sense sequence | Sense Chemistry | Sense Backbone |
|---|---|---|---|---|---|---|---|
| MMP1-65 | 26189 | 26121 | | 544 | YAGXYGGYYXAAA | mm0mm00mmm0mm-Chl | Oooooooooosso |
| MMP1-66 | 26190 | 25916 | 1521 | 545 | AGCUGGUUCAACA | mmmm00mmm00mm-Chl | Oooooooooosso |
| MMP1-67 | 26191 | 25916 | 1521 | 546 | AGCUGGUUCAACA | mmmm00mmm00mm-Chl | Oooooooooosso |
| MMP1-68 | 26192 | 25916 | 1521 | 547 | AGCUGGUUCAACA | mmmm00mmm00mm-Chl | Oooooooooosso |
| MMP1-69 | 26193 | 25916 | 1521 | 548 | AGCUGGUUCAACA | mmmm00mmm00mm-Chl | ooooooooooosso |
| MMP1-70 | 26194 | 26126 | 1521 | 549 | AGXYGGYYXAAXA | mmmm00mmm00mm-Chl | Oooooooooosso | o: phosphodiester;
s: phosphorothioate;
P: 5' phosphorylation;
O: 2'-OH;
f: 2'-fluoro;
m: 2' O-methyl.
X = 5 methyl C and Y = 5 methyl U

TABLE 5

Optimized MMP-1 Antisense Strand Oligonucleotides

| Oligo Number | Duplex ID | Oligo Number | Start Site | SEQ ID NO: | Antisense sequence | AntiSense Chemistry | AntiSense Backbone |
|---|---|---|---|---|---|---|---|
| MMP1-42 | 26166 | 869 | 26098 | 550 | UAGCUGAACAUCACCACUG | Pm00ff000f0ff0fm0fm0 | ooooooooooossssso |
| MMP1-43 | 26167 | | 26099 | 551 | YAGXYGAAXAYXAXXAXYG | Pm00ff000f0ff0ff0ff0 | ooooooooooossssso |
| MMP1-44 | 26168 | | 26100 | 552 | YAGXYGAAXAYXAXXAXYG | Pm00ff000f0ff0fm0mm0 | ooooooooooossssso |
| MMP1-45 | 26169 | | 26101 | 553 | UAGCUGAACAUCACCACUG | Pm00ff000f0ff0fm0mm0 | ooooooooooossssso |
| MMP1-46 | 26170 | | 25855 | 554 | UAGCUGAACAUCACCACUG | Pm00ff000f0ff0ff0ff0 | ooooooooooossssso |
| MMP1-47 | 26171 | | 25855 | 555 | UAGCUGAACAUCACCACUG | Pm00ff000f0ff0ff0ff0 | ooooooooooossssso |
| MMP1-48 | 26172 | 984 | 26104 | 556 | UAGCAUCAAAGGUUAGCUU | Pm00f0ff00m00mf00mm0 | ooooooooooossssso |
| MMP1-49 | 26173 | | 26105 | 557 | UAGCAUCAAAGGUUAGCUU | Pm00f0ff00m00mfffmm0 | ooooooooooossssso |
| MMP1-50 | 26174 | | 26106 | 558 | UAGCAUCAAAGGUUAGCUU | Pm00f0ff00m00fffff0 | ooooooooooossssso |
| MMP1-51 | 26175 | | 26107 | 559 | YAGXAYXAAAGGYYAGXYU | Pm00f0ff00m00mf00mm0 | ooooooooooossssso |
| MMP1-52 | 26176 | | 26108 | 560 | YAGXAYXAAAGGYUAGXYU | Pm00f0ff00m00mfffmm0 | ooooooooooossssso |
| MMP1-53 | 26177 | | 26109 | 561 | YAGXAYXAAAGGYYAGXYU | Pm00f0ff00m00fffff0 | ooooooooooossssso |
| MMP1-54 | 26178 | | 25857 | 562 | UAGCAUCAAAGGUUAGCUU | Pm00f0ff00m00ff00ff0 | ooooooooooossssso |
| MMP1-55 | 26179 | 1332 | 26111 | 563 | UUUCAUCAUACCUCCAGUA | Pmfff0ff0f0ffmfmffm0 | ooooooooooossssso |
| MMP1-56 | 26180 | | 26112 | 564 | UUUCAUCAUACCUCCAGUA | Pmfff0ff0f0ffmfm0mm0 | ooooooooooossssso |
| MMP1-57 | 26181 | | 26113 | 565 | YYYXAYXAYAXXYXXAGYA | Pmfff0ff0f0ffmfmffm0 | ooooooooooossssso |
| MMP1-58 | 26182 | | 26114 | 566 | YYYXAYXAYAXXYXXAGYA | Pmfff0ff0f0ffmfm0fm0 | ooooooooooossssso |
| MMP1-59 | 26183 | | 25887 | 567 | UUUCAUCAUACCUCCAGUA | Pmfff0ff0f0ffffff00M | ooooooooooossssso |

TABLE 5-continued

Optimized MMP-1 Antisense Strand Oligonucleotides

| Oligo Number | Duplex ID | Oligo Number | Start Site | SEQ ID NO: | Antisense sequence | AntiSense Chemistry | AntiSense Backbone |
|---|---|---|---|---|---|---|---|
| MMP1-60 | 26184 | | 25887 | 568 | UUUCAUCAUACCUCCAGUA | Pmfff0ff0f0fffff0 0M | oooooooooooosssssso |
| MMP1-61 | 26185 | 1520 | 26117 | 569 | UUUGAACCAGCUAUUAGCU | Pmff0f0ff00ff0f m0fm0 | oooooooooooosssssso |
| MMP1-62 | 26186 | | 26118 | 570 | UUUGAACCAGCUAUUAGCU | Pmff0m0ff00ff0f m0mm0 | oooooooooooosssssso |
| MMP1-63 | 26187 | | 26119 | 571 | YYYGAAXXAGXYAYYAGXU | Pmff0f0ff00ff0f m0fm0 | oooooooooooosssssso |
| MMP1-64 | 26188 | | 26120 | 572 | YYYGAAXXAGXYAYYAGXU | Pmff0m0ff00ff0f m0mm0 | oooooooooooosssssso |
| MMP1-65 | 26189 | | 25913 | 573 | UUUGAACCAGCUAUUAGCU | Pmff000ff00ff0ff 00f0 | oooooooooooosssssso |
| MMP1-66 | 26190 | 1521 | 26122 | 574 | UGUUGAACCAGCUAUUAGC | Pm0ff0f0ff00ff0f fmm0 | oooooooooooosssssso |
| MMP1-67 | 26191 | 1521 | 26123 | 575 | UGUUGAACCAGCUAUUAGC | Pm0ff0f0ff00ff0 mmmm0 | oooooooooooosssssso |
| MMP1-68 | 26192 | 1521 | 26124 | 576 | YGYYGAAXXAGXYAYYAGC | Pm0ff0f0ff00ff0f fmm0 | oooooooooooosssssso |
| MMP1-69 | 26193 | 1521 | 26125 | 577 | YGYYGAAXXAGXYAYYAGC | Pm0ff0f0ff00ff0 mmmm0 | oooooooooooosssssso |
| MMP1-70 | 26194 | 1521 | 25915 | 578 | UGUUGAACCAGCUAUUAGC | Pm0ff000ff00ff0f f000 | oooooooooooosssssso | o: phosphodiester;
s: phosphorothioate;
P: 5' phosphorylation;
0: 2'-OH;
f: 2'-fluoro;
m: 2' O-methyl.
X = 5 methyl C and Y = 5 methyl U Tyrosinase In some aspects, the disclosure relates to the use of nucleic acids, such as sd-rxRNA, targeting tyrosinase. As used herein, "tyrosinase" refers to an oxidase that controls the rate limiting step for melanin production, the hydroxylation of tyrosine and oxidation Dopa to Dopaquinone. Tyrosinase is encoded by the TYR gene. In some embodiments, the sd-rxRNA targets TYR. Examples of nucleic acids (e.g., sd-rxRNAs) targeting TYR are shown in Tables 6-9 below, incorporated by reference from PCT Publication No. WO 2016/037071.

TABLE 6

TYR Sense Strand Oligonucleotides

| Oligo Number | Start Site | SEQ ID NO: | Sense sequence | Sense Chemistry | Sense Backbone |
|---|---|---|---|---|---|
| TYR-1 | 329 | 579 | UAUAAUAGGACCA | mmm00m00m0mmm-Chl | ooooooooooosso |
| TYR-2 | 330 | 580 | AUAAUAGGACCUA | mm00m00m0mmmm-Chl | ooooooooooosso |
| TYR-3 | 331 | 581 | UAAUAGGACCUGA | mm0m00m0mmmmm-Chl | ooooooooooosso |
| TYR-4 | 489 | 582 | UCACUUUAGCAAA | mm0mmmm00m0mm-Chl | ooooooooooosso |
| TYR-5 | 490 | 583 | CACUUUAGCAAAA | mmmmmm00m00mm-Chl | ooooooooooosso |
| TYR-6 | 544 | 584 | UGGCCAAAUGAAA | mm0mm000m00mm-Chl | ooooooooooosso |
| TYR-7 | 662 | 585 | AGAGACAUUGAUA | mm000m0mm00mm-Chl | ooooooooooosso |

TABLE 6-continued

TYR Sense Strand Oligonucleotides

| Oligo Number | Start Site | SEQ ID NO: | Sense sequence | Sense Chemistry | Sense Backbone |
|---|---|---|---|---|---|
| TYR-8 | 663 | 586 | GAGACAUUGAUUA | mm0Omm00mmm-Chl | oooooooooosso |
| TYR-9 | 698 | 587 | CUGCCUUGGCAUA | mm0mmmm00m0mm-Chl | oooooooooosso |
| TYR-10 | 809 | 588 | GACAUUUGCACAA | mmm0mmm0m0mm-Chl | oooooooooosso |
| TYR-11 | 811 | 589 | CAUUUGCACAGAA | mmmmm0m0m00mm-Chl | oooooooooosso |
| TYR-12 | 812 | 590 | AUUUGCACAGAUA | mmmm0m0m000mm-Chl | oooooooooosso |
| TYR-13 | 813 | 591 | UUUGCACAGAUGA | mmm0m0m000mm-Chl | oooooooooosso |
| TYR-14 | 815 | 592 | UGCACAGAUGAGA | mmm0m000m00mm-Chl | oooooooooosso |
| TYR-15 | 816 | 593 | GCACAGAUGAGUA | mm0m000m000mm-Chl | oooooooooosso |
| TYR-16 | 817 | 594 | CACAGAUGAGUAA | mmm000m000mmm-Chl | oooooooooosso |
| TYR-37 | 818 | 595 | ACAGAUGAGUACA | mm000m000m0mm-Chl | oooooooooosso |
| TYR-17 | 853 | 596 | UCCUAACUUACUA | mmmm00mmm0mm-Chl | oooooooooosso |
| TYR-18 | 854 | 597 | CCUAACUUACUCA | mmm00mmm0mmmm-Chl | oooooooooosso |
| TYR-38 | 855 | 598 | CUAACUUACUCAA | mm00mmm0mmmm-Chl | oooooooooosso |
| TYR-20 | 881 | 599 | UUCUCCUCUUGGA | mmmmmmmmmm0mm-Chl | oooooooooosso |
| TYR-21 | 978 | 600 | CUGGAAACCAUGA | mm000m0mm0mm-Chl | oooooooooosso |
| TYR-22 | 979 | 601 | UGGAAACCAUGAA | mm0m00mm0m0mm-Chl | oooooooooosso |
| TYR-23 | 980 | 602 | GGAAACCAUGACA | mm000mm0m00mm-Chl | oooooooooosso |
| TYR-24 | 981 | 603 | GAAACCAUGACAA | mm00mm0m00mm-Chl | oooooooooosso |
| TYR-25 | 982 | 604 | AAACCAUGACAAA | mm0mm0m00m0mm-Chl | oooooooooosso |
| TYR-26 | 983 | 605 | AACCAUGACAAAA | mmmm0m00m0mm-Chl | oooooooooosso |
| TYR-27 | 1083 | 606 | CCAAUUUCAGCUA | mm00mmmm00mm-Chl | oooooooooosso |
| TYR-28 | 1094 | 607 | UUUAGAAAUACAA | mmm00m00m0mm-Chl | oooooooooosso |
| TYR-29 | 1101 | 608 | AUACACUGGAAGA | mm0m0mm00m0mm-Chl | oooooooooosso |
| TYR-30 | 1103 | 609 | ACACUGGAAGGAA | mm0m000m00m0mm-Chl | oooooooooosso |
| TYR-31 | 1108 | 610 | GGAAGGAUUUGCA | mm00m00mmm0mm-Chl | oooooooooosso |

TABLE 6-continued

TYR Sense Strand Oligonucleotides

| Oligo Number | Start Site | SEQ ID NO: | Sense sequence | Sense Chemistry | Sense Backbone |
|---|---|---|---|---|---|
| TYR-32 | 1111 | 611 | AGGAUUUGCUAGA | mmOOmmmOmmOmm-Chl | ooooooooooosso |
| TYR-39 | 1113 | 612 | GAUUUGCUAGUCA | mmmmmOmmOOmmm-Chl | ooooooooooosso |
| TYR-33 | 1186 | 613 | GAAUGGAACAAUA | mmOmOOmOmOOmm-Chl | ooooooooooosso |
| TYR-34 | 1189 | 614 | UGGAACAAUGUCA | mmOOOmOOmOmmm-Chl | ooooooooooosso |
| TYR-35 | 1310 | 615 | CCAGAAGCCAAUA | mmOmOOOmmOOmm-Chl | ooooooooooosso |
| TYR-36 | 1311 | 616 | CAGAAGCCAAUGA | mmOmOOmOOmmmm-Chl | ooooooooooosso |
| TYR-19 | 1312 | 617 | AGAAGCCAAUGCA | mmOOOmmOOmOmm-Chl | ooooooooooosso |
| TYR-40 | 1652 | 618 | CAGAGCCAUUUAA | mmOOOmmOmmmmm-Chl | ooooooooooosso |
| TYR-41 | 1653 | 619 | AGAGCCAUUUAUA | mmOOmmOmmmOmm-Chl | ooooooooooosso | o: phosphodiester;
s: phosphorothioate;
P: 5' phosphorylation;
O: 2'-OH;
f: 2'-fluoro;
m: 2' O-methyl;
Chl: cholesterol.

TABLE 7

TYR Antisense Strand Oligonucleotides

| Oligo Number | SEQ ID NO: | Antisense sequence | AntiSense Chemistry | AntiSense Backbone |
|---|---|---|---|---|
| TYR-1 | 620 | UGGUCCUAUUAUAAAGAC | PmOOffffOffOfOOOmOOO | Oooooooooooosssssso |
| TYR-2 | 621 | UAGGUCCUAUUAUAAAGA | PmOOOffffOffOfOOmOmO | Oooooooooooosssssso |
| TYR-3 | 622 | UCAGGUCCUAUUAUAAAG | PmfOOOffffOffOfOOmOO | Oooooooooooosssssso |
| TYR-4 | 623 | UUUGCUAAAGUGAGGUAGG | PmffOffOmOOfOOmOfOOO | Oooooooooooosssssso |
| TYR-5 | 624 | UUUUGCUAAAGUGAGGUAG | PmfffOffOmOOfOOmOfOO | ooooooooooosssssso |
| TYR-6 | 625 | UUUCAUUUGGCCAUAGGUC | PmfffOfffOOffOfOOOfO | ooooooooooosssssso |
| TYR-7 | 626 | UAUCAAUGUCUCUCCAGAU | PmOffOOfOffffffffOOmO | ooooooooooosssssso |
| TYR-8 | 627 | UAAUCAAUGUCUCUCCAGA | PmOOffOOfOffffffffOOO | ooooooooooosssssso |
| TYR-9 | 628 | UAUGCCAAGGCAGAAAAGC | PmOfOffOmOOfOOmOOmO | ooooooooooosssssso |
| TYR-10 | 629 | UUGUGCAAAUGUCACACUU | PmfOfOfOOOfOffOfOffO | ooooooooooosssssso |

TABLE 7-continued

TYR Antisense Strand Oligonucleotides

| Oligo Number | SEQ ID NO: | Antisense sequence | AntiSense Chemistry | AntiSense Backbone |
|---|---|---|---|---|
| TYR-11 | 630 | UUCUGUGCAAAUGUCACAC | Pmfff0f0f000f0ff0f00 | ooooooooooosssssso |
| TYR-12 | 631 | UAUCUGUGCAAAUGUCACA | Pm0fff0f0f000f0ff0f0 | ooooooooooosssssso |
| TYR-13 | 632 | UCAUCUGUGCAAAUGUCAC | Pmf0fff0f0f000f0ff00 | ooooooooooosssssso |
| TYR-14 | 633 | UCUCAUCUGUGCAAAUGUC | Pmfff0fff0f0f000f0f0 | ooooooooooosssssso |
| TYR-15 | 634 | UACUCAUCUGUGCAAAUGU | Pm0fff0fff0f0f000f00 | ooooooooooosssssso |
| TYR-16 | 635 | UUACUCAUCUGUGCAAAUG | Pmf0fff0fff0f0f000f0 | ooooooooooosssssso |
| TYR-37 | 636 | UGUACUCAUCUGUGCAAAU | Pm0f0fff0fff0f0f00m0 | ooooooooooosssssso |
| TYR-17 | 637 | UAGUAAGUUAGGAUUUGUG | Pm00f000ff000mfff0f0 | Ooooooooooosssssso |
| TYR-18 | 638 | UGAGUAAGUUAGGAUUUGU | Pm000f000ff00m0fff00 | Ooooooooooosssssso |
| TYR-38 | 639 | UUGAGUAAGUUAGGAUUUG | Pmf000f000ff00m0fff0 | Ooooooooooosssssso |
| TYR-20 | 640 | UCCAAGAGGAGAAGAAUGA | Pmff00m00m000m000f00 | Ooooooooooosssssso |
| TYR-21 | 641 | UCAUGGUUUCCAGGAUUAC | Pmf0f00fffff00m0ff00 | Ooooooooooosssssso |
| TYR-22 | 642 | UUCAUGGUUUCCAGGAUUA | Pmff0f00fffff0m00ff0 | Ooooooooooosssssso |
| TYR-23 | 643 | UGUCAUGGUUUCCAGGAUU | Pm0ff0f00fffff00m0f0 | Ooooooooooosssssso |
| TYR-24 | 644 | UUGUCAUGGUUUCCAGGAU | Pmf0ff0f00fffff000m0 | Ooooooooooosssssso |
| TYR-25 | 645 | UUUGUCAUGGUUUCCAGGA | Pmff0ff0f00fffff00m0 | Ooooooooooosssssso |
| TYR-26 | 646 | UUUUGUCAUGGUUUCCAGG | Pmfff0ff0f00fffff000 | Ooooooooooosssssso |
| TYR-27 | 647 | UAGCUGAAAUUGGCAGCUU | Pm00ff0m00ff00f00ff0 | Ooooooooooosssssso |
| TYR-28 | 648 | UUGUAUUUCUAAAGCUGAA | Pmf0f0fffff00m0ff000 | Ooooooooooosssssso |
| TYR-29 | 649 | UCUUCCAGUGUAUUUCUAA | Pmfffff00f0f0fffff00 | Ooooooooooosssssso |
| TYR-30 | 650 | UUCCUUCCAGUGUAUUUCU | Pmffffffff00f0f0ffff0 | Ooooooooooosssssso |
| TYR-31 | 651 | UGCAAAUCCUUCCAGUGUA | Pm0f000ffffffff00f0f0 | Ooooooooooosssssso |
| TYR-32 | 652 | UCUAGCAAAUCCUUCCAGU | Pmff00f000fffffff000 | Ooooooooooosssssso |
| TYR-39 | 653 | UGACUAGCAAAUCCUUCCA | Pm00ff00f000fffffff0 | Ooooooooooosssssso |

TABLE 7-continued

TYR Antisense Strand Oligonucleotides

| Oligo Number | SEQ ID NO: | Antisense sequence | AntiSense Chemistry | AntiSense Backbone |
|---|---|---|---|---|
| TYR-33 | 654 | UAUUGUUCCAUUCAUAUAG | PmOffOffffOfffOfOfOO | OooooooooooosssssO |
| TYR-34 | 655 | UGACAUUGUUCCAUUCAUA | PmOOfOffOffffOfffOfO | OooooooooooosssssO |
| TYR-35 | 656 | UAUUGGCUUCUGGAUAAAC | PmOffOOfffffOOOfOOmO | OooooooooooosssssO |
| TYR-36 | 657 | UCAUUGGCUUCUGGAUAAA | PmfOffOOfffffOOOfOOO | OooooooooooosssssO |
| TYR-19 | 658 | UGCAUUGGCUUCUGGAUAA | PmOfOffOOfffffOOOfOO | OooooooooooosssssO |
| TYR-40 | 659 | UUAAAUGGCUCUGAUACAA | PmfOOOfOOffffOOfOfOO | OooooooooooosssssO |
| TYR-41 | 660 | UAUAAAUGGCUCUGAUACA | PmOfOOOfOOffffOOfOfO | OooooooooooosssssO | o: phosphodiester;
s: phosphorothioate;
P: 5' phosphorylation;
O: 2'-OH;
f: 2'-fluoro;
m: 2' O-methyl.

TABLE 8

Optimized TYR Sense Strand Oligonucleotides

| Oligo Number | RXi Duplex ID | Oligo Number | Start Site | SEQ ID NO: | Sense sequence | Sense Chemistry | Sense Backbone |
|---|---|---|---|---|---|---|---|
| TYR-42 | 26195 | 25934 | 490 | 661 | CACUUUAGCAAAA | mmmmmmOOmOOmm-Chl | oooooooooosso |
| TYR-43 | 26196 | 25934 | 490 | 662 | CACUUUAGCAAAA | mmmmmmOOmOOmm-Chl | oooooooooosso |
| TYR-44 | 26197 | 25934 | 490 | 663 | CACUUUAGCAAAA | mmmmmmOOmOOmm-Chl | oooooooooosso |
| TYR-45 | 26198 | 25934 | 490 | 664 | CACUUUAGCAAAA | mmmmmmOOmOOmm-Chl | oooooooooosso |
| TYR-46 | 26199 | 26131 | 490 | 665 | XAXYYYAGXAAAA | mmmmmmOOmOOmm-Chl | oooooooooosso |
| TYR-47 | 26200 | 26132 | 490 | 666 | XAXYYYAGXAAAA | mmmmmmOmmmOmm-Chl | oooooooooosso |
| TYR-48 | 26201 | 25940 | 663 | 667 | GAGACAUUGAUUA | mmOOmOmmOOmm-Chl | oooooooooosso |
| TYR-49 | 26202 | 25940 | 663 | 668 | GAGACAUUGAUUA | mmOOmOmmOOmm-Chl | oooooooooosso |
| TYR-50 | 26203 | 25940 | 663 | 669 | GAGACAUUGAUUA | mmOOmOmmOOmm-Chl | oooooooooosso |
| TYR-51 | 26204 | 25940 | 663 | 670 | GAGACAUUGAUUA | mmOOmOmmOOmm-Chl | oooooooooosso |
| TYR-52 | 26205 | 26137 | 663 | 671 | GAGAXAYYGAYYA | mmOOmOmmOOmm-Chl | oooooooooosso |
| TYR-53 | 26206 | 25950 | 813 | 672 | UUUGCACAGAUGA | mmmOmOmOOOmm-Chl | oooooooooosso |

TABLE 8-continued

Optimized TYR Sense Strand Oligonucleotides

| Oligo Number | RXi Duplex ID | Oligo Number | Start Site | SEQ ID NO: | Sense sequence | Sense Chemistry | Sense Backbone |
|---|---|---|---|---|---|---|---|
| TYR-54 | 26207 | 25950 | 813 | 673 | UUUGCACAGAUGA | mmm0m0m000mm m-Chl | ooooooooo osso |
| TYR-55 | 26208 | 25950 | 813 | 674 | UUUGCACAGAUGA | mmm0m0m000mm m-Chl | ooooooooo osso |
| TYR-56 | 26209 | 25950 | 813 | 675 | UUUGCACAGAUGA | mmm0m0m000mm m-Chl | ooooooooo osso |
| TYR-57 | 26210 | 26142 | 813 | 676 | YYYGXAXAGAYGA | mmm0m0m000mm m-Chl | ooooooooo osso |
| TYR-58 | 26211 | 26143 | 813 | 677 | YYYGXAXAGAYGA | mmm0m0m0mm m-Chl | ooooooooo osso |
| TYR-59 | 26212 | 25954 | 816 | 678 | GCACAGAUGAGUA | mm0m000m000mm-Chl | ooooooooo osso |
| TYR-60 | 26213 | 25954 | 816 | 679 | GCACAGAUGAGUA | mm0m000m000mm-Chl | ooooooooo osso |
| TYR-61 | 26214 | 25954 | 816 | 680 | GCACAGAUGAGUA | mm0m000m000mm-Chl | ooooooooo osso |
| TYR-62 | 26215 | 25954 | 816 | 681 | GCACAGAUGAGUA | mm0m000m000mm-Chl | ooooooooo osso |
| TYR-63 | 26216 | 26148 | 816 | 682 | GCACAGAUGAGUA | mm0m0m0m0m m-Chl | ooooooooo osso |
| TYR-64 | 26217 | 26149 | 816 | 683 | GXAXAGAYGAGYA | mm0m0m0m0m m-Chl | ooooooooo osso |
| TYR-65 | 26218 | 25966 | 881 | 684 | UUCUCCUCUUGGA | mmmmmmmmm0 mm-Chl | ooooooooo osso |
| TYR-66 | 26219 | 25966 | 881 | 685 | UUCUCCUCUUGGA | mmmmmmmmm0 mm-Chl | ooooooooo osso |
| TYR-67 | 26220 | 25966 | 881 | 686 | UUCUCCUCUUGGA | mmmmmmmmm0 mm-Chl | ooooooooo osso |
| TYR-68 | 26221 | 25966 | 881 | 687 | UUCUCCUCUUGGA | mmmmmmmmm0 mm-Chl | ooooooooo osso |
| TYR-69 | 26222 | 26154 | 881 | 688 | YYXYXXYXYYGGA | mmmmmmmmm0 mm-Chl | ooooooooo osso |
| TYR-70 | 26223 | 25990 | 1111 | 689 | AGGAUUUGCUAGA | mm00mmm0mm0m m-Chl | ooooooooo osso |
| TYR-71 | 26224 | 25990 | 1111 | 690 | AGGAUUUGCUAGA | mm00mmm0mm0m m-Chl | ooooooooo osso |
| TYR-72 | 26226 | 25990 | 1111 | 691 | AGGAUUUGCUAGA | mm0mmm0mm0m m-Chl | ooooooooo osso |
| TYR-73 | 26227 | 25990 | 1111 | 692 | AGGAUUUGCUAGA | mm0mmm0mm0m m-Chl | ooooooooo osso |
| TYR-74 | 26228 | 26159 | 1111 | 693 | AGGAYYYGXYAGA | mm0mmm0mm0m m-Chl | ooooooooo osso |
| TYR-75 | 26229 | 25994 | 1186 | 694 | GAAUGGAACAAUA | mm0m00m00m m-Chl | ooooooooo osso |
| TYR-76 | 26230 | 25994 | 1186 | 695 | GAAUGGAACAAUA | mm0m00m00m m-Chl | ooooooooo osso |
| TYR-77 | 26231 | 25994 | 1186 | 696 | GAAUGGAACAAUA | mm0m00m0m0m m-Chl | ooooooooo osso |
| TYR-78 | 26232 | 25994 | 1186 | 697 | GAAUGGAACAAUA | mm0m00m0m0m m-Chl | ooooooooo osso |

TABLE 8-continued

Optimized TYR Sense Strand Oligonucleotides

| Oligo Number | RXi Duplex ID | Oligo Number | Start Site | SEQ ID NO: | Sense sequence | Sense Chemistry | Sense Backbone |
|---|---|---|---|---|---|---|---|
| TYR-79 | 26233 | 26164 | 1186 | 698 | GAAYGGAAX AAYA | mm0m00m0m00m m-Chl | oooooooo osso |
| TYR-80 | 26234 | 26165 | 1186 | 699 | GAAYGGAAX AAYA | mm0m0mm0mm0m m-Chl | oooooooo osso | o: phosphodiester;
s: phosphorothioate;
P: 5' phosphorylation;
O: 2'-OH;
f: 2'-fluoro;
m: 2' O-methyl.
X = 5 methyl C and Y = 5 methyl U In some embodiments, the nucleic acid molecule is RXI-231, comprising a sense strand sequence of: mG.mA.A.mU. G. G.mA. A.mC. A. A*mU*mA.TEG-Chl (e.g., SEQ ID NO: 696) and an antisense strand sequence of: P.5mU. A.5fU.5fU. G.5mU.5fU.5fC.5mC. A.5fU.5fU.5fC*A* 5mU*A*5fU*mA*G (e.g., SEQ ID NO: 735).

TABLE 9

Optimized TYR Antisense Strand Oligonucleotides

| Oligo Number | RXi Duplex ID | Start Site | Oligo number | SEQ ID NO: | Antisense sequence | AntiSense Chemistry | AntiSense Backbone |
|---|---|---|---|---|---|---|---|
| TYR-42 | 26195 | 490 | 26127 | 700 | UUUUGCUAAAGU GAGGUAG | Pmfff0ff0f00f00 m0mm0 | oooooooooo osssssso |
| TYR-43 | 26196 | 490 | 26128 | 701 | UUUUGCUAAAGU GAGGUAG | Pmfff0ff0f00f00 m0mf0 | oooooooooo osssssso |
| TYR-44 | 26197 | 490 | 26129 | 702 | YYYYGXYAAAGY GAGGYAG | Pmfff0ff0f00f00 m0mm0 | oooooooooo osssssso |
| TYR-45 | 26198 | 490 | 26130 | 703 | YYYYGXYAAAGY GAGGYAG | Pmfff0ff0f00f00 m0mf0 | oooooooooo osssssso |
| TYR-46 | 26199 | 490 | 25933 | 704 | UUUUGCUAAAGU GAGGUAG | Pmfff0ff0m00f00 m0f00 | oooooooooo osssssso |
| TYR-47 | 26200 | 490 | 25933 | 705 | UUUUGCUAAAGU GAGGUAG | Pmfff0ff0m00f00 m0f00 | oooooooooo osssssso |
| TYR-48 | 26201 | 663 | 26133 | 706 | UAAUCAAUGUCU CUCCAGA | Pmf0ff00f0fffmff mmm0 | oooooooooo osssssso |
| TYR-49 | 26202 | 663 | 26134 | 707 | UAAUCAAUGUCU CUCCAGA | Pmf0ff00f0ffmm ffmmm0 | oooooooooo osssssso |
| TYR-50 | 26203 | 663 | 26135 | 708 | YAAYXAAYGYXY XYXXAGA | Pmf0ff00f0fffmff mmm0 | oooooooooo osssssso |
| TYR-51 | 26204 | 663 | 26136 | 709 | YAAYXAAYGYXY XYXXAGA | Pmf0ff00f0ffmm ffmmm0 | oooooooooo osssssso |
| TYR-52 | 26205 | 663 | 25939 | 710 | UAAUCAAUGUCU CUCCAGA | Pm00ff00f0fffffff 000 | oooooooooo osssssso |
| TYR-53 | 26206 | 813 | 26138 | 711 | UCAUCUGUGCAA AUGUCAC | Pmf0fff0f0f0f0f mfmm0 | oooooooooo osssssso |
| TYR-54 | 26207 | 813 | 26139 | 712 | UCAUCUGUGCAA AUGUCAC | Pmf0fff0f0f0f0m 0fmm0 | oooooooooo osssssso |
| TYR-55 | 26208 | 813 | 26140 | 713 | YXAYXYGYGXAA AYGYXAC | Pmf0fff0f0f0f0f mfmm0 | oooooooooo osssssso |

TABLE 9-continued

Optimized TYR Antisense Strand Oligonucleotides

| Oligo Number | RXi Duplex ID | Start Site | Oligo number | SEQ ID NO: | Antisense sequence | AntiSense Chemistry | AntiSense Backbone |
|---|---|---|---|---|---|---|---|
| TYR-56 | 26209 | 813 | 26141 | 714 | YXAYXYGYGXAA AYGYXAC | Pmf0fff0f0f0f0m 0fmm0 | oooooooooo ossssso |
| TYR-57 | 26210 | 813 | 25949 | 715 | UCAUCUGUGCAA AUGUCAC | Pmf0fff0f0f000f0 ff00 | oooooooooo ossssso |
| TYR-58 | 26211 | 813 | 25949 | 716 | UCAUCUGUGCAA AUGUCAC | Pmf0fff0f0f000f0 ff00 | oooooooooo ossssso |
| TYR-59 | 26212 | 816 | 26144 | 717 | UACUCAUCUGUG CAAAUGU | Pm0fff0fff0f0m0 m0mm0 | oooooooooo ossssso |
| TYR-60 | 26213 | 816 | 26145 | 718 | UACUCAUCUGUG CAAAUGU | Pm0fff0fff0f0f0 m0fm0 | oooooooooo ossssso |
| TYR-61 | 26214 | 816 | 26146 | 719 | YAXYXAYXYGYG XAAAYGU | Pm0fff0fff0f0m0 m0mm0 | oooooooooo ossssso |
| TYR-62 | 26215 | 816 | 26147 | 720 | YAXYXAYXYGYG XAAAYGU | Pm0fff0fff0f0f0 m0fm0 | oooooooooo ossssso |
| TYR-63 | 26216 | 816 | 25953 | 721 | UACUCAUCUGUG CAAAUGU | Pm0fff0fff0f0f00 0f00 | oooooooooo ossssso |
| TYR-64 | 26217 | 816 | 25953 | 722 | UACUCAUCUGUG CAAAUGU | Pm0fff0fff0f0f00 0f00 | oooooooooo ossssso |
| TYR-65 | 26218 | 881 | 26150 | 723 | UCCAAGAGGAGA AGAAUGA | Pmff00m00m00f m0m0fm0 | oooooooooo ossssso |
| TYR-66 | 26219 | 881 | 26151 | 724 | UCCAAGAGGAGA AGAAUGA | Pmff00f00f00fm 0m0fm0 | oooooooooo ossssso |
| TYR-67 | 26220 | 881 | 26152 | 725 | YXXAAGAGGAGA AGAAYGA | Pmff00m00m00f m0m0fm0 | oooooooooo ossssso |
| TYR-68 | 26221 | 881 | 26153 | 726 | YXXAAGAGGAGA AGAAYGA | Pmff00f00f00fm 0m0fm0 | oooooooooo ossssso |
| TYR-69 | 26222 | 881 | 25965 | 727 | UCCAAGAGGAGA AGAAUGA | Pmff00m00m000 m000f00 | oooooooooo ossssso |
| TYR-70 | 26223 | 1111 | 26155 | 728 | UCUAGCAAAUCC UUCCAGU | Pmff00f000fffmf mfmm0 | oooooooooo ossssso |
| TYR-71 | 26224 | 1111 | 26156 | 729 | UCUAGCAAAUCC UUCCAGU | Pmff00f0f0fffmf mf0m0 | oooooooooo ossssso |
| TYR-72 | 26226 | 1111 | 26157 | 730 | YXYAGXAAAYXX YYXXAGU | Pmff00f000fffmf mfmm0 | oooooooooo ossssso |
| TYR-73 | 26227 | 1111 | 26158 | 731 | YXYAGXAAAYXX YYXXAGU | Pmff00f0f0fffmf mf0m0 | oooooooooo ossssso |
| TYR-74 | 26228 | 1111 | 25989 | 732 | UCUAGCAAAUCC UUCCAGU | Pmff00f000fffffff 000 | oooooooooo ossssso |
| TYR-75 | 26229 | 1186 | 26160 | 733 | UAUUGUUCCAUU CAUAUAG | Pm0ff0mffm0fff 0m0fm0 | oooooooooo ossssso |
| TYR-76 | 26230 | 1186 | 26161 | 734 | UAUUGUUCCAUU CAUAUAG | Pm0ff0ffff0fff0m 0mm0 | oooooooooo ossssso |
| TYR-77 | 26231 | 1186 | 26162 | 735 | YAYYGYYXXAYY XAYAYAG | Pm0ff0mffm0fff 0m0fm0 | oooooooooo ossssso |
| TYR-78 | 26232 | 1186 | 26163 | 736 | YAYYGYYXXAYY XAYAYAG | Pm0ff0ffff0fff0m 0mm0 | oooooooooo ossssso |

TABLE 9-continued

Optimized TYR Antisense Strand Oligonucleotides

| Oligo Number | RXi Duplex ID | StartOligo Site | Oligo number | SEQ ID NO: | Antisense sequence | AntiSense Chemistry | AntiSense Backbone |
|---|---|---|---|---|---|---|---|
| TYR-79 | 26233 | 1186 | 25993 | 737 | UAUUGUUCCAUU CAUAUAG | PmOffOffffOfffOfO fOO | ooooooooooo ossssssso |
| TYR-80 | 26234 | 1186 | 25993 | 738 | UAUUGUUCCAUU CAUAUAG | PmOffOffffOfffOfO fOO | ooooooooooo ossssssso | o: phosphodiester;
s: phosphorothioate;
P: 5' phosphorylation;
O: 2'-OH;
f: 2'-fluoro;
m: 2' O-methyl.
X = 5 methyl C and Y = 5 methyl U Map4k4

In some aspects, the disclosure relates to the use of nucleic acids, such as sd-rxRNA, targeting MAP4k4. MAP4K4 is a mammalian serine/threonine protein kinase that belongs to a group of protein kinases related to *Saccharomyces cerevisiae* Sterile 20 (STE20). MAP4K4 (also known as NIK for Nck interacting kinase) was first identified in a mouse screen for proteins that interact with the SH3 domain of Nck (Su et al. (1997). Since its discovery, MAP4K4 has been and continues to be linked to wide range of physiological functions. Examples of nucleic acids (e.g., sd-rxRNAs) targeting Map4k4 are shown below.

Duplex:
passenger strand:
(SEQ ID NO: 739)
DY547.mC.mU.G.mU.G.G.mA.A.G.mU.mC*mU*A.TEG-Chl guide strand:
(SEQ ID NO: 740)
P.fU.A.G.A.fC.fU.fU.fC.fC.A.mC*A*mG*A*mA*mC*mU*mC*
U Duplex:
passenger strand:
(SEQ ID NO: 741)
mC.mU.G.mU.G.G.mA.A.G.mU.mC*mU*A.TEG-Chl guide strand:
(SEQ ID NO: 742)
P.fU.A.G.A.fC.fU.fU.fC.fC.A.mC*A*mG*A*mA*mC*mU*mC*
U Additional Target Genes In some aspects, the disclosure relates to the use of nucleic acids, such as sd-rxRNA, targeting one of the following target genes: VEGF, PDGF-B, SPP1, TGFB1, TGFB2, HIF-1α mTOR, PTGS2 (COX-2), PPIB, IL-1 alpha, IL-1 beta, Icam-1, Tie 1, Tie 2, ANG2, Ang1, MYC, or TNFα.

In some embodiments, RNAi compounds described by the disclosure comprise an asymmetric compound comprising a duplex region (for efficient RISC entry of 8-15 bases long) and single stranded region of 4-12 nucleotides long. In some embodiments, the duplex region is 13 or 14 nucleotides long. A 6 or 7 nucleotide single stranded region is preferred in some embodiments. The single stranded region of RNAi compounds described by the disclosure also comprises 2-12 phosphorothioate internucleotide linkages (referred to as phosphorothioate modifications). In some embodiments, the single stranded region of the RNAi compound includes 6-8 phosphorothioate internucleotide linkages. Additionally, in some embodiments, RNAi compounds described by the disclosure also include a unique chemical modification pattern, which provides stability and is compatible with RISC entry. In some embodiments, the combination of these elements has resulted in unexpected properties which are highly useful for delivery of RNAi reagents in vitro and in vivo.

In some embodiments, the chemical modification pattern, which provides stability and is compatible with RISC entry includes modifications to the sense, or passenger, strand as well as the antisense, or guide, strand. For instance the passenger strand can be modified with any chemical entities which confirm stability and do not interfere with activity. Such modifications include 2' ribo modifications (O-methyl, 2' F, 2 deoxy and others) and backbone modification like phosphorothioate modifications. In some embodiments, the chemical modification pattern in the passenger strand includes O-methyl modification of C and U nucleotides within the passenger strand or alternatively the passenger strand may be completely O-methyl modified.

The guide strand, for example, may also be modified by any chemical modification which confirms stability without interfering with RISC entry. In some embodiments, the chemical modification pattern in the guide strand includes the majority of C and U nucleotides being 2' F modified and the 5' end being phosphorylated. Another chemical modification pattern in the guide strand includes 2'O-methyl modification of position 1 and C/U in positions 11-18 and 5' end chemical phosphorylation. Yet another chemical modification pattern in the guide strand includes 2'O-methyl modification of position 1 and C/U in positions 11-18 and 5' end chemical phosphorylation and 2'F modification of C/U in positions 2-10. In some embodiments, the passenger strand and/or the guide strand contains at least one 5-methyl C or U modifications.

In some embodiments, at least 30% of the nucleotides in the sd-rxRNA are modified. For example, at least 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% of the nucleotides in the sd-rxRNA are modified. In some embodiments, 100% of the nucleotides in the sd-rxRNA are modified.

The above-described chemical modification patterns of the oligonucleotides described by the disclosure are well tolerated and, in some embodiments, have been observed to improve efficacy of asymmetric RNAi compounds. In some embodiments, elimination of any of the described components (Guide strand stabilization, phosphorothioate stretch, sense strand stabilization, and/or hydrophobic conjugate), or increase in size of the molecule, in some instances results in sub-optimal efficacy and in some instances complete loss of efficacy. In some embodiments, the combination of elements results in development of a compound, which is fully active following passive delivery to cells, such as HeLa cells.

The sd-rxRNA can be further improved in some instances by improving the hydrophobicity of compounds using of novel types of chemistries. For example, one chemistry is related to use of hydrophobic base modifications. Any base in any position might be modified, as long as modification results in an increase of the partition coefficient of the base. In some embodiments, the locations for modification chemistries are positions 4 and 5 of the pyrimidines. The major advantage of these positions is (a) ease of synthesis and (b) lack of interference with base-pairing and A form helix formation, which are essential for RISC complex loading and target recognition. In some embodiments, a version of sd-rxRNA compounds where multiple deoxy Uridines are present without interfering with overall compound efficacy are used. In addition, major improvement in tissue distribution and cellular uptake might be obtained by optimizing the structure of the hydrophobic conjugate. In some embodiments, the structure of sterol is modified to alter (increase/decrease) C17 attached chain. This type of modification, in some embodiments, results in significant increase in cellular uptake and improvement of tissue uptake prosperities in vivo.

dsRNA formulated according to the disclosure also include rxRNAori. rxRNAori refers to a class of RNA molecules described in and incorporated by reference from PCT Publication No. WO2009/102427 (Application No. PCT/US2009/000852), filed on Feb. 11, 2009, and entitled, "MODIFIED RNAI POLYNUCLEOTIDES AND USES THEREOF," and US Patent Publication No. 2011/0039914, filed on Nov. 1, 2010, and entitled "MODIFIED RNAI POLYNUCLEOTIDES AND USES THEREOF."

In some embodiments, an rxRNAori molecule comprises a double-stranded RNA (dsRNA) construct of 12-35 nucleotides in length, for inhibiting expression of a target gene, comprising: a sense strand having a 5'-end and a 3'-end, wherein the sense strand is highly modified with 2'-modified ribose sugars, and wherein 3-6 nucleotides in the central portion of the sense strand are not modified with 2'-modified ribose sugars and, an antisense strand having a 5'-end and a 3'-end, which hybridizes to the sense strand and to mRNA of the target gene, wherein the dsRNA inhibits expression of the target gene in a sequence-dependent manner.

rxRNAori can contain any of the modifications described herein. In some embodiments, at least 30% of the nucleotides in the rxRNAori are modified. For example, at least 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% of the nucleotides in the rxRNAori are modified. In some embodiments, 100% of the nucleotides in the sd-rxRNA are modified. In some embodiments, only the passenger strand of the rxRNAori contains modifications.

This disclosure is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Thus, aspects of the disclosure relate to isolated double stranded nucleic acid molecules comprising a guide (antisense) strand and a passenger (sense) strand. As used herein, the term "double-stranded" refers to one or more nucleic acid molecules in which at least a portion of the nucleomonomers are complementary and hydrogen bond to form a double-stranded region. In some embodiments, the length of the guide strand ranges from 16-29 nucleotides long. In certain embodiments, the guide strand is 16, 17, 18, 19, 20, 21, 22, 23, 24, 25, 26, 27, 28, or 29 nucleotides long. The guide strand has complementarity to a target gene. Complementarity between the guide strand and the target gene may exist over any portion of the guide strand. Complementarity as used herein may be perfect complementarity or less than perfect complementarity as long as the guide strand is sufficiently complementary to the target that it mediates RNAi. In some embodiments complementarity refers to less than 25%, 20%, 15%, 10%, 5%, 4%, 3%, 2%, or 1% mismatch between the guide strand and the target. Perfect complementarity refers to 100% complementarity. Thus oligonucleotide described by the disclosure have the advantage of being able to tolerate sequence variations that might be expected due to genetic mutation, strain polymorphism, or evolutionary divergence. For example, siRNA sequences with insertions, deletions, and single point mutations relative to the target sequence have also been found to be effective for inhibition. Moreover, not all positions of a siRNA contribute equally to target recognition. Mismatches in the center of the siRNA are most critical and essentially abolish target RNA cleavage. Mismatches upstream of the center or upstream of the cleavage site referencing the antisense strand are tolerated but significantly reduce target RNA cleavage. Mismatches downstream of the center or cleavage site referencing the antisense strand, preferably located near the 3' end of the antisense strand, e.g. 1, 2, 3, 4, 5 or 6 nucleotides from the 3' end of the antisense strand, are tolerated and reduce target RNA cleavage only slightly.

While not wishing to be bound by any particular theory, in some embodiments, the guide strand is at least 16 nucleotides in length and anchors the Argonaute protein in RISC. In some embodiments, when the guide strand loads into RISC it has a defined seed region and target mRNA cleavage takes place across from position 10-11 of the guide strand. In some embodiments, the 5' end of the guide strand is or is able to be phosphorylated. The nucleic acid molecules described herein may be referred to as minimum trigger RNA.

In some embodiments, the length of the passenger strand ranges from 8-15 nucleotides long. In certain embodiments, the passenger strand is 8, 9, 10, 11, 12, 13, 14 or 15 nucleotides long. The passenger strand has complementarity to the guide strand. Complementarity between the passenger strand and the guide strand can exist over any portion of the passenger or guide strand. In some embodiments, there is 100% complementarity between the guide and passenger strands within the double stranded region of the molecule.

Aspects of the disclosure relate to double stranded nucleic acid molecules with minimal double stranded regions. In some embodiments the region of the molecule that is double stranded ranges from 8-15 nucleotides long. In certain embodiments, the region of the molecule that is double stranded is 8, 9, 10, 11, 12, 13, 14 or 15 nucleotides long. In certain embodiments the double stranded region is 13 or 14 nucleotides long. There can be 100% complementarity between the guide and passenger strands, or there may be one or more mismatches between the guide and passenger strands. In some embodiments, on one end of the double stranded molecule, the molecule is either blunt-ended or has a one-nucleotide overhang. The single stranded region of the molecule is in some embodiments between 4-12 nucleotides long. For example the single stranded region can be 4, 5, 6, 7, 8, 9, 10, 11 or 12 nucleotides long. However, in certain embodiments, the single stranded region can also be less than 4 or greater than 12 nucleotides long. In certain embodiments, the single stranded region is at least 6 or at least 7 nucleotides long.

RNAi constructs associated with the disclosure can have a thermodynamic stability ($\Delta G$) of less than −13 kkal/mol. In some embodiments, the thermodynamic stability ($\Delta G$) is less than −20 kkal/mol. In some embodiments there is a loss of efficacy when ($\Delta G$) goes below −21 kkal/mol. In some embodiments a ($\Delta G$) value higher than −13 kkal/mol is compatible with aspects of the invention. Without wishing to be bound by any theory, in some embodiments a molecule with a relatively higher ($\Delta G$) value may become active at a relatively higher concentration, while a molecule with a relatively lower ($\Delta G$) value may become active at a relatively lower concentration. In some embodiments, the ($\Delta G$) value may be higher than −9 kkcal/mol. The gene silencing effects mediated by the RNAi constructs associated with the disclosure, containing minimal double stranded regions, are unexpected because molecules of almost identical design but lower thermodynamic stability have been demonstrated to be inactive (Rana et al 2004).

Without wishing to be bound by any theory, results described herein suggest that a stretch of 8-10 bp of dsRNA or dsDNA will be structurally recognized by protein components of RISC or co-factors of RISC. Additionally, there is a free energy requirement for the triggering compound that it may be either sensed by the protein components and/or stable enough to interact with such components so that it may be loaded into the Argonaute protein. If optimal thermodynamics are present and there is a double stranded portion that is preferably at least 8 nucleotides then the duplex will be recognized and loaded into the RNAi machinery.

In some embodiments, thermodynamic stability is increased through the use of LNA bases. In some embodiments, additional chemical modifications are introduced. Several non-limiting examples of chemical modifications include: 5' Phosphate, 2'-O-methyl, 2'-O-ethyl, 2'-fluoro, ribothymidine, C-5 propynyl-dC (pdC) and C-5 propynyl-dU (pdU); C-5 propynyl-C (pC) and C-5 propynyl-U (pU); 5-methyl C, 5-methyl U, 5-methyl dC, 5-methyl dU methoxy, (2,6-diaminopurine), 5'-Dimethoxytrityl-N4-ethyl-2'-deoxyCytidine and MGB (minor groove binder). It should be appreciated that more than one chemical modification can be combined within the same molecule.

Molecules associated with the invention are optimized for increased potency and/or reduced toxicity. For example, nucleotide length of the guide and/or passenger strand, and/or the number of phosphorothioate modifications in the guide and/or passenger strand, can in some aspects influence potency of the RNA molecule, while replacing 2'-fluoro (2'F) modifications with 2'-O-methyl (2'OMe) modifications can in some aspects influence toxicity of the molecule. Specifically, reduction in 2'F content of a molecule is predicted to reduce toxicity of the molecule. Furthermore, the number of phosphorothioate modifications in an RNA molecule can influence the uptake of the molecule into a cell, for example the efficiency of passive uptake of the molecule into a cell. Preferred embodiments of molecules described herein have no 2'F modification and yet are characterized by equal efficacy in cellular uptake and tissue penetration. Such molecules represent a significant improvement over prior art, such as molecules described by Accell and Wolfrum, which are heavily modified with extensive use of 2'F.

In some embodiments, a guide strand is approximately 18-19 nucleotides in length and has approximately 2-14 phosphate modifications. For example, a guide strand can contain 2, 3, 4, 5, 6, 7, 8, 9, 10, 11, 12, 13, 14 or more than 14 nucleotides that are phosphate-modified. The guide strand may contain one or more modifications that confer increased stability without interfering with RISC entry. The phosphate modified nucleotides, such as phosphorothioate modified nucleotides, can be at the 3' end, 5' end or spread throughout the guide strand. In some embodiments, the 3' terminal 10 nucleotides of the guide strand contains 1, 2, 3, 4, 5, 6, 7, 8, 9 or 10 phosphorothioate modified nucleotides. The guide strand can also contain 2'F and/or 2'OMe modifications, which can be located throughout the molecule. In some embodiments, the nucleotide in position one of the guide strand (the nucleotide in the most 5' position of the guide strand) is 2'OMe modified and/or phosphorylated. C and U nucleotides within the guide strand can be 2'F modified. For example, C and U nucleotides in positions 2-10 of a 19 nt guide strand (or corresponding positions in a guide strand of a different length) can be 2'F modified. C and U nucleotides within the guide strand can also be 2'OMe modified. For example, C and U nucleotides in positions 11-18 of a 19 nt guide strand (or corresponding positions in a guide strand of a different length) can be 2'OMe modified. In some embodiments, the nucleotide at the most 3' end of the guide strand is unmodified. In certain embodiments, the majority of Cs and Us within the guide strand are 2'F modified and the 5' end of the guide strand is phosphorylated. In other embodiments, position 1 and the Cs or Us in positions 11-18 are 2'OMe modified and the 5' end of the guide strand is phosphorylated. In other embodiments, position 1 and the Cs or Us in positions 11-18 are 2'OMe modified, the 5' end of the guide strand is phosphorylated, and the Cs or Us in position 2-10 are 2'F modified.

In some aspects, an optimal passenger strand is approximately 11-14 nucleotides in length. The passenger strand may contain modifications that confer increased stability. One or more nucleotides in the passenger strand can be 2'OMe modified. In some embodiments, one or more of the C and/or U nucleotides in the passenger strand is 2'OMe modified, or all of the C and U nucleotides in the passenger strand are 2'OMe modified. In certain embodiments, all of the nucleotides in the passenger strand are 2'OMe modified. One or more of the nucleotides on the passenger strand can also be phosphate-modified such as phosphorothioate modified. The passenger strand can also contain 2' ribo, 2'F and 2 deoxy modifications or any combination of the above. Chemical modification patterns on both the guide and passenger strand can be well tolerated and a combination of chemical modifications can lead to increased efficacy and self-delivery of RNA molecules.

Aspects of the disclosure relate to RNAi constructs that have extended single-stranded regions relative to double stranded regions, as compared to molecules that have been used previously for RNAi. The single stranded region of the molecules may be modified to promote cellular uptake or gene silencing. In some embodiments, phosphorothioate modification of the single stranded region influences cellular uptake and/or gene silencing. The region of the guide strand that is phosphorothioate modified can include nucleotides within both the single stranded and double stranded regions of the molecule. In some embodiments, the single stranded region includes 2-12 phosphorothioate modifications. For example, the single stranded region can include 2, 3, 4, 5, 6, 7, 8, 9, 10, 11, or 12 phosphorothioate modifications. In some instances, the single stranded region contains 6-8 phosphorothioate modifications.

In some embodiments, molecules associated with the disclosure are also optimized for cellular uptake. In RNA molecules described herein, the guide and/or passenger strands can be attached to a conjugate. In certain embodiments the conjugate is hydrophobic. The hydrophobic conjugate can be a small molecule with a partition coefficient that is higher than 10. The conjugate can be a sterol-type molecule such as cholesterol, or a molecule with an increased length polycarbon chain attached to C17, and the presence of a conjugate can influence the ability of an RNA molecule to be taken into a cell with or without a lipid transfection reagent. The conjugate can be attached to the passenger or guide strand through a hydrophobic linker. In some embodiments, a hydrophobic linker is 5-12C in length, and/or is hydroxypyrrolidine-based. In some embodiments, a hydrophobic conjugate is attached to the passenger strand and the CU residues of either the passenger and/or guide strand are modified. In some embodiments, at least 50%, 55%, 60%, 65%, 70%, 75%, 80%, 85%, 90% or 95% of the CU residues on the passenger strand and/or the guide strand are modified. In some aspects, molecules associated with the invention are self-delivering (sd). As used herein, "self-delivery" refers to the ability of a molecule to be delivered into a cell without the need for an additional delivery vehicle such as a transfection reagent.

Aspects of the disclosure relate to selecting molecules for use in RNAi. In some embodiments, molecules that have a double stranded region of 8-15 nucleotides can be selected for use in RNAi. In some embodiments, molecules are selected based on their thermodynamic stability ($\Delta G$). In some embodiments, molecules will be selected that have a ($\Delta G$) of less than −13 kkal/mol. For example, the ($\Delta G$) value may be −13, −14, −15, −16, −17, −18, −19, −21, −22 or less than −22 kkal/mol. In other embodiments, the ($\Delta G$) value may be higher than −13 kkal/mol. For example, the ($\Delta G$) value may be −12, −11, −10, −9, −8, −7 or more than −7 kkal/mol. It should be appreciated that AG can be calculated using any method known in the art. In some embodiments AG is calculated using Mfold, available through the Mfold internet site (mfold.bioinfo.rpi.edu/cgi-bin/rna-form1.cgi). Methods for calculating AG are described in, and are incorporated by reference from, the following references: Zuker, M. (2003) Nucleic Acids Res., 31(13):3406-15; Mathews, D. H., Sabina, J., Zuker, M. and Turner, D. H. (1999) J. Mol. Biol. 288:911-940; Mathews, D. H., Disney, M. D., Childs, J. L., Schroeder, S. J., Zuker, M., and Turner, D. H. (2004) Proc. Natl. Acad. Sci. 101:7287-7292; Duan, S., Mathews, D. H., and Turner, D. H. (2006) Biochemistry 45:9819-9832; Wuchty, S., Fontana, W., Hofacker, I. L., and Schuster, P. (1999) Biopolymers 49:145-165.

In certain embodiments, the polynucleotide contains 5'- and/or 3'-end overhangs. The number and/or sequence of nucleotides overhang on one end of the polynucleotide may be the same or different from the other end of the polynucleotide. In certain embodiments, one or more of the overhang nucleotides may contain chemical modification(s), such as phosphorothioate or 2'-OMe modification.

In certain embodiments, the polynucleotide is unmodified. In other embodiments, at least one nucleotide is modified. In further embodiments, the modification includes a 2'-H or 2'-modified ribose sugar at the 2nd nucleotide from the 5'-end of the guide sequence. The "2nd nucleotide" is defined as the second nucleotide from the 5'-end of the polynucleotide.

As used herein, "2'-modified ribose sugar" includes those ribose sugars that do not have a 2'-OH group. "2'-modified ribose sugar" does not include 2'-deoxyribose (found in unmodified canonical DNA nucleotides). For example, the 2'-modified ribose sugar may be 2'-O-alkyl nucleotides, 2'-deoxy-2'-fluoro nucleotides, 2'-deoxy nucleotides, or combination thereof.

In certain embodiments, the 2'-modified nucleotides are pyrimidine nucleotides (e.g., C/U). Examples of 2'-O-alkyl nucleotides include 2'-O-methyl nucleotides, or 2'-O-allyl nucleotides.

In certain embodiments, the sd-rxRNA polynucleotide of the disclosure with the above-referenced 5'-end modification exhibits significantly (e.g., at least about 25%, 30%, 35%, 40%, 45%, 50%, 55%, 60%, 65%, 70%, 75%, 80%, 85%, 90% or more) less "off-target" gene silencing when compared to similar constructs without the specified 5'-end modification, thus greatly improving the overall specificity of the RNAi reagent or therapeutics.

As used herein, "off-target" gene silencing refers to unintended gene silencing due to, for example, spurious sequence homology between the antisense (guide) sequence and the unintended target mRNA sequence.

According to this aspect of the disclosure, certain guide strand modifications further increase nuclease stability, and/or lower interferon induction, without significantly decreasing RNAi activity (or no decrease in RNAi activity at all).

In some embodiments, the 5'-stem sequence may comprise a 2'-modified ribose sugar, such as 2'-O-methyl modified nucleotide, at the $2^{nd}$ nucleotide on the 5'-end of the polynucleotide and, in some embodiments, no other modified nucleotides. The hairpin structure having such modification may have enhanced target specificity or reduced off-target silencing compared to a similar construct without the 2'-O-methyl modification at said position.

Certain combinations of specific 5'-stem sequence and 3'-stem sequence modifications may result in further unexpected advantages, as partly manifested by enhanced ability to inhibit target gene expression, enhanced serum stability, and/or increased target specificity, etc.

In certain embodiments, the guide strand comprises a 2'-O-methyl modified nucleotide at the $2^{nd}$ nucleotide on the 5'-end of the guide strand and no other modified nucleotides.

In other aspects, the sd-rxRNA structures of the disclosure mediate sequence-dependent gene silencing by a microRNA mechanism. As used herein, the term "microRNA" ("miRNA"), also referred to in the art as "small temporal RNAs" ("stRNAs"), refers to a small (10-50 nucleotide) RNA which are genetically encoded (e.g., by viral, mammalian, or plant genomes) and are capable of directing or mediating RNA silencing. An "miRNA disorder" shall refer to a disease or disorder characterized by an aberrant expression or activity of an miRNA.

microRNAs are involved in down-regulating target genes in critical pathways, such as development and cancer, in mice, worms and mammals. Gene silencing through a microRNA mechanism is achieved by specific yet imperfect base-pairing of the miRNA and its target messenger RNA (mRNA). Various mechanisms may be used in microRNA-mediated down-regulation of target mRNA expression.

miRNAs are noncoding RNAs of approximately 22 nucleotides which can regulate gene expression at the post transcriptional or translational level during plant and animal development. One common feature of miRNAs is that they are all excised from an approximately 70 nucleotide precursor RNA stem-loop termed pre-miRNA, probably by Dicer, an RNase III-type enzyme, or a homolog thereof. Naturally-occurring miRNAs are expressed by endogenous genes in vivo and are processed from a hairpin or stem-loop precursor (pre-miRNA or pri-miRNAs) by Dicer or other RNAses. miRNAs can exist transiently in vivo as a double-stranded duplex but only one strand is taken up by the RISC complex to direct gene silencing.

In some embodiments a version of sd-rxRNA compounds, which are effective in cellular uptake and inhibiting of miRNA activity, are described. Typically, the compounds are similar to RISC entering version but large strand chemical modification patterns are optimized in the way to block cleavage and act as an effective inhibitor of the RISC action. For example, the compound might be completely or mostly Omethyl modified with the PS content described previously. For these types of compounds the 5' phosphorylation is not necessary. The presence of double stranded region is preferred as it is promotes cellular uptake and efficient RISC loading.

Another pathway that uses small RNAs as sequence-specific regulators is the RNA interference (RNAi) pathway, which is an evolutionarily conserved response to the presence of double-stranded RNA (dsRNA) in the cell. The dsRNAs are cleaved into ~20-base pair (bp) duplexes of small-interfering RNAs (siRNAs) by Dicer. These small RNAs get assembled into multiprotein effector complexes called RNA-induced silencing complexes (RISCs). The siRNAs then guide the cleavage of target mRNAs with perfect complementarity.

Some aspects of biogenesis, protein complexes, and function are shared between the siRNA pathway and the miRNA pathway. The subject single-stranded polynucleotides may mimic the dsRNA in the siRNA mechanism, or the microRNA in the miRNA mechanism.

In certain embodiments, the modified RNAi constructs may have improved stability in serum and/or cerebral spinal fluid compared to an unmodified RNAi constructs having the same sequence.

In certain embodiments, the structure of the RNAi construct does not induce interferon response in primary cells, such as mammalian primary cells, including primary cells from human, mouse and other rodents, and other non-human mammals. In certain embodiments, the RNAi construct may also be used to inhibit expression of a target gene in an invertebrate organism.

To further increase the stability of the subject constructs in vivo, the 3'-end of the hairpin structure may be blocked by protective group(s). For example, protective groups such as inverted nucleotides, inverted abasic moieties, or amino-end modified nucleotides may be used. Inverted nucleotides may comprise an inverted deoxynucleotide. Inverted abasic moieties may comprise an inverted deoxyabasic moiety, such as a 3',3'-linked or 5',5'-linked deoxyabasic moiety.

The RNAi constructs of the invention are capable of inhibiting the synthesis of any target protein encoded by target gene(s). The disclosure includes methods to inhibit expression of a target gene either in a cell in vitro, or in vivo. As such, the RNAi constructs of the disclosure are useful for treating a patient with a disease characterized by the overexpression of a target gene.

The target gene can be endogenous or exogenous (e.g., introduced into a cell by a virus or using recombinant DNA technology) to a cell. Such methods may include introduction of RNA into a cell in an amount sufficient to inhibit expression of the target gene. By way of example, such an RNA molecule may have a guide strand that is complementary to the nucleotide sequence of the target gene, such that the composition inhibits expression of the target gene.

The disclosure also relates to vectors expressing the nucleic acids of the invention, and cells comprising such vectors or the nucleic acids. The cell may be a mammalian cell in vivo or in culture, such as a human cell.

The disclosure further relates to compositions comprising the subject RNAi constructs, and a pharmaceutically acceptable carrier or diluent.

The method may be carried out in vitro, ex vivo, or in vivo, in, for example, mammalian cells in culture, such as a human cell in culture.

The target cells (e.g., mammalian cell) may be contacted in the presence of a delivery reagent, such as a lipid (e.g., a cationic lipid) or a liposome.

Another aspect of the disclosure provides a method for inhibiting the expression of a target gene in a mammalian cell, comprising contacting the mammalian cell with a vector expressing the subject RNAi constructs.

In one aspect of the disclosure, a longer duplex polynucleotide is provided, including a first polynucleotide that ranges in size from about 16 to about 30 nucleotides; a second polynucleotide that ranges in size from about 26 to about 46 nucleotides, wherein the first polynucleotide (the antisense strand) is complementary to both the second polynucleotide (the sense strand) and a target gene, and wherein both polynucleotides form a duplex and wherein the first polynucleotide contains a single stranded region longer than 6 bases in length and is modified with alternative chemical modification pattern, and/or includes a conjugate moiety that facilitates cellular delivery. In this embodiment, between about 40% to about 90% of the nucleotides of the passenger strand between about 40% to about 90% of the nucleotides of the guide strand, and between about 40% to about 90% of the nucleotides of the single stranded region of the first polynucleotide are chemically modified nucleotides.

In some embodiments, the chemically modified nucleotide in the polynucleotide duplex may be any chemically modified nucleotide known in the art, such as those discussed in detail above. In some embodiments, the chemically modified nucleotide is selected from the group consisting of 2' F modified nucleotides, 2'-O-methyl modified and 2'deoxy nucleotides. In some embodiments, the chemically modified nucleotides results from "hydrophobic modifications" of the nucleotide base. In some embodiments, the chemically modified nucleotides are phosphorothioates. In some embodiments, chemically modified nucleotides are combination of phosphorothioates, 2'-O-methyl, 2'deoxy, hydrophobic modifications and phosphorothioates. As these groups of modifications refer to modification of the ribose ring, back bone and nucleotide, it is feasible that some modified nucleotides will carry a combination of all three modification types.

In some embodiments, the chemical modification is not the same across the various regions of the duplex. In a particular embodiment, the first polynucleotide (the passenger strand), has a large number of diverse chemical modifications in various positions. For this polynucleotide up to 90% of nucleotides might be chemically modified and/or have mismatches introduced.

In some embodiments, chemical modifications of the first or second polynucleotide include, but not limited to, 5' position modification of Uridine and Cytosine (4-pyridyl, 2-pyridyl, indolyl, phenyl ($C_6H_5OH$); tryptophanyl (C8H6N)CH2CH(NH2)CO), isobutyl, butyl, aminobenzyl; phenyl; naphthyl, etc), where the chemical modification might alter base pairing capabilities of a nucleotide. For the guide strand an important feature of this aspect of the invention is the position of the chemical modification relative to the 5' end of the antisense and sequence. For example, chemical phosphorylation of the 5' end of the guide strand is usually beneficial for efficacy. O-methyl modifications in the seed region of the sense strand (position 2-7 relative to the 5' end) are not generally well tolerated, whereas 2'F and deoxy are well tolerated. The mid part of the guide strand and the 3' end of the guide strand are more permissive in a type of chemical modifications applied. Deoxy modifications are not tolerated at the 3' end of the guide strand.

A unique feature of this aspect of the disclosure involves the use of hydrophobic modification on the bases. In one embodiment, the hydrophobic modifications are preferably positioned near the 5' end of the guide strand, in other embodiments, they localized in the middle of the guides strand, in other embodiment they localized at the 3' end of the guide strand and yet in another embodiment they are distributed thought the whole length of the polynucleotide. The same type of patterns is applicable to the passenger strand of the duplex.

The other part of the molecule is a single stranded region. The single stranded region is expected to range from 7 to 40 nucleotides.

In one embodiment, the single stranded region of the first polynucleotide contains modifications selected from the group consisting of between 40% and 90% hydrophobic base modifications, between 40%-90% phosphorothioates, between 40%-90% modification of the ribose moiety, and any combination of the preceding.

Efficiency of guide strand (first polynucleotide) loading into the RISC complex might be altered for heavily modified polynucleotides, so in one embodiment, the duplex polynucleotide includes a mismatch between nucleotide 9, 11, 12, 13, or 14 on the guide strand (first polynucleotide) and the opposite nucleotide on the sense strand (second polynucleotide) to promote efficient guide strand loading.

More detailed aspects of the invention are described in the sections below.

Duplex Characteristics

Double-stranded oligonucleotides of the disclosure may be formed by two separate complementary nucleic acid strands. Duplex formation can occur either inside or outside the cell containing the target gene.

As used herein, the term "duplex" includes the region of the double-stranded nucleic acid molecule(s) that is (are) hydrogen bonded to a complementary sequence. Double-stranded oligonucleotides of the invention may comprise a nucleotide sequence that is sense to a target gene and a complementary sequence that is antisense to the target gene. The sense and antisense nucleotide sequences correspond to the target gene sequence, e.g., are identical or are sufficiently identical to effect target gene inhibition (e.g., are about at least about 98% identical, 96% identical, 94%, 90% identical, 85% identical, or 80% identical) to the target gene sequence.

In certain embodiments, the double-stranded oligonucleotide of the disclosure is double-stranded over its entire length, i.e., with no overhanging single-stranded sequence at either end of the molecule, i.e., is blunt-ended. In other embodiments, the individual nucleic acid molecules can be of different lengths. In other words, a double-stranded oligonucleotide of the invention is not double-stranded over its entire length. For instance, when two separate nucleic acid molecules are used, one of the molecules, e.g., the first molecule comprising an antisense sequence, can be longer than the second molecule hybridizing thereto (leaving a portion of the molecule single-stranded). Likewise, when a single nucleic acid molecule is used a portion of the molecule at either end can remain single-stranded.

In some embodiments, a double-stranded oligonucleotide of the invention contains mismatches and/or loops or bulges, but is double-stranded over at least about 70% of the length of the oligonucleotide. In some embodiments, a double-stranded oligonucleotide described by the disclosure is double-stranded over at least about 80% of the length of the oligonucleotide. In some embodiments, a double-stranded oligonucleotide described by the disclosure is double-stranded over at least about 90%-95% of the length of the oligonucleotide. In some embodiments, a double-stranded oligonucleotide described by the disclosure is double-stranded over at least about 96%-98% of the length of the oligonucleotide. In certain embodiments, the double-stranded oligonucleotide as described by the disclosure contains at least or up to 1, 2, 3, 4, 5, 6, 7, 8, 9, 10, 11, 12, 13, 14, or 15 mismatches.

Modifications

The nucleotides (e.g., therapeutic oligonucleotides) of the disclosure may be modified at various locations, including the sugar moiety, the phosphodiester linkage, and/or the base.

In some embodiments, the base moiety of a nucleoside may be modified. For example, a pyrimidine base may be modified at the 2, 3, 4, 5, and/or 6 position of the pyrimidine ring. In some embodiments, the exocyclic amine of cytosine may be modified. A purine base may also be modified. For example, a purine base may be modified at the 1, 2, 3, 6, 7, or 8 position. In some embodiments, the exocyclic amine of adenine may be modified. In some cases, a nitrogen atom in a ring of a base moiety may be substituted with another atom, such as carbon. A modification to a base moiety may be any suitable modification. Examples of modifications are known to those of ordinary skill in the art. In some embodiments, the base modifications include alkylated purines or pyrimidines, acylated purines or pyrimidines, or other heterocycles.

In some embodiments, a pyrimidine may be modified at the 5 position. For example, the 5 position of a pyrimidine may be modified with an alkyl group, an alkynyl group, an alkenyl group, an acyl group, or substituted derivatives thereof. In other examples, the 5 position of a pyrimidine may be modified with a hydroxyl group or an alkoxyl group or substituted derivative thereof. Also, the $N^4$ position of a pyrimidine may be alkylated. In still further examples, the pyrimidine 5-6 bond may be saturated, a nitrogen atom within the pyrimidine ring may be substituted with a carbon atom, and/or the $O^2$ and $O^4$ atoms may be substituted with sulfur atoms. It should be understood that other modifications are possible as well.

In other examples, the $N^7$ position and/or $N^2$ and/or $N^3$ position of a purine may be modified with an alkyl group or substituted derivative thereof. In further examples, a third ring may be fused to the purine bicyclic ring system and/or a nitrogen atom within the purine ring system may be substituted with a carbon atom. It should be understood that other modifications are possible as well.

Non-limiting examples of pyrimidines modified at the 5 position are disclosed in U.S. Pat. Nos. 5,591,843, 7,205,297, 6,432,963, and 6,020,483; non-limiting examples of pyrimidines modified at the $N^4$ position are disclosed in U.S. Pat. No. 5,580,731; non-limiting examples of purines modified at the 8 position are disclosed in U.S. Pat. Nos. 6,355,787 and 5,580,972; non-limiting examples of purines modified at the $N^6$ position are disclosed in U.S. Pat. Nos. 4,853,386, 5,789,416, and 7,041,824; and non-limiting examples of purines modified at the 2 position are disclosed in U.S. Pat. Nos. 4,201,860 and 5,587,469, all of which are incorporated herein by reference.

Non-limiting examples of modified bases include $N^4,N^4$-ethanocytosine, 7-deazaxanthosine, 7-deazaguanosine, 8-oxo-$N^6$-methyladenine, 4-acetylcytosine, 5-(carboxyhydroxylmethyl) uracil, 5-fluorouracil, 5-bromouracil, 5-carboxymethylaminomethyl-2-thiouracil, 5-carboxymethylaminomethyl uracil, dihydrouracil, inosine, $N^6$-isopentenyladenine, 1-methyladenine, 1-methylpseudouracil, 1-methylguanine, 1-methylinosine, 2,2-dimethylguanine, 2-methyladenine, 2-methylguanine, 3-methylcytosine, 5-methylcytosine, $N^6$-methyladenine, 7-methylguanine, 5-methylaminomethyl uracil, 5-methoxy aminomethyl-2-thiouracil, 5-methoxyuracil, 2-methylthio-$N^6$-isopentenyladenine, pseudouracil, 5-methyl-2-thiouracil, 2-thiouracil, 4-thiouracil, 5-methyluracil, 2-thiocytosine, and 2,6-diaminopurine. In some embodiments, the base moiety may be a heterocyclic base other than a purine or pyrimidine. The heterocyclic base may be optionally modified and/or substituted.

Sugar moieties include natural, unmodified sugars, e.g., monosaccharide (such as pentose, e.g., ribose, deoxyribose), modified sugars and sugar analogs. In general, possible modifications of nucleomonomers, particularly of a sugar moiety, include, for example, replacement of one or more of the hydroxyl groups with a halogen, a heteroatom, an aliphatic group, or the functionalization of the hydroxyl group as an ether, an amine, a thiol, or the like.

One particularly useful group of modified nucleomonomers are 2'-O-methyl nucleotides. Such 2'-O-methyl nucleotides may be referred to as "methylated," and the corresponding nucleotides may be made from unmethylated nucleotides followed by alkylation or directly from methylated nucleotide reagents. Modified nucleomonomers may be used in combination with unmodified nucleomonomers. For example, an oligonucleotide of the invention may contain both methylated and unmethylated nucleomonomers.

Some exemplary modified nucleomonomers include sugar- or backbone-modified ribonucleotides. Modified ribonucleotides may contain a non-naturally occurring base (instead of a naturally occurring base), such as uridines or cytidines modified at the 5'-position, e.g., 5'-(2-amino)propyl uridine and 5'-bromo uridine; adenosines and guanosines modified at the 8-position, e.g., 8-bromo guanosine; deaza nucleotides, e.g., 7-deaza-adenosine; and N-alkylated nucleotides, e.g., N6-methyl adenosine. Also, sugar-modified ribonucleotides may have the 2'-OH group replaced by a H, alxoxy (or OR), R or alkyl, halogen, SH, SR, amino (such as $NH_2$, NHR, $NR_2$), or CN group, wherein R is lower alkyl, alkenyl, or alkynyl.

Modified ribonucleotides may also have the phosphodiester group connecting to adjacent ribonucleotides replaced by a modified group, e.g., of phosphorothioate group. More generally, the various nucleotide modifications may be combined.

Although the antisense (guide) strand may be substantially identical to at least a portion of the target gene (or genes), at least with respect to the base pairing properties, the sequence need not be perfectly identical to be useful, e.g., to inhibit expression of a target gene's phenotype. Generally, higher homology can be used to compensate for the use of a shorter antisense gene. In some cases, the antisense strand generally will be substantially identical (although in antisense orientation) to the target gene.

The use of 2'-O-methyl modified RNA may also be beneficial in circumstances in which it is desirable to minimize cellular stress responses. RNA having 2'-O-methyl nucleomonomers may not be recognized by cellular machinery that is thought to recognize unmodified RNA. The use of 2'-O-methylated or partially 2'-O-methylated RNA may avoid the interferon response to double-stranded nucleic acids, while maintaining target RNA inhibition. This may be useful, for example, for avoiding the interferon or other cellular stress responses, both in short RNAi (e.g., siRNA) sequences that induce the interferon response, and in longer RNAi sequences that may induce the interferon response.

Overall, modified sugars may include D-ribose, 2'-O-alkyl (including 2'-O-methyl and 2'-O-ethyl), i.e., 2'-alkoxy, 2'-amino, 2'-S-alkyl, 2'-halo (including 2'-fluoro), 2'-methoxyethoxy, 2'-allyloxy (—$OCH_2CH=CH_2$), 2'-propargyl, 2'-propyl, ethynyl, ethenyl, propenyl, and cyano and the like. In one embodiment, the sugar moiety can be a hexose and incorporated into an oligonucleotide as described (Augustyns, K., et al., Nucl. Acids. Res. 18:4711 (1992)). Exemplary nucleomonomers can be found, e.g., in U.S. Pat. No. 5,849,902, incorporated by reference herein.

Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999, the entire contents of which are incorporated herein by reference.

Certain compounds of the disclosure may exist in particular geometric or stereoisomeric forms. The disclosure contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in disclosure.

Isomeric mixtures containing any of a variety of isomer ratios may be utilized in accordance with the disclosure. For example, where only two isomers are combined, mixtures containing 50:50, 60:40, 70:30, 80:20, 90:10, 95:5, 96:4, 97:3, 98:2, 99:1, or 100:0 isomer ratios are all contemplated by the disclosure. Those of ordinary skill in the art will readily appreciate that analogous ratios are contemplated for more complex isomer mixtures.

If, for instance, a particular enantiomer of a compound of the disclosure is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic means well known in the art, and subsequent recovery of the pure enantiomers.

In certain embodiments, oligonucleotides of the disclosure comprise 3' and 5' termini (except for circular oligonucleotides). In one embodiment, the 3' and 5' termini of an oligonucleotide can be substantially protected from nucleases e.g., by modifying the 3' or 5' linkages (e.g., U.S. Pat. No. 5,849,902 and WO 98/13526). For example, oligonucleotides can be made resistant by the inclusion of a "blocking group." The term "blocking group" as used herein refers to substituents (e.g., other than OH groups) that can be attached to oligonucleotides or nucleomonomers, either as protecting groups or coupling groups for synthesis (e.g., FITC, propyl ($CH_2$—$CH_2$—$CH_3$), glycol (—O—$CH_2$—$CH_2$—O—) phosphate ($PO_3^{2-}$), hydrogen phosphonate, or phosphoramidite). "Blocking groups" also include "end blocking groups" or "exonuclease blocking groups" which protect the 5' and 3' termini of the oligonucleotide, including modified nucleotides and non-nucleotide exonuclease resistant structures.

Exemplary end-blocking groups include cap structures (e.g., a 7-methylguanosine cap), inverted nucleomonomers, e.g., with 3'-3' or 5'-5' end inversions (see, e.g., Ortiagao et al. 1992. Antisense Res. Dev. 2:129), methylphosphonate, phosphoramidite, non-nucleotide groups (e.g., non-nucleotide linkers, amino linkers, conjugates) and the like. The 3' terminal nucleomonomer can comprise a modified sugar moiety. The 3' terminal nucleomonomer comprises a 3'-O that can optionally be substituted by a blocking group that prevents 3'-exonuclease degradation of the oligonucleotide. For example, the 3'-hydroxyl can be esterified to a nucleotide through a 3'→3' internucleotide linkage. For example, the alkyloxy radical can be methoxy, ethoxy, or isopropoxy, and preferably, ethoxy. Optionally, the 3'→3'linked nucleotide at the 3' terminus can be linked by a substitute linkage. To reduce nuclease degradation, the 5' most 3'→5' linkage can be a modified linkage, e.g., a phosphorothioate or a P-alkyloxyphosphotriester linkage. Preferably, the two 5' most 3'→5' linkages are modified linkages. Optionally, the 5' terminal hydroxy moiety can be esterified with a phosphorus containing moiety, e.g., phosphate, phosphorothioate, or P-ethoxyphosphate.

One of ordinary skill in the art will appreciate that the synthetic methods, as described herein, utilize a variety of protecting groups. By the term "protecting group," as used herein, it is meant that a particular functional moiety, e.g., O, S, or N, is temporarily blocked so that a reaction can be carried out selectively at another reactive site in a multifunctional compound. In certain embodiments, a protecting group reacts selectively in good yield to give a protected substrate that is stable to the projected reactions; the protecting group should be selectively removable in good yield by readily available, preferably non-toxic reagents that do not attack the other functional groups; the protecting group forms an easily separable derivative (more preferably without the generation of new stereogenic centers); and the protecting group has a minimum of additional functionality to avoid further sites of reaction. As detailed herein, oxygen, sulfur, nitrogen, and carbon protecting groups may be utilized. Hydroxyl protecting groups include methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl, p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, a-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4"-tris(4,5-dichlorophthalimidophenyl)methyl, 4,4',4"-tris(levulinoyloxyphenyl)methyl, 4,4',4"-tris(benzoyloxyphenyl)methyl, 3-(imidazol-1-yl)bis(4',4"-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxide, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), alkyl methyl carbonate, 9-fluorenylmethyl carbonate (Fmoc), alkyl ethyl carbonate, alkyl 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), alkyl isobutyl carbonate, alkyl vinyl carbonate alkyl allyl carbonate, alkyl p-nitrophenyl carbonate, alkyl benzyl carbonate, alkyl p-methoxybenzyl carbonate, alkyl 3,4-dimethoxybenzyl carbonate, alkyl o-nitrobenzyl carbonate, alkyl p-nitrobenzyl carbonate, alkyl S-benzyl thiocarbonate, 4-ethoxy-1-napthyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxycarbonyl)benzoate, a-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts). For protecting 1,2- or 1,3-diols, the protecting groups include methylene acetal, ethylidene acetal, 1-t-butylethylidene ketal, 1-phenylethylidene ketal, (4-methoxyphenyl)ethylidene acetal, 2,2,2-trichloroethylidene acetal, acetonide, cyclopentylidene ketal, cyclohexylidene ketal, cycloheptylidene ketal, benzylidene acetal, p-methoxybenzylidene acetal, 2,4-dimethoxybenzylidene ketal, 3,4-dimethoxybenzylidene acetal, 2-nitrobenzylidene acetal, methoxymethylene acetal, ethoxymethylene acetal, dimethoxymethylene ortho ester, 1-methoxyethylidene ortho ester, 1-ethoxyethylidine ortho ester, 1,2-dimethoxyethylidene ortho ester, α-methoxybenzylidene ortho ester, 1-(N,N-dimethylamino)ethylidene derivative, α-(N,N'-dimethylamino)benzylidene derivative, 2-oxacyclopentylidene ortho ester, di-t-butylsilylene group (DTBS), 1,3-(1,1,3,3-tetraisopropyldisiloxanylidene) derivative (TIPDS), tetra-t-butoxydisiloxane-1,3-diylidene derivative (TBDS), cyclic carbonates, cyclic boronates, ethyl boronate, and phenyl boronate. Amino-protecting groups include methyl carbamate, ethyl carbamante, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butylphenyl)-1-methylethyl carbamate (t-Bumeoc), 2-(2'- and 4'-pyridyl)ethyl carbamate (Pyoc), 2-(N,N-dicyclohexylcarboxamido)ethyl carbamate, t-butyl carbamate (BOC), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl)methyl carbamate, phenothiazinyl-(10)-carbonyl derivative, N'-p-toluenesulfonylaminocarbonyl derivative, N'-phenylaminothiocarbonyl derivative, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxycarbonylvinyl carbamate, o-(N,N-dimethylcarboxamido)benzyl carbamate, 1,1-dimethyl-3-(N,N-dimethylcarboxamido)propyl carbamate, 1,1-dimethylpropynyl carbamate, di(2-pyridyl)methyl carbamate, 2-furanylmethyl carbamate, 2-iodoethyl carbamate, isoborynl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl)ethyl carbamate, phenyl carbamate, p-(phenylazo)benzyl carbamate, 2,4,6-tri-t-butylphenyl carbamate, 4-(trimethylammonium)benzyl carbamate, 2,4,6-trimethylbenzyl carbamate, formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitophenylacetamide, o-nitrophenoxyacetamide, acetoacetamide, (N'-dithiobenzyloxycarbonylamino)acetamide, 3-(p-hydroxyphenyl)propanamide, 3-(o-nitrophenyl)propanamide, 2-methyl-2-(o-nitrophenoxy)propanamide, 2-methyl-2-(o-phenylazophenoxy)propanamide, 4-chlorobutanamide, 3-methyl-3-nitrobutanamide, o-nitrocinnamide, N-acetylmethionine derivative, o-nitrobenzamide, o-(benzoyloxymethyl)benzamide, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-allylamine, N-[2-(trimethylsilyl)ethoxy]methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene)amine, N,N'-isopropylidenediamine, N-p-nitrobenzylideneamine, N-salicylideneamine, N-5-chlorosalicylideneamine, N-(5-chloro-2-hydroxyphenyl)phenylmethyleneamine, N-cyclohexylideneamine, N-(5,5-dimethyl-3-oxo-1-cyclohexenyl)amine, N-borane derivative, N-diphenylborinic acid derivative, N-[phenyl(pentacarbonylchromium- or tungsten)carbonyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, 3-nitropyridinesulfenamide (Npys), p-toluenesulfonamide (Ts), benzenesulfonamide, 2,3,6,-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide. Exemplary protecting groups are detailed herein. However, it will be appreciated that the present invention is not intended to be limited to these protecting groups; rather, a variety of additional equivalent protecting groups can be readily identified using the above criteria and utilized in the method of the present invention. Additionally, a variety of protecting groups are described in Protective Groups in Organic Synthesis, Third Ed. Greene, T. W. and Wuts, P. G., Eds., John Wiley & Sons, New York: 1999, the entire contents of which are hereby incorporated by reference.

It will be appreciated that the compounds, as described herein, may be substituted with any number of substituents or functional moieties. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. As used herein, the term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful in the treatment, for example, of infectious diseases or proliferative disorders. The term "stable", as used herein, preferably refers to compounds which possess stability sufficient to allow manufacture and which maintain the integrity of the compound for a sufficient period of time to be detected and preferably for a sufficient period of time to be useful for the purposes detailed herein.

The term "aliphatic," as used herein, includes both saturated and unsaturated, straight chain (i.e., unbranched), branched, acyclic, cyclic, or polycyclic aliphatic hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl," "alkynyl," and the like. Furthermore, as used herein, the terms "alkyl," "alkenyl," "alkynyl," and the like encompass both substituted and unsubstituted groups. In certain embodiments, as used herein, "lower alkyl" is used to indicate those alkyl groups (cyclic, acyclic, substituted, unsubstituted, branched, or unbranched) having 1-6 carbon atoms.

In certain embodiments, the alkyl, alkenyl, and alkynyl groups employed in the invention contain 1-20 aliphatic carbon atoms. In certain other embodiments, the alkyl, alkenyl, and alkynyl groups employed in the invention contain 1-10 aliphatic carbon atoms. In yet other embodiments, the alkyl, alkenyl, and alkynyl groups employed in the invention contain 1-8 aliphatic carbon atoms. In still other embodiments, the alkyl, alkenyl, and alkynyl groups employed in the invention contain 1-6 aliphatic carbon atoms. In yet other embodiments, the alkyl, alkenyl, and alkynyl groups employed in the invention contain 1-4 carbon atoms. Illustrative aliphatic groups thus include, but are not limited to, for example, methyl, ethyl, n-propyl, isopropyl, cyclopropyl, —$CH_2$-cyclopropyl, vinyl, allyl, n-butyl, sec-butyl, isobutyl, tert-butyl, cyclobutyl, —$CH_2$-cyclobutyl, n-pentyl, sec-pentyl, isopentyl, tert-pentyl, cyclopentyl, —$CH_2$-cyclopentyl, n-hexyl, sec-hexyl, cyclohexyl, —$CH_2$-cyclohexyl moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl, and the like.

Some examples of substituents of the above-described aliphatic (and other) moieties of compounds of the invention include, but are not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$ wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments described herein.

The term "heteroaliphatic," as used herein, refers to aliphatic moieties that contain one or more oxygen, sulfur, nitrogen, phosphorus, or silicon atoms, e.g., in place of carbon atoms. Heteroaliphatic moieties may be branched, unbranched, cyclic or acyclic and include saturated and unsaturated heterocycles such as morpholino, pyrrolidinyl, etc. In certain embodiments, heteroaliphatic moieties are substituted by independent replacement of one or more of the hydrogen atoms thereon with one or more moieties including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$, wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments described herein.

The terms "halo" and "halogen" as used herein refer to an atom selected from fluorine, chlorine, bromine, and iodine.

The term "alkyl" includes saturated aliphatic groups, including straight-chain alkyl groups (e.g., methyl, ethyl, propyl, butyl, pentyl, hexyl, heptyl, octyl, nonyl, decyl, etc.), branched-chain alkyl groups (isopropyl, tert-butyl, isobutyl, etc.), cycloalkyl (alicyclic) groups (cyclopropyl, cyclopentyl, cyclohexyl, cycloheptyl, cyclooctyl), alkyl substituted cycloalkyl groups, and cycloalkyl substituted alkyl groups. In certain embodiments, a straight chain or branched chain alkyl has 6 or fewer carbon atoms in its backbone (e.g., $C_1$-$C_6$ for straight chain, $C_3$-$C_6$ for branched chain), and more preferably 4 or fewer. Likewise, preferred cycloalkyls have from 3-8 carbon atoms in their ring structure, and more preferably have 5 or 6 carbons in the ring structure. The term $C_1$-$C_6$ includes alkyl groups containing 1 to 6 carbon atoms.

Moreover, unless otherwise specified, the term alkyl includes both "unsubstituted alkyls" and "substituted alkyls," the latter of which refers to alkyl moieties having independently selected substituents replacing a hydrogen on one or more carbons of the hydrocarbon backbone. Such substituents can include, for example, alkenyl, alkynyl, halogen, hydroxyl, alkylcarbonyloxy, arylcarbonyloxy, alkoxycarbonyloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfates, alkylsulfinyl, sulfonato, sulfamoyl, sulfonamido, nitro, trifluoromethyl, cyano, azido, heterocyclyl, alkylaryl, or an aromatic or heteroaromatic moiety. Cycloalkyls can be further substituted, e.g., with the substituents described above. An "alkylaryl" or an "arylalkyl" moiety is an alkyl substituted with an aryl (e.g., phenylmethyl (benzyl)). The term "alkyl" also includes the side chains of natural and unnatural amino acids. The term "n-alkyl" means a straight chain (i.e., unbranched) unsubstituted alkyl group.

The term "alkenyl" includes unsaturated aliphatic groups analogous in length and possible substitution to the alkyls described above, but that contain at least one double bond. For example, the term "alkenyl" includes straight-chain alkenyl groups (e.g., ethylenyl, propenyl, butenyl, pentenyl, hexenyl, heptenyl, octenyl, nonenyl, decenyl, etc.), branched-chain alkenyl groups, cycloalkenyl (alicyclic) groups (cyclopropenyl, cyclopentenyl, cyclohexenyl, cycloheptenyl, cyclooctenyl), alkyl or alkenyl substituted cycloalkenyl groups, and cycloalkyl or cycloalkenyl substituted alkenyl groups. In certain embodiments, a straight chain or branched chain alkenyl group has 6 or fewer carbon atoms in its backbone (e.g., $C_2$-$C_6$ for straight chain, $C_3$-$C_6$ for branched chain). Likewise, cycloalkenyl groups may have from 3-8 carbon atoms in their ring structure, and more preferably have 5 or 6 carbons in the ring structure. The term $C_2$-$C_6$ includes alkenyl groups containing 2 to 6 carbon atoms.

Moreover, unless otherwise specified, the term alkenyl includes both "unsubstituted alkenyls" and "substituted alkenyls," the latter of which refers to alkenyl moieties having independently selected substituents replacing a hydrogen on one or more carbons of the hydrocarbon backbone. Such substituents can include, for example, alkyl groups, alkynyl groups, halogens, hydroxyl, alkylcarbonyloxy, arylcarbonyloxy, alkoxycarbonyloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfates, alkylsulfinyl, sulfonato, sulfamoyl, sulfonamido, nitro, trifluoromethyl, cyano, azido, heterocyclyl, alkylaryl, or an aromatic or heteroaromatic moiety.

The term "alkynyl" includes unsaturated aliphatic groups analogous in length and possible substitution to the alkyls described above, but which contain at least one triple bond. For example, the term "alkynyl" includes straight-chain alkynyl groups (e.g., ethynyl, propynyl, butynyl, pentynyl, hexynyl, heptynyl, octynyl, nonynyl, decynyl, etc.), branched-chain alkynyl groups, and cycloalkyl or cycloalkenyl substituted alkynyl groups. In certain embodiments, a straight chain or branched chain alkynyl group has 6 or fewer carbon atoms in its backbone (e.g., $C_2$-$C_6$ for straight chain, $C_3$-$C_6$ for branched chain). The term $C_2$-$C_6$ includes alkynyl groups containing 2 to 6 carbon atoms.

Moreover, unless otherwise specified, the term alkynyl includes both "unsubstituted alkynyls" and "substituted alkynyls," the latter of which refers to alkynyl moieties having independently selected substituents replacing a hydrogen on one or more carbons of the hydrocarbon backbone. Such substituents can include, for example, alkyl groups, alkynyl groups, halogens, hydroxyl, alkylcarbonyloxy, arylcarbonyloxy, alkoxycarbonyloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfates, alkylsulfinyl, sulfonato, sulfamoyl, sulfonamido, nitro, trifluoromethyl, cyano, azido, heterocyclyl, alkylaryl, or an aromatic or heteroaromatic moiety.

Unless the number of carbons is otherwise specified, "lower alkyl" as used herein means an alkyl group, as defined above, but having from one to five carbon atoms in its backbone structure. "Lower alkenyl" and "lower alkynyl" have chain lengths of, for example, 2-5 carbon atoms.

The term "alkoxy" includes substituted and unsubstituted alkyl, alkenyl, and alkynyl groups covalently linked to an oxygen atom. Examples of alkoxy groups include methoxy, ethoxy, isopropyloxy, propoxy, butoxy, and pentoxy groups. Examples of substituted alkoxy groups include halogenated alkoxy groups. The alkoxy groups can be substituted with independently selected groups such as alkenyl, alkynyl, halogen, hydroxyl, alkylcarbonyloxy, arylcarbonyloxy, alkoxycarbonyloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfates, alkylsulfinyl, sulfonato, sulfamoyl, sulfonamido, nitro, trifluoromethyl, cyano, azido, heterocyclyl, alkylaryl, or an aromatic or heteroaromatic moieties. Examples of halogen substituted alkoxy groups include, but are not limited to, fluoromethoxy, difluoromethoxy, trifluoromethoxy, chloromethoxy, dichloromethoxy, trichloromethoxy, etc.

The term "heteroatom" includes atoms of any element other than carbon or hydrogen. Preferred heteroatoms are nitrogen, oxygen, sulfur and phosphorus.

The term "hydroxy" or "hydroxyl" includes groups with an —OH or —O⁻ (with an appropriate counterion).

The term "halogen" includes fluorine, bromine, chlorine, iodine, etc. The term "perhalogenated" generally refers to a moiety wherein all hydrogens are replaced by halogen atoms.

The term "substituted" includes independently selected substituents which can be placed on the moiety and which allow the molecule to perform its intended function. Examples of substituents include alkyl, alkenyl, alkynyl, aryl, $(CR'R'')_{0-3}NR'R''$, $(CR'R'')_{0-3}CN$, $NO_2$, halogen, $(CR'R'')_{0-3}C(halogen)_3$, $(CR'R'')_{0-3}CH(halogen)_2$, $(CR'R'')_{0-3}CH_2(halogen)$, $(CR'R'')_{0-3}CONR'R''$, $(CR'R'')_{0-3}S(O)_{1-2}NR'R''$, $(CR'R'')_{0-3}CHO$, $(CR'R'')_{0-3}O(CR'R'')_{0-3}H$, $(CR'R'')_{0-3}S(O)_{0-2}R'$, $(CR'R'')_{0-3}O(CR'R'')_{0-3}H$, $(CR'R'')_{0-3}COR'$, $(CR'R'')_{0-3}CO_2R'$, or $(CR'R'')_{0-3}OR'$ groups; wherein each R' and R" are each independently hydrogen, a $C_1$-$C_5$ alkyl, $C_2$-$C_5$ alkenyl, $C_2$-$C_5$ alkynyl, or aryl group, or R' and R" taken together are a benzylidene group or a —$(CH_2)_2O(CH_2)_2$— group.

The term "amine" or "amino" includes compounds or moieties in which a nitrogen atom is covalently bonded to at least one carbon or heteroatom. The term "alkyl amino" includes groups and compounds wherein the nitrogen is bound to at least one additional alkyl group. The term "dialkyl amino" includes groups wherein the nitrogen atom is bound to at least two additional alkyl groups.

The term "ether" includes compounds or moieties which contain an oxygen bonded to two different carbon atoms or heteroatoms. For example, the term includes "alkoxyalkyl," which refers to an alkyl, alkenyl, or alkynyl group covalently bonded to an oxygen atom which is covalently bonded to another alkyl group.

The terms "polynucleotide," "nucleotide sequence," "nucleic acid," "nucleic acid molecule," "nucleic acid sequence," and "oligonucleotide" refer to a polymer of two or more nucleotides. The polynucleotides can be DNA, RNA, or derivatives or modified versions thereof. The polynucleotide may be single-stranded or double-stranded. The polynucleotide can be modified at the base moiety, sugar moiety, or phosphate backbone, for example, to improve stability of the molecule, its hybridization parameters, etc. The polynucleotide may comprise a modified base moiety which is selected from the group including but not limited to 5-fluorouracil, 5-bromouracil, 5-chlorouracil, 5-iodouracil, hypoxanthine, xanthine, 4-acetylcytosine, 5-(carboxyhydroxylmethyl) uracil, 5-carboxymethylaminomethyl-2-thiouridine, 5-carboxymethylaminomethyluracil, dihydrouracil, beta-D-galactosylqueosine, inosine, N6-isopentenyladenine, 1-methylguanine, 1-methylinosine, 2,2-dimethylguanine, 2-methyladenine, 2-methylguanine, 3-methylcytosine, 5-methylcytosine, N6-adenine, 7-methylguanine, 5-methylaminomethyluracil, 5-methoxyaminomethyl-2-thiouracil, beta-D-mannosylqueosine, 5'-methoxycarboxymethyluracil, 5-methoxyuracil, 2-methylthio-N6-isopentenyladenine, wybutoxosine, pseudouracil, queosine, 2-thiocytosine, 5-methyl-2-thiouracil, 2-thiouracil, 4-thiouracil, 5-methyluracil, uracil-5-oxyacetic acid methylester, uracil-5-oxyacetic acid, 5-methyl-2-thiouracil, 3-(3-amino-3-N-2-carboxypropyl) uracil, and 2,6-diaminopurine. The polynucleotide may comprise a modified sugar moiety (e.g., 2'-fluororibose, ribose, 2'-deoxyribose, 2'-O-methylcytidine, arabinose, and hexose), and/or a modified phosphate moiety (e.g., phosphorothioates and 5'-N-phosphoramidite linkages). A nucleotide sequence typically carries genetic information, including the information used by cellular machinery to make proteins and enzymes. These terms include double- or single-stranded genomic and cDNA, RNA, any synthetic and genetically manipulated polynucleotide, and both sense and antisense polynucleotides. This includes single- and double-stranded molecules, i.e., DNA-DNA, DNA-RNA, and RNA-RNA hybrids, as well as "protein nucleic acids" (PNA) formed by conjugating bases to an amino acid backbone.

The term "base" includes the known purine and pyrimidine heterocyclic bases, deazapurines, and analogs (including heterocyclic substituted analogs, e.g., aminoethoxy phenoxazine), derivatives (e.g., 1-alkyl-, 1-alkenyl-, heteroaromatic- and 1-alkynyl derivatives) and tautomers thereof. Examples of purines include adenine, guanine, inosine, diaminopurine, and xanthine and analogs (e.g., 8-oxo-$N^6$-methyladenine or 7-diazaxanthine) and derivatives thereof. Pyrimidines include, for example, thymine, uracil, and cytosine, and their analogs (e.g., 5-methylcytosine, 5-methyluracil, 5-(1-propynyl)uracil, 5-(1-propynyl) cytosine and 4,4-ethanocytosine). Other examples of suitable bases include non-purinyl and non-pyrimidinyl bases such as 2-aminopyridine and triazines.

In a preferred embodiment, the nucleomonomers of an oligonucleotide of the invention are RNA nucleotides. In another preferred embodiment, the nucleomonomers of an oligonucleotide of the invention are modified RNA nucleotides. Thus, the oligonucleotides contain modified RNA nucleotides.

The term "nucleoside" includes bases which are covalently attached to a sugar moiety, preferably ribose or deoxyribose. Examples of preferred nucleosides include ribonucleosides and deoxyribonucleosides. Nucleosides also include bases linked to amino acids or amino acid analogs which may comprise free carboxyl groups, free amino groups, or protecting groups. Suitable protecting groups are well known in the art (see P. G. M. Wuts and T. W. Greene, "Protective Groups in Organic Synthesis", $2^{nd}$ Ed., Wiley-Interscience, New York, 1999).

The term "nucleotide" includes nucleosides which further comprise a phosphate group or a phosphate analog.

The nucleic acid molecules may be associated with a hydrophobic moiety for targeting and/or delivery of the molecule to a cell. In certain embodiments, the hydrophobic moiety is associated with the nucleic acid molecule through a linker. In certain embodiments, the association is through non-covalent interactions. In other embodiments, the association is through a covalent bond. Any linker known in the art may be used to associate the nucleic acid with the hydrophobic moiety. Linkers known in the art are described in published international PCT applications, WO 92/03464, WO 95/23162, WO 2008/021157, WO 2009/021157, WO 2009/134487, WO 2009/126933, U.S. Patent Application Publication 2005/0107325, U.S. Pat. Nos. 5,414,077, 5,419,966, 5,512,667, 5,646,126, and 5,652,359, which are incorporated herein by reference. The linker may be as simple as a covalent bond to a multi-atom linker. The linker may be cyclic or acyclic. The linker may be optionally substituted. In certain embodiments, the linker is capable of being cleaved from the nucleic acid. In certain embodiments, the linker is capable of being hydrolyzed under physiological conditions. In certain embodiments, the linker is capable of being cleaved by an enzyme (e.g., an esterase or phosphodiesterase). In certain embodiments, the linker comprises a spacer element to separate the nucleic acid from the hydrophobic moiety. The spacer element may include one to thirty carbon or heteroatoms. In certain embodiments, the linker and/or spacer element comprises protonatable functional groups. Such protonatable functional groups may promote the endosomal escape of the nucleic acid molecule. The protonatable functional groups may also aid in the delivery of the nucleic acid to a cell, for example, neutralizing the overall charge of the molecule. In other embodiments, the linker and/or spacer element is biologically inert (that is, it does not impart biological activity or function to the resulting nucleic acid molecule).

In certain embodiments, the nucleic acid molecule with a linker and hydrophobic moiety is of the formulae described herein. In certain embodiments, the nucleic acid molecule is of the formula:

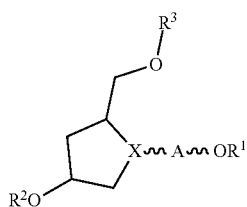

wherein

X is N or CH;

A is a bond; substituted or unsubstituted, cyclic or acyclic, branched or unbranched aliphatic; or substituted or unsubstituted, cyclic or acyclic, branched or unbranched heteroaliphatic;

$R^1$ is a hydrophobic moiety;

$R^2$ is hydrogen; an oxygen-protecting group; cyclic or acyclic, substituted or unsubstituted, branched or unbranched aliphatic; cyclic or acyclic, substituted or unsubstituted, branched or unbranched heteroaliphatic; substituted or unsubstituted, branched or unbranched acyl; substituted or unsubstituted, branched or unbranched aryl; substituted or unsubstituted, branched or unbranched heteroaryl; and $R^3$ is a nucleic acid.

In certain embodiments, the molecule is of the formula:

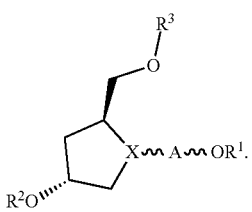

In certain embodiments, the molecule is of the formula:

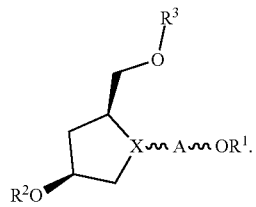

In certain embodiments, the molecule is of the formula:

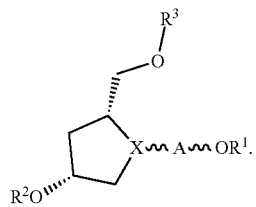

In certain embodiments, the molecule is of the formula:

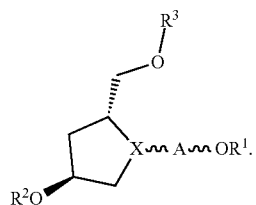

In certain embodiments, X is N. In certain embodiments, X is CH.

In certain embodiments, A is a bond. In certain embodiments, A is substituted or unsubstituted, cyclic or acyclic, branched or unbranched aliphatic. In certain embodiments, A is acyclic, substituted or unsubstituted, branched or unbranched aliphatic. In certain embodiments, A is acyclic, substituted, branched or unbranched aliphatic. In certain embodiments, A is acyclic, substituted, unbranched aliphatic. In certain embodiments, A is acyclic, substituted, unbranched alkyl. In certain embodiments, A is acyclic, substituted, unbranched $C_{1-20}$ alkyl. In certain embodiments, A is acyclic, substituted, unbranched $C_{1-12}$ alkyl. In certain embodiments, A is acyclic, substituted, unbranched $C_{1-10}$ alkyl. In certain embodiments, A is acyclic, substituted, unbranched $C_{1-8}$ alkyl. In certain embodiments, A is acyclic, substituted, unbranched $C_{1-6}$ alkyl. In certain embodiments, A is substituted or unsubstituted, cyclic or acyclic, branched or unbranched heteroaliphatic. In certain embodiments, A is acyclic, substituted or unsubstituted, branched or unbranched heteroaliphatic. In certain embodiments, A is acyclic, substituted, branched or unbranched heteroaliphatic. In certain embodiments, A is acyclic, substituted, unbranched heteroaliphatic.

In certain embodiments, A is of the formula:

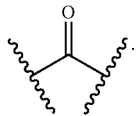

In certain embodiments, A is of one of the formulae:
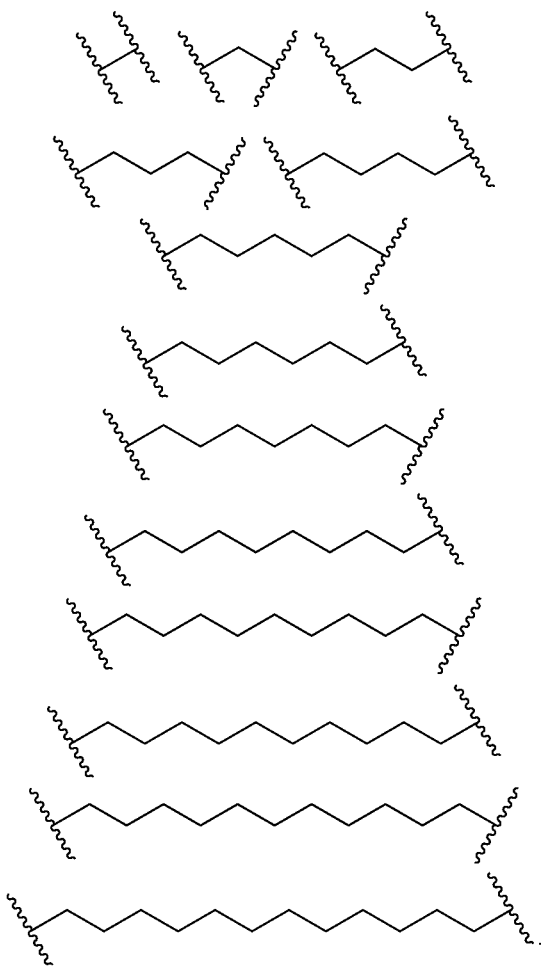
In certain embodiments, A is of one of the formulae:
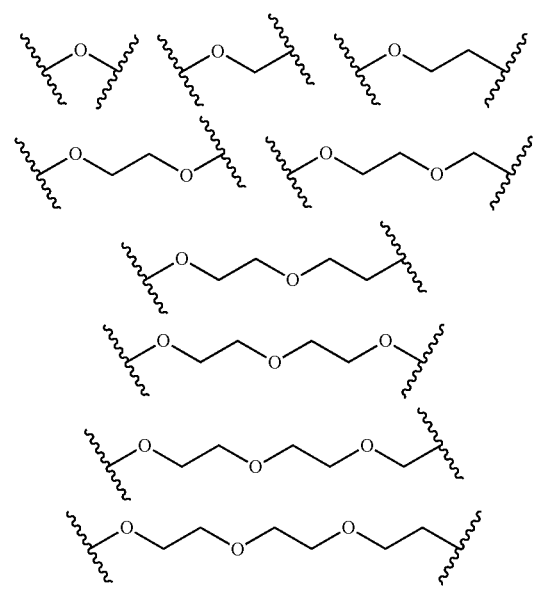
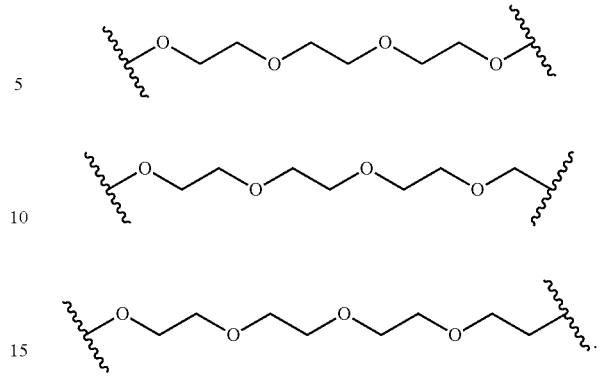
In certain embodiments, A is of one of the formulae:
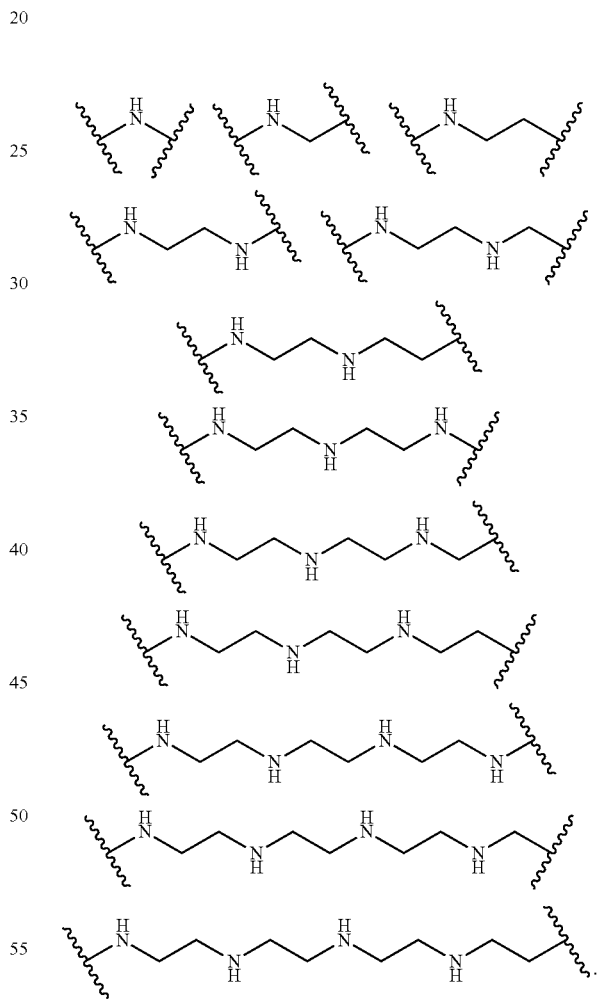
In certain embodiments, A is of the formula:
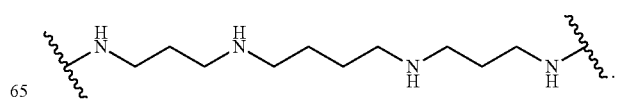

In certain embodiments, A is of the formula:

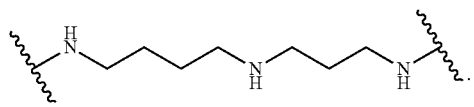 [SMILES: *NCCCCNCCCN*]

In certain embodiments, A is of the formula:

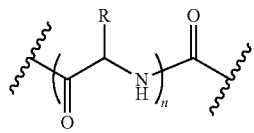

wherein
each occurrence of R is independently the side chain of a natural or unnatural amino acid; and
n is an integer between 1 and 20, inclusive. In certain embodiments, A is of the formula:

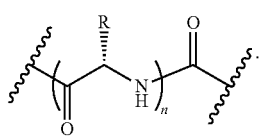

In certain embodiments, each occurrence of R is independently the side chain of a natural amino acid. In certain embodiments, n is an integer between 1 and 15, inclusive. In certain embodiments, n is an integer between 1 and 10, inclusive. In certain embodiments, n is an integer between 1 and 5, inclusive.

In certain embodiments, A is of the formula:

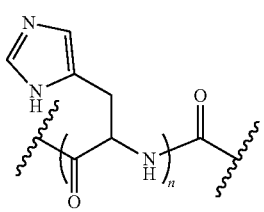

wherein n is an integer between 1 and 20, inclusive. In certain embodiments, A is of the formula:

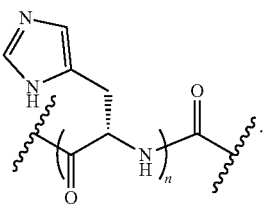

In certain embodiments, n is an integer between 1 and 15, inclusive. In certain embodiments, n is an integer between 1 and 10, inclusive. In certain embodiments, n is an integer between 1 and 5, inclusive.

In certain embodiments, A is of the formula:

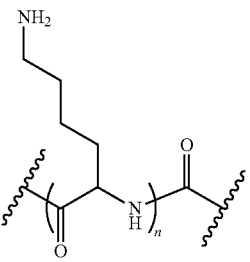

wherein n is an integer between 1 and 20, inclusive. In certain embodiments, A is of the formula:

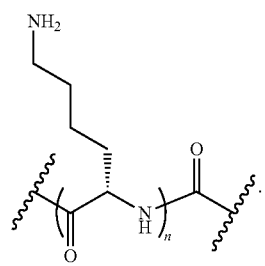

In certain embodiments, n is an integer between 1 and 15, inclusive. In certain embodiments, n is an integer between 1 and 10, inclusive. In certain embodiments, n is an integer between 1 and 5, inclusive.

In certain embodiments, the molecule is of the formula:

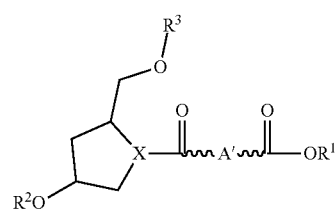

wherein X, $R^1$, $R^2$, and $R^3$ are as defined herein; and
A' is substituted or unsubstituted, cyclic or acyclic, branched or unbranched aliphatic; or substituted or unsubstituted, cyclic or acyclic, branched or unbranched heteroaliphatic.

In certain embodiments, A' is of one of the formulae:

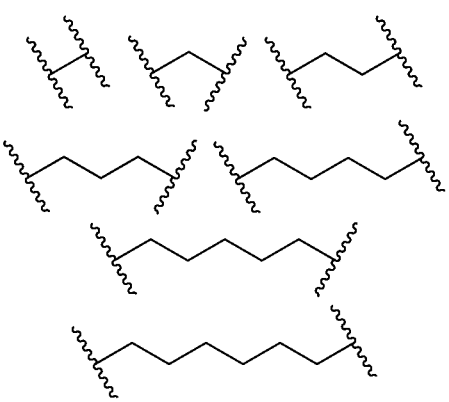

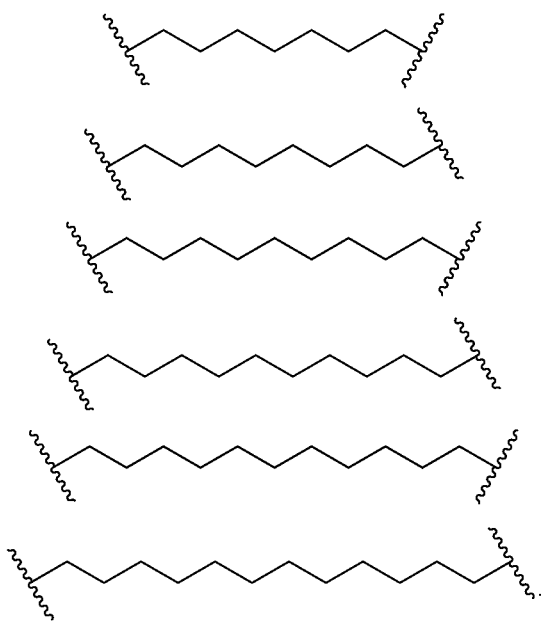

In certain embodiments, A is of one of the formulae:

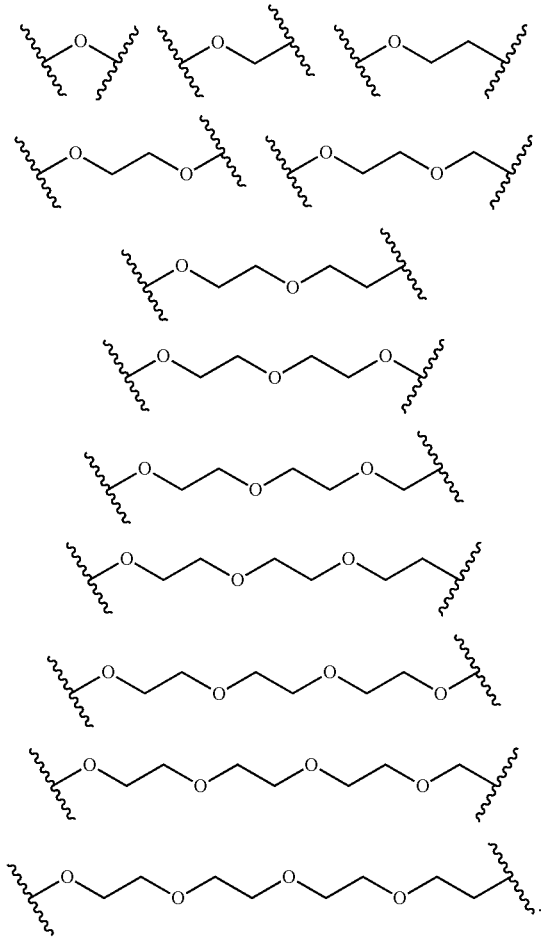

In certain embodiments, A is of one of the formulae:

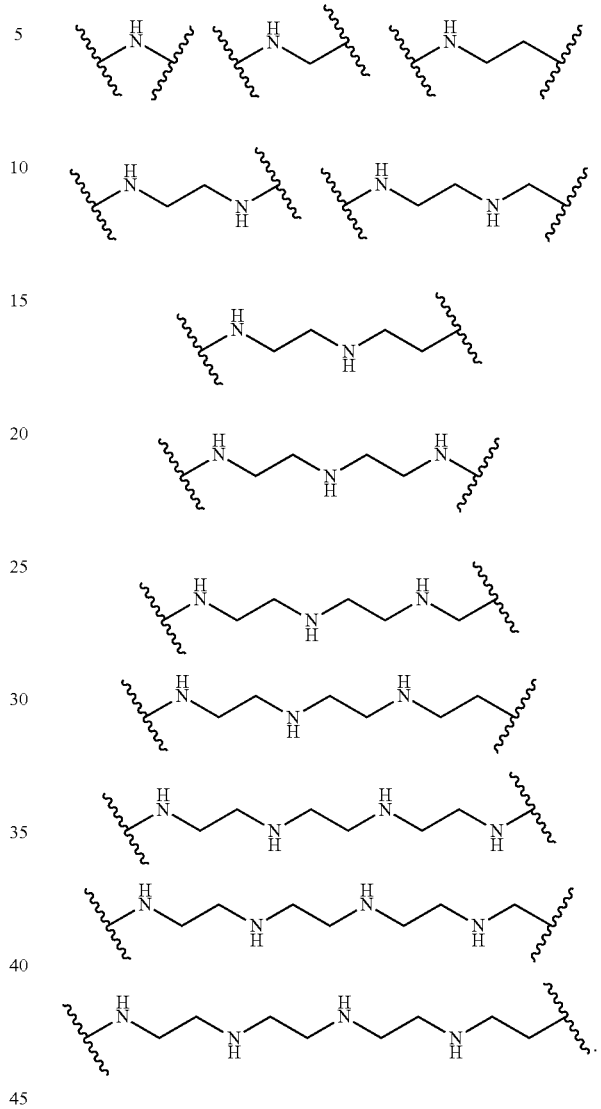

In certain embodiments, A is of the formula:

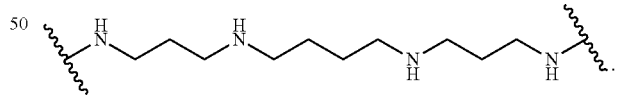

In certain embodiments, A is of the formula:

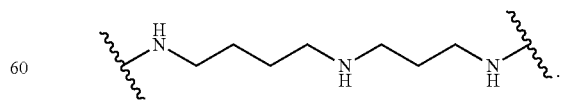

In certain embodiments, $R^1$ is a steroid. In certain embodiments, $R^1$ is a cholesterol. In certain embodiments, $R^1$ is a lipophilic vitamin. In certain embodiments, $R^1$ is a vitamin A. In certain embodiments, $R^1$ is a vitamin E.

In certain embodiments, R¹ is of the formula:

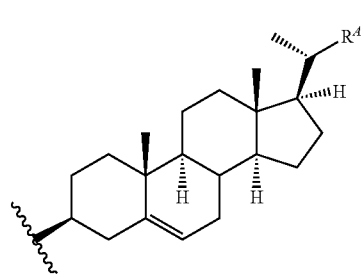

wherein R^A is substituted or unsubstituted, cyclic or acyclic, branched or unbranched aliphatic; or substituted or unsubstituted, cyclic or acyclic, branched or unbranched heteroaliphatic.

In certain embodiments, R¹ is of the formula:

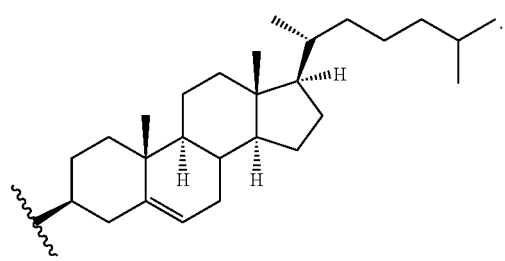

In certain embodiments, R¹ is of the formula:

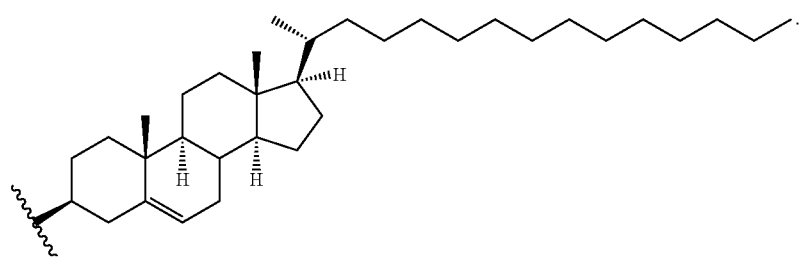

In certain embodiments, R¹ is of the formula:

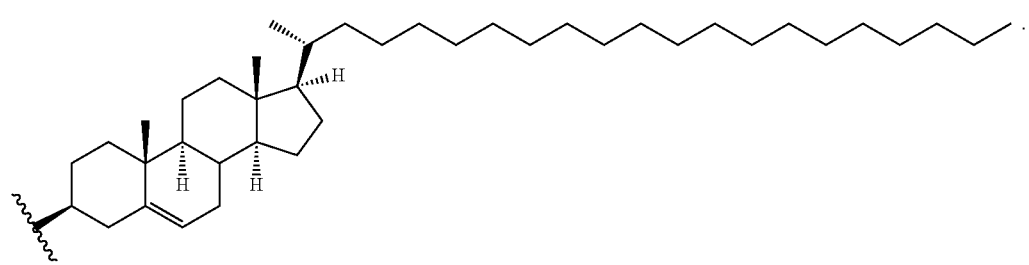

In certain embodiments, R¹ is of the formula:

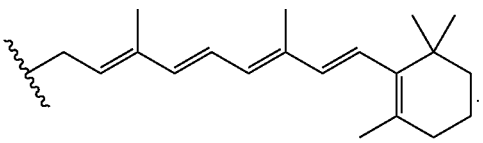 [SMILES: *C/C=C(C)/C=C/C=C(C)/C=C/C1=C(C)CCCC1(C)C]

In certain embodiments, R¹ is of the formula:

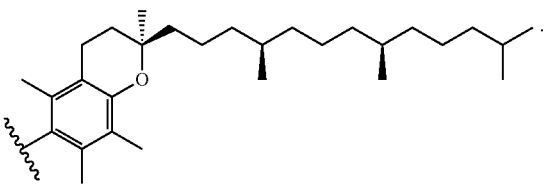 [SMILES: *c1c(C)c(C)c2c(c1C)CC[C@@](C)(CCC[C@H](C)CCC[C@H](C)CCCC(C)C)O2]

In certain embodiments, the nucleic acid molecule is of the formula:

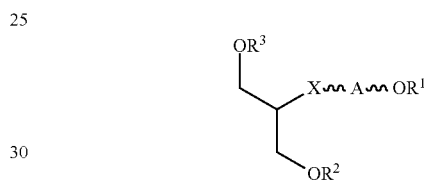

wherein
X is N or CH;
A is a bond; substituted or unsubstituted, cyclic or acyclic, branched or unbranched aliphatic; or substituted or unsubstituted, cyclic or acyclic, branched or unbranched heteroaliphatic;

$R^1$ is a hydrophobic moiety;

$R^2$ is hydrogen; an oxygen-protecting group; cyclic or acyclic, substituted or unsubstituted, branched or unbranched aliphatic; cyclic or acyclic, substituted or unsubstituted, branched or unbranched heteroaliphatic; substituted or unsubstituted, branched or unbranched acyl; substituted or unsubstituted, branched or unbranched aryl; substituted or unsubstituted, branched or unbranched heteroaryl; and $R^3$ is a nucleic acid.

In certain embodiments, the nucleic acid molecule is of the formula:

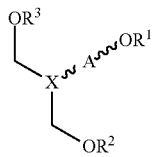

wherein

X is N or CH;

A is a bond; substituted or unsubstituted, cyclic or acyclic, branched or unbranched aliphatic; or substituted or unsubstituted, cyclic or acyclic, branched or unbranched heteroaliphatic;

$R^1$ is a hydrophobic moiety;

$R^2$ is hydrogen; an oxygen-protecting group; cyclic or acyclic, substituted or unsubstituted, branched or unbranched aliphatic; cyclic or acyclic, substituted or unsubstituted, branched or unbranched heteroaliphatic; substituted or unsubstituted, branched or unbranched acyl; substituted or unsubstituted, branched or unbranched aryl; substituted or unsubstituted, branched or unbranched heteroaryl; and $R^3$ is a nucleic acid.

In certain embodiments, the nucleic acid molecule is of the formula:

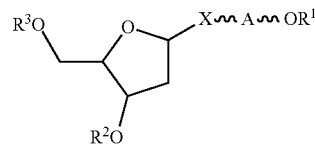

wherein

X is N or CH;

A is a bond; substituted or unsubstituted, cyclic or acyclic, branched or unbranched aliphatic; or substituted or unsubstituted, cyclic or acyclic, branched or unbranched heteroaliphatic;

$R^1$ is a hydrophobic moiety;

$R^2$ is hydrogen; an oxygen-protecting group; cyclic or acyclic, substituted or unsubstituted, branched or unbranched aliphatic; cyclic or acyclic, substituted or unsubstituted, branched or unbranched heteroaliphatic; substituted or unsubstituted, branched or unbranched acyl; substituted or unsubstituted, branched or unbranched aryl; substituted or unsubstituted, branched or unbranched heteroaryl; and $R^3$ is a nucleic acid. In certain embodiments, the nucleic acid molecule is of the formula:

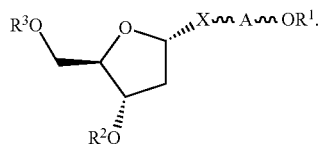

In certain embodiments, the nucleic acid molecule is of the formula:

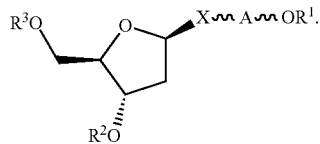

In certain embodiments, the nucleic acid molecule is of the formula:

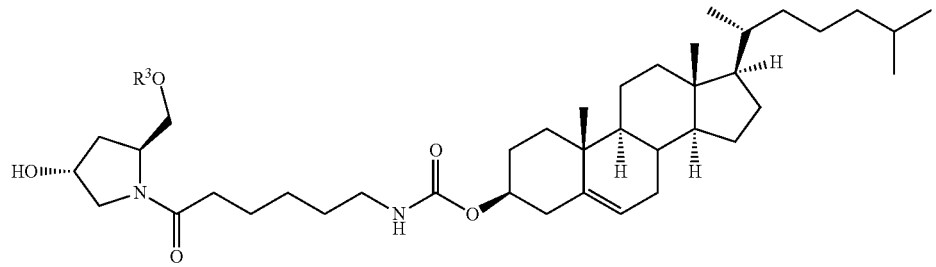

wherein $R^3$ is a nucleic acid.

In certain embodiments, the nucleic acid molecule is of the formula:
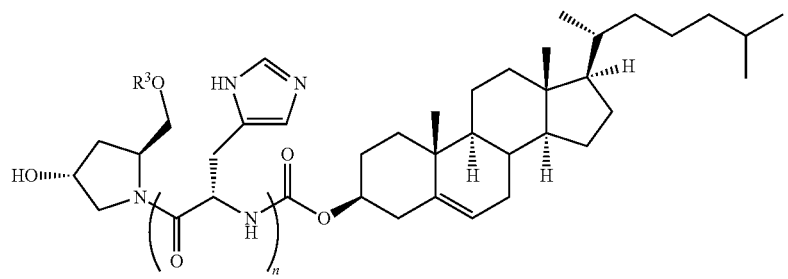
wherein $R^3$ is a nucleic acid; and
n is an integer between 1 and 20, inclusive.
In certain embodiments, the nucleic acid molecule is of the formula:
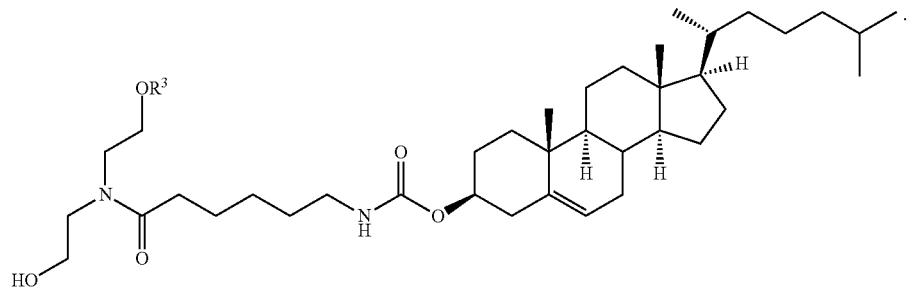
In certain embodiments, the nucleic acid molecule is of the formula:
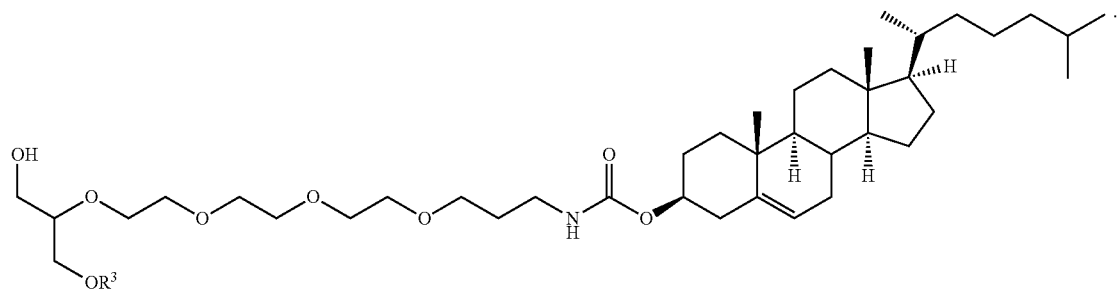
In certain embodiments, the nucleic acid molecule is of the formula:
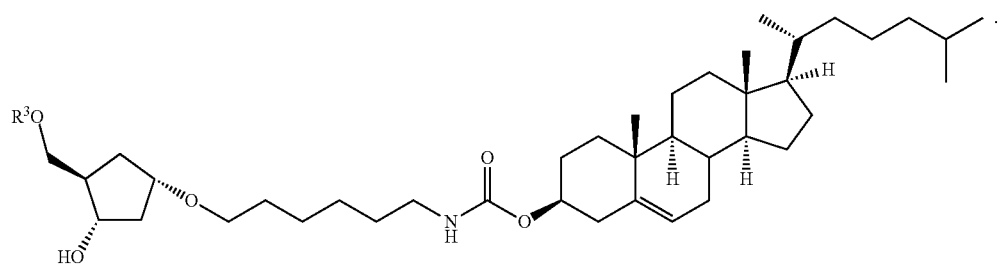

In certain embodiments, the nucleic acid molecule is of the formula:

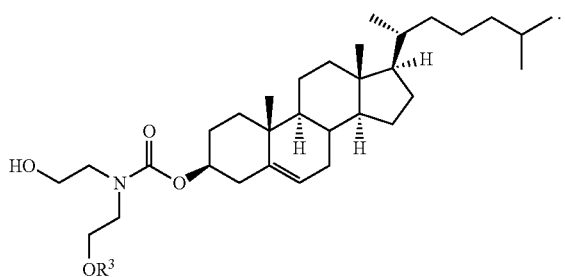

In certain embodiments, the nucleic acid molecule is of the formula:

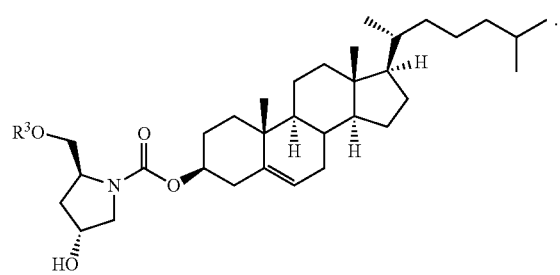

As used herein, the term "linkage" includes a naturally occurring, unmodified phosphodiester moiety (—O—(PO$^2$)—O—) that covalently couples adjacent nucleomonomers. As used herein, the term "substitute linkage" includes any analog or derivative of the native phosphodiester group that covalently couples adjacent nucleomonomers. Substitute linkages include phosphodiester analogs, e.g., phosphorothioate, phosphorodithioate, and P-ethyoxyphosphodiester, P-ethoxyphosphodiester, P-alkyloxyphosphotriester, methylphosphonate, and nonphosphorus containing linkages, e.g., acetals and amides. Such substitute linkages are known in the art (e.g., Bjergarde et al. 1991. Nucleic Acids Res. 19:5843; Caruthers et al. 1991. Nucleosides Nucleotides. 10:47). In certain embodiments, non-hydrolizable linkages are preferred, such as phosphorothiate linkages.

In certain embodiments, oligonucleotides of the disclosure comprise hydrophobically modified nucleotides or "hydrophobic modifications." As used herein "hydrophobic modifications" refers to bases that are modified such that (1) overall hydrophobicity of the base is significantly increased, and/or (2) the base is still capable of forming close to regular Watson-Crick interaction. Several non-limiting examples of base modifications include 5-position uridine and cytidine modifications such as phenyl, 4-pyridyl, 2-pyridyl, indolyl, and isobutyl, phenyl (C6H5OH); tryptophanyl (C8H6N) CH2CH(NH2)CO), Isobutyl, butyl, aminobenzyl; phenyl; and naphthyl.

Another type of conjugates that can be attached to the end (3' or 5' end), the loop region, or any other parts of the sd-rxRNA might include a sterol, sterol type molecule, peptide, small molecule, protein, etc. In some embodiments, a sdrxRNA may contain more than one conjugates (same or different chemical nature). In some embodiments, the conjugate is cholesterol.

Another way to increase target gene specificity, or to reduce off-target silencing effect, is to introduce a 2'-modification (such as the 2'-O methyl modification) at a position corresponding to the second 5'-end nucleotide of the guide sequence. This allows the positioning of this 2'-modification in the Dicer-resistant hairpin structure, thus enabling one to design better RNAi constructs with less or no off-target silencing.

In one embodiment, a hairpin polynucleotide of the disclosure can comprise one nucleic acid portion which is DNA and one nucleic acid portion which is RNA. Antisense (guide) sequences of the invention can be "chimeric oligonucleotides" which comprise an RNA-like and a DNA-like region.

The language "RNase H activating region" includes a region of an oligonucleotide, e.g., a chimeric oligonucleotide, that is capable of recruiting RNase H to cleave the target RNA strand to which the oligonucleotide binds. Typically, the RNase activating region contains a minimal core (of at least about 3-5, typically between about 3-12, more typically, between about 5-12, and more preferably between about 5-10 contiguous nucleomonomers) of DNA or DNA-like nucleomonomers. (See, e.g., U.S. Pat. No. 5,849,902). In some embodiments, the RNase H activating region comprises about nine contiguous deoxyribose containing nucleomonomers.

The language "non-activating region" includes a region of an antisense sequence, e.g., a chimeric oligonucleotide, that does not recruit or activate RNase H. In some embodiments, a non-activating region does not comprise phosphorothioate DNA. The oligonucleotides of the invention comprise at least one non-activating region. In one embodiment, the non-activating region can be stabilized against nucleases or can provide specificity for the target by being complementary to the target and forming hydrogen bonds with the target nucleic acid molecule, which is to be bound by the oligonucleotide.

In some embodiments, at least a portion of the contiguous polynucleotides are linked by a substitute linkage, e.g., a phosphorothioate linkage.

In certain embodiments, most or all of the nucleotides beyond the guide sequence (2'-modified or not) are linked by phosphorothioate linkages. Such constructs tend to have improved pharmacokinetics due to their higher affinity for serum proteins. The phosphorothioate linkages in the non-guide sequence portion of the polynucleotide generally do not interfere with guide strand activity, once the latter is loaded into RISC.

Antisense (guide) sequences of the disclosure may include "morpholino oligonucleotides." Morpholino oligonucleotides are non-ionic and function by an RNase H-independent mechanism. Each of the 4 genetic bases (Adenine, Cytosine, Guanine, and Thymine/Uracil) of the morpholino oligonucleotides is linked to a 6-membered morpholine ring. Morpholino oligonucleotides are made by joining the 4 different subunit types by, e.g., non-ionic phosphorodiamidate inter-subunit linkages. Morpholino oligonucleotides have many advantages including: complete resistance to nucleases (Antisense & Nucl. Acid Drug Dev. 1996. 6:267); predictable targeting (Biochemica Biophysica Acta. 1999. 1489:141); reliable activity in cells (Antisense & Nucl. Acid Drug Dev. 1997. 7:63); excellent sequence specificity (Antisense & Nucl. Acid Drug Dev. 1997. 7:151); minimal non-antisense activity (Biochemica Biophysica Acta. 1999. 1489:141); and simple osmotic or scrape delivery (Antisense & Nucl. Acid Drug Dev. 1997. 7:291). Morpholino oligonucleotides are also preferred because of their non-toxicity at high doses. A discussion of the preparation of morpholino oligonucleotides can be found in Antisense & Nucl. Acid Drug Dev. 1997. 7:187.

The chemical modifications described herein are believed, based on the data described herein, to promote single stranded polynucleotide loading into the RISC. Single stranded polynucleotides have been shown to be active in loading into RISC and inducing gene silencing. However, the level of activity for single stranded polynucleotides appears to be 2 to 4 orders of magnitude lower when compared to a duplex polynucleotide.

The disclosure, in some aspects, provides a description of the chemical modification patterns, which may (a) significantly increase stability of the single stranded polynucleotide (b) promote efficient loading of the polynucleotide into the RISC complex and (c) improve uptake of the single stranded nucleotide by the cell. The chemical modification patterns may include combination of ribose, backbone, hydrophobic nucleoside and conjugate type of modifications. In addition, in some of the embodiments, the 5' end of the single polynucleotide may be chemically phosphorylated.

In some embodiments, the disclosure provides a description of the chemical modifications patterns, which improve functionality of RISC inhibiting polynucleotides. Single stranded polynucleotides have been shown to inhibit activity of a preloaded RISC complex through the substrate competition mechanism. For these types of molecules, conventionally called antagomers, the activity usually requires high concentration and in vivo delivery is not very effective. The disclosure provides, in some aspect, a description of the chemical modification patterns, which may (a) significantly increase stability of the single stranded polynucleotide (b) promote efficient recognition of the polynucleotide by the RISC as a substrate and/or (c) improve uptake of the single stranded nucleotide by the cell. The chemical modification patterns may include combination of ribose, backbone, hydrophobic nucleoside and conjugate type of modifications.

The modifications provided by the disclosure are applicable to all polynucleotides. This includes single stranded RISC entering polynucleotides, single stranded RISC inhibiting polynucleotides, conventional duplexed polynucleotides of variable length (15-40 bp),asymmetric duplexed polynucleotides, and the like. Polynucleotides may be modified with wide variety of chemical modification patterns, including 5' end, ribose, backbone and hydrophobic nucleoside modifications.

Synthesis

Oligonucleotides of the disclosure can be synthesized by any method known in the art, e.g., using enzymatic synthesis and/or chemical synthesis. The oligonucleotides can be synthesized in vitro (e.g., using enzymatic synthesis and chemical synthesis) or in vivo (using recombinant DNA technology well known in the art).

In a some embodiments, chemical synthesis is used for modified polynucleotides. Chemical synthesis of linear oligonucleotides is well known in the art and can be achieved by solution or solid phase techniques. Preferably, synthesis is by solid phase methods. Oligonucleotides can be made by any of several different synthetic procedures including the phosphoramidite, phosphite triester, H-phosphonate, and phosphotriester methods, typically by automated synthesis methods.

Oligonucleotide synthesis protocols are well known in the art and can be found, e.g., in U.S. Pat. No. 5,830,653; WO 98/13526; Stec et al. 1984. J. Am. Chem. Soc. 106:6077; Stec et al. 1985. J. Org. Chem. 50:3908; Stec et al. J. Chromatog. 1985. 326:263; LaPlanche et al. 1986. Nucl. Acid. Res. 1986. 14:9081; Fasman G. D., 1989. Practical Handbook of Biochemistry and Molecular Biology. 1989. CRC Press, Boca Raton, Fla.; Lamone. 1993. Biochem. Soc. Trans. 21:1; U.S. Pat. Nos. 5,013,830; 5,214,135; 5,525,719; Kawasaki et al. 1993. J. Med. Chem. 36:831; WO 92/03568; U.S. Pat. Nos. 5,276,019; and 5,264,423.

The synthesis method selected can depend on the length of the desired oligonucleotide and such choice is within the skill of the ordinary artisan. For example, the phosphoramidite and phosphite triester method can produce oligonucleotides having 175 or more nucleotides, while the H-phosphonate method works well for oligonucleotides of less than 100 nucleotides. If modified bases are incorporated into the oligonucleotide, and particularly if modified phosphodiester linkages are used, then the synthetic procedures are altered as needed according to known procedures. In this regard, Uhlmann et al. (1990, Chemical Reviews 90:543-584) provide references and outline procedures for making oligonucleotides with modified bases and modified phosphodiester linkages. Other exemplary methods for making oligonucleotides are taught in Sonveaux. 1994. "Protecting Groups in Oligonucleotide Synthesis"; Agrawal. Methods in Molecular Biology 26:1. Exemplary synthesis methods are also taught in "Oligonucleotide Synthesis—A Practical Approach" (Gait, M. J. IRL Press at Oxford University Press. 1984). Moreover, linear oligonucleotides of defined sequence, including some sequences with modified nucleotides, are readily available from several commercial sources.

The oligonucleotides may be purified by polyacrylamide gel electrophoresis, or by any of a number of chromatographic methods, including gel chromatography and high pressure liquid chromatography. To confirm a nucleotide sequence, especially unmodified nucleotide sequences, oligonucleotides may be subjected to DNA sequencing by any of the known procedures, including Maxam and Gilbert sequencing, Sanger sequencing, capillary electrophoresis sequencing, the wandering spot sequencing procedure or by using selective chemical degradation of oligonucleotides bound to Hybond paper. Sequences of short oligonucleotides can also be analyzed by laser desorption mass spectroscopy or by fast atom bombardment (McNeal, et al., 1982, J. Am. Chem. Soc. 104:976; Viari, et al., 1987, Biomed. Environ. Mass Spectrom. 14:83; Grotjahn et al., 1982, Nuc. Acid Res. 10:4671). Sequencing methods are also available for RNA oligonucleotides.

The quality of oligonucleotides synthesized can be verified by testing the oligonucleotide by capillary electrophoresis and denaturing strong anion HPLC (SAX-HPLC) using, e.g., the method of Bergot and Egan. 1992. J. Chrom. 599:35.

Other exemplary synthesis techniques are well known in the art (see, e.g., Sambrook et al., Molecular Cloning: a Laboratory Manual, Second Edition (1989); DNA Cloning, Volumes I and II (DN Glover Ed. 1985); Oligonucleotide Synthesis (M J Gait Ed, 1984; Nucleic Acid Hybridisation (B D Hames and S J Higgins eds. 1984); A Practical Guide to Molecular Cloning (1984); or the series, Methods in Enzymology (Academic Press, Inc.)).

In certain embodiments, the subject RNAi constructs or at least portions thereof are transcribed from expression vectors encoding the subject constructs. Any art recognized vectors may be use for this purpose. The transcribed RNAi constructs may be isolated and purified, before desired modifications (such as replacing an unmodified sense strand with a modified one, etc.) are carried out.

Delivery/Carrier
Uptake of Oligonucleotides by Cells

Oligonucleotides and oligonucleotide compositions are contacted with (i.e., brought into contact with, also referred to herein as administered or delivered to) and taken up by one or more cells or a cell lysate. The term "cells" includes prokaryotic and eukaryotic cells, preferably vertebrate cells, and, more preferably, mammalian cells. In a preferred embodiment, the oligonucleotide compositions of the invention are contacted with human cells.

Oligonucleotide compositions of the invention can be contacted with cells in vitro, e.g., in a test tube or culture dish, (and may or may not be introduced into a subject) or in vivo, e.g., in a subject such as a mammalian subject. In some embodiments, oligonucleotides are administered topically or through electroporation. Oligonucleotides are taken up by cells at a slow rate by endocytosis, but endocytosed oligonucleotides are generally sequestered and not available, e.g., for hybridization to a target nucleic acid molecule. In one embodiment, cellular uptake can be facilitated by electroporation or calcium phosphate precipitation. However, these procedures are only useful for in vitro or ex vivo embodiments, are not convenient and, in some cases, are associated with cell toxicity.

In another embodiment, delivery of oligonucleotides into cells can be enhanced by suitable art recognized methods including calcium phosphate, DMSO, glycerol or dextran, electroporation, or by transfection, e.g., using cationic, anionic, or neutral lipid compositions or liposomes using methods known in the art (see e.g., WO 90/14074; WO 91/16024; WO 91/17424; U.S. Pat. No. 4,897,355; Bergan et al. 1993. Nucleic Acids Research. 21:3567). Enhanced delivery of oligonucleotides can also be mediated by the use of vectors (See e.g., Shi, Y. 2003. Trends Genet 2003 Jan. 19:9; Reichhart J M et al. Genesis. 2002. 34(1-2):1604, Yu et al. 2002. Proc. Natl. Acad Sci. USA 99:6047; Sui et al. 2002. Proc. Natl. Acad Sci. USA 99:5515) viruses, polyamine or polycation conjugates using compounds such as polylysine, protamine, or Ni, N12-bis (ethyl) spermine (see, e.g., Bartzatt, R. et al. 1989. Biotechnol. Appl. Biochem. 11:133; Wagner E. et al. 1992. Proc. Natl. Acad. Sci. 88:4255).

In certain embodiments, the sd-rxRNA of the invention may be delivered by using various beta-glucan containing particles, referred to as GeRPs (glucan encapsulated RNA loaded particle), described in, and incorporated by reference from, U.S. Provisional Application No. 61/310,611, filed on Mar. 4, 2010 and entitled "Formulations and Methods for Targeted Delivery to Phagocyte Cells." Such particles are also described in, and incorporated by reference from US Patent Publications US 2005/0281781 A1, and US 2010/0040656, and in PCT publications WO 2006/007372, and WO 2007/050643. The sd-rxRNA molecule may be hydrophobically modified and optionally may be associated with a lipid and/or amphiphilic peptide. In certain embodiments, the beta-glucan particle is derived from yeast. In certain embodiments, the payload trapping molecule is a polymer, such as those with a molecular weight of at least about 1000 Da, 10,000 Da, 50,000 Da, 100 kDa, 500 kDa, etc. Preferred polymers include (without limitation) cationic polymers, chitosans, or PEI (polyethylenimine), etc.

Glucan particles can be derived from insoluble components of fungal cell walls such as yeast cell walls. In some embodiments, the yeast is Baker's yeast. Yeast-derived glucan molecules can include one or more of 13-(1,3)-Glucan, 13-(1,6)-Glucan, mannan and chitin. In some embodiments, a glucan particle comprises a hollow yeast cell wall whereby the particle maintains a three dimensional structure resembling a cell, within which it can complex with or encapsulate a molecule such as an RNA molecule. Some of the advantages associated with the use of yeast cell wall particles are availability of the components, their biodegradable nature, and their ability to be targeted to phagocytic cells.

In some embodiments, glucan particles can be prepared by extraction of insoluble components from cell walls, for example by extracting Baker's yeast (Fleischmann's) with 1M NaOH/pH 4.0 H2O, followed by washing and drying. Methods of preparing yeast cell wall particles are discussed in, and incorporated by reference from U.S. Pat. Nos. 4,810,646, 4,992,540, 5,082,936, 5,028,703, 5,032,401, 5,322,841, 5,401,727, 5,504,079, 5,607,677, 5,968,811, 6,242,594, 6,444,448, 6,476,003, US Patent Publications 2003/0216346, 2004/0014715 and 2010/0040656, and PCT published application WO02/12348.

Protocols for preparing glucan particles are also described in, and incorporated by reference from, the following references: Soto and Ostroff (2008), "Characterization of multilayered nanoparticles encapsulated in yeast cell wall particles for DNA delivery." Bioconjug Chem 19(4):840-8; Soto and Ostroff (2007), "Oral Macrophage Mediated Gene Delivery System," Nanotech, Volume 2, Chapter 5 ("Drug Delivery"), pages 378-381; and Li et al. (2007), "Yeast glucan particles activate murine resident macrophages to secrete proinflammatory cytokines via MyD88- and Syk kinase-dependent pathways." Clinical Immunology 124(2): 170-181.

Glucan containing particles such as yeast cell wall particles can also be obtained commercially. Several non-limiting examples include: Nutricell MOS 55 from Biorigin (Sao Paolo, Brazil), SAF-Mannan (SAF Agri, Minneapolis, Minn.), Nutrex (Sensient Technologies, Milwaukee, Wis.), alkali-extracted particles such as those produced by Nutricepts (Nutricepts Inc., Burnsville, Minn.) and ASA Biotech, acid-extracted WGP particles from Biopolymer Engineering, and organic solvent-extracted particles such as Adjuvax™ from Alpha-beta Technology, Inc. (Worcester, Mass.) and microparticulate glucan from Novogen (Stamford, Conn.).

Glucan particles such as yeast cell wall particles can have varying levels of purity depending on the method of production and/or extraction. In some instances, particles are alkali-extracted, acid-extracted or organic solvent-extracted to remove intracellular components and/or the outer mannoprotein layer of the cell wall. Such protocols can produce particles that have a glucan (w/w) content in the range of 50%-90%. In some instances, a particle of lower purity, meaning lower glucan w/w content may be preferred, while in other embodiments, a particle of higher purity, meaning higher glucan w/w content may be preferred.

Glucan particles, such as yeast cell wall particles, can have a natural lipid content. For example, the particles can contain 1%, 2%, 3%, 4%, 5%, 6%, 7%, 8%, 9%, 10%, 11%, 12%, 13%, 14%, 15%, 16%, 17%, 18%, 19%, 20% or more than 20% w/w lipid. In the Examples section, the effectiveness of two glucan particle batches are tested: YGP SAF and YGP SAF+L (containing natural lipids). In some instances, the presence of natural lipids may assist in complexation or capture of RNA molecules.

Glucan containing particles typically have a diameter of approximately 2-4 microns, although particles with a diameter of less than 2 microns or greater than 4 microns are also compatible with aspects of the invention.

The RNA molecule(s) to be delivered are complexed or "trapped" within the shell of the glucan particle. The shell or RNA component of the particle can be labeled for visualization, as described in, and incorporated by reference from, Soto and Ostroff (2008) Bioconjug Chem 19:840. Methods of loading GeRPs are discussed further below.

The optimal protocol for uptake of oligonucleotides will depend upon a number of factors, the most crucial being the type of cells that are being used. Other factors that are important in uptake include, but are not limited to, the nature and concentration of the oligonucleotide, the confluence of the cells, the type of culture the cells are in (e.g., a suspension culture or plated) and the type of media in which the cells are grown.

Encapsulating Agents

Encapsulating agents entrap oligonucleotides within vesicles. In some embodiments, an oligonucleotide may be associated with a carrier or vehicle, e.g., liposomes or micelles, although other carriers could be used, as would be appreciated by one skilled in the art. Liposomes are vesicles made of a lipid bilayer having a structure similar to biological membranes. Such carriers are used to facilitate the cellular uptake or targeting of the oligonucleotide, or improve the oligonucleotide's pharmacokinetic or toxicologic properties.

For example, the oligonucleotides described by the disclosure may also be administered encapsulated in liposomes, pharmaceutical compositions wherein the active ingredient is contained either dispersed or variously present in corpuscles consisting of aqueous concentric layers adherent to lipidic layers. The oligonucleotides, depending upon solubility, may be present both in the aqueous layer and in the lipidic layer, or in what is generally termed a liposomic suspension. The hydrophobic layer, generally but not exclusively, comprises phopholipids such as lecithin and sphingomyelin, steroids such as cholesterol, more or less ionic surfactants such as diacetylphosphate, stearylamine, or phosphatidic acid, or other materials of a hydrophobic nature. The diameters of the liposomes generally range from about 15 nm to about 5 microns.

The use of liposomes as drug delivery vehicles offers several advantages. Liposomes increase intracellular stability, increase uptake efficiency and improve biological activity. Liposomes are hollow spherical vesicles composed of lipids arranged in a similar fashion as those lipids which make up the cell membrane. They have an internal aqueous space for entrapping water soluble compounds and range in size from 0.05 to several microns in diameter. Several studies have shown that liposomes can deliver nucleic acids to cells and that the nucleic acids remain biologically active. For example, a lipid delivery vehicle originally designed as a research tool, such as Lipofectin or LIPOFECTAMINE™ 2000, can deliver intact nucleic acid molecules to cells.

Specific advantages of using liposomes include the following: they are non-toxic and biodegradable in composition; they display long circulation half-lives; and recognition molecules can be readily attached to their surface for targeting to tissues. Finally, cost-effective manufacture of liposome-based pharmaceuticals, either in a liquid suspension or lyophilized product, has demonstrated the viability of this technology as an acceptable drug delivery system.

In some aspects, formulations associated with the invention might be selected for a class of naturally occurring or chemically synthesized or modified saturated and unsaturated fatty acid residues. Fatty acids might exist in a form of triglycerides, diglycerides or individual fatty acids. In another embodiment, the use of well-validated mixtures of fatty acids and/or fat emulsions currently used in pharmacology for parenteral nutrition may be utilized.

Liposome based formulations are widely used for oligonucleotide delivery. However, most of commercially available lipid or liposome formulations contain at least one positively charged lipid (cationic lipids). The presence of this positively charged lipid is believed to be essential for obtaining a high degree of oligonucleotide loading and for enhancing liposome fusogenic properties. Several methods have been performed and published to identify optimal positively charged lipid chemistries. However, the commercially available liposome formulations containing cationic lipids are characterized by a high level of toxicity. In vivo limited therapeutic indexes have revealed that liposome formulations containing positive charged lipids are associated with toxicity (i.e. elevation in liver enzymes) at concentrations only slightly higher than concentration required to achieve RNA silencing.

Nucleic acids associated with the invention can be hydrophobically modified and can be encompassed within neutral nanotransporters. Further description of neutral nanotransporters is incorporated by reference from PCT Application PCT/US2009/005251, filed on Sep. 22, 2009, and entitled "Neutral Nanotransporters." Such particles enable quantitative oligonucleotide incorporation into non-charged lipid mixtures. The lack of toxic levels of cationic lipids in such neutral nanotransporter compositions is an important feature.

As demonstrated in PCT/US2009/005251, oligonucleotides can effectively be incorporated into a lipid mixture that is free of cationic lipids and such a composition can effectively deliver a therapeutic oligonucleotide to a cell in a manner that it is functional. For example, a high level of activity was observed when the fatty mixture was composed of a phosphatidylcholine base fatty acid and a sterol such as a cholesterol. For instance, one preferred formulation of neutral fatty mixture is composed of at least 20% of DOPC or DSPC and at least 20% of sterol such as cholesterol. Even as low as 1:5 lipid to oligonucleotide ratio was shown to be sufficient to get complete encapsulation of the oligonucleotide in a non charged formulation.

The neutral nanotransporters compositions enable efficient loading of oligonucleotide into neutral fat formulation. The composition includes an oligonucleotide that is modified in a manner such that the hydrophobicity of the molecule is increased (for example a hydrophobic molecule is attached (covalently or no-covalently) to a hydrophobic molecule on the oligonucleotide terminus or a non-terminal nucleotide, base, sugar, or backbone), the modified oligonucleotide being mixed with a neutral fat formulation (for example containing at least 25% of cholesterol and 25% of DOPC or analogs thereof). A cargo molecule, such as another lipid can also be included in the composition. This composition, where part of the formulation is build into the oligonucleotide itself, enables efficient encapsulation of oligonucleotide in neutral lipid particles.

In some aspects, stable particles ranging in size from 50 to 140 nm can be formed upon complexing of hydrophobic oligonucleotides with preferred formulations. It is interesting to mention that the formulation by itself typically does not form small particles, but rather, forms agglomerates, which are transformed into stable 50-120 nm particles upon addition of the hydrophobic modified oligonucleotide.

The neutral nanotransporter compositions of the invention include a hydrophobic modified polynucleotide, a neutral fatty mixture, and optionally a cargo molecule. A "hydrophobic modified polynucleotide" as used herein is a polynucleotide of the disclosure (e.g., sd-rxRNA) that has at least one modification that renders the polynucleotide more hydrophobic than the polynucleotide was prior to modification. The modification may be achieved by attaching (covalently or non-covalently) a hydrophobic molecule to the polynucleotide. In some instances the hydrophobic molecule is or includes a lipophilic group.

The term "lipophilic group" means a group that has a higher affinity for lipids than its affinity for water. Examples of lipophilic groups include, but are not limited to, cholesterol, a cholesteryl or modified cholesteryl residue, adamantine, dihydrotesterone, long chain alkyl, long chain alkenyl, long chain alkynyl, olely-lithocholic, cholenic, oleoyl-cholenic, palmityl, heptadecyl, myrisityl, bile acids, cholic acid or taurocholic acid, deoxycholate, oleyl litocholic acid, oleoyl cholenic acid, glycolipids, phospholipids, sphingolipids, isoprenoids, such as steroids, vitamins, such as vitamin E, fatty acids either saturated or unsaturated, fatty acid esters, such as triglycerides, pyrenes, porphyrines, Texaphyrine, adamantane, acridines, biotin, coumarin, fluorescein, rhodamine, Texas-Red, digoxygenin, dimethoxytrityl, t-butyldimethylsilyl, t-butyldiphenylsilyl, cyanine dyes (e.g. Cy3 or Cy5), Hoechst 33258 dye, psoralen, or ibuprofen. The cholesterol moiety may be reduced (e.g. as in cholestan) or may be substituted (e.g. by halogen). A combination of different lipophilic groups in one molecule is also possible.

The hydrophobic molecule may be attached at various positions of the polynucleotide. As described above, the hydrophobic molecule may be linked to the terminal residue of the polynucleotide such as the 3' of 5'-end of the polynucleotide. Alternatively, it may be linked to an internal nucleotide or a nucleotide on a branch of the polynucleotide. The hydrophobic molecule may be attached, for instance to a 2'-position of the nucleotide. The hydrophobic molecule may also be linked to the heterocyclic base, the sugar or the backbone of a nucleotide of the polynucleotide.

The hydrophobic molecule may be connected to the polynucleotide by a linker moiety. Optionally the linker moiety is a non-nucleotidic linker moiety. Non-nucleotidic linkers are e.g. abasic residues (dSpacer), oligoethyleneglycol, such as triethyleneglycol (spacer 9) or hexaethylenegylcol (spacer 18), or alkane-diol, such as butanediol. The spacer units are preferably linked by phosphodiester or phosphorothioate bonds. The linker units may appear just once in the molecule or may be incorporated several times, e.g. via phosphodiester, phosphorothioate, methylphosphonate, or amide linkages.

Typical conjugation protocols involve the synthesis of polynucleotides bearing an aminolinker at one or more positions of the sequence, however, a linker is not required. The amino group is then reacted with the molecule being conjugated using appropriate coupling or activating reagents. The conjugation reaction may be performed either with the polynucleotide still bound to a solid support or following cleavage of the polynucleotide in solution phase. Purification of the modified polynucleotide by HPLC typically results in a pure material.

In some embodiments the hydrophobic molecule is a sterol type conjugate, a PhytoSterol conjugate, cholesterol conjugate, sterol type conjugate with altered side chain length, fatty acid conjugate, any other hydrophobic group conjugate, and/or hydrophobic modifications of the internal nucleoside, which provide sufficient hydrophobicity to be incorporated into micelles.

For purposes of the disclosure, the term "sterols", refers or steroid alcohols are a subgroup of steroids with a hydroxyl group at the 3-position of the A-ring. They are amphipathic lipids synthesized from acetyl-coenzyme A via the HMG-CoA reductase pathway. The overall molecule is quite flat. The hydroxyl group on the A ring is polar. The rest of the aliphatic chain is non-polar. Usually sterols are considered to have an 8 carbon chain at position 17.

For purposes of the disclosure, the term "sterol type molecules", refers to steroid alcohols, which are similar in structure to sterols. The main difference is the structure of the ring and number of carbons in a position 21 attached side chain.

For purposes of the disclosure, the term "PhytoSterols" (also called plant sterols) are a group of steroid alcohols, phytochemicals naturally occurring in plants. There are more then 200 different known PhytoSterols For purposes of the disclosure, the term "Sterol side chain" refers to a chemical composition of a side chain attached at the position 17 of sterol-type molecule. In a standard definition sterols are limited to a 4 ring structure carrying a 8 carbon chain at position 17. In this invention, the sterol type molecules with side chain longer and shorter than conventional are described. The side chain may branched or contain double back bones.

Thus, sterols useful in the disclosure, for example, include cholesterols, as well as unique sterols in which position 17 has attached side chain of 2-7 or longer then 9 carbons. In a particular embodiment, the length of the polycarbon tail is varied between 5 and 9 carbons. Such conjugates may have significantly better in vivo efficacy, in particular delivery to liver. These types of molecules are expected to work at concentrations 5 to 9 fold lower then oligonucleotides conjugated to conventional cholesterols.

Alternatively the polynucleotide may be bound to a protein, peptide or positively charged chemical that functions as the hydrophobic molecule. The proteins may be selected from the group consisting of protamine, dsRNA binding domain, and arginine rich peptides. Exemplary positively charged chemicals include spermine, spermidine, cadaverine, and putrescine.

In another embodiment hydrophobic molecule conjugates may demonstrate even higher efficacy when it is combined with optimal chemical modification patterns of the polynucleotide (as described herein in detail), containing but not limited to hydrophobic modifications, phosphorothioate modifications, and 2' ribo modifications.

In another embodiment the sterol type molecule may be a naturally occurring PhytoSterols. The polycarbon chain may be longer than 9 and may be linear, branched and/or contain double bonds. Some PhytoSterol containing polynucleotide conjugates may be significantly more potent and active in delivery of polynucleotides to various tissues. Some PhytoSterols may demonstrate tissue preference and thus be used as a way to delivery RNAi specifically to particular tissues.

The hydrophobic modified polynucleotide is mixed with a neutral fatty mixture to form a micelle. The neutral fatty acid mixture is a mixture of fats that has a net neutral or slightly net negative charge at or around physiological pH that can form a micelle with the hydrophobic modified polynucleotide. For purposes of the present invention, the term "micelle" refers to a small nanoparticle formed by a mixture of non charged fatty acids and phospholipids. The neutral fatty mixture may include cationic lipids as long as they are present in an amount that does not cause toxicity. In preferred embodiments the neutral fatty mixture is free of cationic lipids. A mixture that is free of cationic lipids is one that has less than 1% and preferably 0% of the total lipid being cationic lipid. The term "cationic lipid" includes lipids and synthetic lipids having a net positive charge at or around physiological pH. The term "anionic lipid" includes lipids and synthetic lipids having a net negative charge at or around physiological pH.

The neutral fats bind to the oligonucleotides of the invention by a strong but non-covalent attraction (e.g., an electrostatic, van der Waals, pi-stacking, etc. interaction).

The neutral fat mixture may include formulations selected from a class of naturally occurring or chemically synthesized or modified saturated and unsaturated fatty acid residues. Fatty acids might exist in a form of triglycerides, diglycerides or individual fatty acids. In another embodiment the use of well-validated mixtures of fatty acids and/or fat emulsions currently used in pharmacology for parenteral nutrition may be utilized.

The neutral fatty mixture is preferably a mixture of a choline based fatty acid and a sterol. Choline based fatty acids include for instance, synthetic phosphocholine derivatives such as DDPC, DLPC, DMPC, DPPC, DSPC, DOPC, POPC, and DEPC. DOPC (chemical registry number 4235-95-4) is dioleoylphosphatidylcholine (also known as dielaidoylphosphatidylcholine, dioleoyl-PC, dioleoylphosphocholine, dioleoyl-sn-glycero-3-phosphocholine, dioleylphosphatidylcholine). DSPC (chemical registry number 816-94-4) is distearoylphosphatidylcholine (also known as 1,2-Distearoyl-sn-Glycero-3-phosphocholine).

The sterol in the neutral fatty mixture may be for instance cholesterol. The neutral fatty mixture may be made up completely of a choline based fatty acid and a sterol or it may optionally include a cargo molecule. For instance, the neutral fatty mixture may have at least 20% or 25% fatty acid and 20% or 25% sterol.

For purposes of the present invention, the term "Fatty acids" relates to conventional description of fatty acid. They may exist as individual entities or in a form of two- and triglycerides. For purposes of the present invention, the term "fat emulsions" refers to safe fat formulations given intravenously to subjects who are unable to get enough fat in their diet. It is an emulsion of soy bean oil (or other naturally occurring oils) and egg phospholipids. Fat emulsions are being used for formulation of some insoluble anesthetics. In this disclosure, fat emulsions might be part of commercially available preparations like Intralipid, Liposyn, Nutrilipid, modified commercial preparations, where they are enriched with particular fatty acids or fully de novo-formulated combinations of fatty acids and phospholipids.

In some embodiments, the cells to be contacted with an oligonucleotide composition of the disclosure are contacted with a mixture comprising the oligonucleotide and a mixture comprising a lipid, e.g., one of the lipids or lipid compositions described supra for between about 12 hours to about 24 hours. In another embodiment, the cells to be contacted with an oligonucleotide composition are contacted with a mixture comprising the oligonucleotide and a mixture comprising a lipid, e.g., one of the lipids or lipid compositions described supra for between about 1 and about five days. In one embodiment, the cells are contacted with a mixture comprising a lipid and the oligonucleotide for between about three days to as long as about 30 days. In another embodiment, a mixture comprising a lipid is left in contact with the cells for at least about five to about 20 days. In another embodiment, a mixture comprising a lipid is left in contact with the cells for at least about seven to about 15 days.

50%-60% of the formulation can optionally be any other lipid or molecule. Such a lipid or molecule is referred to herein as a cargo lipid or cargo molecule. Cargo molecules include but are not limited to intralipid, small molecules, fusogenic peptides or lipids or other small molecules might be added to alter cellular uptake, endosomal release or tissue distribution properties. The ability to tolerate cargo molecules is important for modulation of properties of these particles, if such properties are desirable. For instance the presence of some tissue specific metabolites might drastically alter tissue distribution profiles. For example use of Intralipid type formulation enriched in shorter or longer fatty chains with various degrees of saturation affects tissue distribution profiles of these type of formulations (and their loads).

An example of a cargo lipid useful according to the disclosure is a fusogenic lipid. For instance, the zwitterionic lipid DOPE (chemical registry number 4004-5-1, 1,2-Dioleoyl-sn-Glycero-3-phosphoethanolamine) is a preferred cargo lipid.

Intralipid may be comprised of the following composition: 1 000 mL contain: purified soybean oil 90 g, purified egg phospholipids 12 g, glycerol anhydrous 22 g, water for injection q.s. ad 1 000 mL. pH is adjusted with sodium hydroxide to pH approximately 8. Energy content/L: 4.6 MJ (190 kcal). Osmolality (approx.): 300 mOsm/kg water. In another embodiment fat emulsion is Liposyn that contains 5% safflower oil, 5% soybean oil, up to 1.2% egg phosphatides added as an emulsifier and 2.5% glycerin in water for injection. It may also contain sodium hydroxide for pH adjustment. pH 8.0 (6.0-9.0). Liposyn has an osmolarity of 276 m Osmol/liter (actual).

Variation in the identity, amounts and ratios of cargo lipids affects the cellular uptake and tissue distribution characteristics of these compounds. For example, the length of lipid tails and level of saturability will affect differential uptake to liver, lung, fat and cardiomyocytes. Addition of special hydrophobic molecules like vitamins or different forms of sterols can favor distribution to special tissues which are involved in the metabolism of particular compounds. In some embodiments, vitamin A or E is used. Complexes are formed at different oligonucleotide concentrations, with higher concentrations favoring more efficient complex formation.

In another embodiment, the fat emulsion is based on a mixture of lipids. Such lipids may include natural compounds, chemically synthesized compounds, purified fatty acids or any other lipids. In yet another embodiment the composition of fat emulsion is entirely artificial. In a particular embodiment, the fat emulsion is more than 70% linoleic acid. In yet another particular embodiment the fat emulsion is at least 1% of cardiolipin. Linoleic acid (LA) is an unsaturated omega-6 fatty acid. It is a colorless liquid made of a carboxylic acid with an 18-carbon chain and two cis double bonds.

In some embodiments, the alteration of the composition of the fat emulsion is used as a way to alter tissue distribution of hydrophobically modified polynucleotides. This methodology provides for the specific delivery of the polynucleotides to particular tissues.

In another embodiment the fat emulsions of the cargo molecule contain more than 70% of Linoleic acid ($C_{18}H_{32}O_2$) and/or cardiolipin.

Fat emulsions, like intralipid have been used before as a delivery formulation for some non-water soluble drugs (such as Propofol, re-formulated as Diprivan). Unique features of the present invention include (a) the concept of combining modified polynucleotides with the hydrophobic compound (s), so it can be incorporated in the fat micelles and (b) mixing it with the fat emulsions to provide a reversible carrier. After injection into a blood stream, micelles usually bind to serum proteins, including albumin, HDL, LDL and other. This binding is reversible and eventually the fat is absorbed by cells. The polynucleotide, incorporated as a part of the micelle will then be delivered closely to the surface of the cells. After that cellular uptake might be happening though variable mechanisms, including but not limited to sterol type delivery.

Complexing Agents

Complexing agents bind to the oligonucleotides of the disclosure by a strong but non-covalent attraction (e.g., an electrostatic, van der Waals, pi-stacking, etc. interaction). In some embodiments, oligonucleotides of the disclosure can be complexed with a complexing agent to increase cellular uptake of oligonucleotides. An example of a complexing agent includes cationic lipids. Cationic lipids can be used to deliver oligonucleotides to cells. However, as discussed above, formulations free in cationic lipids are preferred in some embodiments.

The term "cationic lipid" includes lipids and synthetic lipids having both polar and non-polar domains and which are capable of being positively charged at or around physiological pH and which bind to polyanions, such as nucleic acids, and facilitate the delivery of nucleic acids into cells. In general cationic lipids include saturated and unsaturated alkyl and alicyclic ethers and esters of amines, amides, or derivatives thereof. Straight-chain and branched alkyl and alkenyl groups of cationic lipids can contain, e.g., from 1 to about 25 carbon atoms. Preferred straight chain or branched alkyl or alkene groups have six or more carbon atoms. Alicyclic groups include cholesterol and other steroid groups. Cationic lipids can be prepared with a variety of counterions (anions) including, e.g., Cl$^-$, Br$^-$, I$^-$, F$^-$, acetate, trifluoroacetate, sulfate, nitrite, and nitrate.

Examples of cationic lipids include polyethylenimine, polyamidoamine (PAMAM) starburst dendrimers, Lipofectin (a combination of DOTMA and DOPE), Lipofectase, LIPOFECTAMINE™ (e.g., LIPOFECTAMINE™ 2000), DOPE, Cytofectin (Gilead Sciences, Foster City, Calif.), and Eufectins (JBL, San Luis Obispo, Calif.). Exemplary cationic liposomes can be made from N-[1-(2,3-dioleoloxy)-propyl]-N,N,N-trimethylammonium chloride (DOTMA), N-[1-(2,3-dioleoloxy)-propyl]-N,N,N-trimethylammonium methylsulfate (DOTAP), 3β-[N—(N',N'-dimethylaminoethane)carbamoyl]cholesterol (DC-Chol), 2,3,-dioleyloxy-N-[2 (sperminecarboxamido)ethyl]-N,N-dimethyl-1-propanaminium trifluoroacetate (DOSPA), 1,2-dimyristyloxypropyl-3-dimethyl-hydroxyethyl ammonium bromide; and dimethyldioctadecylammonium bromide (DDAB). The cationic lipid N-(1-(2,3-dioleyloxy)propyl)-N,N,N-trimethylammonium chloride (DOTMA), for example, was found to increase 1000-fold the antisense effect of a phosphorothioate oligonucleotide. (Vlassov et al., 1994, Biochimica et Biophysica Acta 1197:95-108). Oligonucleotides can also be complexed with, e.g., poly (L-lysine) or avidin and lipids may, or may not, be included in this mixture, e.g., steryl-poly (L-lysine).

Cationic lipids have been used in the art to deliver oligonucleotides to cells (see, e.g., U.S. Pat. Nos. 5,855,910; 5,851,548; 5,830,430; 5,780,053; 5,767,099; Lewis et al. 1996. Proc. Natl. Acad. Sci. USA 93:3176; Hope et al. 1998. Molecular Membrane Biology 15:1). Other lipid compositions which can be used to facilitate uptake of the instant oligonucleotides can be used in connection with the claimed methods. In addition to those listed supra, other lipid compositions are also known in the art and include, e.g., those taught in U.S. Pat. Nos. 4,235,871; 4,501,728; 4,837,028; 4,737,323.

In some embodiments, lipid compositions can further comprise agents, e.g., viral proteins to enhance lipid-mediated transfections of oligonucleotides (Kamata, et al., 1994. Nucl. Acids. Res. 22:536). In another embodiment, oligonucleotides are contacted with cells as part of a composition comprising an oligonucleotide, a peptide, and a lipid as taught, e.g., in U.S. Pat. No. 5,736,392. Improved lipids have also been described which are serum resistant (Lewis, et al., 1996. Proc. Natl. Acad. Sci. 93:3176). Cationic lipids and other complexing agents act to increase the number of oligonucleotides carried into the cell through endocytosis.

In another embodiment N-substituted glycine oligonucleotides (peptoids) can be used to optimize uptake of oligonucleotides. Peptoids have been used to create cationic lipid-like compounds for transfection (Murphy, et al., 1998. Proc. Natl. Acad. Sci. 95:1517). Peptoids can be synthesized using standard methods (e.g., Zuckermann, R. N., et al. 1992. J. Am. Chem. Soc. 114:10646; Zuckermann, R. N., et al. 1992. Int. J. Peptide Protein Res. 40:497). Combinations of cationic lipids and peptoids, liptoids, can also be used to optimize uptake of the subject oligonucleotides (Hunag, et al., 1998. Chemistry and Biology. 5:345). Liptoids can be synthesized by elaborating peptoid oligonucleotides and coupling the amino terminal submonomer to a lipid via its amino group (Hunag, et al., 1998. Chemistry and Biology. 5:345).

It is known in the art that positively charged amino acids can be used for creating highly active cationic lipids (Lewis et al. 1996. Proc. Natl. Acad. Sci. US.A. 93:3176). In some embodiments, a composition for delivering oligonucleotides of the disclosure comprises a number of arginine, lysine, histidine or ornithine residues linked to a lipophilic moiety (see e.g., U.S. Pat. No. 5,777,153).

In another embodiment, a composition for delivering oligonucleotides of the disclosure comprises a peptide having from between about one to about four basic residues. These basic residues can be located, e.g., on the amino terminal, C-terminal, or internal region of the peptide. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine (can also be considered non-polar), asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). Apart from the basic amino acids, a majority or all of the other residues of the peptide can be selected from the non-basic amino acids, e.g., amino acids other than lysine, arginine, or histidine. Preferably a preponderance of neutral amino acids with long neutral side chains are used.

In some embodiments, a composition for delivering oligonucleotides of the disclosure comprises a natural or synthetic polypeptide having one or more gamma carboxyglutamic acid residues, or γ-Gla residues. These gamma carboxyglutamic acid residues may enable the polypeptide to bind to each other and to membrane surfaces. In other words, a polypeptide having a series of γ-Gla may be used as a general delivery modality that helps an RNAi construct to stick to whatever membrane to which it comes in contact. This may at least slow RNAi constructs from being cleared from the blood stream and enhance their chance of homing to the target.

The gamma carboxyglutamic acid residues may exist in natural proteins (for example, prothrombin has 10 γ-Gla residues). Alternatively, they can be introduced into the purified, recombinantly produced, or chemically synthesized polypeptides by carboxylation using, for example, a vitamin K-dependent carboxylase. The gamma carboxyglutamic acid residues may be consecutive or non-consecutive, and the total number and location of such gamma carboxyglutamic acid residues in the polypeptide can be regulated/fine tuned to achieve different levels of "stickiness" of the polypeptide.

In some embodiments, the cells to be contacted with an oligonucleotide composition of the disclosure are contacted with a mixture comprising the oligonucleotide and a mixture comprising a lipid, e.g., one of the lipids or lipid compositions described supra for between about 12 hours to about 24 hours. In another embodiment, the cells to be contacted with an oligonucleotide composition are contacted with a mixture comprising the oligonucleotide and a mixture comprising a lipid, e.g., one of the lipids or lipid compositions described supra for between about 1 and about five days. In one embodiment, the cells are contacted with a mixture comprising a lipid and the oligonucleotide for between about three days to as long as about 30 days. In another embodiment, a mixture comprising a lipid is left in contact with the cells for at least about five to about 20 days. In another embodiment, a mixture comprising a lipid is left in contact with the cells for at least about seven to about 15 days.

For example, in one embodiment, an oligonucleotide composition can be contacted with cells in the presence of a lipid such as cytofectin CS or GSV (available from Glen Research; Sterling, Va.), GS3815, GS2888 for prolonged incubation periods as described herein.

In one embodiment, the incubation of the cells with the mixture comprising a lipid and an oligonucleotide composition does not reduce the viability of the cells. Preferably, after the transfection period the cells are substantially viable. In one embodiment, after transfection, the cells are between at least about 70% and at least about 100% viable. In another embodiment, the cells are between at least about 80% and at least about 95% viable. In yet another embodiment, the cells are between at least about 85% and at least about 90% viable.

In one embodiment, oligonucleotides are modified by attaching a peptide sequence that transports the oligonucleotide into a cell, referred to herein as a "transporting peptide." In one embodiment, the composition includes an oligonucleotide which is complementary to a target nucleic acid molecule encoding the protein, and a covalently attached transporting peptide.

The language "transporting peptide" includes an amino acid sequence that facilitates the transport of an oligonucleotide into a cell. Exemplary peptides which facilitate the transport of the moieties to which they are linked into cells are known in the art, and include, e.g., HIV TAT transcription factor, lactoferrin, Herpes VP22 protein, and fibroblast growth factor 2 (Pooga et al. 1998. Nature Biotechnology. 16:857; and Derossi et al. 1998. Trends in Cell Biology. 8:84; Elliott and O'Hare. 1997. Cell 88:223).

Oligonucleotides can be attached to the transporting peptide using known techniques, e.g., (Prochiantz, A. 1996. Curr. Opin. Neurobiol. 6:629; Derossi et al. 1998. Trends Cell Biol. 8:84; Troy et al. 1996. J. Neurosci. 16:253), Vives et al. 1997. J. Biol. Chem. 272:16010). For example, in one embodiment, oligonucleotides bearing an activated thiol group are linked via that thiol group to a cysteine present in a transport peptide (e.g., to the cysteine present in the β turn between the second and the third helix of the antennapedia homeodomain as taught, e.g., in Derossi et al. 1998. Trends Cell Biol. 8:84; Prochiantz. 1996. Current Opinion in Neurobiol. 6:629; Allinquant et al. 1995. J Cell Biol. 128:919). In another embodiment, a Boc-Cys-(Npys)OH group can be coupled to the transport peptide as the last (N-terminal) amino acid and an oligonucleotide bearing an SH group can be coupled to the peptide (Troy et al. 1996. J. Neurosci. 16:253).

In one embodiment, a linking group can be attached to a nucleomonomer and the transporting peptide can be covalently attached to the linker. In one embodiment, a linker can function as both an attachment site for a transporting peptide and can provide stability against nucleases. Examples of suitable linkers include substituted or unsubstituted $C_1$-$C_{20}$ alkyl chains, $C_2$-$C_{20}$ alkenyl chains, $C_2$-$C_{20}$ alkynyl chains, peptides, and heteroatoms (e.g., S, O, NH, etc.). Other exemplary linkers include bifunctional crosslinking agents such as sulfosuccinimidyl-4-(maleimidophenyl)-butyrate (SMPB) (see, e.g., Smith et al. Biochem J 1991.276: 417-2).

In some embodiments, oligonucleotides of the disclosure are synthesized as molecular conjugates which utilize receptor-mediated endocytotic mechanisms for delivering genes into cells (see, e.g., Bunnell et al. 1992. Somatic Cell and Molecular Genetics. 18:559, and the references cited therein).

Targeting Agents

The delivery of oligonucleotides can also be improved by targeting the oligonucleotides to a cellular receptor. The targeting moieties can be conjugated to the oligonucleotides or attached to a carrier group (i.e., poly(L-lysine) or liposomes) linked to the oligonucleotides. This method is well suited to cells that display specific receptor-mediated endocytosis.

For instance, oligonucleotide conjugates to 6-phosphomannosylated proteins are internalized 20-fold more efficiently by cells expressing mannose 6-phosphate specific receptors than free oligonucleotides. The oligonucleotides may also be coupled to a ligand for a cellular receptor using a biodegradable linker. In another example, the delivery construct is mannosylated streptavidin which forms a tight complex with biotinylated oligonucleotides. Mannosylated streptavidin was found to increase 20-fold the internalization of biotinylated oligonucleotides. (Vlassov et al. 1994. Biochimica et Biophysica Acta 1197:95-108).

In addition specific ligands can be conjugated to the polylysine component of polylysine-based delivery systems. For example, transferrin-polylysine, adenovirus-polylysine, and influenza virus hemagglutinin HA-2 N-terminal fusogenic peptides-polylysine conjugates greatly enhance receptor-mediated DNA delivery in eucaryotic cells. Mannosylated glycoprotein conjugated to poly(L-lysine) in aveolar macrophages has been employed to enhance the cellular uptake of oligonucleotides. Liang et al. 1999. Pharmazie 54:559-566.

Because malignant cells have an increased need for essential nutrients such as folic acid and transferrin, these nutrients can be used to target oligonucleotides to cancerous cells. For example, when folic acid is linked to poly(L-lysine) enhanced oligonucleotide uptake is seen in promyelocytic leukaemia (HL-60) cells and human melanoma (M-14) cells. Ginobbi et al. 1997. Anticancer Res. 17:29. In another example, liposomes coated with maleylated bovine serum albumin, folic acid, or ferric protoporphyrin IX, show enhanced cellular uptake of oligonucleotides in murine macrophages, KB cells, and 2.2.15 human hepatoma cells. Liang et al. 1999. Pharmazie 54:559-566.

Liposomes naturally accumulate in the liver, spleen, and reticuloendothelial system (so-called, passive targeting). By coupling liposomes to various ligands such as antibodies are protein A, they can be actively targeted to specific cell populations. For example, protein A-bearing liposomes may be pretreated with H-2K specific antibodies which are targeted to the mouse major histocompatibility complex-encoded H-2K protein expressed on L cells. (Vlassov et al. 1994. Biochimica et Biophysica Acta 1197:95-108).

Other in vitro and/or in vivo delivery of RNAi reagents are known in the art, and can be used to deliver the subject RNAi constructs. See, for example, U.S. patent application publications 20080152661, 20080112916, 20080107694, 20080038296, 20070231392, 20060240093, 20060178327, 20060008910, 20050265957, 20050064595, 20050042227, 20050037496, 20050026286, 20040162235, 20040072785, 20040063654, 20030157030, WO 2008/036825, WO04/065601, and AU2004206255B2, just to name a few (all incorporated by reference).

Treatment Indications

In some aspects, formulations (e.g., gel formulations, ointments, etc.) described by the disclosure are useful for treating disorders affecting the skin, scalp, nails, oral mucosa or genital mucosa of a subject in need thereof. As used herein, a "subject in need thereof" is an organism (e.g., a mammal, such as a human, non-human primate, mouse, etc.) that displays one or more signs or symptoms of a particular disorder or disease (e.g., a skin disease). As used herein, the terms "treat", "treating" or "treatment" refer to the reduction or amelioration of one or more signs or symptoms associated with a skin disease.

In some aspects, the instant disclosure relates to the use of sd-rxRNA to target a gene associated with skin disease. In some embodiments, the gene associated with skin disease encodes CTGF, VEGF, MAP4K4, PDGF-B, SPP1, TGFB1, TGFB2, HIF-1α mTOR, PTGS2 (COX-2), PPIB, IL-1 alpha, IL-1 beta, Icam-1, Tie 1, Tie 2, ANG2, Ang1, MYC, TNFα, MMP1, TYR or any combination thereof.

Non-limiting examples of diseases that may be treated by a sd-rxRNA targeting genes associated with skin disorders include arthritis (osteo and rheumatoid), acne scarring, chronic ulcers (venous ulcers), gangrene (*Vibrio* and *Clostridium*), corneal erosions, periodontitis, blistering skin disorders (e.g. Stevens-Johnson, etc.), skin photo ageing including photo damage), endometrial cancer, endometriosis, skin cancer, dermal scarring, psoriasis, morphea (localized scleroderma), post inflammatory hyperpigmentation, lentigines, uneven skin tone, and hyper-pigmentation photo ageing.

Connective tissue growth factor (CTGF), also known as Hypertrophic chondrocyte-specific protein 24, is a secreted heparin-binding protein that has been implicated in wound healing and scleroderma. Connective tissue growth factor is active in many cell types including fibroblasts, myofibroblasts, endothelial and epithelial cells. Representative Genbank accession number providing DNA and protein sequence information for human CTGF are NM_001901.2 and M92934.

In some embodiments, a sd-rxRNA targeting a gene associated with a skin disorder an be used to treat acne scarring. In some embodiments, the sd-rxRNA targets MMP1. Acne is highly prevalent among adolescents and in some cases acne lesions can result in scarring (either atrophic or hypertrophic). The healing of the lesion occurs in three stages, the last being the remodeling of the ECM. MMPs are required for this stage and overexpression of MMPs at this stage of wound healing may lead to scarring. (Fabbrocini, Annunziata, Monfrecola, Dermatology Research and Practice Volume 2010 (2010), Article ID 893080, incorporated herein by reference).

In some embodiments, a sd-rxRNA targeting a gene associated with a skin disorder (e.g., MMP) can be used to treat chronic ulcers. In some embodiments, the sd-rxRNA targets MMP1. Venous ulcers (stasis ulcers, varicose ulcers or ulcus cruris) affects ~1% of the US population and are the most common form of leg ulcers. Venous incompetence and venous hypertension are believed to be the primary mechanism of ulcer formation. In certain embodiments, the sd-rxRNA is used to treat chronic venous ulcers. (Collins L and Seraj S, Am Fam Physician. 2010 Apr. 15; 81(8):989-996, incorporated herein by reference).

In some embodiments, a sd-rxRNA targeting a gene associated with a skin disorder (e.g., MMP) can be used to treat gangrene. In some embodiments, the sd-rxRNA targets MMP1. Gangrene, necrosis of a considerable tissue, is caused by reduced blood flow to the affected tissue due to trauma, vascular disorder or infection (*Vibrio* or *Clostridium*). Collagenases are a known virulence factor in the spread of gas gangrene.

In some embodiments, a sd-rxRNA targeting a gene associated with a skin disorder (e.g., MMP) can be used to treat periodontitis. In some embodiments, the sd-rxRNA targets MMP1. Periodontitis (pyorrhea) is caused due to an infection of the gums and results in a chronic inflammatory disease and if left untreated may lead to the loss of the bones that support teeth.

In some embodiments, a sd-rxRNA targeting a gene associated with a skin disorder (e.g., MMP) can be used to treat blistering skin disorders. In some embodiments, the sd-rxRNA targets MMP1. Non-limiting examples of blistering skin disorders include Stevens-Johnson Syndrome and Toxic Epidermal Necrolysis. In Steven Johnson syndrome and Toxic Epidermal Necrolysis the epidermis (outer layer of the skin) detaches from the dermis due to a reaction to drugs or bacterial infection.

In some embodiments, a sd-rxRNA targeting a gene associated with a skin disorder (e.g., MMP) can be used to treat skin photoaging. In some embodiments, the sd-rxRNA targets MMP1. Photoaging of the skin results from repeated exposure to ultraviolet A (UVA) rays that damage collagen fibrils in the dermis. This damage results in the improper repair of the affected skin leading to wrinkles and/or leathery skin.

In some embodiments, a sd-rxRNA targeting a gene associated with a skin disorder (e.g., MMP) can be used to treat endometrial cancer. In some embodiments, the sd-rxRNA targets MMP1. Endometrial cancer originates in the endometrium of the uterus (inner lining of the uterus). MMP1 was found to be up-regulated in endometrial cancers and suggested to play in role in the development and/or pathogenesis of the carcinoma. (Nishioka et al., Cancer Science, June 2000, Volume 91, Issue 6, pages 612-615, incorporated herein by reference). In some embodiments, a sd-rxRNA targeting a MMP can be used to treat endometriosis. In some embodiments, the sd-rxRNA targets MMP1 Endometriosis is a condition where the endometrium (inner lining of the uterus) grows outside of the uterus. MMP1 was found to be up-regulated in endometrial lesions, suggesting the protein is involved in the pathogenesis of endometriosis. (Lass et al., Hum. Reprod., June 2005, 20(6): 1695-1701, incorporated herein by reference).

In some embodiments, a sd-rxRNA targeting a gene associated with a skin disorder (e.g., MMP) can be used to treat tuberculosis. In some embodiments, the sd-rxRNA targets MMP1. Tuberculosis is an infectious disease caused by mycobacteria (most commonly *Mycobacterium tuberculosis*) which leads to destruction of tissue, most commonly in the lung (pulmonary tuberculosis). Over one third of the world's population is believed to have been infected with tuberculosis. (Dye et al. Science., 2010; 328(5980):856-861, incorporated herein by reference.) Collagenases have been shown to be to be upregulated in patients with tuberculosis. (Elkington et al., Volume 121, Issue 5 (May 2, 2011) J Clin Invest. 2011; 121(5):1827-1833. doi:10.1172/JCI45666.)

In some embodiments, the gene associated with skin disease encodes a tyrosinase (TYR). Non-limiting examples of diseases that may be treated using a sd-rxRNA that targets a gene associated with a skin disorder (e.g., TYR) include cutaneous pigmentation disorders (e.g. hypermelanosis, post inflammatory hyperpigmentation, melasma, solar lentigo), freckles and lentigines (multiple lentigines syndrome), retinitis pigmentosa, Addison's disease, neuroblastoma, glioblastoma, Parkinson's disease, and keloids.

In some embodiments, a sd-rxRNA that targets a gene associated with a skin disorder (e.g., TYR) can be used to treat cutaneous Hyperpigmentation. Hyperpigmentation, the darkening of an area of skin, results from increased levels melanin, altered melanocyte density or both. Tyrosinase is the enzyme responsible for catalyzing the rate limiting step of the melanin biosynthetic pathway. In certain embodiments, sd-rxRNA is used to treat cutaneous hyperpigmentation. In some embodiments the sd-rxRNA targets TYR. In some embodiments, a sd-rxRNA targeting TYR can be used to treat hypermelanosis. Hypermelanosis is a darkening of the skin associated with increased levels of melanin.

In some embodiments, a sd-rxRNA that targets a gene associated with a skin disorder (e.g., TYR) can be used to treat inflammatory hyperpigmentation. Inflammatory hyperpigmentation of the skin may result following an occurrence of inflammation or cutaneous injury. The inflammation or injury in the skin may lead to melanocytes to increase production of melanin.

In some embodiments, a sd-rxRNA that targets a gene associated with a skin disorder (e.g., TYR) can be used to treat melasma. Melasma (also referred to as chloasma in pregnant woman) is an acquired form of hyperpigmentation that affects millions of people worldwide, 90% of which are women. Causes of melasma include but are not limited to ultraviolet exposure, pregnancy, hormone replacement therapy and birth control pills. Although the pathogenesis of melasma is unknown, it is hypothesized that there is an increase in active melanocytes. (Vashi, NA, British Journal of Dermatology, 2013, 169, 41-56, incorporated herein by reference). In certain embodiments, the sd-rxRNA is used to treat melasma. In some embodiments, the sd-rxRNA targets Tyrosinase.

In some embodiments, a sd-rxRNA that targets a gene associated with a skin disorder (e.g., TYR) can be used to treat solar lentigo. Solar lentigos, also known as sun-induced freckles, is a hyperpigmented lesion caused by repeated exposure to sun and/or ultraviolet light. The repeated exposure induce mutations leading to increases in melanin production in the affected areas.

In some embodiments, sd-rxRNA that targets a gene associated with a skin disorder (e.g., TYR) can be used to treat retinitis pigmentosa. Retinitis pigmentosa is an inherited retinal degenerative disease caused by mutations in several known genes. In certain embodiments, the sd-rxRNA is used to treat retinitis pigmentosa. (Hartong, Lancet 2006, 368, 1795, incorporated herein by reference). In some embodiments, the sd-rxRNA targets TYR.

In some embodiments, a sd-rxRNA targeting sd-rxRNA that targets a gene associated with a skin disorder (e.g., TYR) can be used to treat Addison's disease. Addison's disease (also known as: chronic adrenal insufficiency, hypocortisolism and hypoadrenalism) is a chronic endocrine disorder resulting in reduced levels of glucocorticoids, androgens and aldosterone. The reduction in levels of steroids leads to increases in levels of adrenocorticotropic hormone (ACTH) and melanocyte stimulating hormone (MSH) leading to the activation of melanocytes and production of melanin.

In some embodiments, sd-rxRNA that targets a gene associated with a skin disorder (e.g., TYR) can be used to treat keloids. Keloids are scars which extend beyond the original skin injury. Keloids are a particularly aggressive form of dermal scars that do not regress. Keloid scars are raised, irregular-shaped, pink to dark red in color and characteristically extend beyond the boundaries of the original wound. Keloids are commonly tender or painful and may itch intensely. While keloids are more prevalent in darker skinned individuals and often run in families, keloids can occur in people with all skin types.

In some embodiments, the disease associated with TYR is a neoplasm. In some embodiments, an sd-rxRNA is targeted to a neoplasm or a neoplastic tissue and is used to ameliorate at least one symptom of a condition or disorder associated with neoplasia. Neoplasia refers to the abnormal proliferation of cells, often resulting in an abnormal mass of tissue (i.e., a neoplasm). Neoplasm may be benign, pre-malignant (e.g., a carcinoma in situ), or malignant (cancerous). Benign neoplasms include uterine fibroids and melanocytic nevi (i.e., skin moles) that do not transform into cancer. Potentially malignant, or pre-cancerous, neoplasms include carcinoma in situ, which is an early form of carcinoma that does not invade surrounding tissue, but rather proliferate in their normal environment. Malignant neoplasms are commonly referred to as cancer, and they invade and destroy surrounding tissue, may form metastases, and eventually may be fatal to the host.

In some instances, the sd-rxRNA is targeted to a neoplasm or neoplastic cells of epithelial origin. Epithelial cells reside in one or more layers which cover the entire surface of the body and which line most of the hollow structures of the body, excluding the blood vessels, lymph vessels, and the heart interior, which are lined with endothelium, and the chest and abdominal cavities which are lined with mesothelium.

Epithelial neoplasms include, but are not limited to, benign and premalignant epithelial tumors, such as breast fibroadenoma and colon adenoma, and malignant epithelial tumors. Malignant epithelial tumors include primary tumors, also referred to as carcinomas, and secondary tumors, also referred to as metastases of epithelial origin. Carcinomas include, but are not limited to, acinar carcinoma, acinous carcinoma, alveolar adenocarcinoma (also called adenocystic carcinoma, adenomyoepithelioma, cribriform carcinoma and cylindroma), carcinoma adenomatosum, adenocarcinoma, carcinoma of adrenal cortex, alveolar carcinoma, alveolar cell carcinoma (also called bronchiolar carcinoma, alveolar cell tumor and pulmonary adenomatosis), basal cell carcinoma, carcinoma basocellulare (also called basaloma, or basiloma, and hair matrix carcinoma), basaloid carcinoma, basosquamous cell carcinoma, breast carcinoma, bronchioalveolar carcinoma, bronchiolar carcinoma, bronchogenic carcinoma, cerebriform carcinoma, cholangiocellular carcinoma (also called cholangioma and cholangiocarcinoma), chorionic carcinoma, colloid carcinoma, comedo carcinoma, corpus carcinoma, cribriform carcinoma, carcinoma en cuirasse, carcinoma cutaneum, cylindrical carcinoma, cylindrical cell carcinoma, duct carcinoma, carcinoma durum, embryonal carcinoma, encephaloid carcinoma, epibulbar carcinoma, epidermoid carcinoma, carcinoma epitheliale adenoides, carcinoma exulcere, carcinoma fibrosum, gelatiniform carcinoma, gelatinous carcinoma, giant cell carcinoma, gigantocellulare, glandular carcinoma, granulosa cell carcinoma, hair-matrix carcinoma, hematoid carcinoma, hepatocellular carcinoma (also called hepatoma, malignant hepatoma and hepatocarcinoma), Hurthle cell carcinoma, hyaline carcinoma, hypernephroid carcinoma, infantile embryonal carcinoma, carcinoma in situ, intraepidermal carcinoma, intraepithelial carcinoma, Krompecher's carcinoma, Kulchitzky-cell carcinoma, lenticular carcinoma, carcinoma lenticulare, lipomatous carcinoma, lymphoepithelial carcinoma, carcinoma mastitoides, carcinoma medullare, medullary carcinoma, carcinoma melanodes, melanotic carcinoma, mucinous carcinoma, carcinoma muciparum, carcinoma mucocellulare, mucoepidermoid carcinoma, carcinoma mucosum, mucous carcinoma, carcinoma myxomatodes, nasopharyngeal carcinoma, carcinoma nigrum, oat cell carcinoma, carcinoma ossificans, osteoid carcinoma, ovarian carcinoma, papillary carcinoma, periportal carcinoma, preinvasive carcinoma, prostate carcinoma, renal cell carcinoma of kidney (also called adenocarcinoma of kidney and hypernephoroid carcinoma), reserve cell carcinoma, carcinoma sarcomatodes, scheinderian carcinoma, scirrhous carcinoma, carcinoma scroti, signet-ring cell carcinoma, carcinoma simplex, small-cell carcinoma, solanoid carcinoma, spheroidal cell carcinoma, spindle cell carcinoma, carcinoma spongiosum, squamous carcinoma, squamous cell carcinoma, string carcinoma, carcinoma telangiectaticum, carcinoma telangiectodes, transitional cell carcinoma, carcinoma tuberosum, tuberous carcinoma, verrucous carcinoma, carcinoma vilosum.

In other instances, the sd-rxRNA is targeted to a neoplasm or neoplastic cells of mesenchymal origin, for example, neoplastic cells forming a sarcoma. Sarcomas are rare mesenchymal neoplasms that arise in bone and soft tissues. Different types of sarcomas are recognized, including liposarcomas (including myxoid liposarcomas and pleiomorphic liposarcomas), leiomyosarcomas, rhabdomyosarcomas, malignant peripheral nerve sheath tumors (also called malignant schwannomas, neurofibrosarcomas, or neurogenic sarcomas), Ewing's tumors (including Ewing's sarcoma of bone, extraskeletal [not bone] Ewing's sarcoma, and primitive neuroectodermal tumor [PNET]), synovial sarcoma, angiosarcomas, hemangiosarcomas, lymphangiosarcomas, Kaposi's sarcoma, hemangioendothelioma, fibrosarcoma, desmoid tumor (also called aggressive fibromatosis), dermatofibrosarcoma protuberans (DFSP), malignant fibrous histiocytoma (MFH), hemangiopericytoma, malignant mesenchymoma, alveolar soft-part sarcoma, epithelioid sarcoma, clear cell sarcoma, desmoplastic small cell tumor, gastrointestinal stromal tumor (GIST) (also known as GI stromal sarcoma), osteosarcoma (also known as osteogenic sarcoma)-skeletal and extraskeletal, and chondrosarcoma.

In yet other instances, the sd-rxRNA targets neoplasms or neoplastic cells of melanocytic origin. Melanomas are tumors arising from the melanocytic system of the skin and other organs. Examples of melanoma include lentigo maligna melanoma, superficial spreading melanoma, nodular melanoma, and acral lentiginous melanoma.

In still other instances, the sd-rxRNA targets malignant neoplasms or neoplastic cells including, but not limited to, those found in biliary tract cancer, endometrial cancer, esophageal cancer, gastric cancer, intraepithelial neoplasms, including Bowen's disease and Paget's disease, liver cancer, oral cancer, including squamous cell carcinoma, sarcomas, including fibrosarcoma and osteosarcoma, skin cancer, including melanoma, Kaposi's sarcoma, testicular cancer, including germinal tumors (seminoma, non-seminoma (teratomas, choriocarcinomas)), stromal tumors and germ cell tumors, thyroid cancer, including thyroid adenocarcinoma and medullar carcinoma, and renal cancer including adenocarcinoma and Wilms tumor.

In other instances, the sd-rxRNA targets neoplasms or neoplastic cells originating in bone, muscle or connective tissue. The neoplastic cells may be found in primary tumors (e.g., sarcomas) of bone and connective tissue.

The total dose, concentration, volume of the sd-rxRNA delivered, and rate of delivery can be optimized for a given neoplasm type, size and architecture. The zone of RNA interference can be controlled by optimizing these parameters. The volume and concentration of the sd-rxRNA delivered into the neoplasm must be sufficient to promote RNA interference throughout the tumor. Depending on the number of injections, and their placement with respect to neoplasm architecture, it can be useful to administer total sd-rxRNA volumes less than the neoplasm volume, greater than the neoplasm volume, or approximately equal to the neoplasm volume.

In some embodiments, an sd-rxRNA that is targeted to a neoplasm targets a proliferative gene or a gene that is expressed at higher levels in a neoplastic tissue than in other tissues. A "proliferative gene," as referred to herein, can be any gene that promotes, directly or indirectly, increased rate of growth or replication of cells, resulting in formation of a neoplasm or neoplastic cells. Increase rate of growth or replication resulting from expression/function of a proliferative gene is relative to the rate of growth or replication of non-neoplastic tissue of similar origin (e.g., neoplasms of the skin v. non-neoplastic skin). Several non-limiting examples of proliferative genes or genes that are expressed at higher levels in a neoplastic tissue than in other tissues include VEGF/VEGFR, HER2, PDGF/PDGFR, HDAC, MET, c-kit, CDK, FLT-1, IGF/IGFR, FGF/FGFR, Ras/Raf, Abl, Bcl-2, Src, mTOR, PKC, MAPK, BIRC5, FAS, HIF1A, CDH16, MYC, HRAS, and CTNNB1.

Vascular endothelial growth factor (VEGF) is a member of the PDGF/VEGF growth factor family and encodes a protein that is often found as a disulfide linked homodimer. This protein is a glycosylated mitogen that specifically acts on endothelial cells and has various effects, including mediating increased vascular permeability, inducing angiogenesis, vasculogenesis and endothelial cell growth, promoting cell migration, and inhibiting apoptosis. Elevated levels of this protein is linked to POEMS syndrome, also known as Crow-Fukase syndrome. Mutations in this gene have been associated with proliferative and nonproliferative diabetic retinopathy. Alternatively spliced transcript variants, encoding either freely secreted or cell-associated isoforms, have been characterized, and can be targeted with sd-rxRNAs of the present invention. There is also evidence for the use of non-AUG (CUG) translation initiation sites upstream of, and in-frame with the first AUG, leading to additional isoforms. A representative example of a transcript variant of human VEGFA is Genbank accession number NM_001025366.2. Its corresponding protein is Genbank accession number NP_001020537.2.

Platelet-derived growth factor (PDGFA/PDGFB) is a member of the platelet-derived growth factor family. The four members of this family are mitogenic factors for cells of mesenchymal origin and are characterized by a motif of eight cysteines. The PDGF gene product can exist either as a homodimer or as a heterodimer with the platelet-derived growth factor beta polypeptide, where the dimers are connected by disulfide bonds. Studies using knockout mice have shown cellular defects in oligodendrocytes, alveolar smooth muscle cells, and Leydig cells in the testis; knockout mice die either as embryos or shortly after birth. Two splice variants have been identified for PDGF, and can be targeted by the sd-rxRNA of the present invention. Representative examples of human PDGF transcripts are GenBank accession numbers NM_002607.5 and NM_011057.3. Their corresponding proteins are Genbank accession numbers NP_002598.4 and NP_03187.2, respectively. PDGF binds to its receptor, PDGFR. A representative example of human PDGFR transcript is Genbank accession number NM_006206.4, and its corresponding protein is NP_006197.1.

Human epidermal growth factor 2 (HER2, also referred to as HER-2, NEU, NGL, TKR1, CD340, MLN 19, and ERBB2) encodes a member of the epidermal growth factor (EGF) receptor family of receptor tyrosine kinases. This protein has no ligand binding domain of its own and therefore cannot bind growth factors. However, it does bind tightly to other ligand-bound EGF receptor family members to form a heterodimer, stabilizing ligand binding and enhancing kinase-mediated activation of downstream signaling pathways, such as those involving mitogen-activated protein kinase and phosphatidylinositol-3 kinase. Allelic variations at amino acid positions 654 and 655 of isoform a (positions 624 and 625 of isoform b) have been reported, with the most common allele being Ile654/Ile655. Amplification and/or overexpression of this gene has been reported in numerous cancers, including breast and ovarian tumors. Alternative splicing results in several additional transcript variants, some encoding different isoforms. Each transcript variant can be a target of the sd-rxRNA of the present invention. A representative example of a transcript variant of HER2 is GenBank accession number NM_004448.2. Its corresponding protein is Genbank accession number NP_004439.2.

Histone deacetylase 1 (HDAC1), belongs to the histone deacetylase/acuc/alpha family and is a component of the histone deacetylase complex. It interacts with retinoblastoma tumor-suppressor protein and this complex is a key element in the control of cell proliferation and differentiation. Together with metastasis-associated protein-2, it deacetylates p53 and modulates its effect on cell growth and apoptosis. In some instances, the sd-rxRNAs can target HDAC1, retinoblastoma tumor-suppressor protein, and/or metastasis-associated protein-2. In other instances, the sd-rxRNA can target p53. A representative example of human HDAC1 transcript is Genbank accession number NM_004964.2, and its corresponding protein is Genbank accession number NP_004955.2.

Met proto-oncogene (MET), is a hepatocyte growth factor receptor and encodes tyrosine-kinase activity. The primary single chain precursor protein is post-translationally cleaved to produce the alpha and beta subunits, which are disulfide linked to form the mature receptor. Various mutations in the MET gene are associated with papillary renal carcinoma. Two transcript variants encoding different isoforms have been found for this gene, each of which can be targeted by the sd-rxRNA. A representative example of human MET transcript is Genbank accession number NM_000245.2, and its corresponding protein is Genbank accession number NP_000236.2.

V-kit Hardy-Zuckerman 4 feline sarcoma viral oncogene (KIT, also referred to as PBT, SCFR, C-Kit, or CD117), encodes the human homolog of the proto-oncogene c-kit. C-kit was first identified as the cellular homolog of the feline sarcoma viral oncogene v-kit. This protein is a type 3 transmembrane receptor for MGF (mast cell growth factor, also known as stem cell factor). Mutations in this gene are associated with gastrointestinal stromal tumors, mast cell disease, acute myelogenous lukemia, and piebaldism. Multiple transcript variants encoding different isoforms have been found for this gene, each of which can be targeted by the sd-rxRNAs. A representative example of human KIT transcript is Genbank accession number NM_000222.2, and its corresponding protein is NP_000213.1.

Cyclin-dependent kinases (CDKs) play an essential role in cell cycle control of eukaryotic cells, are phosphorylated, and thus activated by the CDK-activating kinase (CAK). CAK is a multisubunit protein that includes CDK7 (MIM 601955), cyclin H (CCNH; MIM 601953), and MAT1. MAT1 (for 'menage a trois-1') is involved in the assembly of the CAK complex. A representative example of a human CDK transcript is Genbank accession number NM_001177963.1, and its corresponding protein is NP_001171434.1.

Fms-related tyrosine kinase 1 (FLT-1, also referred to as FLT, VEGFR1, FLT1) encodes a member of the vascular endothelial growth factor receptor (VEGFR) family. VEGFR family members are receptor tyrosine kinases (RTKs) which contain an extracellular ligand-binding region with seven immunoglobulin (Ig)-like domains, a transmembrane segment, and a tyrosine kinase (TK) domain within the cytoplasmic domain. This protein binds to VEGFR-A, VEGFR-B and placental growth factor and plays an important role in angiogenesis and vasculogenesis. Expression of this receptor is found in vascular endothelial cells, placental trophoblast cells and peripheral blood monocytes. Multiple transcript variants encoding different isoforms have been found for this gene. Isoforms include a full-length transmembrane receptor isoform and shortened, soluble isoforms. The soluble isoforms are associated with the onset of pre-eclampsia. Each transcript variant of FLT-1 can be a target of the sd-rxRNA. A representative example of human FLT-1 transcript is Genbank accession number NM_001159920.1, and its corresponding protein is NP_00115392.1.

Insulin-like growth factors (IGFs) are similar to insulin in function and structure and are members of a family of proteins involved in mediating growth and development. IGFI protein, for example, is processed from a precursor, bound by a specific receptor, and secreted. Defects in this gene are a cause of insulin-like growth factor I deficiency. Several transcript variants encoding different isoforms have been found for these genes, each of which can be a target of the sd-rxRNA. A representative example of human IGF transcript is Genbank accession number NM_000618.3, and its corresponding protein is NP_000609.1.

Fibroblast growth factor (FGF) family members possess broad mitogenic and cell survival activities, and are involved in a variety of biological processes, including embryonic development, cell growth, morphogenesis, tissue repair, tumor growth, and invasion. FGF1, for example, functions as a modifier of endothelial cell migration and proliferation, as well as an angiogenic factor. It acts as a mitogen for a variety of mesoderm- and neuroectoderm-derived cells in vitro, thus is thought to be involved in organogenesis. Alternatively spliced transcript variants encoding distinct isoforms of several FGFs have been reported, each of which may be a target of the sd-rxRNA. A representative example of human FGF1 transcript s Genbank accession number NM_000800.3, and its corresponding protein is NP_000791.1.

Fibroblast growth factor receptor (FGFR) family members, having highly conserved amino acid sequences between members and throughout evolution, differ from one another in their ligand affinities and tissue distribution. A full-length representative protein consists of an extracellular region, composed of three immunoglobulin-like domains, a single hydrophobic membrane-spanning segment and a cytoplasmic tyrosine kinase domain. The extracellular portion of the protein interacts with fibroblast growth factors, setting in motion a cascade of downstream signals, ultimately influencing mitogenesis and differentiation. FGFR1, for example, binds both acidic and basic fibroblast growth factors and is involved in limb induction. Mutations in this gene have been associated with Pfeiffer syndrome, Jackson-Weiss syndrome, Antley-Bixler syndrome, osteoglophonic dysplasia, and autosomal dominant Kallmann syndrome 2. Chromosomal aberrations involving FGFR1 are associated with stem cell myeloproliferative disorder and stem cell leukemia lymphoma syndrome. Alternatively spliced variants which encode different protein isoforms of FGFR1 family members have been described, each of which may be a target of the sd-rxRNA. A representative example of a human FGFR1 is Genbank accession number NM_001174063.1, and its corresponding protein is NP_001167534.1.

The Ras subfamily (an abbreviation of RAt Sarcoma) is a protein subfamily of small GTPases that are involved in cellular signal transduction, and is also used to designate gene subfamily of the genes encoding those proteins. Activation of Ras signaling causes cell growth, differentiation and survival. Ras is the prototypical member of the Ras superfamily of proteins which are all related in structure and regulate diverse cell behaviors. Since Ras communicates signals from outside the cell to the nucleus, mutations in ras genes can permanently activate it and cause inappropriate transmission inside the cell, even in the absence of extracellular signals. Because these signals result in cell growth and division, dysregulated Ras signaling can ultimately lead to oncogenesis and cancer. Activating mutations in Ras are found in 20-25% of all human tumors and up to 90% in specific tumor types.

KRAS, a Kirsten ras oncogene homolog from the mammalian ras gene family, encodes a protein that is a member of the small GTPase superfamily. A single amino acid substitution is responsible for an activating mutation. The transforming protein that results is implicated in various malignancies, including lung adenocarcinoma, mucinous adenoma, ductal carcinoma of the pancreas and colorectal carcinoma. Alternative splicing leads to variants encoding two isoforms that differ in the C-terminal region. Each KRAS gene variant can be a target of the sd-rxRNA. A representative example of human KRAS transcript is Genbank accession number NM_004985.3, and its corresponding protein is NP_04976.2.

HRAS, a v-HA-ras Harvey rat sarcoma viral oncogene homolog from the mammalian ras gene family, encodes a protein that undergoes a continuous cycle of de- and re-palmitoylation, which regulates its rapid exchange between the plasma membrane and the Golgi apparatus. Mutations in this gene cause Costello syndrome, a disease characterized by increased growth at the prenatal stage, growth deficiency at the postnatal stage, predisposition to tumor formation, mental retardation, skin and musculoskeletal abnormalities, distinctive facial appearance and cardiovascular abnormalities. Defects in this gene are implicated in a variety of cancers, including bladder cancer, follicular thyroid cancer, and oral squamous cell carcinoma. Multiple transcript variants, which encode different isoforms, have been identified for this gene. Each transcript variant can be a target of the sd-rxRNA. A representative example of human HRAS transcript is Genbank accession number NM_001130442.1, and its corresponding protein is NP_001123914.1.

RAF proto-oncogene serine/threonine-protein kinase also known as proto-oncogene c-RAF or simply c-Raf is an enzyme that in humans is encoded by the RAF1 gene. The c-Raf protein functions in the MAPK/ERK signal transduction pathway as part of a protein kinase cascade. c-Raf is a member of the Raf kinase family of serine/threonine-specific protein kinases, and is a MAP kinase (MAP3K) that functions downstream of the Ras subfamily of membrane associated GTPases to which it binds directly. Once activated, Raf-1 can phosphorylate to activate the dual specificity protein kinases MEK1 and MEK2, which, in turn, phosphorylate to activate the serine/threonine-specific protein kinases ERK1 and ERK2. Activated ERKs are pleiotropic effectors of cell physiology and play an important role in the control of gene expression involved in the cell division cycle, apoptosis, cell differentiation, and cell migration. Any one or more of c-Raf (RAF1), MEK1, MEK2, ERK1, and ERK2 may be targets of the sd-rxRNA. A representative example of human RAF1 transcript is NM_002880.3, and its corresponding protein is NP_00287.1.

Mitogen-activated protein kinase 1 (MAPK1) (also referred to as ERK, p38, p40, p41, ERK2, ERT1, MAPK2, PRKM1, PRKM2, P42MAPK, or p41mapk) encodes a member of the MAP kinase family. MAP kinases, also known as extracellular signal-regulated kinases (ERKs), act as an integration point for multiple biochemical signals, and are involved in a wide variety of cellular processes such as proliferation, differentiation, transcription regulation and development. The activation of this kinase requires its phosphorylation by upstream kinases. Upon activation, this kinase translocates to the nucleus of the stimulated cells, where it phosphorylates nuclear targets. Two alternatively spliced transcript variants encoding the same protein, but differing in the UTRs, have been reported for this gene. Each transcript variant of MAPK1 can be a target of the sd-rxRNA. A representative example of human MAPK1 transcript is NM_002745.4, and its corresponding protein is NP_002736.3.

C-abl oncogene 1, non-receptor tyrosine kinase (ABL1) encodes a cytoplasmic and nuclear protein tyrosine kinase that has been implicated in processes of cell differentiation, cell division, cell adhesion, and stress response. Activity of c-Abl protein is negatively regulated by its SH3 domain, and deletion of the SH3 domain turns ABL1 into an oncogene. The t(9;22) translocation results in the head-to-tail fusion of the BCR (MIM:151410) and ABL1 genes present in many cases of chronic myelogeneous leukemia. The DNA-binding activity of the ubiquitously expressed ABL1 tyrosine kinase is regulated by CDC2-mediated phosphorylation, suggesting a cell cycle function for ABL1. The ABL1 gene is expressed as either a 6- or 7-kb mRNA transcript, with alternatively spliced first exons spliced to the common exons 2-11. Each transcript variant of ABL1 can be a target of the sd-rxRNA. A representative example of human ABL1 transcript is Genbank accession number NM_005057.4, and its corresponding protein is NP_005148.2.

B-cell CLL/lymphoma 2 (Bcl-2) encodes an integral outer mitochondrial membrane protein that blocks the apoptotic death of some cells such as lymphocytes. Constitutive expression of BCL2, such as in the case of translocation of BCL2 to Ig heavy chain locus, is thought to be the cause of follicular lymphoma. Two transcript variants, produced by alternate splicing, differ in their C-terminal ends, each of which can be a target of the sd-rxRNA. A representative example of a human Bcl-2 transcript is NM_000633.2, and its corresponding protein is NP_00624.2.

V-src sarcoma viral oncogene homolog (SRC) is highly similar to the v-src gene of Rous sarcoma virus. This proto-oncogene may play a role in the regulation of embryonic development and cell growth. The protein encoded by this gene is a tyrosine-protein kinase whose activity can be inhibited by phosphorylation by c-SRC kinase. Mutations in this gene could be involved in the malignant progression of colon cancer. Two transcript variants encoding the same protein have been found for this gene, each of which may be a target of the sd-rxRNA. A representative example of a human SRC transcript is NM_005417.3, and its corresponding protein is NP_005408.1.

Mechanistic target of rapamycin (serine/threonine kinase) (mTOR) encodes a protein belonging to a family of phosphatidylinositol kinase-related kinases. These kinases mediate cellular responses to stresses such as DNA damage and nutrient deprivation. This protein acts as the target for the cell-cycle arrest and immunosuppressive effects of the FKBP12-rapamycin complex. A representative example of a human mTOR transcript is NM_004958.3, and its corresponding protein is NP_004949.1.

Protein kinase C (PKC) encodes a family of enzymes that are involved in controlling the function of other proteins through the phosphorylation of hydroxyl groups of serine and threonine amino acid residues on these proteins. PKC enzymes in turn are activated by signals such as increases in the concentration of diacylglycerol or Ca2+. Hence PKC enzymes play important roles in several signal transduction cascades. The PKC family consists of about ten isozymes. They are divided into three subfamilies, based on their second messenger requirements: conventional (or classical), novel, and atypical. Conventional (c)PKCs contain the isoforms α, βI, βII, and γ. These require Ca2+, diacylglycerol (DAG), and a phospholipid such as phosphatidylserine for activation. Novel (n)PKCs include the δ, Ǝ, η, and θ isoforms, and require DAG, but do not require Ca2+ for activation. Thus, conventional and novel PKCs are activated through the same signal transduction pathway as phospholipase C. On the other hand, atypical (a)PKCs (including protein kinase Mζ and ι/λ isoforms) require neither Ca2+ nor diacylglycerol for activation. The term "protein kinase C" refers to the entire family of isoforms. Any one or more of conventional, novel, and atypical PKC genes can be a target of the sd-rxRNA. A representative example of human PKC transcript is NM_005400.2, and its corresponding protein NP_005391.1.

Baculoviral IAP repeat containing 5 (BIRC5) (also referred to as API4 or EPR-1) is a member of the inhibitor of apoptosis (IAP) gene family, which encode negative regulatory proteins that prevent apoptotic cell death. IAP family members usually contain multiple baculovirus IAP repeat (BIR) domains, but this gene encodes proteins with only a single BIR domain. The encoded proteins also lack a C-terminus RING finger domain. Gene expression is high during fetal development and in most tumors yet low in adult tissues. Antisense transcripts are involved in the regulation of this gene's expression. At least four transcript variants encoding distinct isoforms have been found for this gene, each of which may be a target of the sd-rxRNA. A representative example of human BRCS transcript is NM_001012270.1, and its corresponding protein NP_001012270.1.

Fas (TNF receptor superfamily, member 6) (FAS, also referred to as APT1, CD95, FAS1, APO-1, FASTM, ALPS1A, or TNFRSF6) encodes a member of the TNF-receptor superfamily. This receptor contains a death domain. It has been shown to play a central role in the physiological regulation of programmed cell death, and has been implicated in the pathogenesis of various malignancies and diseases of the immune system. The interaction of this receptor with its ligand allows the formation of a death-inducing signaling complex that includes Fas-associated death domain protein (FADD), caspase 8, and caspase 10. The autoproteolytic processing of the caspases in the complex triggers a downstream caspase cascade, and leads to apoptosis. This receptor has been also shown to activate NF-kappaB, MAPK3/ERK1, and MAPK8/JNK, and is found to be involved in transducing the proliferating signals in normal diploid fibroblast and T cells. Several alternatively spliced transcript variants have been described, some of which are candidates for nonsense-mediated mRNA decay (NMD). The isoforms lacking the transmembrane domain may negatively regulate the apoptosis mediated by the full length isoform. Each transcript variant may be a target of the sd-rxRNA. In some instances, the sd-rxRNA target is FADD, caspase 8, and/or caspase 10. In other instances, the sd-rxRNA target is NF-kappaB, MAPK3/ERK1 and/or MAPK8/JNK. A representative example of human BIRC5 transcript is NM_001012270.1, and its corresponding protein NP_001012270.1.

Hypoxia inducible factor 1, alpha subunit (HIF1A), is a transcription factor found in mammalian cells cultured under reduced oxygen tension that plays an essential role in cellular and systemic homeostatic responses to hypoxia. HIF1 is a heterodimer composed of an alpha subunit and a beta subunit. The beta subunit has been identified as the aryl hydrocarbon receptor nuclear translocator (ARNT). This gene encodes the alpha subunit of HIF-1. Overexpression of a natural antisense transcript (aHIF) of this gene has been shown to be associated with nonpapillary renal carcinomas. Two alternative transcripts encoding different isoforms have been identified. Each transcript variant and/or the natural antisense transcript can be a target of the sd-rxRNA. A representative example of human HIF1A transcript is NM_001530.3, and its corresponding protein NP_001521.1.

Cadherin 16, KSP-cadherin (CDH16) is a member of the cadherin superfamily, genes encoding calcium-dependent, membrane-associated glycoproteins. Mapped to a previously identified cluster of cadherin genes on chromosome 16q22.1, the gene localizes with superfamily members CDH1, CDH3, CDH5, CDH8 and CDH11. The protein consists of an extracellular domain containing 6 cadherin domains, a transmembrane region and a truncated cytoplasmic domain but lacks the prosequence and tripeptide HAV adhesion recognition sequence typical of most classical cadherins. Expression is exclusively in kidney, where the protein functions as the principal mediator of homotypic cellular recognition, playing a role in the morphogenic direction of tissue development. Alternatively spliced transcript variants encoding distinct isoforms have been identified, each of which can be a target of the sd-rxRNA. A representative example of human CDH16 transcript is NM_004062.3, and its corresponding protein NP_004053.1.

Catenin (cadherin-associated protein), beta 1 (CTNNB1) encodes a protein that is part of a complex of proteins that constitute adherens junctions (AJs). AJs are necessary for the creation and maintenance of epithelial cell layers by regulating cell growth and adhesion between cells. The encoded protein also anchors the actin cytoskeleton and may be responsible for transmitting the contact inhibition signal that causes cells to stop dividing once the epithelial sheet is complete. This protein binds to the product of the APC gene, which is mutated in adenomatous polyposis of the colon. Mutations in this gene are a cause of colorectal cancer (CRC), pilomatrixoma (PTR), medulloblastoma (MDB), and ovarian cancer. Three transcript variants encoding the same protein have been found for this gene, each of which can be a target of the sd-rxRNA. A representative example of human CTNNB1 transcript is NM_001098209.1, and its corresponding protein NP_001091679.1.

V-myc myelocytomatosis viral oncogene homolog (MYC) encodes a multifunctional, nuclear phosphoprotein that plays a role in cell cycle progression, apoptosis and cellular transformation. It functions as a transcription factor that regulates transcription of specific target genes. Mutations, overexpression, rearrangement and translocation of this gene have been associated with a variety of hematopoietic tumors, leukemias and lymphomas, including Burkitt lymphoma. There is evidence to show that alternative translation initiations from an upstream, in-frame non-AUG (CUG) and a downstream AUG start site result in the production of two isoforms with distinct N-termini. The synthesis of non-AUG initiated protein is suppressed in Burkitt's lymphomas, suggesting its importance in the normal function of this gene. Each transcript variant, including mutant variants, can be a target of the sd-rxRNA. A representative example of human MYC transcript is NM_002467.4, and its corresponding protein NP_002458.2.

Administration

Aspects of the disclosure relate to the surprising discovery that topical administration of formulations (e.g., gel formulations, ointment formulations, etc.) described by the disclosure. In some embodiments, administration of formulations described by the disclosure mediates efficient delivery of therapeutic oligonucleotides (e.g., sd-rxRNAs) to the dermis of a subject. As used herein "administration" refers to contacting cells with oligonucleotides and can be performed in vitro or in vivo. The dosage of oligonucleotides may be adjusted to optimally reduce expression of a protein translated from a target nucleic acid molecule, e.g., as measured by a readout of RNA stability or by a therapeutic response, without undue experimentation.

For example, expression of the protein encoded by the nucleic acid target can be measured to determine whether or not the dosage regimen needs to be adjusted accordingly. In addition, an increase or decrease in RNA or protein levels in a cell or produced by a cell can be measured using any art recognized technique. By determining whether transcription has been decreased, the effectiveness of the oligonucleotide in inducing the cleavage of a target RNA can be determined.

Any of the above-described oligonucleotide compositions can be used alone or in conjunction with a pharmaceutically acceptable carrier. As used herein, "pharmaceutically acceptable carrier" includes appropriate solvents, dispersion media, coatings, antibacterial and antifungal agents, isotonic and absorption delaying agents, and the like. The use of such media and agents for pharmaceutical active substances is well known in the art. Except insofar as any conventional media or agent is incompatible with the active ingredient, it can be used in the therapeutic compositions. Supplementary active ingredients can also be incorporated into the compositions.

Oligonucleotides may be incorporated into liposomes or liposomes modified with polyethylene glycol or admixed with cationic lipids for parenteral administration. Incorporation of additional substances into the liposome, for example, antibodies reactive against membrane proteins found on specific target cells, can help target the oligonucleotides to specific cell types.

With respect to in vivo applications, the formulations of the present disclosure can be administered to a patient in a variety of forms adapted to the chosen route of administration, e.g., parenterally, orally, or intraperitoneally. Parenteral administration, which is preferred, includes administration by the following routes: intravenous; intramuscular; interstitially; intraarterially; subcutaneous; intra ocular; intrasynovial; trans epithelial, including transdermal; pulmonary via inhalation; ophthalmic; sublingual and buccal; topically, including ophthalmic; dermal; ocular; rectal; and nasal inhalation via insufflation. In preferred embodiments, the sd-rxRNA molecules are administered by topical application.

Pharmaceutical preparations for topical administration include transdermal patches, ointments, lotions, creams, gels, drops, sprays, suppositories, liquids and powders. In addition, conventional pharmaceutical carriers, aqueous, powder or oily bases, or thickeners may be used in pharmaceutical preparations for topical administration.

For transmucosal or transdermal administration, penetrants appropriate to the barrier to be permeated are used in the formulation. Such penetrants are known in the art, and include, for example, for transmucosal administration bile salts and fusidic acid derivatives, and detergents. Transmucosal administration may be through nasal sprays or using suppositories. For oral administration, the oligonucleotides are formulated into conventional oral administration forms such as capsules, tablets, and tonics. For topical administration, the oligonucleotides of the invention are formulated into ointments, salves, gels, or creams as known in the art.

The chosen method of delivery, in some embodiments, results in entry of the oligonucleotides into cells. In some embodiments, preferred delivery methods include liposomes (10-400 nm), hydrogels, controlled-release polymers, and other pharmaceutically applicable vehicles, and microinjection or electroporation (for ex vivo treatments).

The pharmaceutical preparations of the present invention may be prepared and formulated as emulsions. Emulsions are usually heterogeneous systems of one liquid dispersed in another in the form of droplets usually exceeding 0.1 µm in diameter. The emulsions of the present invention may contain excipients such as emulsifiers, stabilizers, dyes, fats, oils, waxes, fatty acids, fatty alcohols, fatty esters, humectants, hydrophilic colloids, preservatives, and anti-oxidants may also be present in emulsions as needed. These excipients may be present as a solution in either the aqueous phase, oily phase or itself as a separate phase.

Examples of naturally occurring emulsifiers that may be used in emulsion formulations of the present invention include lanolin, beeswax, phosphatides, lecithin and acacia. Finely divided solids have also been used as good emulsifiers especially in combination with surfactants and in viscous preparations. Examples of finely divided solids that may be used as emulsifiers include polar inorganic solids, such as heavy metal hydroxides, nonswelling clays such as bentonite, attapulgite, hectorite, kaolin, montrnorillonite, colloidal aluminum silicate and colloidal magnesium aluminum silicate, pigments and nonpolar solids such as carbon or glyceryl tristearate.

Examples of preservatives that may be included in the emulsion formulations include methyl paraben, propyl paraben, quaternary ammonium salts, benzalkonium chloride, esters of p-hydroxybenzoic acid, and boric acid. Examples of antioxidants that may be included in the emulsion formulations include free radical scavengers such as tocopherols, alkyl gallates, butylated hydroxyanisole, butylated hydroxytoluene, or reducing agents such as ascorbic acid and sodium metabisulfite, and antioxidant synergists such as citric acid, tartaric acid, and lecithin.

In one embodiment, the compositions of oligonucleotides are formulated as microemulsions. A microemulsion is a system of water, oil and amphiphile which is a single optically isotropic and thermodynamically stable liquid solution. Typically microemulsions are prepared by first dispersing an oil in an aqueous surfactant solution and then adding a sufficient amount of a 4th component, generally an intermediate chain-length alcohol to form a transparent system.

Surfactants that may be used in the preparation of microemulsions include, but are not limited to, ionic surfactants, non-ionic surfactants, Brij 96, polyoxyethylene oleyl ethers, polyglycerol fatty acid esters, tetraglycerol monolaurate (ML310), tetraglycerol monooleate (MO310), hexaglycerol monooleate (PO310), hexaglycerol pentaoleate (PO500), decaglycerol monocaprate (MCA750), decaglycerol monooleate (MO750), decaglycerol sequioleate (S0750), decaglycerol decaoleate (DA0750), alone or in combination with cosurfactants. The cosurfactant, usually a short-chain alcohol such as ethanol, 1-propanol, and 1-butanol, serves to increase the interfacial fluidity by penetrating into the surfactant film and consequently creating a disordered film because of the void space generated among surfactant molecules.

Microemulsions may, however, be prepared without the use of cosurfactants and alcohol-free self-emulsifying microemulsion systems are known in the art. The aqueous phase may typically be, but is not limited to, water, an aqueous solution of the drug, glycerol, PEG300, PEG400, polyglycerols, propylene glycols, and derivatives of ethylene glycol. The oil phase may include, but is not limited to, materials such as Captex 300, Captex 355, Capmul MCM, fatty acid esters, medium chain ($C_8$-$C_{12}$) mono, di, and tri-glycerides, polyoxyethylated glyceryl fatty acid esters, fatty alcohols, polyglycolized glycerides, saturated polyglycolized $C_8$-$C_{10}$ glycerides, vegetable oils and silicone oil.

Microemulsions are particularly of interest from the standpoint of drug solubilization and the enhanced absorption of drugs. Lipid based microemulsions (both oil/water and water/oil) have been proposed to enhance the oral bioavailability of drugs.

Microemulsions offer improved drug solubilization, protection of drug from enzymatic hydrolysis, possible enhancement of drug absorption due to surfactant-induced alterations in membrane fluidity and permeability, ease of preparation, ease of oral administration over solid dosage forms, improved clinical potency, and decreased toxicity (Constantinides et al., Pharmaceutical Research, 1994, 11:1385; Ho et al., J. Pharm. Sci., 1996, 85:138-143). Microemulsions have also been effective in the transdermal delivery of active components in both cosmetic and pharmaceutical applications. It is expected that the microemulsion compositions and formulations of the present invention will facilitate the increased systemic absorption of oligonucleotides from the gastrointestinal tract, as well as improve the local cellular uptake of oligonucleotides within the gastrointestinal tract, vagina, buccal cavity and other areas of administration.

In some embodiments, the present disclosure relates to formulations comprising various (e.g., one or more) penetration enhancers to affect the efficient delivery of nucleic acids, particularly oligonucleotides, to the skin of animals. Even non-lipophilic drugs may cross cell membranes if the membrane to be crossed is treated with a penetration enhancer. In addition to increasing the diffusion of non-lipophilic drugs across cell membranes, penetration enhancers also act to enhance the permeability of lipophilic drugs.

Five categories of penetration enhancers that may be used in formulations described by the present disclosure include: surfactants, fatty acids, bile salts, chelating agents, and non-chelating non-surfactants. Other agents may be utilized to enhance the penetration of the administered oligonucleotides include: glycols such as ethylene glycol and propylene glycol, pyrrols such as 2-15 pyrrol, azones, and terpenes such as limonene, and menthone.

The oligonucleotides, especially in lipid formulations, can also be administered by coating a medical device, for example, a catheter, such as an angioplasty balloon catheter, with a cationic lipid formulation. Coating may be achieved, for example, by dipping the medical device into a lipid formulation or a mixture of a lipid formulation and a suitable solvent, for example, an aqueous-based buffer, an aqueous solvent, ethanol, methylene chloride, chloroform and the like. An amount of the formulation will naturally adhere to the surface of the device which is subsequently administered to a patient, as appropriate. Alternatively, a lyophilized mixture of a lipid formulation may be specifically bound to the surface of the device. Such binding techniques are described, for example, in K. Ishihara et al., Journal of Biomedical Materials Research, Vol. 27, pp. 1309-1314 (1993), the disclosures of which are incorporated herein by reference in their entirety.

The useful dosage to be administered and the particular mode of administration will vary depending upon such factors as the cell type, or for in vivo use, the age, weight and the particular animal and region thereof to be treated, the particular oligonucleotide and delivery method used, the therapeutic or diagnostic use contemplated, and the form of the formulation, for example, suspension, emulsion, micelle or liposome, as will be readily apparent to those skilled in the art. Typically, dosage is administered at lower levels and increased until the desired effect is achieved. When lipids are used to deliver the oligonucleotides, the amount of lipid compound that is administered can vary and generally depends upon the amount of oligonucleotide agent being administered. For example, the weight ratio of lipid compound to oligonucleotide agent is preferably from about 1:1 to about 15:1, with a weight ratio of about 5:1 to about 10:1 being more preferred. Generally, the amount of cationic lipid compound which is administered will vary from between about 0.1 milligram (mg) to about 1 gram (g). By way of general guidance, typically between about 0.1 mg and about 10 mg of the particular oligonucleotide agent, and about 1 mg to about 100 mg of the lipid compositions, each per kilogram of patient body weight, is administered, although higher and lower amounts can be used.

The agents of the disclosure are administered to subjects or contacted with cells in a biologically compatible form suitable for pharmaceutical administration. By "biologically compatible form suitable for administration" is meant that the oligonucleotide is administered in a form in which any toxic effects are outweighed by the therapeutic effects of the oligonucleotide. In one embodiment, oligonucleotides can be administered to subjects. Examples of subjects include mammals, e.g., humans and other primates; cows, pigs, horses, and farming (agricultural) animals; dogs, cats, and other domesticated pets; mice, rats, and transgenic non-human animals.

Administration of an active amount of an oligonucleotide of the disclosure is defined as an amount effective, at dosages and for periods of time necessary to achieve the desired result. For example, an active amount of an oligonucleotide may vary according to factors such as the type of cell, the oligonucleotide used, and for in vivo uses the disease state, age, sex, and weight of the individual, and the ability of the oligonucleotide to elicit a desired response in the individual. Establishment of therapeutic levels of oligonucleotides within the cell is dependent upon the rates of uptake and efflux or degradation. Decreasing the degree of degradation prolongs the intracellular half-life of the oligonucleotide. Thus, chemically-modified oligonucleotides, e.g., with modification of the phosphate backbone, may require different dosing.

The exact dosage of an oligonucleotide and number of doses administered will depend upon the data generated experimentally and in clinical trials. Several factors such as the desired effect, the delivery vehicle, disease indication, and the route of administration, will affect the dosage. Dosages can be readily determined by one of ordinary skill in the art and formulated into the subject pharmaceutical compositions. Preferably, the duration of treatment will extend at least through the course of the disease symptoms.

Dosage regimens may be adjusted to provide the optimum therapeutic response. For example, the oligonucleotide may be repeatedly administered, e.g., several doses may be administered daily or the dose may be proportionally reduced as indicated by the exigencies of the therapeutic situation. One of ordinary skill in the art will readily be able to determine appropriate doses and schedules of administration of the subject oligonucleotides, whether the oligonucleotides are to be administered to cells or to subjects.

Administration of sd-rxRNAs, such as through topical application, can be optimized through testing of dosing regimens. In some embodiments, a single administration is sufficient. To further prolong the effect of the administered sd-rxRNA, the sd-rxRNA can be administered in a slow-release formulation or device, as would be familiar to one of ordinary skill in the art. The hydrophobic nature of sd-rxRNA compounds can enable use of a wide variety of polymers, some of which are not compatible with conventional oligonucleotide delivery.

In other embodiments, the sd-rxRNA is administered multiple times. In some instances it is administered daily, bi-weekly, weekly, every two weeks, every three weeks, monthly, every two months, every three months, every four months, every five months, every six months or less frequently than every six months. In some instances, it is administered multiple times per day, week, month and/or year. For example, it can be administered approximately every hour, 2 hours, 3 hours, 4 hours, 5 hours, 6 hours, 7 hours, 8 hours, 9 hours 10 hours, 12 hours or more than twelve hours. It can be administered 1, 2, 3, 4, 5, 6, 7, 8, 9, 10 or more than 10 times per day.

Aspects of the disclosure relate to administering sd-rxRNA molecules to a subject. In some instances the subject is a patient and administering the sd-rxRNA molecule involves administering the sd-rxRNA molecule in a doctor's office.

In some embodiments, more than one sd-rxRNA molecule is administered simultaneously. For example a composition may be administered that contains 1, 2, 3, 4, 5, 6, 7, 8, 9, 10 or more than 10 different sd-rxRNA molecules. In certain embodiments, a composition comprises 2 or 3 different sd-rxRNA molecules. When a composition comprises more than one sd-rxRNA, the sd-rxRNA molecules within the composition can be directed to the same gene or to different genes.

In some instances, the effective amount of sd-rxRNA that is delivered by topical administration is at least approximately 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more than 100 mg/kg including any intermediate values.

In some instances, the effective amount of sd-rxRNA that is delivered through topical application is at least approximately 1, 5, 10, 15, 20, 25, 30, 35, 40, 45, 50, 55, 60, 65, 70, 75, 80, 85, 90, 95, 100, 125, 150, 200, 250, 300, 350, 400, 450, 500, 550, 600, 650, 700, 750, 800, 850, 900, 950 or more than 950 µg including any intermediate values.

sd-rxRNA molecules administered through methods described herein are effectively targeted to all the cell types in the skin. In preferred embodiments, sd-rxRNA molecules administered through methods described herein are effectively targeted to the dermal skin layer (e.g., the dermis) of a subject.

Gene-specific knockout or knockdown phenotypes of cells or non-human organisms, particularly of human cells or non-human mammals may be used in analytic to procedures, e.g. in the functional and/or phenotypical analysis of complex physiological processes such as analysis of gene expression profiles and/or proteomes. Preferably the analysis is carried out by high throughput methods using oligonucleotide based chips.

Therapeutic Use

By inhibiting the expression of a gene, the oligonucleotide compositions of the disclosure can be used to treat any disease involving the expression of a protein. Examples of diseases that can be treated by oligonucleotide compositions, just to illustrate, include: cancer, retinopathies, autoimmune diseases, inflammatory diseases (i.e., ICAM-1 related disorders, Psoriasis, Ulcerative Colitus, Crohn's disease), viral diseases (i.e., HIV, Hepatitis C), miRNA disorders, and cardiovascular diseases.

In one embodiment, in vitro treatment of cells with oligonucleotides can be used for ex vivo therapy of cells removed from a subject (e.g., for treatment of leukemia or viral infection) or for treatment of cells which did not originate in the subject, but are to be administered to the subject (e.g., to eliminate transplantation antigen expression on cells to be transplanted into a subject). In addition, in vitro treatment of cells can be used in non-therapeutic settings, e.g., to evaluate gene function, to study gene regulation and protein synthesis or to evaluate improvements made to oligonucleotides designed to modulate gene expression or protein synthesis. In vivo treatment of cells can be useful in certain clinical settings where it is desirable to inhibit the expression of a protein. There are numerous medical conditions for which antisense therapy is reported to be suitable (see, e.g., U.S. Pat. No. 5,830,653) as well as respiratory syncytial virus infection (WO 95/22,553) influenza virus (WO 94/23,028), and malignancies (WO 94/08, 003). Other examples of clinical uses of antisense sequences are reviewed, e.g., in Glaser. 1996. Genetic Engineering News 16:1. Exemplary targets for cleavage by oligonucleotides include, e.g., protein kinase Ca, ICAM-1, c-raf kinase, p53, c-myb, and the bcr/abl fusion gene found in chronic myelogenous leukemia.

The subject nucleic acids can be used in RNAi-based therapy in any animal having RNAi pathway, such as human, non-human primate, non-human mammal, non-human vertebrates, rodents (mice, rats, hamsters, rabbits, etc.), domestic livestock animals, pets (cats, dogs, etc.), *Xenopus*, fish, insects (*Drosophila*, etc.), and worms (*C. elegans*), etc.

In some aspects, the disclosure provides methods for preventing in a subject, a disease or condition associated with an aberrant or unwanted target gene expression or activity, by administering to the subject a therapeutic agent (e.g., a RNAi agent or vector or transgene encoding same). If appropriate, subjects are first treated with a priming agent so as to be more responsive to the subsequent RNAi therapy. Subjects at risk for a disease which is caused or contributed to by aberrant or unwanted target gene expression or activity can be identified by, for example, any or a combination of diagnostic or prognostic assays as described herein. Administration of a prophylactic agent can occur prior to the manifestation of symptoms characteristic of the target gene aberrancy, such that a disease or disorder is prevented or, alternatively, delayed in its progression. Depending on the type of target gene aberrancy, for example, a target gene, target gene agonist or target gene antagonist agent can be used for treating the subject.

In another aspect, the disclosure pertains to methods of modulating target gene expression, protein expression or activity for therapeutic purposes. Accordingly, in an exemplary embodiment, the modulatory method of the disclosure involves contacting a cell capable of expressing target gene with a therapeutic agent described by the disclosure that is specific for the target gene or protein (e.g., is specific for the mRNA encoded by said gene or specifying the amino acid sequence of said protein) such that expression or one or more of the activities of target protein is modulated. These modulatory methods can be performed in vitro (e.g., by culturing the cell with the agent), in vivo (e.g., by administering the agent to a subject), or ex vivo. Typically, subjects are first treated with a priming agent so as to be more responsive to the subsequent RNAi therapy. As such, the present disclosure provides methods of treating an individual afflicted with a disease or disorder characterized by aberrant or unwanted expression or activity of a target gene polypeptide or nucleic acid molecule. Inhibition of target gene activity is desirable in situations in which target gene is abnormally unregulated and/or in which decreased target gene activity is likely to have a beneficial effect.

The therapeutic agents of the disclosure can be administered to individuals to treat (prophylactically or therapeutically) disorders associated with aberrant or unwanted target gene activity. In conjunction with such treatment, pharmacogenomics (i.e., the study of the relationship between an individual's genotype and that individual's response to a foreign compound or drug) may be considered. Differences in metabolism of therapeutics can lead to severe toxicity or therapeutic failure by altering the relation between dose and blood concentration of the pharmacologically active drug. Thus, a physician or clinician may consider applying knowledge obtained in relevant pharmacogenomics studies in determining whether to administer a therapeutic agent as well as tailoring the dosage and/or therapeutic regimen of treatment with a therapeutic agent. Pharmacogenomics deals with clinically significant hereditary variations in the response to drugs due to altered drug disposition and abnormal action in affected persons. See, for example, Eichelbaum, M. et al. (1996) Clin. Exp. Pharmacol. Physiol. 23(10-11): 983-985 and Linder, M. W. et al. (1997) Clin. Chem. 43(2):254-266

RNAi in Skin Indications

Nucleic acid molecules, or compositions comprising nucleic acid molecules, described herein may in some embodiments be administered to pre-treat, treat or prevent compromised skin. As used herein "compromised skin" refers to skin which exhibits characteristics distinct from normal skin. Compromised skin may occur in association with a dermatological condition. Several non-limiting examples of dermatological conditions include rosacea, common acne, seborrheic dermatitis, perioral dermatitis, acneform rashes, transient acantholytic dermatosis, and acne necrotica miliaris. In some instances, compromised skin may comprise a wound and/or scar tissue. In some instances, methods and compositions associated with the disclosure may be used to promote wound healing, prevention, reduction or inhibition of scarring, and/or promotion of re-epithelialisation of wounds.

A subject can be pre-treated or treated prophylactically with a molecule associated with the disclosure, prior to the skin of the subject becoming compromised. As used herein "pre-treatment" or "prophylactic treatment" refers to administering a nucleic acid to the skin prior to the skin becoming compromised. For example, a subject could be pre-treated 15 minutes, 30 minutes, 1 hour, 2 hours, 3 hours, 4 hours, 5 hours, 6 hours, 7 hours, 8 hours, 9 hours, 10 hours, 11 hours, 12 hours, 24 hours, 48 hours, 3 days, 4 days, 5 days, 6 days, 7 days, 8 days or more than 8 days prior to the skin becoming compromised. In other embodiments, a subject can be treated with a molecule associated with the disclosure immediately before the skin becomes compromised and/or simultaneous to the skin becoming compromised and/or after the skin has been compromised. In some embodiments, the skin is compromised through a medical procedure such as surgery, including elective surgery. In certain embodiments methods and compositions may be applied to areas of the skin that are believed to be at risk of becoming compromised. It should be appreciated that one of ordinary skill in the art would be able to optimize timing of administration using no more than routine experimentation.

In some aspects, methods associated with the disclosure can be applied to promote healing of compromised skin. Administration can occur at any time up until the compromised skin has healed, even if the compromised skin has already partially healed. The timing of administration can depend on several factors including the nature of the compromised skin, the degree of damage within the compromised skin, and the size of the compromised area. In some embodiments administration may occur immediately after the skin is compromised, or 30 minutes, 1 hour, 2 hours, 4 hours, 6 hours, 8 hours, 12 hours, 24 hours, 48 hours, or more than 48 hours (e.g., 3 days, 4, days, 5 days, 6 days, 7 days, 10 days, 14 days, etc.) after the skin has been compromised. Methods and compositions of the invention may be administered one or more times as necessary. For example, in some embodiments, compositions may be administered daily or twice daily. In some instances, compositions may be administered both before and after formation of compromised skin.

Compositions associated with the disclosure may be administered by any suitable route. In some embodiments, administration occurs locally at an area of compromised skin. In some embodiments, compositions may also be administered in a topical form, such as in a cream or ointment. In some embodiments, administration of compositions described herein comprises part of an initial treatment or pre-treatment of compromised skin, while in other embodiments, administration of such compositions comprises follow-up care for an area of compromised skin.

The appropriate amount of a composition or medicament to be applied can depend on many different factors and can be determined by one of ordinary skill in the art through routine experimentation. Several non-limiting factors that might be considered include biological activity and bioavailability of the agent, nature of the agent, mode of administration, half-life, and characteristics of the subject to be treated.

In some aspects, nucleic acid molecules associated with the disclosure may also be used in treatment and/or prevention of fibrotic disorders, including pulmonary fibrosis, liver cirrhosis, scleroderma and glomerulonephritis, lung fibrosis, liver fibrosis, skin fibrosis, muscle fibrosis, radiation fibrosis, kidney fibrosis, proliferative vitreoretinopathy and uterine fibrosis.

A therapeutically effective amount of a nucleic acid molecule described herein may in some embodiments be an amount sufficient to prevent the formation of compromised skin and/or improve the condition of compromised skin. In some embodiments, improvement of the condition of compromised skin may correspond to promotion of wound healing and/or inhibition of scarring and/or promotion of epithelial regeneration. The extent of prevention of formation of compromised skin and/or improvement to the condition of compromised skin may in some instances be determined by, for example, a doctor or clinician.

The ability of nucleic acid molecules associated with the disclosure to prevent the formation of compromised skin and/or improve the condition of compromised skin may in some instances be measured with reference to properties exhibited by the skin. In some instances, these properties may include rate of epithelialisation and/or decreased size of an area of compromised skin compared to control skin at comparable time points.

As used herein, prevention of formation of compromised skin, for example prior to a surgical procedure, and/or improvement of the condition of compromised skin, for example after a surgical procedure, can encompass any increase in the rate of healing in the compromised skin as compared with the rate of healing occurring in a control sample. In some instances, the condition of compromised skin may be assessed with respect to either comparison of the rate of re-epithelialisation achieved in treated and control skin, or comparison of the relative areas of treated and control areas of compromised skin at comparable time points. In some aspects, a molecule that prevents formation of compromised skin or promotes healing of compromised skin may be a molecule that, upon administration, causes the area of compromised skin to exhibit an increased rate of re-epithelialisation and/or a reduction of the size of compromised skin compared to a control at comparable time points. In some embodiments, the healing of compromised skin may give rise to a rate of healing that is 5%, 10%, 20%, 30%, 40%, 50%, 60%, 70%, 80%, 90% or 100% greater than the rate occurring in controls.

In some aspects, subjects to be treated by methods and compositions associated with the disclosure may be subjects who will undergo, are undergoing or have undergone a medical procedure such as a surgery. In some embodiments, the subject may be prone to defective, delayed or otherwise impaired re-epithelialisation, such as dermal wounds in the aged. Other non-limiting examples of conditions or disorders in which wound healing is associated with delayed or otherwise impaired re-epithelialisation include patients suffering from diabetes, patients with polypharmacy, postmenopausal women, patients susceptible to pressure injuries, patients with venous disease, clinically obese patients, patients receiving chemotherapy, patients receiving radiotherapy, patients receiving steroid treatment, and immunocompromised patients. In some instances, defective re-epithelialisation response can contributes to infections at the wound site, and to the formation of chronic wounds such as ulcers.

In some embodiments, methods associated with the disclosure may promote the re-epithelialisation of compromised skin in chronic wounds, such as ulcers, and may also inhibit scarring associated with wound healing. In other embodiments, methods associated with the disclosure are applied to prevention or treatment of compromised skin in acute wounds in patients predisposed to impaired wound healing developing into chronic wounds. In other aspects, methods associated with the disclosure are applied to promote accelerated healing of compromised skin while preventing, reducing or inhibiting scarring for use in general clinical contexts. In some aspects, this can involve the treatment of surgical incisions and application of such methods may result in the prevention, reduction or inhibition of scarring that may otherwise occur on such healing. Such treatment may result in the scars being less noticeable and exhibiting regeneration of a more normal skin structure. In other embodiments, the compromised skin that is treated is not compromised skin that is caused by a surgical incision. The compromised skin may be subject to continued care and continued application of medicaments to encourage re-epithelialisation and healing.

In some aspects, methods associated with the disclosure may also be used in the treatment of compromised skin associated with grafting procedures. This can involve treatment at a graft donor site and/or at a graft recipient site. Grafts can in some embodiments involve skin, artificial skin, or skin substitutes. Methods associated with the invention can also be used for promoting epithelial regeneration. As used herein, promotion of epithelial regeneration encompasses any increase in the rate of epithelial regeneration as compared to the regeneration occurring in a control-treated or untreated epithelium. The rate of epithelial regeneration attained can in some instances be compared with that taking place in control-treated or untreated epithelia using any suitable model of epithelial regeneration known in the art. Promotion of epithelial regeneration may be of use to induce effective re-epithelialisation in contexts in which the re-epithelialisation response is impaired, inhibited, retarded or otherwise defective. Promotion of epithelial regeneration may be also effected to accelerate the rate of defective or normal epithelial regeneration responses in patients suffering from epithelial damage.

Some instances where re-epithelialisation response may be defective include conditions such as pemphigus, Hailey-Hailey disease (familial benign pemphigus), toxic epidermal necrolysis (TEN)/Lyell's syndrome, epidermolysis bullosa, cutaneous leishmaniasis and actinic keratosis. Defective re-epithelialisation of the lungs may be associated with idiopathic pulmonary fibrosis (IPF) or interstitial lung disease. Defective re-epithelialisation of the eye may be associated with conditions such as partial limbal stem cell deficiency or corneal erosions. Defective re-epithelialisation of the gastrointestinal tract or colon may be associated with conditions such as chronic anal fissures (fissure in ano), ulcerative colitis or Crohn's disease, and other inflammatory bowel disorders.

In some aspects, methods associated with the disclosure are used to prevent, reduce or otherwise inhibit compromised skin associated with scarring. This can be applied to any site within the body and any tissue or organ, including the skin, eye, nerves, tendons, ligaments, muscle, and oral cavity (including the lips and palate), as well as internal organs (such as the liver, heart, brain, abdominal cavity, pelvic cavity, thoracic cavity, guts and reproductive tissue). In the skin, treatment may change the morphology and organization of collagen fibers and may result in making the scars less visible and blend in with the surrounding skin. As used herein, prevention, reduction or inhibition of scarring encompasses any degree of prevention, reduction or inhibition in scarring as compared to the level of scarring occurring in a control-treated or untreated wound.

Prevention, reduction or inhibition of compromised skin, such as compromised skin associated with dermal scarring, can be assessed and/or measured with reference to microscopic and/or macroscopic characteristics. Macroscopic characteristics may include color, height, surface texture and stiffness of the skin. In some instances, prevention, reduction or inhibition of compromised skin may be demonstrated when the color, height, surface texture and stiffness of the skin resembles that of normal skin more closely after treatment than does a control that is untreated. Microscopic assessment of compromised skin may involve examining characteristics such as thickness and/or orientation and/or composition of the extracellular matrix (ECM) fibers, and cellularity of the compromised skin. In some instances, prevention, reduction or inhibition of compromised skin may be demonstrated when the thickness and/or orientation and/or composition of the extracellular matrix (ECM) fibers, and/or cellularity of the compromised skin resembles that of normal skin more closely after treatment than does a control that is untreated.

In some aspects, methods associated with the disclosure are used for cosmetic purposes, at least in part to contribute to improving the cosmetic appearance of compromised skin. In some embodiments, methods associated with the disclosure may be used to prevent, reduce or inhibit compromised skin such as scarring of wounds covering joints of the body. In other embodiments, methods associated with the disclosure may be used to promote accelerated wound healing and/or prevent, reduce or inhibit scarring of wounds at increased risk of forming a contractile scar, and/or of wounds located at sites of high skin tension.

In some embodiments, methods associated with the disclosure can be applied to promoting healing of compromised skin in instances where there is an increased risk of pathological scar formation, such as hypertrophic scars and keloids, which may have more pronounced deleterious effects than normal scarring. In some embodiments, methods described herein for promoting accelerated healing of compromised skin and/or preventing, reducing or inhibiting scarring are applied to compromised skin produced by surgical revision of pathological scars.

Aspects of the disclosure relate to compromised skin caused by burn injuries. Healing in response to burn injuries can lead to adverse scarring, including the formation of hypertrophic scars. Methods associated with the disclosure can be applied to treatment of all injuries involving damage to an epithelial layer, such as injuries to the skin in which the epidermis is damaged. Other non-limiting examples of injuries to epithelial tissue include injuries involving the respiratory epithelia, digestive epithelia or epithelia surrounding internal tissues or organs.

The present disclosure is further illustrated by the following Examples, which in no way should be construed as further limiting. The entire contents of all of the references (including literature references, issued patents, published patent applications, and co pending patent applications) cited throughout this application are hereby expressly incorporated by reference.

EXAMPLES

Example 1: Formulation of Sd-rxRNA in Topical Gel Formulation sd-rxRNAs targeting Map4k4 (1.2% w/w) were formulated in 10% urea, 5% lactic acid and water to 100%. To prepare the formulation, urea was added to an appropriate volume of phosphate buffered saline (PBS) and mixed by inversion until the urea was completely dissolved. Lactic acid was added and the solution was vortexed to mix. pH was adjusted to desired level using 10 N NaOH. Methylcellulose (MC) was added and the solution heated to 85° C. to dissolve methylcellulose and vortexed to mix. The solution was allowed to cool to room temperature. The Map4k4-targeting sd-rxRNA solution was added and the final solution was vortexed and stored at 4° C. until use. One example of a Map4k4-targeting formulation is described in Table 10 below.

TABLE 10

| Example of formulation | |
|---|---|
| Ingredient | %, w/w |
| PBS (1X) | 82.8 |
| Urea | 10.00 |
| Lactic Acid | 5.00 |
| Methylcellulose | 1.00 |
| Map4k4-targeting sd-rxRNA | 1.20 |
| Remaining Water/pH adjustment (10N NaOH) | q.s. to 100% |

Example 2: Sd-rxRNA Uptake in an Ex Vivo Pig Skin Explant Model

A formulation comprising fluorescently-labeled sd-rxRNAs in a gel comprising urea and lactic acid (e.g., 1.2% Map4k4 sd-rxRNA, 10% urea, 5% lactic acid; w/w) were topically applied to pig ear explant skin (Yorkshire pigs) in transwell inserts for 48 hours to test for absorption of the sd-rxRNA into the epidermis and dermis. Briefly, pig explant skin was washed with Cetaphil Gentle Skin Cleanser and warm water then blotted dry. Biopsy punches (8 mm each) were taken from the skin and placed into transwell inserts. The edges were sealed with vacuum grease. Inserts were placed into wells of a 6-well dish containing gauze and ~4 mL of complete Eagle's Minimum Essential Medium (EMEM). 15 μL of formulation was added to the top of each skin sample. Media was changed 2× per day. Forty-eight hours following topical application, the skin was rinsed with PBS to remove the formulation, and then transferred to 4% paraformaldehyde. After fixation, the skin was processed, blocked and sections were cut.

Fluorescence imaging was used to detect cellular uptake and localization of the fluorescently-labeled sd-rxRNA. Nuclei were also stained. Staining of stratum corneum was observed for sd-rxRNA formulated in PBS (FIG. 1), whereas staining of the epidermal layer of skin was observed for sd-rxRNA formulated in the gel comprising urea and lactic acid (FIG. 1).

Example 3: Effect of Thickening Agents and Varying pH of Gel Composition on Sd-rxRNA Uptake in an Ex Vivo Pig Skin Explant Model The effects of different formulation thickeners, such as methylcellulose (MC; 1% w/w) and hydroxypropyl cellulose (HPC; 1% w/w), and formulation pH levels, were tested on skin uptake of sd-rxRNA gel compositions comprising urea and lactic acid (e.g., 1.2% Map4k4 sd-rxRNA, 10% urea, 5% lactic acid; w/w). Formulations were topically applied to pig ear explant skin (Yorkshire pigs) in transwell inserts for 48 hours to test for absorption of the fluorescently-labeled sd-rxRNA into the epidermis and dermis.

Briefly, pig explant skin was washed with Cetaphil Gentle Skin Cleanser and warm water then blotted dry. Biopsy punches (8 mm each) were taken from the skin and placed into transwell inserts. The edges were sealed with vacuum grease. Inserts were placed in 6-well dish containing gauze and ~4 mL of complete EMEM. 15 µL of formulation was added to the top of each sample. Media was changed 2× per day. Forty-eight hours following topical application, the skin was rinsed with PBS, to remove the formulation, and then transferred to 4% paraformaldehyde. After fixation, skin was processed, blocked and sections were cut.

Figure 2:
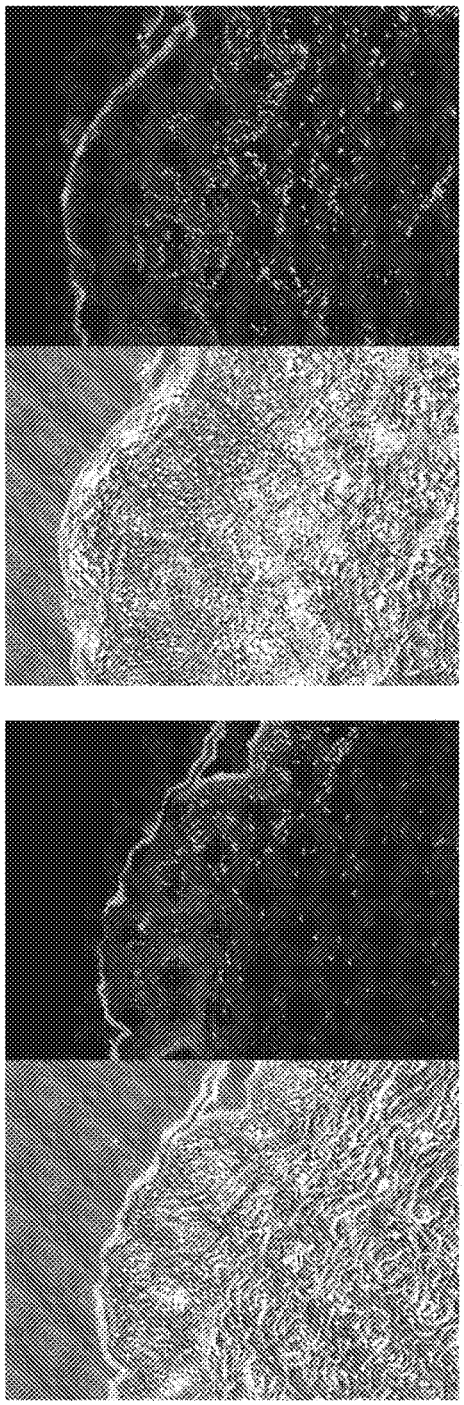
FIG. 2 shows representative images indicating that sd-rxRNA in formulations containing methylcellulose (MC) penetrate into the epidermal layer, and formulations containing hydroxyprolyl cellulose (HPC) penetrate to the stratum corneum, following topical administration.
Figure 2:
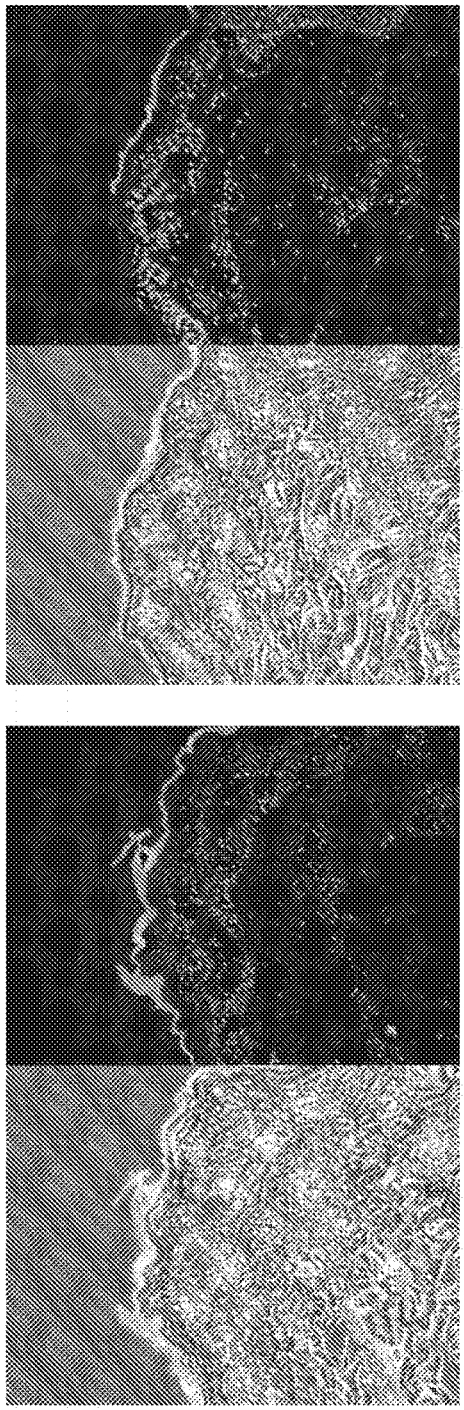
Figure 3:
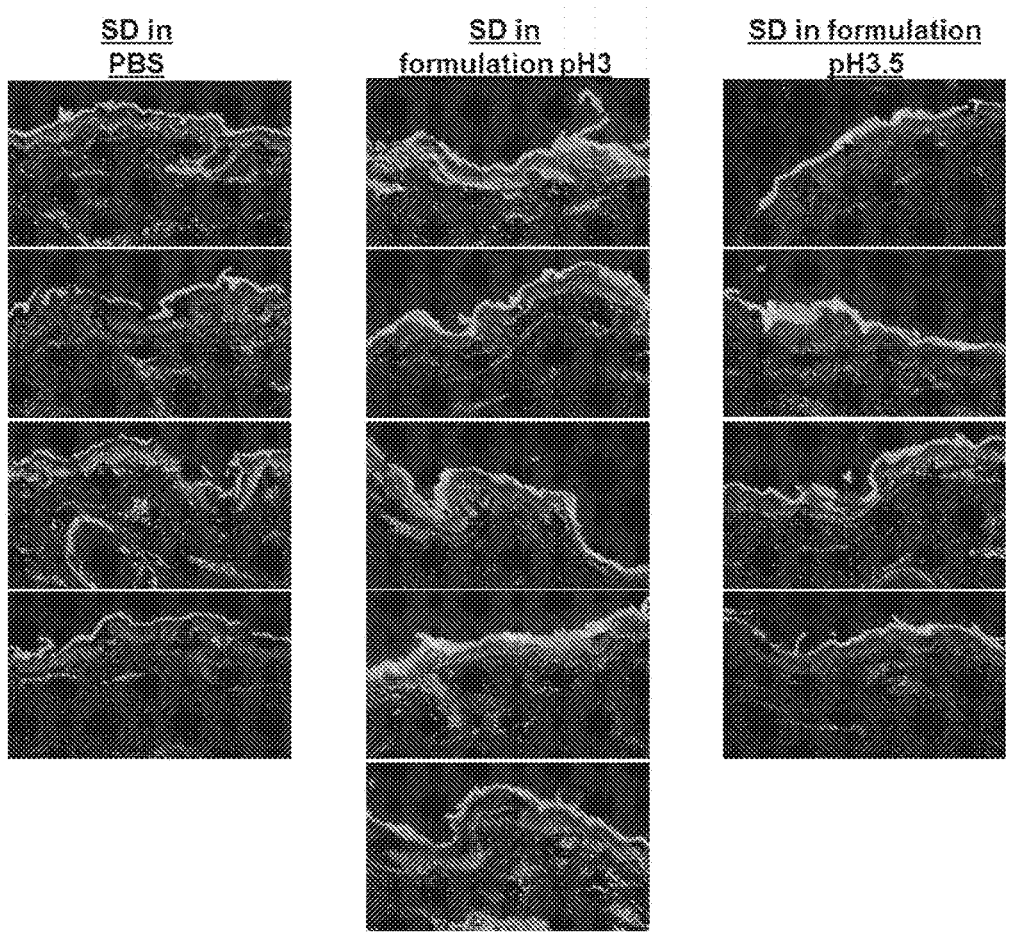
FIG. 3 shows representative images indicating enhanced penetration of sd-rxRNA into epidermis and dermis following topical administration of formulations containing MC and pH adjusted to pH 3.5.
Figure 3:
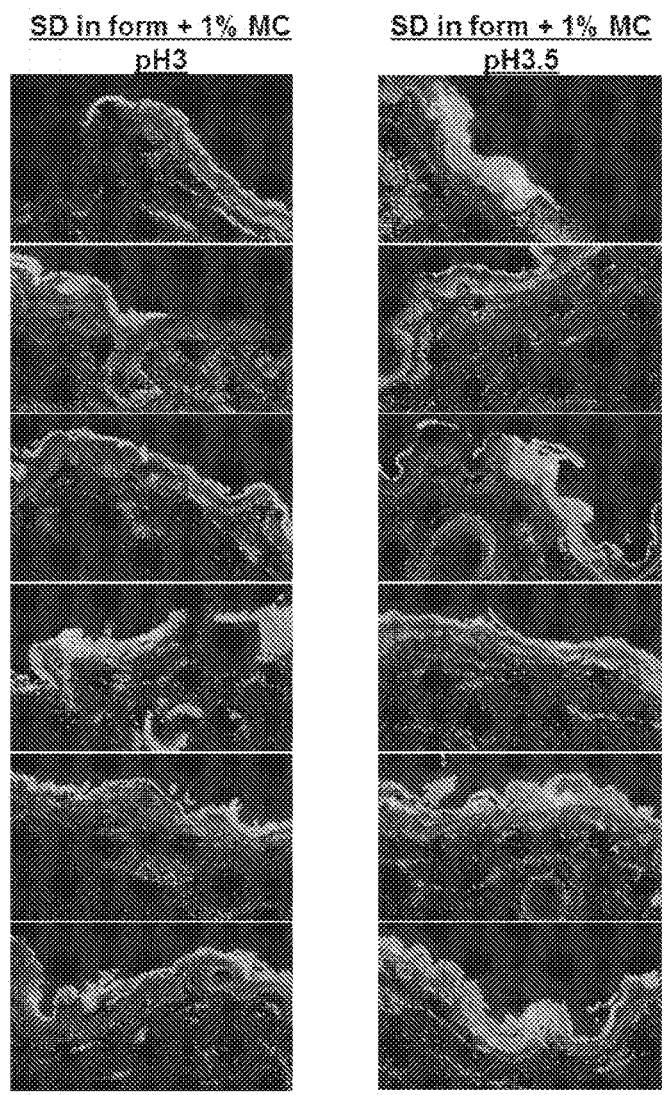

Fluorescence imaging was used to detect cellular uptake and localization of the sd-rxRNA. Nuclei were also stained. FIG. 2 shows enhanced delivery of fluorescently-labeled sd-rxRNA formulated in a urea/lactic acid gel formulation containing 1% methylcellulose to the epidermis and dermis of the tissue. FIG. 3 shows that in some embodiments, adjustment of the formulation to pH 3.5 greatly enhances penetration of sd-rxRNA into the epidermis and dermis of the tissue relative to formulations having a pH of 3.0.

Example 4: Sd-rxRNA Uptake in Human Skin sd-rxRNAs formulated in the urea/lactic acid (e.g., 10% urea, 5% lactic acid, 1% MC, pH 3.5; w/w; see Table 11 below) gel formulation were topically applied to human explant skin in transwell inserts for 48 hours to test for absorption of the fluorescently-labeled sd-rxRNA into the epidermis and dermis. A PBS sd-rxRNA formulation was used as a control (Table 12 below).

Briefly, human explant skin was washed with Cetaphil Gentle Skin Cleanser and warm water then blotted dry. Biopsy punches (8 mm each) were taken from the skin and placed into transwell inserts. The edges were sealed with vacuum grease. Inserts were placed in wells of a 6-well dish containing gauze and ~4 mL of complete EMEM. 15 uL of formulation was added to the top of each skin sample. Media was changed 2× per day. Forty-eight hours following topical application, the skin was rinsed with PBS to remove the formulation, and transferred to 4% paraformaldehyde. After fixation, the skin was processed, blocked and sections were cut.

Figure 4:
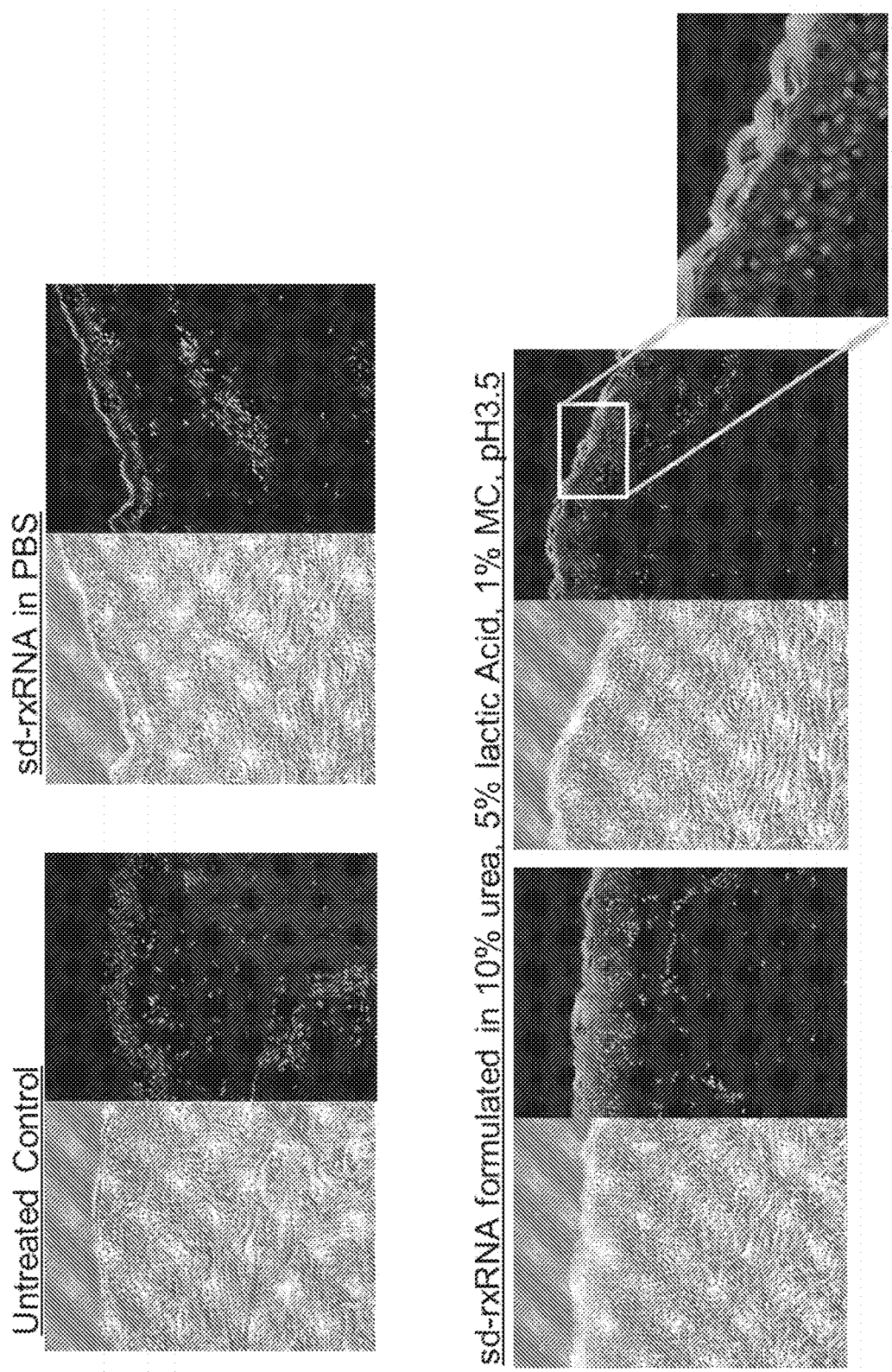
FIG. 4 shows representative images indicating penetration of one embodiment of a sd-rxRNA within a formulation comprising urea (e.g., 10% urea) and lactic acid (e.g., 5% lactic acid) into human skin following topical application.

Fluorescence imaging was used to detect cellular uptake and localization of the fluorescently-labeled sd-rxRNA. Nuclei were also stained. Delivery of fluorescently-labeled sd-rxRNA to the epidermis and dermis was observed in sd-rxRNA gel formulations comprising urea and lactic acid (e.g., 10% urea, 5% lactic acid, 1% MC; w/w) but not in sd-rxRNA PBS formulations (FIG. 4).

TABLE 11

One embodiment of a composition of gel formulation containing sd-rxRNA

| Ingredient | %, w/w |
|---|---|
| Sodium Benzoate, NF | 0.20 |
| NaCl, USP | 0.90 |
| Benecel A4M PHARM | 1.00 |
| Urea, USP | 10.00 |
| Lactic Acid, USP | 5.00 |
| 1N NaOH | 16.40[1] |
| Map4k4 targeting sd-rxRNA | 1.20 |
| Remaining Water/pH adjustment | q.s. to 100% |

TABLE 12

One embodiment of a composition of vehicle gel formulation

| Ingredient | %, w/w |
|---|---|
| Sodium Benzoate, NF | 0.20 |
| NaCl, USP | 0.90 |
| Benecel A4M PHARM | 1.00 |
| Urea, USP | 10.00 |
| Lactic Acid, USP | 5.00 |
| 1N NaOH | 16.40[1] |
| Remaining Water/pH adjustment | q.s. to 100% |

[1]Estimated amount. May require adjustment to final pH 3.5 with 1.0N NaOH and/or 1N HCl from batch to batch.

Example 5: Topical Gel Formulation Containing TYR Targeting Sd-rxRNA Results in Reduced Skin Pigmentation Induced by UV Exposure in Humans This example describes an open-label, single arm (cell), non-randomized, evaluator-blinded pilot study. A one-time, minimal erythemal dose (MED) assessment (using 5 exposures to 5 sites) was performed on the lower back area (Day 1-2). This was followed by a single exposure to UVB radiation (UVR) on Day 7, at 3× the MED level, to 6 sites on the contralateral lower back. Subjects were treated daily with a composition comprising test product and vehicle (e.g., as shown in Table 13) for up for 3 days prior to the UVR (Application Schedule 1) and to 10 days after the UVR (Application Schedule 2). At least one UVR site (per application schedule) remained free of test product and vehicle application (irradiated control). All test sites were occluded with cotton gauze (patch) after application. Clinical grading of skin erythema and pigmentation, as well as skin color assessments using a DSM II ColorMeter, were performed prior to the UVR (Study Day 7) and on Days 1, 4, 7, 9, 11 and 18 after UVR.

TABLE 13

One embodiment of a TYR 77 topical gel formulation

| Ingredient | %, w/w |
|---|---|
| Sodium Benzoate, NF | 0.20 |
| NaCl, USP | 0.90 |
| Benecel A4M PHARM | 1.00 |
| Urea, USP | 10.00 |
| Lactic Acid, USP | 5.00 |

TABLE 13-continued

One embodiment of a TYR 77 topical gel formulation

| Ingredient | %, w/w |
| --- | --- |
| 1N NaOH | 16.401 |
| TYR targeting sd-rxRNA (TYR 77) | 1.20 |
| Remaining Water/pH adjustment | q.s. to 100% |

The "raw" Melanin Index values used for each of the test locations was the mean of the triplicate measurements performed with the Colormeter at each test location. The baseline-corrected Melanin Index values were obtained for each test location by subtracting day 7 Melanin Index (MI) values from each "raw" value. Analyses were done with and without the inclusion of day 25, considering day 18 was the last day of product (RXI-231 or vehicle) applications, and the appropriate length of "follow-up" time was unknown.

Mixed Model Approach

Figure 5:
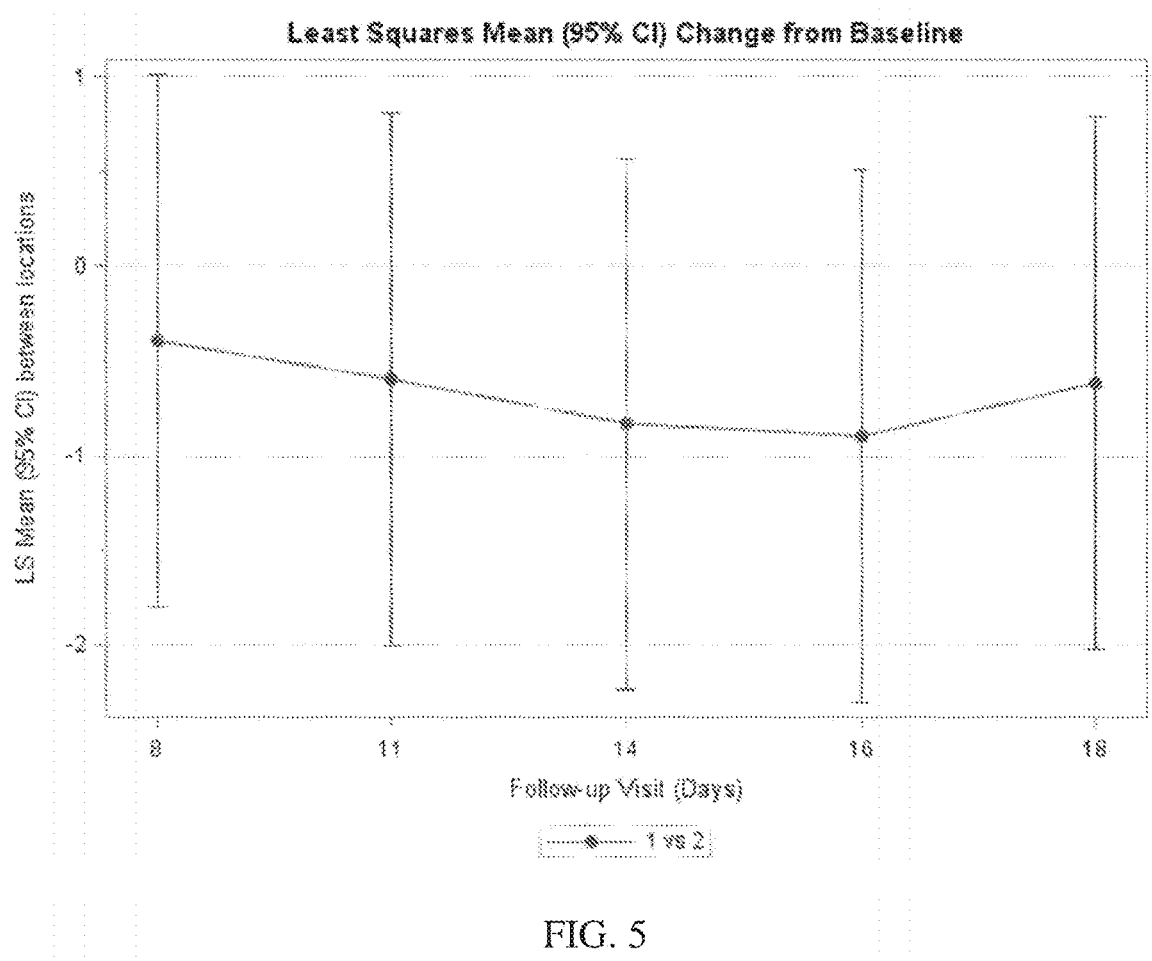
FIG. 5 shows representative data comparing the Melanin Index (MI) change from baseline at each time point for RXI-231 with the time-matched MI change from baseline for vehicle.

To estimate the effect of RXI-231 on the MI, an analysis was done by comparing the MI change from baseline at each time point for RXI-231 with the time-matched MI change from baseline for vehicle (FIG. 5). Point estimates and corresponding 95% CIs were constructed for the baseline adjusted, time matched MI between RXI-231 and vehicle treatment (location) at each time point using a repeated-measure ANCOVA model, fitting subject as random effects and location, visit, visit by location as fixed effects. Baseline MI for each location were included as a covariate. The repeated measures analysis of ANCOVA model were fitted using the SAS PROC MIXED procedure. The estimation method to use were Restricted Maximum Likelihood ((Little, R. C., Milliken, G. A., Stroup, W. W., and Wolfinger, R. D. "SAS Systems for Mixed Models", SAS Institute (1996).

TABLE 14

Type 3 Tests of Fixed Effects

| Effect | Num DF | Den DF | F Value | Pvalue |
| --- | --- | --- | --- | --- |
| day 0 | 1 | 107 | 48.75 | <.0001 |
| visit | 4 | 107 | 44.78 | <.0001 |
| Location | 1 | 107 | 4.38 | 0.0388 |

Using the Mixed Model approach, the difference of Melanin Index change over time between RXI-231 (site 1) and Vehicle (site 2) reached statistical significance (p=0.0388) when RXI-231 applied prior and post UV exposure (Table 14).

EQUIVALENTS

Those skilled in the art will recognize, or be able to ascertain using no more than routine experimentation, many equivalents to the specific embodiments of the invention described herein. Such equivalents are intended to be encompassed by the following claims.

All references, including patent documents, disclosed herein are incorporated by reference in their entirety. This application incorporates by reference the entire contents, including all the drawings and all parts of the specification (including sequence listing or amino acid/polynucleotide sequences) of PCT Publication No. WO2010/033247 (Application No. PCT/US2009/005247), filed on Sep. 22, 2009, and entitled "REDUCED SIZE SELF-DELIVERING RNAI COMPOUNDS," U.S. Pat. No. 8,796,443, issued on Aug. 5, 2014, published as US 2012/0040459 on Feb. 16, 2012, entitled "REDUCED SIZE SELF-DELIVERING RNAI COMPOUNDS," PCT Publication No. WO2009/102427 (Application No. PCT/US2009/000852), filed on Feb. 11, 2009, and entitled, "MODIFIED RNAI POLYNUCLEOTIDES AND USES THEREOF," and US Patent Publication No. 2011/0039914, published on Feb. 17, 2011 and entitled "MODIFIED RNAI POLYNUCLEOTIDES AND USES THEREOF," PCT Publication No. WO 2011/119887 (Application No. PCT/US2011/029867), filed on Mar. 24, 2011, and entitled RNA INTERFERENCE IN DERMAL AND FIBROTIC INDICATIONS, and U.S. Pat. No. 8,664,189, issued on Mar. 4, 2014, published as US 2011/0237648 on Sep. 29, 2011, entitled "RNA INTERFERENCE IN DERMAL AND FIBROTIC INDICATIONS."

The invention claimed is:

1. A pharmaceutical composition formulated in a gel comprising: (a) one or more therapeutic oligonucleotides, (b) urea present in an amount between about 5% and about 15% w/w, (c) lactic acid present in an amount between about 2% and about 10% w/w, and (d) a thickening agent, wherein the thickening agent is methylcellulose (MC), and wherein the thickening agent is present at about 1%, 1.1%, 1.2%, 1.3%, 1.4%, 1.5%, 1.6%, 1.7%, 1.8%, 1.9%, or about 2% w/w, and wherein the pharmaceutical composition has a pH of about 3.5.

2. The pharmaceutical composition of claim 1, wherein the lactic acid is present in an amount between about 2% and about 8% w/w.

3. The pharmaceutical composition of claim 1, further comprising at least one of: a preservative, a salt, a pH adjusting-agent, or any combination of the foregoing.

4. The pharmaceutical composition of claim 1, wherein at least one of the therapeutic oligonucleotides targets CTGF, VEGF, MAP4K4, PDGF-B, SPP1, TGFB1, TGFB2, HIF-1α, mTOR, PTGS2 (COX-2), PPIB, IL-1 alpha, IL-1 beta, Icam-1, Tie 1, Tie 2, ANG2, Ang1, MYC, TNF&, MMP1, TYR or any combination thereof.

5. The pharmaceutical composition of claim 1, wherein at least one of the therapeutic oligonucleotides is an sd-rxRNA.

6. The pharmaceutical composition of claim 5, wherein the sd-rxRNA
   (a) targets CTGF and comprises at least 12 contiguous nucleotides of a sequence set forth in SEQ ID NOs: 1-438;
   (b) targets MMP1 and comprises at least 12 contiguous nucleotides of a sequence set forth in SEQ ID NOs: 439-578;
   (c) targets TYR and comprises at least 12 contiguous nucleotides of a sequence set forth in SEQ ID NOs: 579-738; or
   (d) targets MAP4k4.

7. The pharmaceutical composition of claim 6, wherein the sd-rxRNA comprises
   (a) a sense strand having a sequence set forth in SEQ ID NO: 359 and an antisense strand having a sequence set forth in SEQ ID NO: 360;
   (b) a sense strand having a sequence set forth in SEQ ID NO: 540 and an antisense strand having a sequence set forth in SEQ ID NO: 569;
   (c) a sense strand having a sequence set forth in SEQ ID NO: 696 and an antisense strand having a sequence set forth in SEQ ID NO: 735;
   (d) a sense strand having a sequence set forth in SEQ ID NO: 739 and an antisense strand having a sequence set forth in SEQ ID NO: 740; or
   (e) a sense strand having a sequence set forth in SEQ ID NO: 741 and an antisense strand having a sequence set forth in SEQ ID NO: 742.

8. The pharmaceutical composition of claim 5, wherein the composition comprises 0.1% w/w to 10% w/w therapeutic oligonucleotide.

9. A method for delivering a therapeutic oligonucleotide to the dermis of a subject, the method comprising topically administering a pharmaceutical composition of claim 1 to the subject.

* * * * *